(12) United States Patent
Gulko et al.

(10) Patent No.: US 7,720,698 B1
(45) Date of Patent: May 18, 2010

(54) METHOD AND APPARATUS FOR PERFORMING ASSESSMENTS

(75) Inventors: Paul Gulko, Swampscott, MA (US); Linda Angelone, Everett, MA (US); Kathleen Lavin, Norwood, MA (US); Karen Anderson, Falmouth, MA (US); Denise Amigo, Malden, MA (US); James Winskowicz, Beverly, MA (US)

(73) Assignee: Guaranty Fund Management Services, Boston, MA (US)

( * ) Notice: Subject to any disclaimer, the term of this patent is extended or adjusted under 35 U.S.C. 154(b) by 1724 days.

(21) Appl. No.: 09/905,772

(22) Filed: Jul. 13, 2001

Related U.S. Application Data

(63) Continuation-in-part of application No. 09/745,011, filed on Dec. 20, 2000, now Pat. No. 7,509,265.

(51) Int. Cl.
*G06Q 40/00* (2006.01)
(52) U.S. Cl. .................. 705/4; 705/36; 705/35; 705/30
(58) Field of Classification Search .............. 705/4, 705/36
See application file for complete search history.

(56) References Cited

U.S. PATENT DOCUMENTS

| | | | | |
|---|---|---|---|---|
| 5,704,045 A | * | 12/1997 | King et al. .................. 705/35 |
| 5,802,501 A | * | 9/1998 | Graff .................. 705/36 R |
| 5,991,733 A | * | 11/1999 | Aleia et al. .................. 705/8 |
| 6,119,093 A | * | 9/2000 | Walker et al. .................. 705/4 |
| 6,604,080 B1 | * | 8/2003 | Kern .................. 705/4 |
| 2002/0035488 A1 | * | 3/2002 | Aquila et al. .................. 705/4 |

OTHER PUBLICATIONS

Dan Fitzgerald Presentation dated Jul. 12, 1999.
Presentation of the members of the Board of Directors of Guaranty Fund Management Services dated Apr. 2000.

* cited by examiner

*Primary Examiner*—Vanel Frenel
(74) *Attorney, Agent, or Firm*—Nixon Peabody LLP

(57) ABSTRACT

Described are techniques used in connection with providing insolvency services in connection with guaranty funds, such as property and casualty guaranty funds, upon the occurrence of an insurance company insolvency. A client/server system provides for creating and maintaining a database of state and insurance company member information. Operations, such as calculations, are performed in accordance with different rules that are associated with varying state laws and rules that may vary with insurance account. A range of functions are performed by the system including report generation, unearned premium calculations, assessment calculation, claim entry and management, administrative tasks, and other related operations. The system which provides services and operations in connection with managing insolvency funds may interact with other applications and systems, such as an accounting system, word processing system, and the like by generating data used as input in these other systems. Also described is a database schema representing a relationship between the different data entities that may be stored in a database in connection with performing insolvency operations.

27 Claims, 116 Drawing Sheets

34
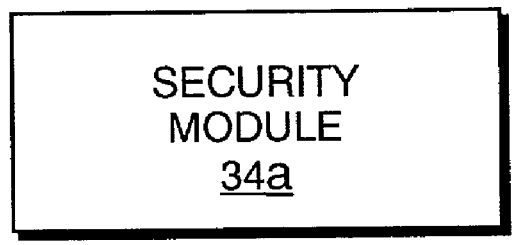
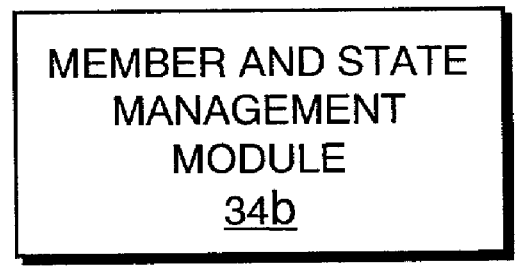
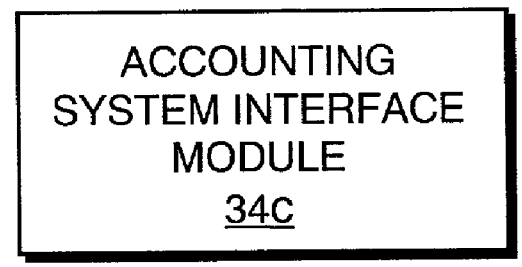
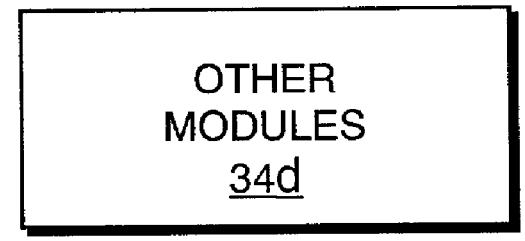
FIG. 4

CAPS

File Claims Unearned Premiums Assessments Member/State Financial Administration Reports Diary View Window Help

Unearned Premium Policy Detail 242

State Fund:
Insolvency:
UP Policy Number:

Insured 224

Insured #1 - First Name:    MI:    Last Name:
Insured #2 - First Name:    MI:    Last Name:
D/B/A or Company:

Policy 226a    Insured 240    226b    Premium Calculation 226c    Payment History 226d

Insured
Street 1:
Street 2:
Street 3:
City:    State:
Zip Code:

Proof of Claim:    Waived
Proof of Claim #:

Optional or Additional Payee
         Type:
Name:
Street 1:
Street 2:
Street 3:
City:    State:
Zip Code:

[New] [Search...] [Notes...] [Diary...] [Delete] [Print] [Save] [Close] 230

Insolvency Mapping

Insolvency: Johnson Mutual Insurance Company

State Fund: NH

Insurance Account: Auto

_504_

Coverage List:

| Yes/No | Coverage Code | Coverage Description |
|---|---|---|
| N | 305003 | Commercial Auto-Liability-Bodily Injury-Combined Single or Split Limit |
| N | 305006 | Commercial Auto-Liability-Bodily Injury-Combined Single or Split Limit-Aggregate |
| N | 305009 | Commercial Auto-Liability-Bodily Injury-Underinsured Motorist |
| N | 305012 | Commercial Auto-Liability-Bodily Injury-Uninsured Motorist |
| N | 305015 | Commercial Auto-Liability-Property Damage-Combined Single or Split Limit |
| N | 305018 | Commercial Auto-Liability-Property Damage-Combined Single or Split Limit-Aggregate |
| N | 305021 | Commercial Auto-Liability-Property Damage-Underinsured Motorist |
| N | 305024 | Commercial Auto-Liability-Property Damage-Uninsured Motorist |
| N | 305027 | Personal Injury Protection (PIP)-No Fault |
| N | 305030 | Medical Payments |
| N | 305033 | Comprehensive or Specified Perils |
| N | 305036 | Commercial |

_502_

Map/Unmap — 506a
Save — 506b
Close — 506c

FIG. 21

Totals 510

State Fund: MA  Claim Number: 12345678901234567890
Insolvency: Abington Mutual Insurance Company  GFMS Number: GF00000001
Policy Number: HP02024000000000000  Date of Loss: 04/27/1999

Claimant

Claimant: Bronson Klopfenstein  512

Coverage 514

Coverage List: 516

| Coverage | Loss Res. | Loss Paid | Loss Pend. | Exp. Res. | Exp. Paid | Exp. Pend. | Loss Recovery | Exp. Recovery | Offset |
|---|---|---|---|---|---|---|---|---|---|
| Benefits | $300,000.00 | $20,000.00 | $2,000.00 | $40,000.00 | $4,000.00 | $0 | $1,000.00 | $100.00 | $500.00 |
| Medical Expense | $11,000.00 | $600.00 | $0 | $5,000.00 | $1,000.00 | $50.00 | $1,000.00 | $0 | $0 |
| COLA | $3,000.00 | $500.00 | $150.00 | $1,000.00 | $200.00 | | | | |
| Claimant Totals | $314,000 | $21,000 | $2,150 | $46,000 | $5,200 | $50 | $2,000 | $100 | $500 |
| Claim Totals | $600,000 | $60,000 | $10,000 | $90,000 | $15,000 | $3,000 | $7,000 | $500 | $1,000 |

[Close]

FIG. 22

Totals

State Fund: [MA]
Insolvency: [Abington Mutual Insurance Company]
Policy Number: [HP02024000000000000]

Claim Number: [1234567890123456 7890]
GFMs Number: [GF00000001]
Date of Loss: [04/27/1999]

_520_

_522_

Claimant

Coverage: [Benefits ▽] _524_

Coverage

Claimant List:

| Claimant | Loss Res. | Loss Paid | Loss Pend. | Exp. Res. | Exp. Paid | Exp. Pend. | Loss Recovery | Exp. Recovery | Offset |
|---|---|---|---|---|---|---|---|---|---|
| Bronson Klopfenstein | $300,000.00 | $20,000.00 | $2,000.00 | $40,000.00 | $4,000.00 | $0 | $2,000.00 | $150.00 | $600.00 |
| John Smith | $200,000.00 | $30,000.00 | $3,000.00 | $40,000.00 | $5,000.00 | $1,000.00 | $0 | $0 | $0 |
| | | | | | | | | | |
| Coverage Totals | $500,000 | $50,000 | $5,000 | $80,000 | $9,000 | $1,000 | $2,000 | $150 | $600 |
| | | | | | | | | | |
| Claim Totals | $600,000 | $60,000 | $10,000 | $90,000 | $15,000 | $3,000 | $7,000 | $500 | $1,000 |

_526_

[Close]

FIG. 23

Diary Detail  530

| Field | Value |
|---|---|
| State Fund: | RI. Ins. Insolvency Fund |
| Insolvency: | United Community Insurance Co. |
| Policy Number: | WC 447824 |
| Insured: | South Kingstown School Dept. |
| Claimant: | Jason Rodner |
| Claim Number: | 435678 |
| Date of Loss: | 02/13/1999 |
| User ID: | gwl |
| Diary Date: | 05/10/1999 |
| Comments: | New Claim |

532

Reviewer ID: df1  — 535a
Review Date: 06/30/1999  OR  Number of Days:  — 535b

534

Diary History List:

| Diary Date | Review Date | Comments |
|---|---|---|

536

[Save]  [Cancel]

FIG. 24

| | ACTION | DIARY TYPE | CLAIM | UNEARNED PREMIUM | GENERIC |
|---|---|---|---|---|---|
| APPROVAL | • WHEN A CLAIM PAYMENT IS DELETED | CLAIM PAYMENT APPROVAL | ✓ | | |
| APPROVAL | • WHEN AN UNEARNED PREMIUM PAYMENT IS DELETED | UP PAYMENT APPROVAL | | ✓ | |
| APPROVAL | • WHEN THE CLOSING OF A CLAIM IS REJECTED | CLAIM CLOSING APPROVAL | ✓ | | |
| APPROVAL | • WHEN THE CLOSING OF AN UNEARNED PREMIUM IS REJECTED | UP CLOSING APPROVAL | | ✓ | |
| CLAIM | • WHEN A CLAIM STATUS IS CHANGED TO "CLOSE" | CLAIM STATUS CHANGED | ✓ | | |
| UNEARNED PREMIUM | • WHEN AN UNEARNED PREMIUM STATUS IS CHANGED TO "CLOSE" | UP STATUS CHANGED | | ✓ | |
| LOI | • WHEN A LOI IS MODIFIED | LOI MODIFIED | | | ✓ |
| LOI | • WHEN A LOI IS DELETED | LOI DELETED | | | ✓ |
| NOTES | • WHEN A CLAIM NOTE IS SENT TO A REVIEWER | CLAIM NOTE | ✓ | | |
| NOTES | • WHEN A CLAIMANT NOTE IS SENT TO A REVIEWER | CLAIMANT NOTE | ✓ | | |
| NOTES | • WHEN AN UNEARNED PREMIUM NOTE IS SENT TO A REVIEWER | UP NOTE | | ✓ | |
| RESERVE | • WHEN A RESERVE IS ADJUSTED FOR A CLAIMANT | CLAIM RESERVE | ✓ | | |
| RESERVE | • WHEN A RESERVE IS ADJUSTED FOR A UNEARNED PREMIUM POLICY | UP RESERVE | | ✓ | |
| TAXPAYER | • WHEN A NEW TAXPAYER IS ADDED | NEW TAXPAYER | | | ✓ |
| TAXPAYER | • WHEN A TAXPAYER IS MODIFIED | MODIFY TAXPAYER | | | ✓ |
| CLAIMANT | • WHEN THE USER ENTERS OR ADJUSTS A RESERVE ABOVE A USER'S PRESET RESERVE AGGREGATE OR INCREMENT LIMIT, THEN A DIARY IS SENT TO A CLAIM MANAGER FOR APPROVAL. | CLAIMANT RESERVE ABOVE LIMIT | ✓ | | |

FIG. 25

FROM 700
FIG. 26U clm_ins_zip: varchar(9) NULL
clm_ins_phone: char(10) NULL
clm_ins_extension: varchar(8) NULL
clm_ins_fax: char(10) NULL
clm_ins_email: varchar(30) NULL
clm_status: varchar(8) NULL
clm_status_date: datetime NULL
clm_status_reason: varchar(8) NULL
clm_status_approved_by: varchar(8) NULL
clm_lookup_code_1: varchar(8) NULL
clm_lookup_code_2: varchar(8) NULL
clm_lookup_code_3: varchar(8) NULL
clm_lookup_code_4: varchar(8) NULL
clm_lookup_code_5: varchar(8) NULL
clm_read_note: char(1) NULL
clm_lien_indicator: char(1) NULL
clm_file_location_date: datetime NULL
clm_box_number: varchar(20) NULL
clm_blocked: char(1) NULL
clm_mod_user: varchar(8) NULL
clm_source: varchar(8) NULL
clm_mod_date: datetime NULL
clm_comp_name: varchar(50) NULL
clm_contact_last_name: varchar(30) NULL
clm_deleted_ind: char(1) NOT NULL
clm_add_user: varchar(8) NULL
clm_add_date: datetime NULL
cbn_contact_first_name: varchar(30) NULL

FIG. 26V

NAIC Data Preview - MEMPREM ~1018

Premium Year: 1999
State Fund: VA

Member Find
NAIC#: [ ] [Find]

Filter
- ⦿ All
- ○ Loaded
- ○ Not Loaded

| NAIC | State Fund | LOI | Premium | Dividends | Unpaid | Loaded |
|---|---|---|---|---|---|---|
| 10014 | VA | 1 | 1632932 | 0 | 0 | Y |
| 10014 | VA | 2.1 | 94363 | 0 | 0 | Y |
| 10014 | VA | 2.2 | 0 | 0 | 0 | Y |
| 10014 | VA | 2.3 | 0 | 0 | 0 | Y |
| 10014 | VA | 3 | 0 | 0 | 0 | Y |
| 10014 | VA | 4 | 4784 | 940 | 15804 | Y |
| 10014 | VA | 5.1 | 39856 | 0 | 0 | Y |
| 10014 | VA | 5.2 | 0 | 0 | 0 | Y |
| 10014 | VA | 6 | 0 | 0 | 0 | Y |
| 10014 | VA | 8 | 136029 | 0 | 48028 | Y |
| 10014 | VA | 9 | 600117 | 0 | 3075 | Y |
| 10014 | VA | 10 | 0 | 0 | 0 | Y |
| 10014 | VA | 11 | 0 | 0 | 0 | Y |
| 10014 | VA | 12 | 0 | 0 | 0 | Y |
| 10014 | VA | 13 | 0 | 0 | 0 | Y |
| 10014 | VA | 14 | 0 | 0 | 0 | Y |
| 10014 | VA | 15.1 | 0 | 0 | 0 | Y |
| 10014 | VA | 15.2 | 0 | 0 | 0 | Y |
| 10014 | VA | 15.3 | 0 | 0 | 0 | Y |

[Cancel]

FIG. 30

NAIC File Staging — 1010

State Fund:
Premium Year: 1999
File Type: Demographics
File Name:
Status:
% Complete:

OK  Options (1012)  Close

FIG. 31

Premium Summary

State Fund: RI ▽  Year: 1994 ▽  Insolvency Date: ▽   Member Fund: NAIC #: [Find]   Status: Approved Premium Subtotals — 1104 Member Ratios

| Member | NAIC# | Auto | Other | Worker's Compensa | Total | (Non-Assessable) | Auto P.A. |
|---|---|---|---|---|---|---|---|
| AFFILIATED FM INSURAN | 10014 | 0 | 1,087,498 | 3 | 1,087,501 | 325,967 | |
| ARBELLA INDEMNITY INS | 10017 | 0 | 0 | 0 | 0 | 0 | |
| AGWAY INSURANCE COM | 10022 | 3,721 | 769 | 0 | 4,490 | 0 | |
| ACE INDEMNITY INSURAN | 10030 | 0 | 0 | 0 | 0 | 0 | |
| AMERICAN BANKERS INS | 10111 | 87,833 | 1,844,745 | 0 | 1,932,578 | 754,632 | |
| AMERICAN LIVE STOCK IN | 10200 | 0 | 0 | 0 | 0 | 0 | |
| NATIONAL CONTINENTAL | 10243 | 0 | 0 | 0 | 0 | 0 | |
| APPALACHIAN INSURANC | 10316 | 0 | 0 | 0 | 0 | 0 | |
| NOBEL INSURANCE COM | 10340 | 0 | 74 | 0 | 74 | 57,432 | |
| AVEMCO INSURANCE CO | 10367 | 0 | 159,302 | 0 | 159,302 | 21,583 | |
| AMERICAN CENTENNIAL | 10391 | 0 | 80,000 | 0 | 80,000 | 74,182 | |
| SUMMIT INSURANCE COM | 10430 | 155,640 | 351,920 | 0 | 507,560 | 0 | |
| CANAL INSURANCE COM | 10464 | 1,199,321 | 38,491 | 0 | 1,237,812 | 0 | |
| CHRYSLER INSURANCE C | 10499 | 697,682 | 132,883 | 1,195 | 831,760 | 10,837 | |
| CAROLINA CASUALTY INS | 10510 | 109,930 | 5,875 | 0 | 115,805 | 0 | |
| PROSELECT INSURANCE | 10638 | 0 | 0 | 0 | 0 | 0 | |

[Premium Detail...]  [Add Premium...]  [Delete Premium]  [Insolvency Dates...]  [Calculate State Law]  [Close]

FIG. 34

Premium Summary

State Fund: RI ▽  Year: 1994 ▽  Insolvency Date: ▽  Member Fund: NAIC #: [Find]  Status: Approved 1100b Premium Subtotals — 1104 — Member Ratios — 1101

| Member | NAIC# | Auto P.A. | Other P.A. | Worker's Compensa | Total P.A. | -Assessable) P.A. | Unallocated |
|---|---|---|---|---|---|---|---|
| AFFILIATED FM INSURAN | 10014 | | | 0 | | | 564,381 |
| ARBELLA INDEMNITY INS | 10017 | | | 0 | | | 0 |
| AGWAY INSURANCE COM | 10022 | | | 0 | | | 18 |
| ACE INDEMNITY INSURAN | 10030 | | | 0 | | | 0 |
| AMERICAN BANKERS INS | 10111 | 87,833 | 679,288 | 0 | 767,121 | 345,348 | 1,639,935 |
| AMERICAN LIVE STOCK IN | 10200 | | | 0 | | | 0 |
| NATIONAL CONTINENTAL | 10243 | | | 0 | | | 0 |
| APPALACHIAN INSURANC | 10316 | | | 0 | | | 0 |
| NOBEL INSURANCE COM | 10340 | | | 0 | | | 0 |
| AVEMCO INSURANCE CO | 10367 | | | 0 | | | 21,583 |
| AMERICAN CENTENNIAL | 10391 | | | 0 | | | 80,000 |
| SUMMIT INSURANCE COM | 10430 | | | 0 | | | 6,927 |
| CANAL INSURANCE COM | 10464 | | | 0 | | | 38,491 |
| CHRYSLER INSURANCE C | 10499 | | | 0 | | | 3,849 |
| CAROLINA CASUALTY INS | 10510 | | | 0 | | | 5,875 |
| PROSELECT INSURANCE | 10638 | | | 0 | | | 0 |

[Premium Detail...] [Add Premium...] [Delete Premium] [Insolvency Dates...] [Calculate State Law] [Close]

FIG. 35

Premium Summary

State Fund: [RI ▽]  Year: [1994 ▽]  Insolvency Date: [ ▽]  Member Fund: NAIC #: [ ]  [Find]  Status: [Approved] ← 1144a Premium Subtotals — 1140a Member Ratios

| Member | NAIC# | Auto | Other | Worker's Compensa | Auto P.A. | Other P.A. | Workers |
|---|---|---|---|---|---|---|---|
| AFFILIATED FM INSURAN | 10014 | 0.00000000 | 0.00287785 | 0.00000011 | | | |
| ARBELLA INDEMNITY INS | 10017 | 0.00000000 | 0.00000000 | 0.00000000 | | | |
| AGWAY INSURANCE COM | 10022 | 0.00000672 | 0.00000204 | 0.00000000 | | | |
| ACE INDEMNITY INSURAN | 10030 | 0.00000000 | 0.00000000 | 0.00000000 | | | |
| AMERICAN BANKERS INS | 10111 | 0.00015860 | 0.00488175 | 0.00000000 | | 0.00179760 | |
| AMERICAN LIVE STOCK IN | 10200 | 0.00000000 | 0.00000000 | 0.00000000 | | | |
| NATIONAL CONTINENTAL | 10243 | 0.00000000 | 0.00000000 | 0.00000000 | | | |
| APPALACHIAN INSURANC | 10316 | 0.00000000 | 0.00000020 | 0.00000000 | | | |
| NOBEL INSURANCE COM | 10340 | 0.00000000 | 0.00042156 | 0.00000000 | | | |
| AVEMCO INSURANCE CO | 10367 | 0.00000000 | 0.00021170 | 0.00000000 | | | |
| AMERICAN CENTENNIAL | 10391 | 0.00028104 | 0.00093129 | 0.00000000 | | | |
| SUMMIT INSURANCE COM | 10430 | 0.00216564 | 0.00010186 | 0.00000000 | | | |
| CANAL INSURANCE COM | 10464 | 0.00000000 | 0.00000000 | 0.00000000 | | | |
| CHRYSLER INSURANCE C | 10499 | 0.00125982 | 0.00035165 | 0.00004286 | | | |
| CAROLINA CASUALTY INS | 10510 | 0.00019850 | 0.00001555 | 0.00000000 | | | |

[Calculate Ratios...] ← 1142a   [Recalculate Member] ← 1146a   [Close]

FIG. 36

Premium Summary

State Fund: RI ▽  Year: 1994 ▽  Insolvency Date: ▽  Member Fund: NAIC #: [Find]  Status: Approved

Premium Subtotals

| Member | NAIC# | Other | Worker's Compensa |
|---|---|---|---|
| AFFILIATED FM INSURAN | 10014 | 0.00287785 | 0.00000011 |
| ARBELLA INDEMNITY INS | 10017 | 0.00000000 | 0.00000000 |
| AGWAY INSURANCE COM | 10022 | 0.00000204 | 0.00000000 |
| ACE INDEMNITY INSURAN | 10030 | 0.00000000 | 0.00000000 |
| AMERICAN BANKERS INS | 10111 | 0.00488175 | 0.00000000 |
| AMERICAN LIVE STOCK IN | 10200 | 0.00000000 | 0.00000000 |
| NATIONAL CONTINENTAL | 10243 | 0.00000000 | 0.00000000 |
| APPALACHIAN INSURANC | 10316 | 0.00000000 | 0.00000000 |
| NOBEL INSURANCE COM | 10340 | 0.00000020 | 0.00000000 |
| AVEMCO INSURANCE CO | 10367 | 0.00042156 | 0.00000000 |
| AMERICAN CENTENNIAL | 10391 | 0.00021170 | 0.00000000 |
| SUMMIT INSURANCE COM | 10430 | 0.00093129 | 0.00000000 |
| CANAL INSURANCE COM | 10464 | 0.00010186 | 0.00000000 |
| CHRYSLER INSURANCE C | 10499 | 0.00035165 | 0.00004286 |
| CAROLINA CASUALTY INS | 10510 | 0.00001555 | 0.00000000 |

Member Ratios

| Auto P.A. | Other P.A. | Workers' Compensa |
|---|---|---|
|  |  |  |
|  |  |  |
|  |  |  |
|  |  |  |
|  | 0.00179760 |  |
|  |  |  |
|  |  |  |
|  |  |  |
|  |  |  |
|  |  |  |
|  |  |  |
|  |  |  |
|  |  |  |
|  |  |  |
|  |  |  |

[Calculate Ratios...] [Recalculate Member] [Close]

Premium Detail — 1150a

State Fund: RI ▽ | Year: 1994 ▽ | NAIC #: 10111 | AMERICAN BANKERS INS. CO. OF FLORIDA | Insolvency Date: / / | Status: Approved | Policy Holders: ☐

1154a

| LOI# | Line of Insurance | Account | NAIC Premium | NAIC Dividend | Adjusted Premium | Adjusted Dividend | State Law Adjusted | Net P |
|---|---|---|---|---|---|---|---|---|
| 1 | FIRE | Other | 2,848 | 0 | | | > 3000 | |
| 2.1 | ALLIED LINES | Other | 132 | 0 | | | | |
| 3 | FARMOWNERS MULTIPL | Other | 15,478 | 0 | | | | |
| 4 | HOMEOWNERS MULTIPL | Other | 505,624 | 0 | | | | |
| 9 | INLAND MARINE | Multi | 1,296,383 | 0 | 1,296,383 | 0 | | |
| 13 | GROUP ACCIDENT & HEA | (Non-Asse | 344,485 | 0 | | | | |
| 15.6 | ALL OTHER A&H | (Non-Asse | 65,865 | 0 | | | | |
| 17 | OTHER LIABILITY | Other | 24,280 | 0 | | | | |
| 19.2 | OTHER PRIVATE PASSEN | Auto | 26,845 | 0 | | | | |
| 21.1 | PRIVATE PASSENGER AIR | Auto | 60,988 | 0 | | | | |
| 24 | SURETY | (Non-Asse | 730 | 0 | | | | |
| 31 | AGGREGATE WRITE-INS | Multi | 343,552 | 0 | 343,552 | 0 | | |

1154b — Totals

NAIC Premium: 2,687,210    Net Premium: 2,687,210

NAIC Dividend: 0    Net Premium Post-Assessment: 1,112,469

[Save] [Allocate] [Close]

FIG. 38

Premium Detail — 1150b

State Fund: RI ▽  Year: 1994 ▽  NAIC #: 10111  AMERICAN BANKERS INS. CO. OF FLORIDA  Status: Approved Insolvency Date: / /  > 3000 Policy Holders: ☐

| LOI# | Line of Insurance | Account | Net Premium | Post Assessment Adjusted | State Law post Ass | Net Premium Post A |
|---|---|---|---|---|---|---|
| 1 | FIRE | Other | 2,848 | | | 2,848 |
| 2.1 | ALLIED LINES | Other | 132 | | | 132 |
| 3 | FARMOWNERS MULTIPL | Other | 15,478 | | | 15,478 |
| 4 | HOMEOWNERS MULTIPL | Other | 505,624 | 505,327 | 505,327 | 505,327 |
| 9 | INLAND MARINE | Multi | 1,296,383 | | 131,223 | 131,223 |
| 13 | GROUP ACCIDENT & HEA | (Non-Asse | 344,485 | 968 | 968 | 968 |
| 15.6 | ALL OTHER A&H | (Non-Asse | 65,865 | 98 | 98 | 98 |
| 17 | OTHER LIABILITY | Other | 24,280 | | | 24,280 |
| 19.2 | OTHER PRIVATE PASSEN | Auto | 26,845 | | | 26,845 |
| 21.1 | PRIVATE PASSENGER AIR | Auto | 60,988 | | | 60,988 |
| 24 | SURETY | (Non-Asse | 730 | | | 730 |
| 31 | AGGREGATE WRITE-INS | Multi | 343,552 | | | 343,552 |

Totals

NAIC Premium: 2,687,210  Net Premium: 2,687,210
NAIC Dividend: 0  Net Premium Post-Assessment: 1,112,469

[Save]  [Allocate]  [Close]

FIG. 39

AGGREGATE WRITE-INS Allocation

Allocation Base Total: [ 0 ]   Unallocated: [ 0 ]

Status: Approved

Insurance Account Total:

| Account | Subtotal |
|---|---|
| Auto | 0 |
| Other | 0 |
| Workers' Compensa (Non-Assessable) | 343,552 |

Allocation:

| LOI# | Line of Insurance | Account | Allocation Base | Premium | Dividend | State Law | Net | Post-Assessment |
|---|---|---|---|---|---|---|---|---|
| 31.996 | CONVERSION - AUTO | Auto | | | 0 | 0 | | 0 |
| 31.996 | CONVERSION - OTHER | Other | | | 0 | 0 | 0 | 0 |
| 31.996 | CONVERSION - WORKERS | Workers'C | | | 0 | 0 | | 0 |
| 31.996 | CONVERSION - NONE | (Non-Asse | | 343,552 | | | 343,552 | |

[ Save ]   [ Cancel ]

FIG. 40

Insolvency Date Maintenance

Available Insolvencies:

| Insolvency | Date |
|---|---|
| Empire Mutual Insurance Company | 09/07/19 |
| Allied Fidelity Insurance Company | 07/15/19 |
| American Druggist Insurance Company | 04/30/19 |
| Carriers Insurance Company | 01/16/19 |
| Commercial Compensation Casualty Co | 09/26/20 |
| Integrity Insurance Company | 03/24/19 |
| American Reserve Insurance Company | 06/07/19 |
| Credit General Insurance Company | 01/05/20 |
| Transit Casualty Company | 12/03/19 |

Add >
< Remove

Selected Insolvencies:

| Insolvency | Date |
|---|---|

Save    Cancel

Gross Assessment — 1180

- State Fund: — 1182a
- Insolvency: — 1182b
- Insurance Account: — 1182c
- Kind: — 1182d
- Type: Normal — 1182e
- Assessment Date: 05/25/2001 — 1182f

- Status: Recommended
- Amount: — 1182g
- Deferred Amount: — 1182h
- Premium Base Year: — 1182i
- Reversal: ☐

Buttons:
- New
- Activate — 1184e
- Rescind — 1184c
- Reverse — 1184d
- Repay
- Search... — 1184a
- Save — 1184b
- Close

FIG. 42

Assessment History — 1300

State Fund: CT  NAIC#: 10111  AMERICAN BANKERS INS. CO. OF FLORIDA — 1308e

Payment/Refund — 1308
- Date: / /
- Amount:
- Check Number: 1308b
- ☐ Line of Credit
- L.O.C. Balance: 1308c  0
- Member Balance: 1308d  0

Tabs: Assessments 1302 | Comments 1304 | Line of Credit 1306

Assessments table — 1309

| Assessment Date | Adjustment Date | Amount | Paid Amount | Apply Amount |
|---|---|---|---|---|
| 12/28/2000 | | 16,215 | 16,215 | N |
| 10/27/1999 | | 172 | 172 | N |
| 11/06/1998 | | -605 | -605 | N |
| 11/24/1997 | | -1,446 | -1,446 | N |
| 12/17/1996 | | -2,386 | -2,386 | N |
| 12/05/1995 | | -3,003 | -3,003 | N |
| 11/08/1994 | | -3,523 | -3,523 | N |
| 12/13/1993 | | -1,916 | -1,916 | N |
| 11/17/1992 | | -5,184 | -5,184 | N |
| 11/18/1991 | | 673 | 673 | N |

— 1302b

Buttons: Assess Detail... (1322) | Fin. Detail... (1322b) | L.O.C. Notification | Payment | Refund | Apply To | Save | Close

FIG. 45

Assessment History — 1310

State Fund: CT    NAIC#: 10111    AMERICAN BANKERS INS. CO. OF FLORIDA

Payment/Refund
Date: / /    Check Number:    L.O.C. Balance: 0
Amount:    ☐ Line of Credit    Member Balance: 0

Assessments | Comments | Line of Credit

Comment Detail:

| User | Date | Comment |
|---|---|---|
| la1 | 05/29/2001 | testing |
| rg2 | 05/03/2001 | RI-1993&1994 premium errors |

Comment:

[New]  [Save]

[Assess Detail...]  [Fin. Detail...]  [L.O.C. Notification]  [Payment]  [Refund]  [Apply To]  [Save]  [Close]

Assessment Detail

| State Fund: | CT |
|---|---|
| Member: | AMERICAN BANKERS INS. CO. OF |
| Assessment Date: | 12/28/2000 |
| Adjustment Date: | |
| Cash Receipt Amount: | 16,215 |

| Payment/Refund Amount: | 16,215 |
|---|---|
| Payment/Refund Allocated: | 16,215 |
| Total Applied: | 16,215 |
| Total Allocated: | 16,215 |
| Outstanding Balance: | 0 |

| Insolvency | Account | Assessment Amount | Pay./Ref. Allocated | Total Allocated | Paid |
|---|---|---|---|---|---|
| IDEAL MUTUAL | Auto | -6 | -6 | -6 | Y |
| IDEAL MUTUAL | Auto | -1 | -1 | -1 | Y |
| IDEAL MUTUAL | Auto | 6 | 6 | 6 | Y |
| IDEAL MUTUAL | Other | 1 | 1 | 1 | Y |
| IDEAL MUTUAL | Other | -279 | -279 | -279 | Y |
| IDEAL MUTUAL | Auto | -63 | -63 | -63 | Y |
| TRANSIT CASUALTY | Auto | 167 | 167 | 167 | Y |
| TRANSIT CASUALTY | Auto | -137 | -137 | -137 | Y |
| TRANSIT CASUALTY | Auto | -32 | -32 | -32 | Y |
| TRANSIT CASUALTY | Auto | -5 | -5 | -5 | Y |

Assessment Amount: 0

[Save]  [Paid] — 1340a    [Partial/Over...] — 1340b    [Gross Assessment...] — 1340c    [Cancel]

FIG. 48

Payment Modification — 1400

Modification Date: [ / / ]

[OK] [Cancel]

FIG. 52

Partial / Over Allocation — 1350

Assessment Amount: [0]

Allocation Amount: [0]

[OK] [Close]

FIG. 49

Gross Assessment

State Fund: CT - Connecticut Insurance Guaranty Association

Insolvency: 111 - Reserve Insurance Company

Insurance Account: Other

Kind: REGULAR

Type: Credit

Assessment Date: 11/06/1998

Status: Approved

Amount: -27,955

Deferred Amount:

Premium Base Year: 1979

Reversal: ☐

[New] [Activate] [Rescind] [Reverse] [Repay] [Search...] [Save] [Close]

Financial Detail — 1380

State Fund: CT

Member: COVENANT INSURANCE COMPANY

Assessment Date: 11/06/1998

Adjustment Date:

Cash Receipt Amount: 1,573

Applied Amount: 1,573

Allocated Amount: 1,573

Outstanding Balance: 0

Payment Activity | Refund Activity | Line of Credit Activity

| Applied Date | Check Number | Check Amount | Amount Applied | Status |
|---|---|---|---|---|
| 01/04/1999 | 100753 | 1,573 | 1,573 | |

Assessment Detail...    Modify (1382a)    Delete (1382b)    Close

Refund Check Search  1450

State Fund: CT
NAIC#:

Refund Check
Number:
Paid Date: / /
Status:

Search Results:

| Status | State Fund | NAIC# | Check # | Issue Date | Paid Date | Amount | Payee Name | Address | C |
|---|---|---|---|---|---|---|---|---|---|
| PAID | CT | 20524 | 315822 | 05/14/2001 | 05/18/2001 | 1,696 | SPECIALTY NATION | ATTN: FAY MAHONEY | L |
| PAID | CT | 16187 | 315823 | 05/14/2001 | 05/18/2001 | 82 | AXA RE PROPERTY | 17 STATE STREET | N |
| PAID | CT | 20362 | 315597 | 03/07/2001 | 03/09/2001 | 51 | SUMITOMO MARINE | ATTN: DEBRA DUNN | W |
| PAID | CT | 20583 | 315598 | 03/07/2001 | 03/09/2001 | 460 | NAC REINSURANCE | SEAVIEW HOUSE | S |
| PAID | CT | 12750 | 315478 | 01/29/2001 | 02/02/2001 | 1 | EVERGREEN NATIO | P.O. BOX 18295 | C |
| PAID | CT | 10014 | 315101 | 12/28/2000 | 12/28/2000 | 8,088 | AFFILIATED FM INS | ATTN: R.N. PRATT, P | JI |
| PAID | CT | 10022 | 315102 | 12/28/2000 | 12/28/2000 | 502 | AGWAY INSURANC | ATTN: STATISTICAL | D |
| PAID | CT | 10069 | 315103 | 12/28/2000 | 12/28/2000 | 7 | HOUSING AUTHORI | P.O. BOX 189 | C |
| PAID | CT | 10200 | 315104 | 12/28/2000 | 12/28/2000 | 614 | AMERICAN LIVE ST | ATTN: MICHAEL T BA | G |
| PAID | CT | 10243 | 315105 | 12/28/2000 | 12/28/2000 | 7 | NATIONAL CONTIN | ATTN: CORPORATE I | M |

Search   Void/Stop Pay...   Close

FIG. 55

4000 ASSESSMENT_FINANCIAL_STAGING

| COLUMN NAME | CONDENSED TYPE | NULLABLE |
|---|---|---|
| 🔑 afs_id | int | NOT NULL |
| at_allocation_group_to | int | NULL |
| af_amount | money | NULL |
| fcr_allocated_adjustment | money | NULL |
| cr_id | int | NULL |
| add_user | varchar(8) | NULL |
| admin_bal_adjustment_id | money | NULL |

4002

ASSESSMENT_ALLOCATION_MSF

| COLUMN NAME | CONDENSED TYPE | NULLABLE |
|---|---|---|
| 🔑 at_allocation_group_to | int | NOT NULL |
| 🔑 sf_code | char(3) | NOT NULL |
| 🔑 mbr_naic_code_funding | char(5) | NOT NULL |
| aam_loc_notification | char(5) | NOT NULL |

4004

4006 MEMBER_RATIO

| COLUMN NAME | CONDENSED TYPE | NULLABLE |
|---|---|---|
| 🔑 sf_code | char(3) | NOT NULL |
| 🔑 mbr_naic_code | char(5) | NOT NULL |
| 🔑 ia_code | char(5) | NOT NULL |
| 🔑 slo_premium_year | int | NOT NULL |
| mr_pre_assess_ratio | real | NOT NULL |
| mr_post_assess_ratio | real | NULL |
| mr_adjustment_date | datetime | NULL |
| mr_mod_user | varchar(8) | NULL |
| mr_mod_date | datetime | NULL |
| mr_add_user | varchar(8) | NULL |
| mr_add_date | datetime | NULL |

FROM 4014 FIG. 57B

CCC

TO 4018 FIG. 57E

FIG. 57A    FROM 4008, FIG. 57D      TO 4026, FIG. 57F

STATE_FUND_LOI_PER_YEAR — 4020

| | COLUMN NAME | CONDENSED TYPE | NULLABLE |
|---|---|---|---|
| 🔑 | sf_code | char(3) | NOT NULL |
| 🔑 | ia_code | char(2) | NOT NULL |
| 🔑 | slo_premium_year | int | NOT NULL |
| 🔑 | loi_number | varchar(6) | NOT NULL |
| | slo_levied_year | int | NOT NULL |
| | slo_mod_user | varchar(8) | NULL |
| | slo_mod_date | datetime | NULL |
| | slo_add_user | varchar(8) | NULL |
| | slo_add_date | datetime | NULL |

FROM 4014 FIG. 57B

FROM 4014 FIG. 57B

MEMBER_STATE_FUND — 4022

| | COLUMN NAME | CONDENSED TYPE | NULLABLE |
|---|---|---|---|
| 🔑 | sf_code | char(3) | NOT NULL |
| 🔑 | mbr_naic_code_id | char(5) | NOT NULL |
| | msf_join_date | datetime | NOT NULL |
| | msf_withdraw_date | datetime | NULL |
| | msf_reinstate_date | datetime | NULL |
| | msf_admin_assessment | money | NULL |
| | msf_admin_ass_paid_date | datetime | NULL |
| | msf_trigger_date | datetime | NULL |
| | msf_inactive_date | datetime | NULL |
| | msf_outstanding_balance | money | NULL |
| | msf_send_mailing | char(1) | NOT NULL |
| | msf_mod_user | varchar(8) | NULL |
| | msf_premium_status | varchar(8) | NULL |
| | msf_mod_date | datetime | NULL |
| | msf_add_user | varchar(8) | NULL |
| | msf_add_date | datetime | NULL |

FROM 4024, FIG. 57F

MEMBER_RATIO_INSOLV

| COLUMN NAME | CONDENSED TYPE | NULLABLE |
|---|---|---|
| 🔑 sf_code | char(3) | NOT NULL |
| 🔑 mbr_naic_code | char(5) | NOT NULL |
| 🔑 ia_code | char(5) | NOT NULL |
| 🔑 slo_premium_year | int | NOT NULL |
| 🔑 mbr_naic_code_insolvency | char(5) | NOT NULL |
| mr_pre_assess_ratio | real | NULL |
| mr_post_assess_ratio | real | NULL |
| mr_adjustment_date | datetime | NULL |
| mr_mod_user | varchar(8) | NULL |
| mr_mod_date | datetime | NULL |
| mr_add_user | varchar(8) | NULL |
| mr_add_date | datetime | NULL |

4008

PREMIUM_BASE_YEAR

| COLUMN NAME | CONDENSED TYPE | NULLABLE |
|---|---|---|
| 🔑 pby_id | int | NOT NULL |
| sf_code | char(3) | NOT NULL |
| pby_method | varchar(8) | NOT NULL |
| pby_from_date | datetime | NOT NULL |
| pby_to_date | datetime | NULL |
| mr_mod_user | varchar(8) | NULL |
| mr_mod_date | datetime | NULL |
| mr_add_user | varchar(8) | NULL |
| mr_add_date | datetime | NULL |

FROM 4034, FIG. 57I

CHK

| COLUMN NAME | CONDENSED TYPE | NULLABLE |
|---|---|---|
| chk_id | int | NOT NULL |
| up_id | int | NULL |
| clm_id | int | NULL |
| cmt_number | char(5) | NULL |
| prv_id | int | NULL |
| chk_type | varchar(8) | NOT NULL |
| agt_id | int | NULL |
| chk_payment_type | varchar(8) | NOT NULL |
| chk_number | int | NULL |
| chk_amount | money | NOT NULL |
| chk_payee_name | varchar(255) | NOT NULL |
| chk_payee_address1 | varchar(30) | NOT NULL |
| chk_payee_address2 | varchar(30) | NULL |
| chk_payee_address3 | varchar(30) | NULL |
| chk_payee_city | varchar(30) | NOT NULL |
| chk_payee_state | char(2) | NOT NULL |
| chk_payee_zip | varchar(9) | NOT NULL |
| chk_issue_date | datetime | NULL |
| chk_create_date | datetime | NOT NULL |
| chk_status | varchar(8) | NOT NULL |
| chk_approval_date | datetime | NULL |
| chk_approval_reason | varchar(8) | NULL |
| chk_approval_by | varchar(8) | NULL |
| chk_comment | varchar(255) | NULL |
| chk_mod_user | varchar(8) | NULL |
| chk_mod_date | datetime | NULL |
| chk_add_user | varchar(8) | NULL |
| chk_add_date | datetime | NULL |
| chk_service_start_date | datetime | NULL |
| chk_payee_care_of | varchar(255) | NULL |
| chk_service_end_date | datetime | NULL |
| chk_authorized_by | varchar(8) | NULL |
| chk_up_gross_amount | money | NULL |
| chk_disability_start_date | datetime | NULL |
| chk_disability_end_date | datetime | NULL |
| chk_tax_id_reason | varchar(8) | NULL |
| chk_paid_date | datetime | NULL |

NAIC_MEMBER_PREM

| | COLUMN NAME | CONDENSED TYPE | NULLABLE |
|---|---|---|---|
| 🔑 | nmp_id | int | NOT NULL |
| | nl_id | int | NOT NULL |
| | nmp_premium_year | int | NOT NULL |
| | nmp_sf_code | char(3) | NOT NULL |
| | nmp_naic_code | char(5) | NOT NULL |
| | nmp_loi_number | varchar(6) | NOT NULL |
| | nmp_premium | money | NOT NULL |
| | nmp_dividend | money | NOT NULL |
| | nmp_unpaid_losses | money | NOT NULL |
| | nmp_loaded_ind | char(1) | NULL |
| | nmp_status | varchar(8) | NULL |
| | nmp_mod_user | varchar(8) | NULL |
| | nmp_mod_date | datetime | NULL |
| | nmp_add_user | varchar(8) | NULL |
| | nmp_add_date | datetime | NULL |

FROM 4110
FIG. 58C

4112

| NAIC_DEMOGRAPHICS | | |
|---|---|---|
| COLUMN NAME | CONDENSED TYPE | NULLABLE |
| 🗝 nd_id | int | NOT NULL |
| nl_id | int | NOT NULL |
| nd_premium_year | int | NOT NULL |
| nd_naic_code | char(5) | NOT NULL |
| nd_company_name | varchar(36) | NULL |
| nd_filing_type | char(1) | NULL |
| nd_company_type | char(1) | NULL |
| nd_fein | char(11) | NULL |
| nd_state_domicile | char(2) | NULL |
| nd_address | varchar(40) | NULL |
| nd_city | varchar(30) | NULL |
| nd_state | char(2) | NULL |
| nd_zip | varchar(10) | NULL |
| nd_contact_person | varchar(30) | NULL |
| nd_contact_phone | varchar(19) | NULL |
| nd_officer_name | varchar(30) | NULL |
| nd_comm_bus_date | varchar(10) | NULL |
| nd_group_code | char(5) | NULL |
| nd_group_name | varchar(50) | NULL |
| nd_company_status | char(1) | NULL |
| nd_canadian | char(1) | NULL |
| nd_loaded_ind | char(1) | NULL |
| nd_status | varchar(8) | NULL |
| nd_mod_user | varchar(8) | NULL |
| nd_mod_date | datetime | NULL |
| nd_add_user | varchar(8) | NULL |
| nd_add_date | datetime | NULL |
| nd_country | varchar(25) | NULL |

FIG. 58D

Premium Summary

State Fund: ME ▽ Year: 1998 ▽ Insolvency Date: 11/5/1995 ▽ Member Fund: NAIC #: [ ] Find Status: Calculated Premium Subtotals / Member Ratios

| Member | NAIC# | ALL | Auto | Other | Workers' Compensa | Total | (Non-Ar |
|---|---|---|---|---|---|---|---|
| RELIANCE REINSURANCE | 10019 | | | 0 | 0 | 0 | |
| AGWAY INSURANCE COM | 10022 | | 508,353 | 851,640 | 0 | 1,359,993 | |
| AMERICAN BANKERS INS | 10111 | | 105,394 | 528,985 | 0 | 634,379 | |
| AMERICAN LIVE STOCK IN | 10200 | | 0 | 3,208 | 0 | 3,208 | |
| WHITE MOUNTAINS INSU | 10205 | | 25,535 | 79,436 | 8,132 | 113,103 | |
| AMERICAN REINSURANCE | 10227 | | | 0 | 0 | 0 | |
| NATIONAL CONTINENTAL | 10243 | | | 0 | 0 | 0 | |
| NOBEL INSURANCE COM | 10340 | | 30,885 | 125,306 | 0 | 156,191 | |
| AVEMCO INSURANCE CO | 10367 | | 0 | 427,257 | 0 | 427,257 | |
| CANAL INSURANCE COMP | 10464 | | 2,856,727 | 90,389 | 0 | 2,947,116 | |
| CHRYSLER INSURANCE C | 10499 | | 118,867 | 80 | 0 | 118,947 | |
| CAROLINA CASUALTY INS | 10510 | | 493,351 | 36,940 | 0 | 530,291 | |
| PROSELECT INSURANCE | 10638 | | 0 | 0 | 0 | 0 | |
| CHURCH INSURANCE CO | 10669 | | 0 | 25,213 | 0 | 25,213 | |
| CINCINNATI INSURANCE | 10677 | | 3,275 | 50,003 | 0 | 53,278 | |
| NATIONWIDE INSURANCE | 10723 | | 0 | 0 | 0 | 0 | |

Premium Detail... | Add Premium... | Delete Premium | Insolvency Dates... | Calculate State Law | Close

FIG. 59

Premium Detail

State Fund: RI ▽  Year: 1998 ▽  NAIC #: 10111  AMERICAN BANKERS INS. CO. OF FLORIDA  Status: Approved Insolvency Date: 11/5/1995  < 3000 Policy Holders: ☐

| LOI# | Line of Insurance | Account | NAIC Premium | NAIC Dividend | Adjusted Premium | Adjusted Dividend | State Law Adjusted | Net Premium |
|---|---|---|---|---|---|---|---|---|
| 2.1 | ALLIED LINES | Other | -24 | 0 | | | 0 | 0 |
| 3 | FARMOWNERS MULTIPL | Other | 37,751 | 0 | | | 0 | 0 |
| 4 | HOMEOWNERS MULTIPL | Other | 27,782 | 0 | | | | 27,782 |
| 9 | INLAND MARINE | Multi. | -129,550 | 0 | -129,558 | 0 | 0 | 0 |
| 17 | OTHER LIABILITY | Other | 20,881 | 0 | | | 0 | 0 |
| 19.2 | OTHER PRIVATE PASSEN | Auto | 31,947 | 0 | | | 0 | 0 |
| 21.1 | PRIVATE PASSENGER AU | Auto | 63,787 | 0 | | | 0 | 0 |
| 24 | SURETY | (NonAs | 9,611 | 0 | | | 0 | 0 |
| 31 | AGGREGATE WRITE-INS | Multi. | 3,268,677 | 0 | 3,268,677 | 0 | 0 | 0 |
| 99.6 | 5-YEAR AVERAGE-AUTO | Auto | | | | | 21,600 | 21,600 |
| 99.7 | 5-YEAR AVERAGE-OTHER | Other | | | | | 75,900 | 75,900 |

Totals
- NAIC Premium: 3,330,854
- NAIC Dividend: 0
- Net Premium: 3,330,854
- Net Premium Post-Assessment: 3,330,854

[Save]  [Allocate...]  [Close]

Member Insurance Account — 2700

- NAIC#: 19550 — 2708b
- State Fund Code: VA — 2708a
- Insurance Account: Other — 2702
- Withdrawal Date: 03/09/1989 — 2704
- Reinstate Date: / / 
- 5-Year Average: 45,865 — 2706

[Save] [Cancel]

METHOD AND APPARATUS FOR PERFORMING ASSESSMENTS

CROSS REFERENCES TO RELATED APPLICATION(S)

This application is a continuation-in-part of U.S. patent application Ser. No. 09/745,011, filed on Dec. 20, 2000 now U.S. Pat. No. 7,509,265.

BACKGROUND

1. Technical Field

This application generally relates to insurance insolvency operations, and more particularly to such operations that may be performed in a computer system.

2. Description of Related Art

Business methods, such as those associated with the insurance industry and services performed in connection with insolvency of an insurance company and the operation of property and casualty guaranty funds, may be performed manually. Tasks may include, for example, performing calculations and manual data entry. Performing these tasks may include undertaking cumbersome and tedious operations. Computer systems may be used in performing tasks or functions such as those traditionally performed in connection with various business methods. However, there may be drawbacks with existing systems.

An existing system may include a variety of different hardware and/or software that is not easily maintainable or readily integrated. Additionally portions of software in an existing system may include functionality that is not needed in performing other operations creating possible additional maintenance. For example, modifications may be needed in performing calculations when there is a statutory change in laws related to insurance claims, deductibles and the like. Such a modification may impact one or more software modules each associated with different vendors making maintenance and integration of existing systems difficult. It may be difficult to identify which different modules require modification, and what the effects will be to other modules in terms of testing and verification. Such modifications, for example, as may be required in maintenance, may require knowledge of multiple vendor software in multiple programming languages. Further, such difficulties may also be encountered when adding functionality to an existing system that may not be readily extensible.

Computer systems may be used as an alternative to, and also in combination with existing manual procedures. However, there may be problems in integrating both manual and automated procedures, such as those that may be implemented using software and hardware included in a computer system.

Thus, it may be advantageous and desirous to provide techniques that are efficient and flexible in performing business methods such as those associated with performing insolvency tasks and services in connection with guaranty funds.

SUMMARY OF THE INVENTION

In accordance with principles of the invention is a method executed in a computer system for performing an assessment comprising: entering assessment data, said assessment data including information associated with a state fund, an insolvency, and an insurance account; associating said assessment data with a first status indicating said assessment data is not integrated to a member level in a hierarchical data arrangement of said assessment data, said first status having a first set of at least one corresponding data operation; and updating said first status to a second status indicating said assessment data is integrated to said member level in said hierarchical data arrangement, said second status having a second set of at least one corresponding data operation different from said first set.

In accordance with another aspect of the invention is a computer program product for performing an assessment that includes machine executable code for: entering assessment data, said assessment data including information associated with a state fund, an insolvency, and an insurance account; associating said assessment data with a first status indicating said assessment data is not integrated to a member level in a hierarchical data arrangement of said assessment data, said first status having a first set of at least one corresponding data operation; and updating said first status to a second status indicating said assessment data is integrated to said member level in said hierarchical data arrangement, said second status having a second set of at least one corresponding data operation different from said first set.

BRIEF DESCRIPTION OF THE DRAWINGS

Features and advantages of the present invention will become more apparent from the following detailed description of exemplary embodiments thereof taken in conjunction with the accompanying drawings in which:

FIG. 4 is an example of software that may be included in the administrative and FIG. 5 maintenance module or software included in the data storage system;

FIGS. 7A through 7E are examples of embodiments of screen displays used in connection with claims operations and processing;

FIGS. 8A through 8G are examples of embodiments of screen displays used in connection with unearned premiums and associated processing operations;

FIGS. 9A through 9C are examples of embodiments of screen displays used in connection with assessments and associated processing operations;

FIGS. 10A through 10B are examples of screen displays used in connection with member and state fund processing operations;

FIG. 21 is an example of an embodiment of a screen display used in connection with mapping Uniform Data Standard (UDS) coverage codes;

FIG. 22 is an example of an embodiment of a screen display used in connection with displaying totals by coverage code for a specified claimant;

FIG. 23 is an example of an embodiment of a screen display used in connection with displaying a list of claimants and totals in accordance with a specified coverage type;

FIG. 24 is an example of an embodiment of a screen display used in connection with creating a diary entry;

FIG. 25 is an example of a table summarizing information regarding trigger events for automatic diary entry generation and notification in one embodiment;

FIGS. 29 through 33 are examples of screenshots that may be displayed in connection with staging and loading NAIC data into the system 10;

FIGS. 34 and 35 are examples of screenshots that may be displayed in connection with premium summary information for members associated with an insurance account;

FIGS. 36 and 37 are examples of screenshots that may be displayed in connection with member ratio data;

FIGS. 38 and 39 are examples of screenshots that may be displayed in connection with premium detail information for a particular member;

FIG. 40 is an example of a screenshot that may be displayed in connection with allocating a single amount of premium information to multiple accounts;

FIG. 41 is an example of a screenshot that may be displayed in connection with maintaining information about insolvencies;

FIG. 42 is an example of screenshot that may be displayed in connection with gross assessment data;

FIGS. 45 through 47 are examples of screenshots that may be displayed in connection with assessment history information;

FIG. 48 is an example of a screenshot that may be displayed in connection with assessment detail data;

FIG. 49 is an example of a screenshot that may be displayed in connection with allocation of a payment;

FIG. 50 is an example of a screenshot that may be displayed in connection with gross assessment data;

FIGS. 51 through 54 are examples of screenshots that may be displayed in connection with financial detail data;

FIG. 55 is an example of a screenshot that may be displayed in connection with searching for refund checks in accordance with user entered search criteria;

FIGS. 57A-57J and 58A-58D are examples of data models showing relationships between different data entities that may be included in a database of the system 10; and FIGS. 59 through 61 are examples of screenshots that may be displayed in connection with five year average information.

DETAILED DESCRIPTION OF PREFERRED EMBODIMENT

Figure 1:
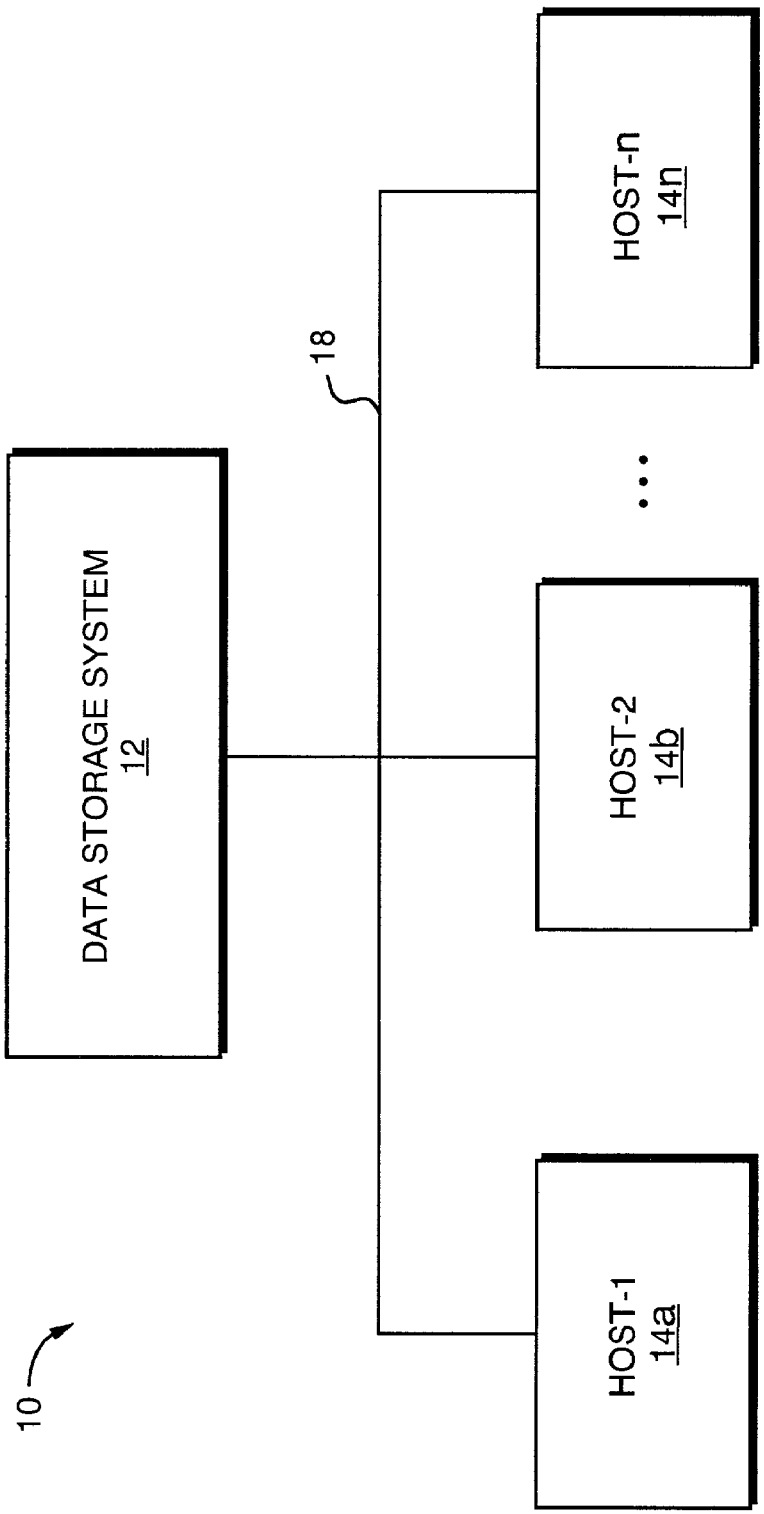
FIG. 1 is an example of an embodiment of a computer system.

Referring now to FIG. 1, shown is an example of an embodiment of a computer system. The computer system 10 includes a data storage system 12, a communications medium 18, and one or more host computer systems 14a-14n. In this particular example, the communications medium 18 serves as a means for communication by which each of the host computer systems 14a-14n may communicate with the data storage system 12. In this embodiment of the computer system 10, the N hosts 14a-14n may perform as a client systems in connection with processing requests for data stored in the data storage system 12. In this example, the data storage system 12 may act as a server system providing information and data to each of the host computer systems as well as for storing data entered to the data storage system 12 from each of the host computer systems 14a-14n. The communication medium 18 may be any one of a variety of networks or other types of communication mediums known to those skilled in the art. For example, the communication medium 18 may be the Internet, an intranet, or other network connection by which the host systems 14a-14n communicate with the data storage system 12, and by which the data storage system 12 communicates also with each of the host systems 14a-14n.

It should be noted that other embodiments of the computer system 10 may include a different number of host systems as well as other devices that perform any one of a variety of functions in accordance with each particular embodiment.

Each of the host systems 14a-14n and the data storage system 12 included in the computer system 10 may be connected to the communication medium 18 by any one of a variety of connections as may be provided and supported in accordance with the type of communication medium 18. The processors included in each of the host systems 14a-14n and the data storage system 12 may be any one of a variety of commercially available, single or multi-processor systems, such as an Intel-based processor, IBM main frame, or other type of commercially available or proprietary processor able to support incoming traffic in accordance with each particular embodiment and application and functions to be performed thereon.

It should also be noted that the particulars of the hardware and software included in each of the host systems 14a-14n and the data storage system 12 are described herein in more detail and may also vary in accordance with each particular embodiment. Each of the host systems 14a-14n as well as the data storage system 12 may all be located at the same physical site, or alternatively may also be located in different physical locations. Examples of the communication medium that may be used to provide the different types of connections between the host computer systems, and the data storage system of the computer system 10 may use a variety of different communication protocols such as SCSI, ESCON, Fibre Channel, or GIGE (Gigabit Ethernet) and the like. Some or all of the connections by which the host systems 14a-14n and the data storage system 12 may be connected to the communication medium 18 may pass through other communication devices such as a Connectrix or other switching equipment that may exist such as a phone line, a repeater, a multiplexer or even a satellite.

Each of the host systems as well as the data storage system 12 may perform different types of data operations in accordance with the different types of administrative tasks and other functions that are to be performed in accordance with different operations and applications executing in the computer system 10 of FIG. 1.

It should be noted that the number of host computer systems as well as the omission of other types of devices and systems in the computer system 10 of FIG. 1 should not be construed as a limitation.

Figure 2:
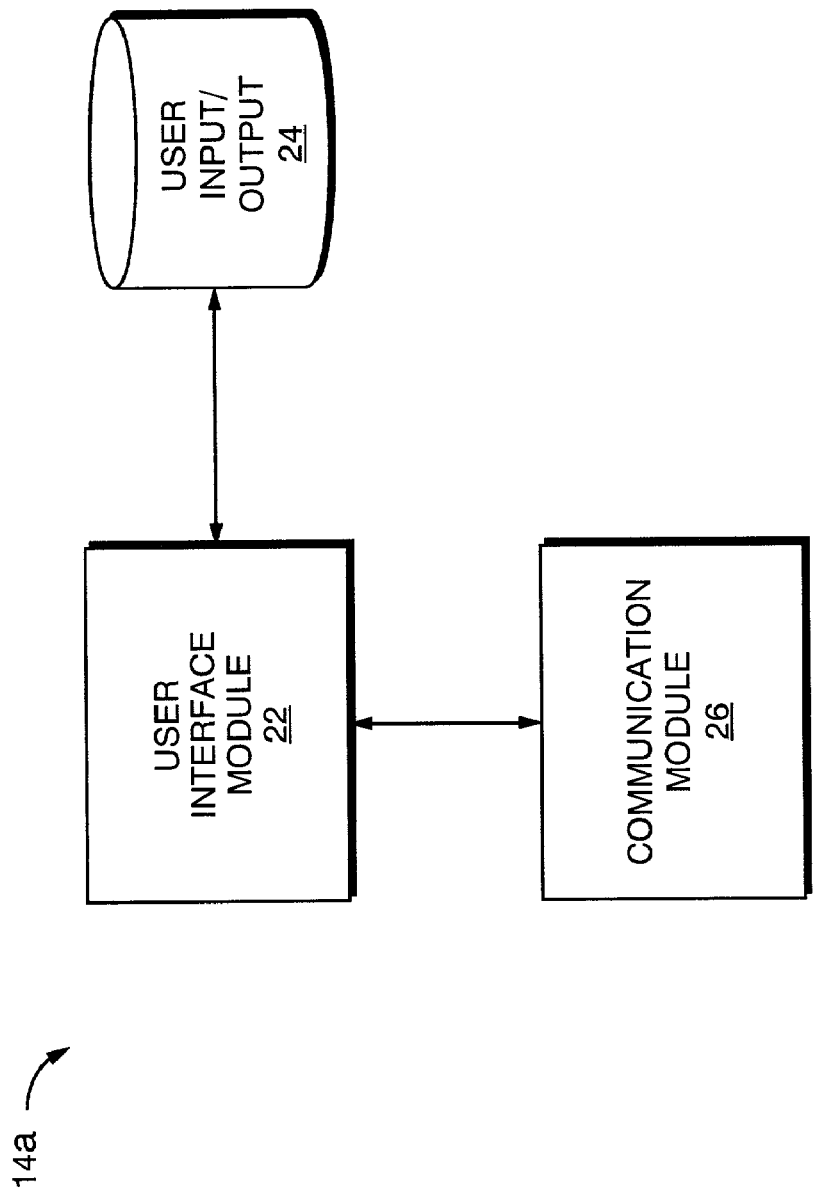
FIG. 2 is an example of an embodiment of software that may be included in a host system.

Referring now to FIG. 2, shown is an example of an embodiment of software that may reside within a host computer system, such as any of 14a-14n. It should be noted that although what will be described in connection with FIG. 2 is software that is shown as residing on host computer system host-1 14a, a similar software arrangement, as well as other software, may exist on this host computer system or any of the other host computer systems 14a-14n in the computer system 10 of FIG. 1.

Shown in FIG. 2 is a user interface module 22, a communication module 26, and user input and output 24. In this particular example, the user interface module 22 includes software that may display one or more user interfaces in connection with obtaining and outputting user data, such as user input and output 24. The user interface module may be used, for example, as an input interface to collect the data which is sent to the communication module 26 which further communicates over communication medium 18 to perform data transfer operations to and from the data storage system 12. In this particular example, each of the host computer systems may include a portion of client software, such as the user interface module 22 which may be a client portion of a software application for gathering data that may be sent and transferred to the data storage system 12. For example, in one embodiment, the user interface module may be implemented using Visual Basic. It should be noted that other embodiments may store all or a portion of the user interface module 22 on another system. In other words, portions of the user interface module 22 may be stored on a different computer system and downloaded when needed to a particular host system serving as a client.

The communication module 26 may be any one of a variety of high and low level software communications packages, for example, that may interface with the communication medium 18 in accordance with the communications protocol, and network or other type of communication connection included between a host computer system and the communication medium 18. This may vary in accordance with each particular embodiment.

The user input and output 24 may be entered, for example, interactively as well as from a data file. This may vary in accordance with each particular embodiment, for example, in accordance with a particular type of interface displayed by the user interface module 22. As will be described in more detail in paragraphs that follow, in one embodiment the user interface may be implemented using Visual Basic for displaying a form-like screen in which a user enters data in particular fields. Data entry may be done interactively. Additionally, the particular type of user input and/or output that may be displayed or accepted from a user may vary in accordance with the different functions or tasks performed in the computer system 10 of FIG. 1. For example, a request for a particular task may be made from a menu selection in accordance with user input 24 as accepted through user interface displayed with the user interface module 22. If this is an administrative task, for example, this request for a performance of a particular task may be sent to the data storage system 12. This and other examples will be presented in more detail in paragraphs that follow.

Figure 3:
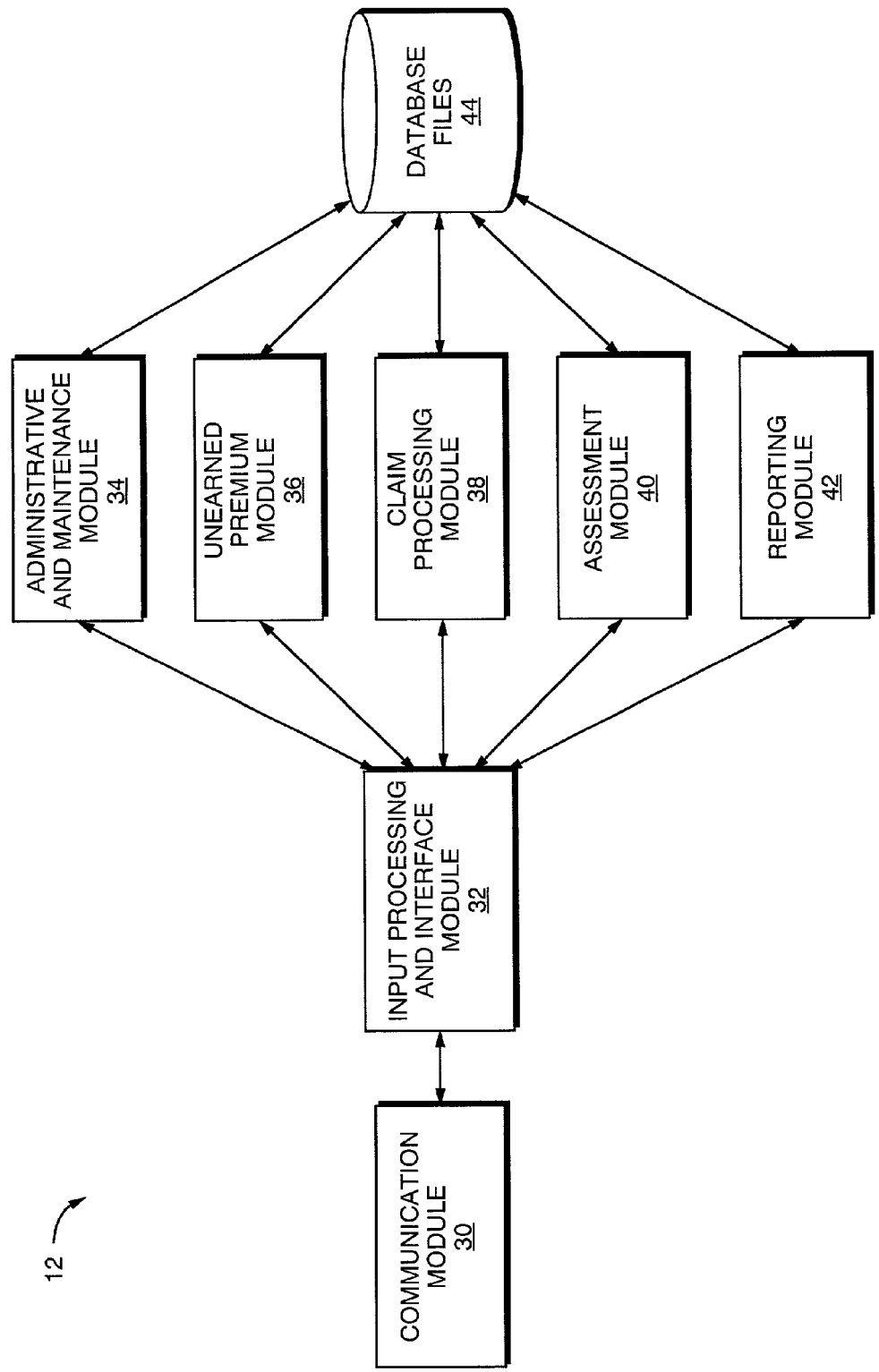
FIG. 3 is an example of an embodiment of software that may be included in the data storage system.

Referring now to FIG. 3, shown is an example of an embodiment of software that may reside within a data storage system 12. In this particular example, the data storage system 12 may be used for maintaining and performing I/O operations in connection with a database. In particular, shown as included in the data storage system 12 is a communication module 30, an input processing and interface module 32, a plurality of other modules 34-42, and database files 44.

Communication module 30 may be similar to that as described in connection with host computer system software communication module 26 and may vary in accordance with each particular embodiment and details included therein. The communication module may interact with the input processing and interface module 32 which may serve as an interface between the communications module and the different types of functions performed by software included in the data storage system 12. In other words, there may be a variation of modules from those shown in FIG. 3 in accordance with the tasks to be performed by the data storage system. In this example, shown is an administrative and maintenance module 34, an unearned premium module 36, a claim processing module 38, an assessment module 40, and a reporting module 42. Each of the modules 34-42 perform particular functions and operations in connection with data stored in the database files 44.

The input processing interface module 32 may determine, in accordance with the data input or to be output, which of the different functional modules 34-42 may be also involved in a particular operation. For example, the administrative and maintenance module 34 may include procedures or functions that may be implemented in any one or more of a variety of programming languages to perform functions designated as an administrative or maintenance task. This may include, for example, updating information in the database file as well as initializing and creating records in accordance with a particular member's information.

The unearned premium module 36 may perform calculations in accordance with an unearned premium calculation that will be explained in more detail in paragraphs that follow.

The claim processing module 38 may perform functions associated with processing a newly reported insurance claim as well as an initial input of existing claims pending at the time of an insolvency of an insurance company.

The assessment module 40 may perform an allocation operation for determining how an assessment is prorated among the solvent members licensed in a state fund.

The reporting module 42 may include various reporting functions, for example, as may be required to produce reports in accordance with data stored in the database files 44 in connection with any reporting needed as may vary in accordance with each particular embodiment.

The software described in connection with the host system 14a and the data storage system 12 may include software providing functionality for administrative services in connection with a guaranty fund, for example, as may be associated with insolvency of insurance companies. The services may be provided, for example, by a nonprofit association using an insurance insolvency fund to pay monies as appropriate. In other words, an insolvency service provider, for example providing services in connection with property and casualty guaranty funds, may be utilized when there is an insolvency in the insurance industry. When a property and casualty company is placed into receivership and/or ordered liquidated, this event triggers insurance insolvency and further may invoke the services to be performed by a service provider. These tasks may include, for example, claim processing, unearned premium processing as well as assessment processing.

For example, monies may be paid from a state fund or guaranty association having a designated amount determined in accordance with accepted insurance practices. Payments may be made from this state fund in connection with claims pending at the time of insolvency and new claims that may arise during a time period, for example, of sixty days after the insolvency, and the like. The amount included in an insolvency fund as well as amounts determined in connection with claims and unearned premiums may be in accordance with different state laws having different limits statutorily specified. Thus, rules for determining the amounts may vary in accordance with each occurrence of an insolvency. For example, different rules may be set forth by state laws as well as may vary in accordance with a particular line of insurance business, such as auto, home and the like within a particular state. The software in this system 10 of FIG. 1 may provide a flexible arrangement for making rule changes as well as the addition of new rules in accordance with different state laws and lines of business.

As will be described in paragraphs that follow, the software that may be implemented in the computer system 10 of FIG. 1 may be a client/server application which includes software residing on a client system, such as one of host computer systems 14a-14n, and a server system, such as the data storage system 12. In this particular embodiment, the client may include software that is implemented using Visual Basics, for example, as a user interface. The server, such as the data storage system 12, may include a SQL back end such that the state laws or variations and limits may be embodied in SQL storage procedures. In other words, the business logic or statutory logic that may vary in accordance with a particular line of business and/or state may be embodied in customized procedures included in each of the different types of modules of FIG. 3, such as claim processing module 38 for performing claim processing calculations. In this particular example, the database file 44 may be implemented as database tables using a relational database schema described in more detail elsewhere herein. It should be noted that one embodiment may implement the database using Microsoft SQL 6.5 as the database engine. Other embodiments may use other software in accordance with hardware and/or software that may be included in each embodiment.

In one embodiment, there are approximately 125 tables in which each table corresponds to a different entity, such as a claim table, a payment table and a claimant information table and the like. Each record within a table may store a representation of an instance of data. For example, the claimant information table may include fields which include a claimant name, address and other types of information. An instance of this may be a particular value associated with claimant information, such as a claimant's name and address.

In this particular embodiment, a variety of functions may be provided and customized in accordance with rules for a plurality of different states and different lines of insurance. In other words, the logic embedded within these routines or procedures that may be included in a particular module, such as the claims processing module 38 or the unearned premium module 36, may include particular procedures for performing calculations in accordance with a plurality of different state laws as well as different lines of insurance and within an insurance account. For example, deductible and "caps" or maximum amounts associated with different modules such as claims, may also vary with insurance account as well as by state. Processing associated with the different modules, such as the claims processing module 38, the claims may be performed with one initial load of data, such as for claims pending at time of insolvency. Additionally, modules may include updating functions as needed, such as updates may be performed accordingly as additional claims are made.

An assessment, such as may be performed by the assessment module 40, may be a determination of the amount of money each solvent member, licensed in a state fund, pays to the guaranty association. Information that may be used in determining the amounts include statutory amounts for each insurance account within a particular state fund, such as commercial auto, worker's compensation, and the like. Assessments may be done on a predetermined periodic basis, such as annually, as well as on an "as needed basis" as described in more detail in paragraphs that follow. It should be noted that in one embodiment, the assessment data and the associated input format, for example, by each state in accordance with insurance accounts, may be provided by the National Association of Insurance Commissioners (NAIC).

In calculating an assessment, reserves are taken into account and may include an estimate made for a subsequent year. Subtracted from that estimate are those monies currently held in reserves such that what is reflected is the additional amount needed in accordance with expectations for claims and monies to be paid out for the subsequent year. The annual assessment may be based on the active or expected claims for a particular time period.

It should be noted that the function as may be performed, for example, by the administrative and maintenance module 34, may also be referred to as "common functionality" that is common between other modules. Member and state information may include, for example, the name of the particular insurance companies for a particular state. Claim data may be customized per insurance company data set. In other words, when an insurance company is initially declared insolvent and/or ordered liquidated, their particular input format for existing claim data may be entered into the system such as in the database files 44. There may be no common format or input medium for the different insolvent insurance companies. Thus, a combination of customized manual and/or automated types of techniques may be used to enter existing claim data when an insolvency initially occurs.

Referring now to FIG. 4, shown is an example of an embodiment of software modules that may be included in the administrative and maintenance module 34 as previously described in connection with software that may reside on the data storage system 12. It should be noted that the software modules described in connection with FIG. 4 may be a portion of modules included in an embodiment. Included in FIG. 4 is a security module 34a, a member and state management module 34b, and accounting system interface module 34c, and any additional modules 34d that may be used in performing the various administrative and maintenance tasks of the administrative and maintenance module 34. In particular, the security module may perform functions that may vary with each particular user, such as restricting access for paying out claims over a particular dollar amount in accordance with the particular user ID, and the like. Different types of security may be implemented by the security module 34a in accordance with the different types of functions and amounts included in a particular embodiment.

The member and state management module 34b may implement functions associated with obtaining member and state particular accounting information. In other words, the function performed by module 34b may include initialization and creation of records in the database files or tables 44 in a particular embodiment for each member insurance company. This may include, for example, information such as particular lines of insurance accounts as well as associated amounts, such as deductibles used in performing calculations, such as may be used by the unearned premium module 36 and the claim processing module 38. The accounting system interface module 34c may perform functions to provide for interfacing to other systems, such as an accounting system, and may generate an input file for use by an existing accounting system. Functionality provided by module 34c may produce customized output by converting data from the database files 44 into a file format used as input to another system, such as the accounting system. Other types of conversions of data and interfaces may be provided in accordance with other modules, for example, as may be included in the other modules component 34d and may vary in accordance with each particular embodiment.

Figure 5:
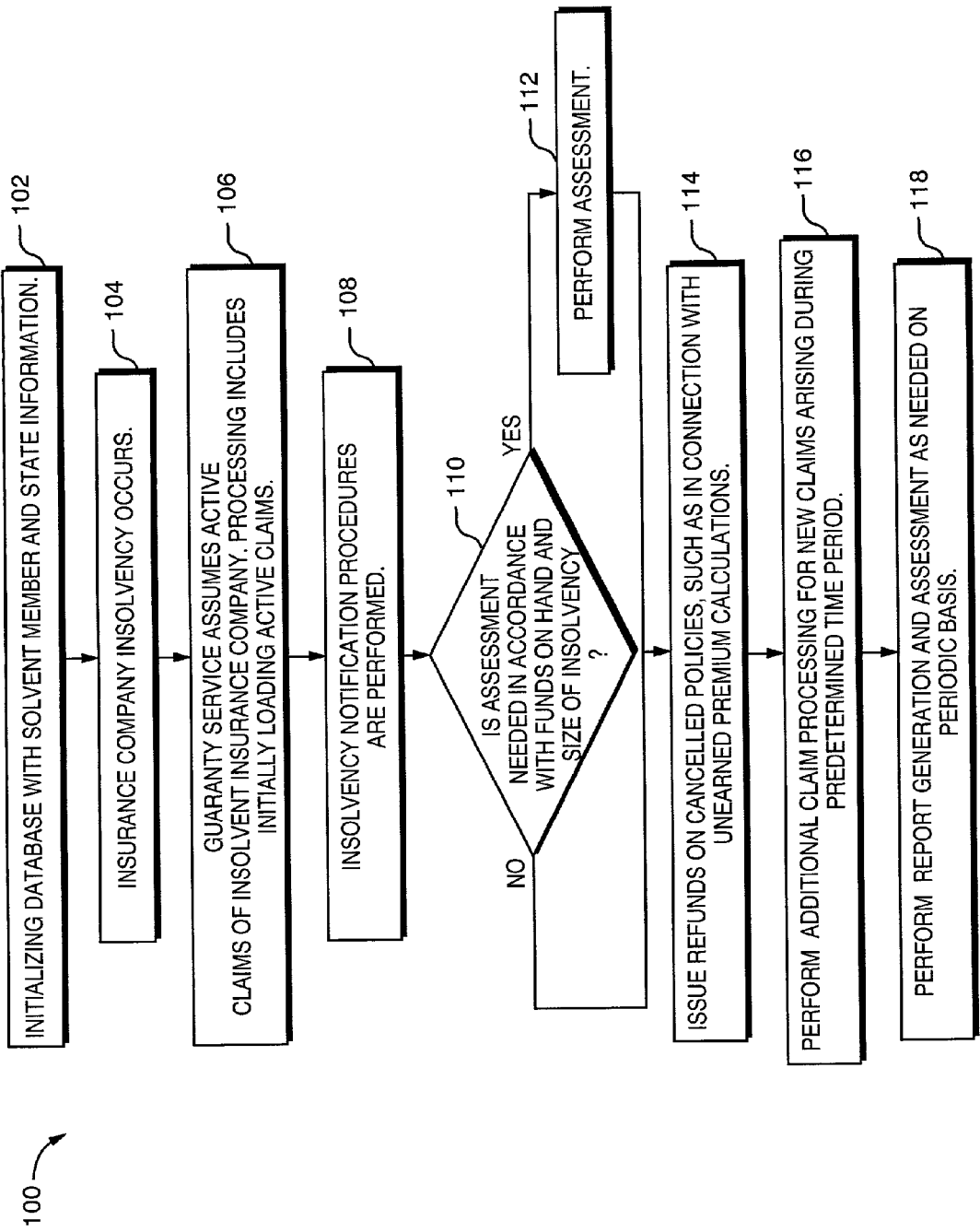
FIG. 5 is a flowchart of steps of one embodiment for performing steps in accordance with a guaranty association upon the occurrence of an insolvency.

Referring now to FIG. 5, shown is flowchart 100 that includes steps of one embodiment that may be performed when an insurance company insolvency occurs. This includes steps corresponding to services that may be performed in connection with a guaranty association. At step 102, a "signing up process" occurs in which there is an initialization of the database with member and state information. In other words, initialization of particular files and records in the database 44 previously described in connection with FIG. 3 may be performed by software included, for example, in the administrative and maintenance module 34. Tasks performed may include, for example, entering data and records in accordance with particular insurance accounts as well as particular state laws and amounts that may vary with state and line of insurance. Member information may include information about one or more particular insurance company that may be a "member" or "members" for a particular state. At step 104, some time later, a member insurance company may become insolvent. In this particular example, the one or more insurance companies that are insolvent at step 104 are members entered at step 102, in which an insolvency service provider performs services in connection with the insolvency.

At step 106, the insolvency service provider assumes the active claims of the insolvent insurance company. Various processing steps may be performed in connection with assuming active claims of the insolvent insurance company, such as initially loading and/or processing active claims, for example, using the claim processing module 38. This is described in more detail elsewhere herein.

At step 108, insolvency notification procedures may be performed. These steps may be performed, for example, by the insolvent insurance company itself, as well as by the insolvency service provider in connection with active and subsequent claims. For example, this may include notification of cancellation of existing policies and the handling of subsequent claims by the insolvency service provider for a time period, such as 60 days subsequent to the cancellation date. Additionally, it should be noted that other processing operations may be performed in connection with step 108 tasks. These other operations may also be performed by the insolvency service provider. These may include, for example, at the request of a liquidator, forwarding proof of claim forms to claimants and insureds as well as publishing notices of insolvencies in periodicals.

At step 110, it is determined whether an assessment is needed in accordance with the funds on hand and size of the insolvency. In other words, a determination is made based on the amount of monies in the reserve fund to pay out claims in connection with the current insolvency, and an assessment may be made at step 112.

Control proceeds to step 114 where refunds are issued on cancelled policies. Calculations may be needed, for example, in performing steps such as by the unearned premium module 36. At step 116, additional claim processing may be performed at some time later for any additional claims arising during a pre-determined time period, such as, for example, 60 days subsequent to the insolvency of an insurance company. These claims may be added as they arise, for example, in connection with inputs to the claim processing module 38.

At step 118, report generation and assessment may be performed as needed on a periodic basis by the different modules such as the assessment module and the reporting module, respectively, included in the software of the data storage system 12.

It should be noted that with regard to the host systems included in the computer system 10 of FIG. 1, different requests for report generation and assessment as well as input of data for each of the different state and members may be input from a host system, such as any one or more of hosts 14a or 14n.

Processing may be performed in this example on the server system such as the data storage system 12. It should be noted that other types of configurations or distribution of tasks may also be included in the embodiment. For example, the data storage system 12 may include one or more processors, each of which may be a single or multi-processor system connected together by any type of communications media or network connection, for example, to perform a distributed processing or other type of arrangement of the tasks described herein.

It should be noted that the foregoing description provides a flexible system and arrangement for efficiently processing data in connection with tasks described herein. Additionally, the foregoing is flexible and extensible having the ability to adapt to changing business needs as well as any changes, for example, that may occur within the statutes, and the like. In other words, the foregoing description may be modified and adaptable in accordance with different types of changes in statutes as well as the addition of new functionality particular to an insurance account. The top-down design approach provides for ease in adding functionality and allowing a "clean" interface with other systems, such as an accounting system and other types of systems that may need to also use the data stored in, for example, the database files 44. The graphical user interface provides for easy data entry and retrieval and display of information to a user.

The claim processing module 38 includes functions to process worker's compensation claims and other claims such as, for example, homeowner, commercial auto, and private passenger physical damage claims that may arise in handling different lines of business of the different states that may be integrated into the system 10 of FIG. 1. The claim processing module includes the ability to pay and calculate different amounts in accordance with the guaranty association statutes.

Figure 6:
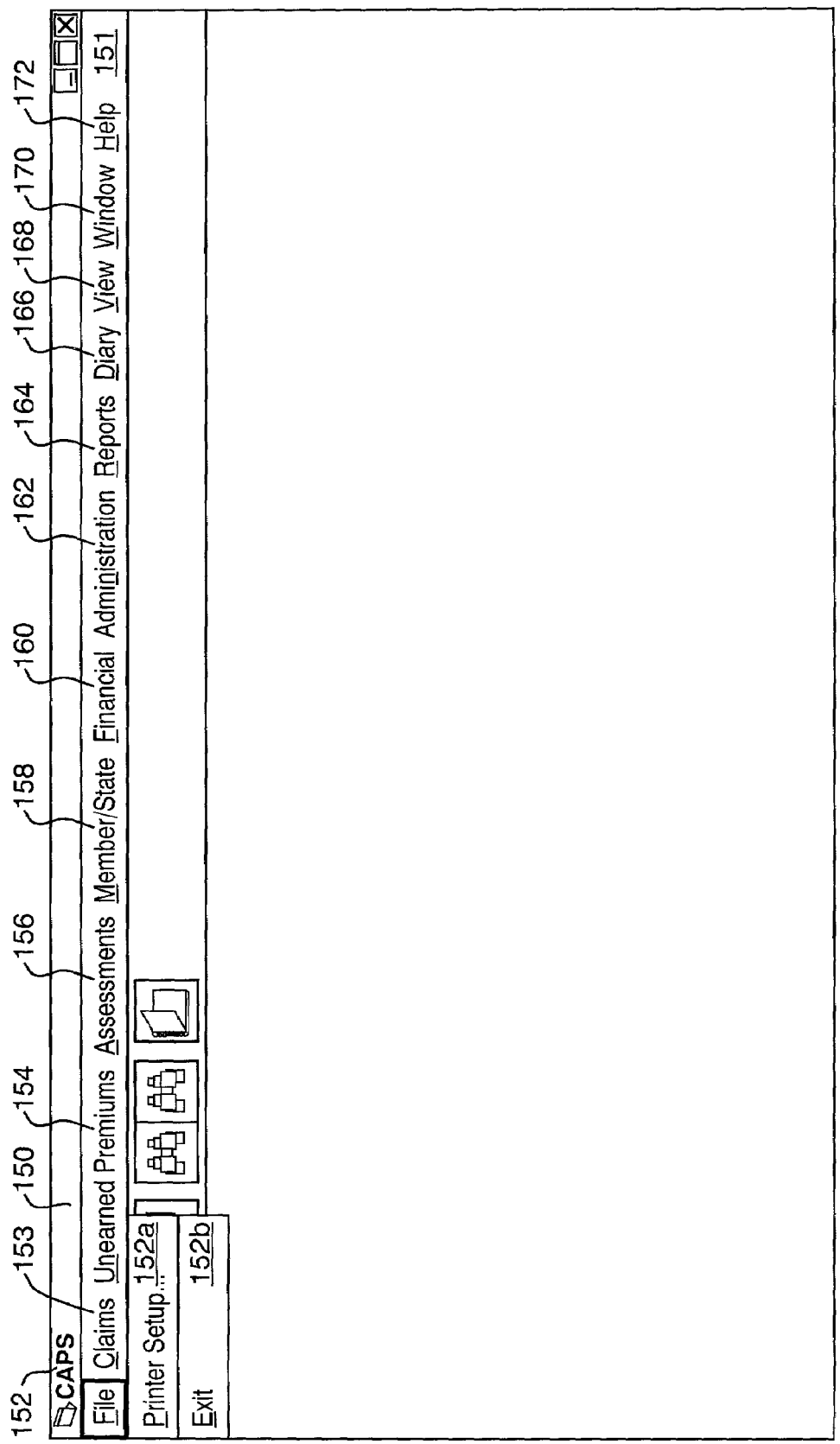
FIG. 6 is an example of an embodiment of a screen display in connection with file options and operations.

Referring now to FIG. 6, shown is an example of an embodiment of a screen display that may be used in connection with displaying file operations. The user interface display 150 shows an example of one type of organization of the different operations that may be performed in connection with processing in the computer system 10 of FIG. 1. It should be noted that other embodiments may include other types of menu displays as well as other types of organizations and hierarchies to embody the functions described herein and should not be construed as a limitation. Similarly, other types of menu displays may embody the same functionality or similar functionality as described herein.

In this example, at the top of the graphical interface or menu display 150, are a variety of different categories of operations that may be performed in connection with software that may operate in the computer system 10 of FIG. 1. For example, shown in the display 150 is a file processing operation 152 displaying file operation menu as including options 152a and 152b. Also included in the display 150 are claims processing operations 153, unearned premium operations 154, assessment operations 156, member/state operation processing steps 158, financial processing operations 160, administrative processing operations 164, reporting options 164, diary processing operations 166, and other operations as may be included in any one of a variety of different menus such as the view option 168, the window option 170, and the help option 172.

As will be described in more detail in paragraphs that follow and also shown in connection with FIG. 6 for file processing operations 152, selecting a particular category of processing operations from the menu bar display 151 results in the display of one or more other processing operations in accordance with the selected option. Shown in the example of FIG. 6, selection of the file operation 152 causes display of the menu options printer setup 152a and exit 152b.

What will now be described in connection with FIGS. 7A-7D are examples of screen displays of one embodiment used in connection with the claims operations and associated processing.

Figure 7A:
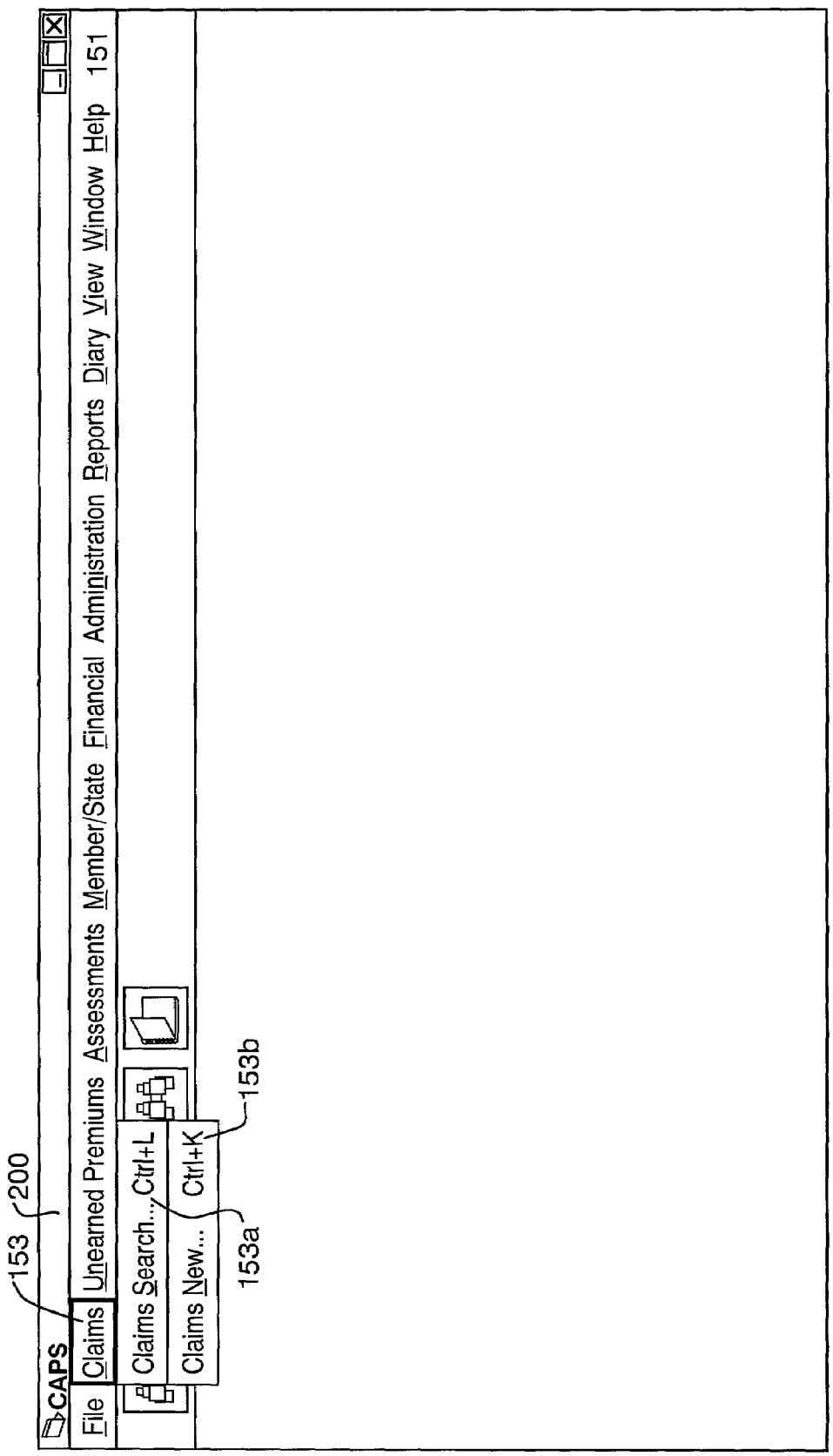

Referring now to FIG. 7A, shown is an example of a screen display 200 that may be used in connection with performing claims processing operations as may be selected from the claims option from the tool bar 151 previously described in connection with FIG. 6. Included in the claims menu options 153 is an option to perform a claims search through selection of 153a, as well as selection and input of new information for a new claim by selecting menu option 153b. It should be noted that as will be described in connection with this and other Figures, shown in the right-hand portion of each menu option are shortcut characters as known to those skilled in the art that may be used and also as an alternative to selecting the corresponding menu option on the left-hand portion of the same line of a menu item displayed. As will be described in more detail herein, in performing a claims search by selecting the option of menu item 153a, a query may be performed of existing claim searches in accordance with selected criteria. Selecting menu option 153b for entry of new claims may include entry of a new claim into the database, for example, an associated and recorded information that may be stored in the database file 44 previously described in connection with FIG. 3.

It should be noted that in this particular embodiment, a menu item may be selected by using keyboard short-cut control characters on the right-hand side of a menu item display, as well as by selecting an item from the menu as with a mouse and mouse buttons. It should also be noted that other embodiments may use other types of techniques, such as touchscreen and/or voice recognition, in connection with selecting and performing an option.

Figure 7B:
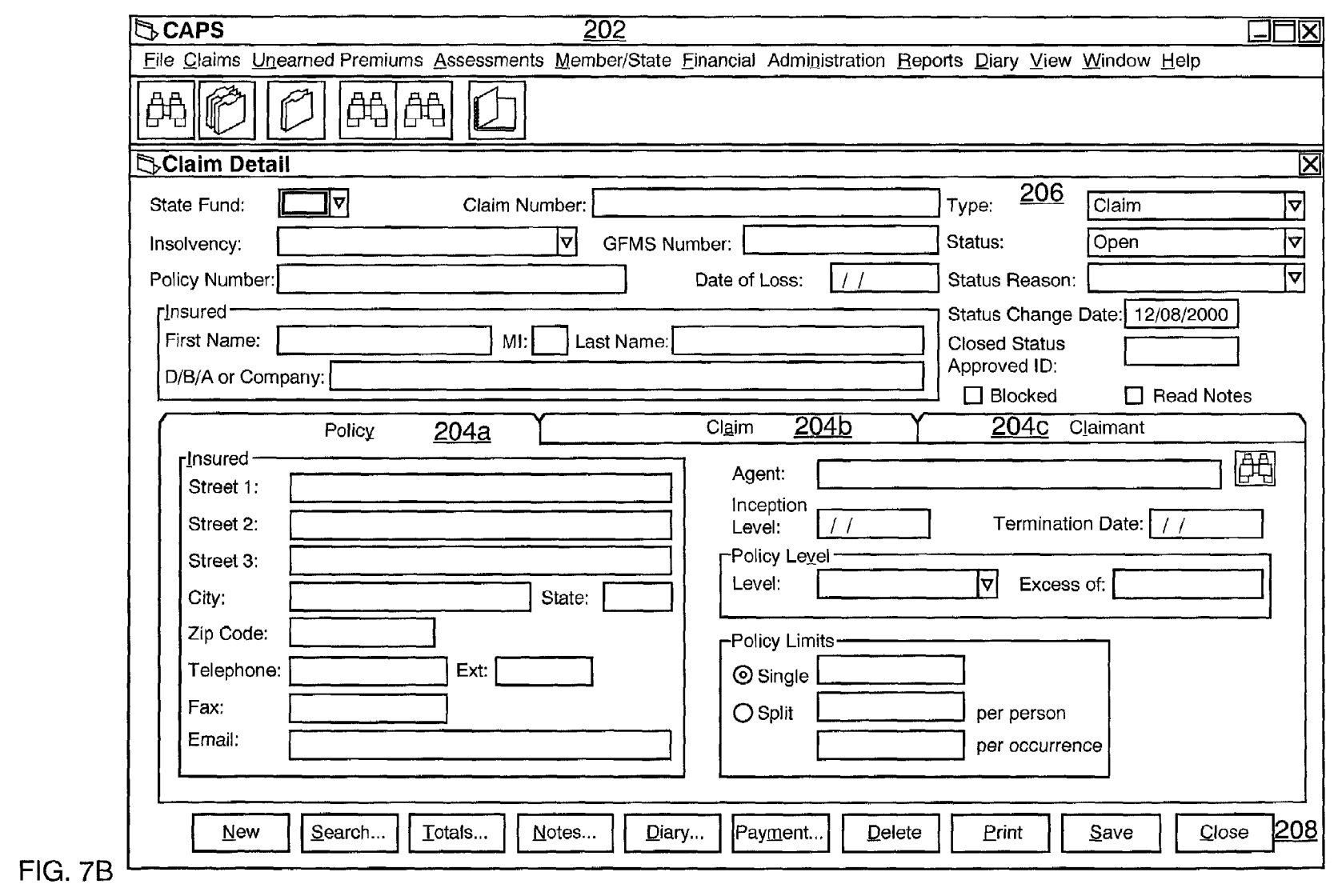

Referring now to FIG. 7B, shown is an example of a screen display that may be used in connection with claims processing when the option, for example, of entering a new claim has been selected as may be performed in connection with the selection of menu item 153b previously described in connection with FIG. 7A. When the option is invoked for selecting and entering a new claim, shown in FIG. 7B is an example of a screen display 202 that may be used in connection with entering a new claim. Included in the display 202 is a top portion of claim detail information 206 as well as various tabs such as 204a-204c that may be used in connection with different types of processing operations performed with a new claim or existing claim in the system. In other words, the tabs 204a-204c are a further detailed description and organization of hierarchy of the different operations that may be performed in connection with claim processing.

The entry of information in this example is organized and associated with these subcategories and operations. In data entry fields associated with the top portion 206 are general claim detail information. In this example, different types of information include claim number, selection of a particular state fund, an insolvency name/number, an associated policy number, as well as different insured information such as the name of the insured. The state fund and other fields displayed on the screen 202 will be explained in more detail elsewhere herein.

It should be noted that the state fund is associated with a particular state and the particular type of funds that may exist within a particular state may vary in accordance with statute and other types of details associated with each particular state for which the system 10 of FIG. 1 performs insolvency functions. Also included in the screen display 202 are tabs 204a-204c. In the screen display 202, tab 204a is considered active as shown by the bolding of the letters for policy information. Also shown at the bottom portion of the screen display 202 are various menu options buttons included in the field 208. As known to those skilled in the art, one technique which may be used to show which type of options are active in accordance with a particular screen display is by graying out those options which are not active. For example, options such as totals, notes, and diary are grayed out and thus are not active in accordance with functions currently being performed. In accordance with policy information displayed by tab 204a, different types of policy information for a particular claim being entered may be displayed. For example, the insured address information is included in the policy tab 204a.

The embodiment of the screen display 202 may include information in the policy tab 204a that is specific to the policy information for which claims may be made. For example, indicated in tab 204a are different types of policy limits such as, for example, with regard to limits for coverages under a particular policy. Also indicated is a policy level and an excess amount. It should also be noted that in the upper portion 206 a type field may include an option or selection such as claim indicating the type of record which is being created. It should be noted that as described elsewhere herein, miscellaneous information may be created and have an associated type. One embodiment includes a type or status of "CBN" which may be used in connection with any one or more of a variety of functions. An embodiment may use a "CBN" type of record when entering partial claim information.

Figure 7C:
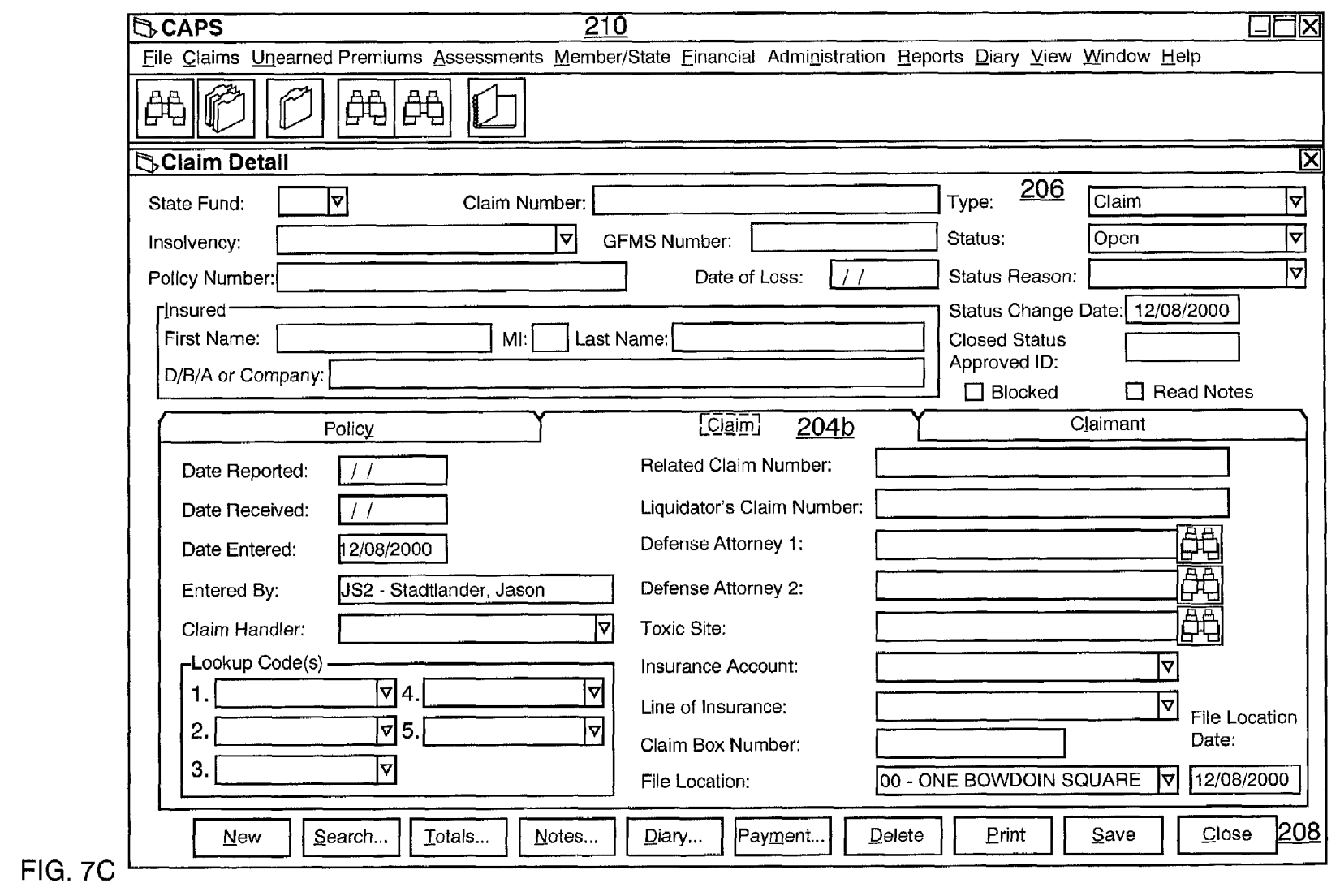

Referring now to FIG. 7C, shown is an example of a screen display 204 as may be shown on the tab 204b claim is active in connection with performing claims processing operations, for example, data operations for a new claim. The claim tab 204b includes data as may be associated with a particular claim being created. This includes, for example, different types of date information as to when the claim was entered and by whom, the particular claim handler assigned as well as any other related claim information such as other claim entries that may be related to the same incident or common to this particular being entered now.

Figure 7D:
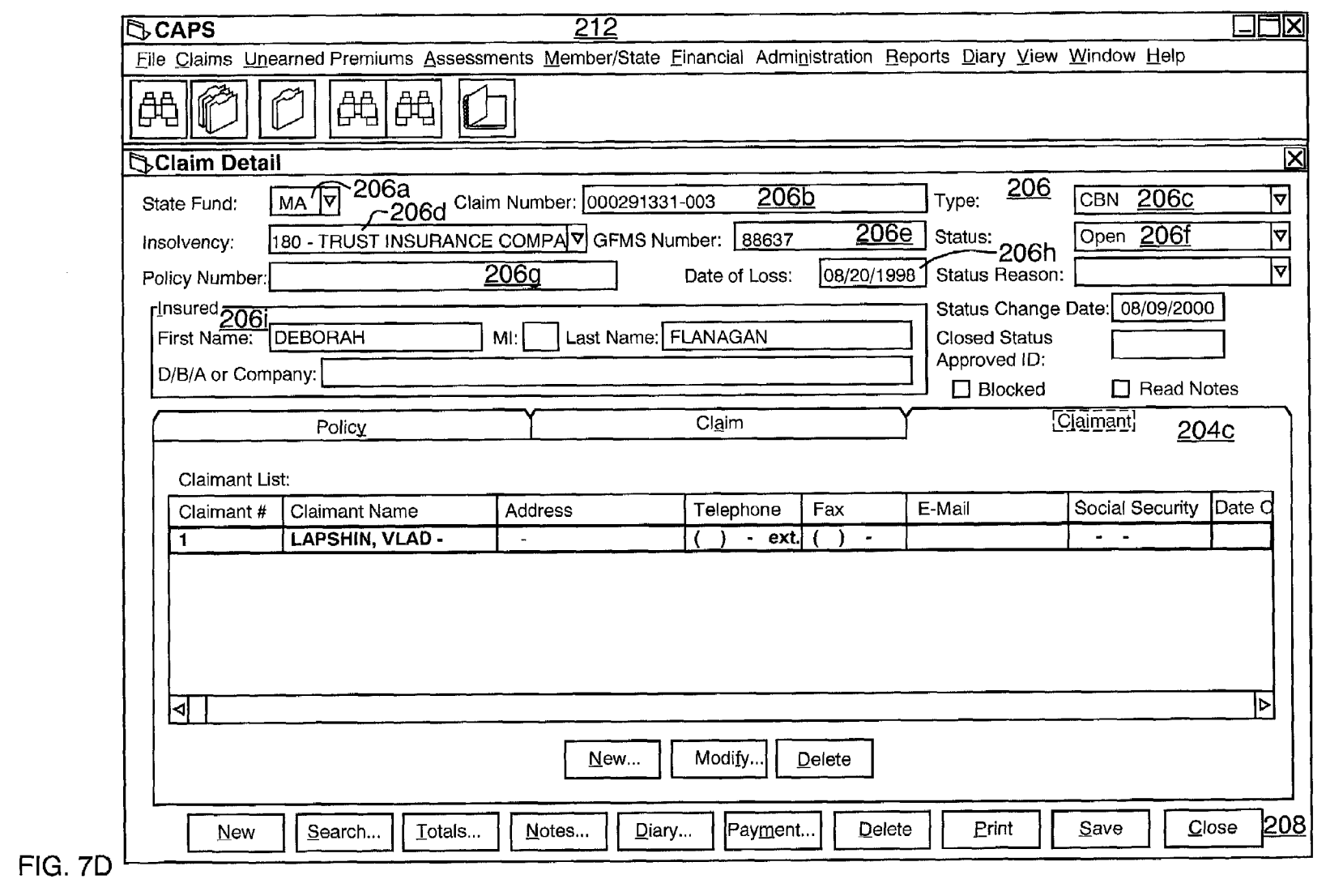

Referring now to FIG. 7D, shown is an example of a screen display 212 that may be used in connection with entering claimant information 204c in connection with claims processing. Shown in this example that may be performed in connection with claim processing as may be associated with entry of a new claim, different types of claimant information may be entered and displayed. In this example, the portion of the screen display 212 as shown in the area of 206 has been filled in partially. For example, the designated state fund has been chosen to correspond to the State of Massachusetts as shown in field 206a. A claim number has been entered for example in field 206b. A type of claim has been entered as displayed by in this example the three-letter code in field 206c. The name of the insolvency for which these functions are being performed is in accordance with data entered in field 206d. The particular GFMS number or system information number may be, for example, assigned by the system to this particular claim is shown in field 206e. The particular status of this claim in this instance is open as indicated by field 206f. The date of the loss is indicated in field 206f. Different fields of insured information may be filled in as in field 206i.

It should be noted that, not shown but, included in this embodiment as indicated by the arrow on the right-hand side of each of these fields such as 206a, one may select from a plurality of different options that are valid in the system. In other words, to assist in data entry, when a particular field is activated for data such as the state fund 206a, when a user selects, as by clicking with a mouse button on field 206a, a variety of different state fund abbreviations corresponding to different states may be displayed from which a user may select one.

Included in tab portion 204c is a list of claimants. In this particular example, only a single claimant is shown. However, the list of claimants making a claim under the particular policy and particular occurrence displayed may be included in the claimant list shown in connection with tab 204c.

Figure 7E:
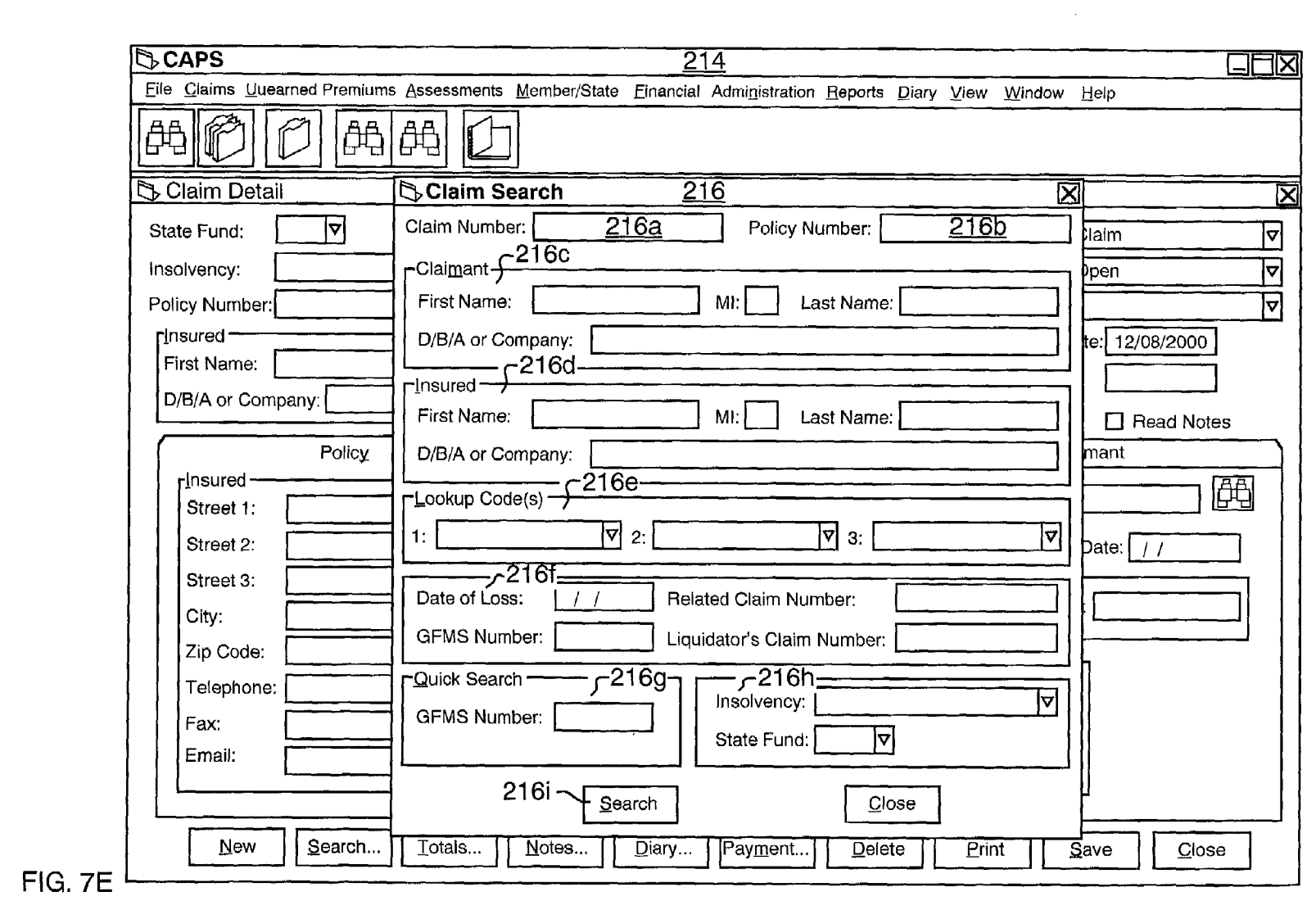

Referring now to FIG. 7E, shown is an example of a screen display 214 as may be used in connection with performing a search for one or more claims in accordance with specified criteria. It should be noted that this option may be selected from the original menu 153 as displayed in connection with option 153a of FIG. 7A. Additionally, different types of shortcut buttons may be included as previously described in connection with FIG. 7D through the portion of the screen display 208. In other words, the search operation may also be performed by selecting or activating one of the buttons in the previously displayed bottom portion of the screen 208. When this option is selected, the screen display 216 may appear as a "pop-up" window interface with different data entry fields in accordance with a particular query of a database for a particular claim.

Shown in this example of a claim search information 216, a user may perform a data query in accordance with the claim number 216a, policy number 216b, claimant information 216c as well as insured information 216d. Field 216e may identify a code associated with one or more types of information. The codes may be defined as needed, for example, defining a code associated with a particular defense attorney. Additionally, a query may be performed in connection with loss information such as 216f as well as different types of insolvency and state fund information 216h. A quick search is an option as included in field 216g in which a particular GFMS number may be entered. This may be a quick search as in this example because it corresponds to a unique record number and information rather than performing a query against many different records having different GFMS numbers. Once the different data fields are entered, a user may activate the search by selecting the search button 216i causing the database query for example in this embodiment to be performed that may result in a display of one or more records or alternatively a message indicating that no such records are found that meet the specified search criteria. It should be noted that other embodiments may perform other actions and options in connection with processing and performing a search for one or more claims and associated information.

Figure 8A:
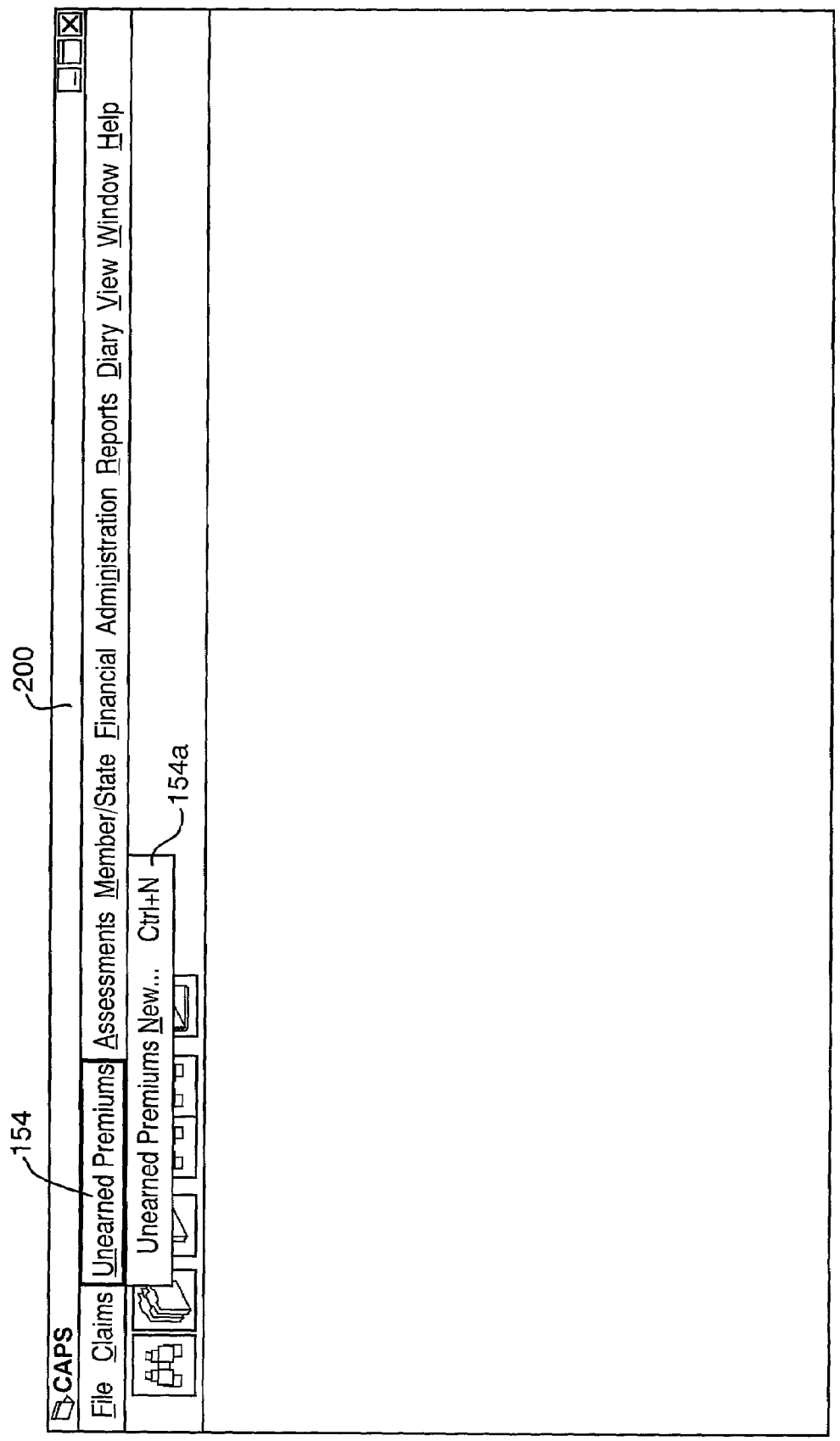

Referred now to FIG. 8A, shown is a screen display of a different menu that may be used in connection with performing unearned premium operations 154. Included in the screen display 220 is a single menu option 154a corresponding to the unearned premium operation when entering a new unearned premium. It should be noted that in this embodiment, unearned premium and associated processing operations refer to those premiums which at the time of insolvency or other predetermined date have not been earned by a particular line of insurance companies which have become insolvent. In one embodiment, this information may be stored per policy holder. For example, if one pays $500 for annual insurance, and six months into the time period of your policy your insurance company becomes insolvency, the unearned premium is approximately 50% at that point in time. In this example, the premium is unearned with respect to a premium which is paid by a policyholder in which an insolvency occurs.

Figure 8B:
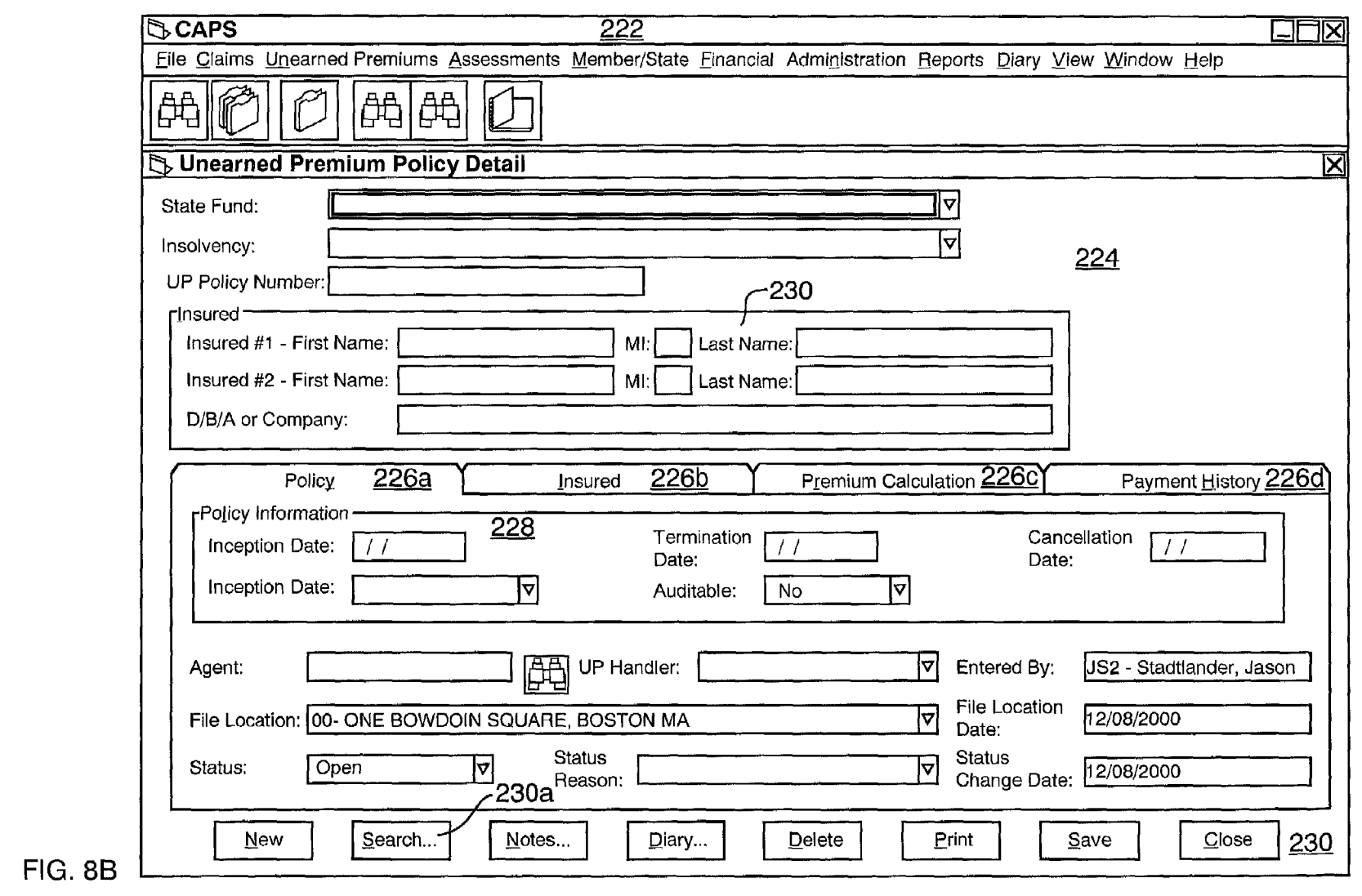

Referring now to FIG. 8B, shown is an example of a screen display that may be used in connection with the selection of unearned premiums new option 154a from the screen display 220. Included in screen display 222 is a structure similar to that previously described in connection with a claim. Common information may be included in the top portion such as in the display fields included in the top portion 224. Operations and data may further be organized as indicated by tabs 226a-226d for performing operations in connection with unearned premiums. The top portion 224 includes information such as an identified state fund, associated insolvency, and policy number as well as insured information.

The tabs identifying different types of data and associated processing may be included with an unearned premium and associated with an unearned premium includes policy information 226a, insured information 226b, premium calculation information 226c and a payment history 226d. It should also be noted that a similarly displayed in connection with the screen displays associated with claims processing, at the bottom portion of the display 222 is a plurality of operation buttons in the bottom portion 230 corresponding to different types of operations or shortcuts that may be selected. For example, unearned premium search or query may be performed by selecting button 230a from the bottom portion of the screen 230 to perform a data query in accordance with unearned premium policy information that may be displayed in a format similar to that previously described in connection with performing a claim search.

Referring now to FIG. 8C, shown is an example of an embodiment of a screen display 242 as may be displayed in connection with insured information tab 226b being activated in connection with the previously described screen display 222. It should be noted that the screen display 242 includes the same common upper portion 224 as well as the different tabs 226a-226d. The difference in this screen display is that a different tab is activated. In this instance, the insured tab 226b is active for display or entry of data that may be used in connection with an insured. For example, in this embodiment different insured information may be entered in field 240 such as a street address, city and state information.

Figure 8D:
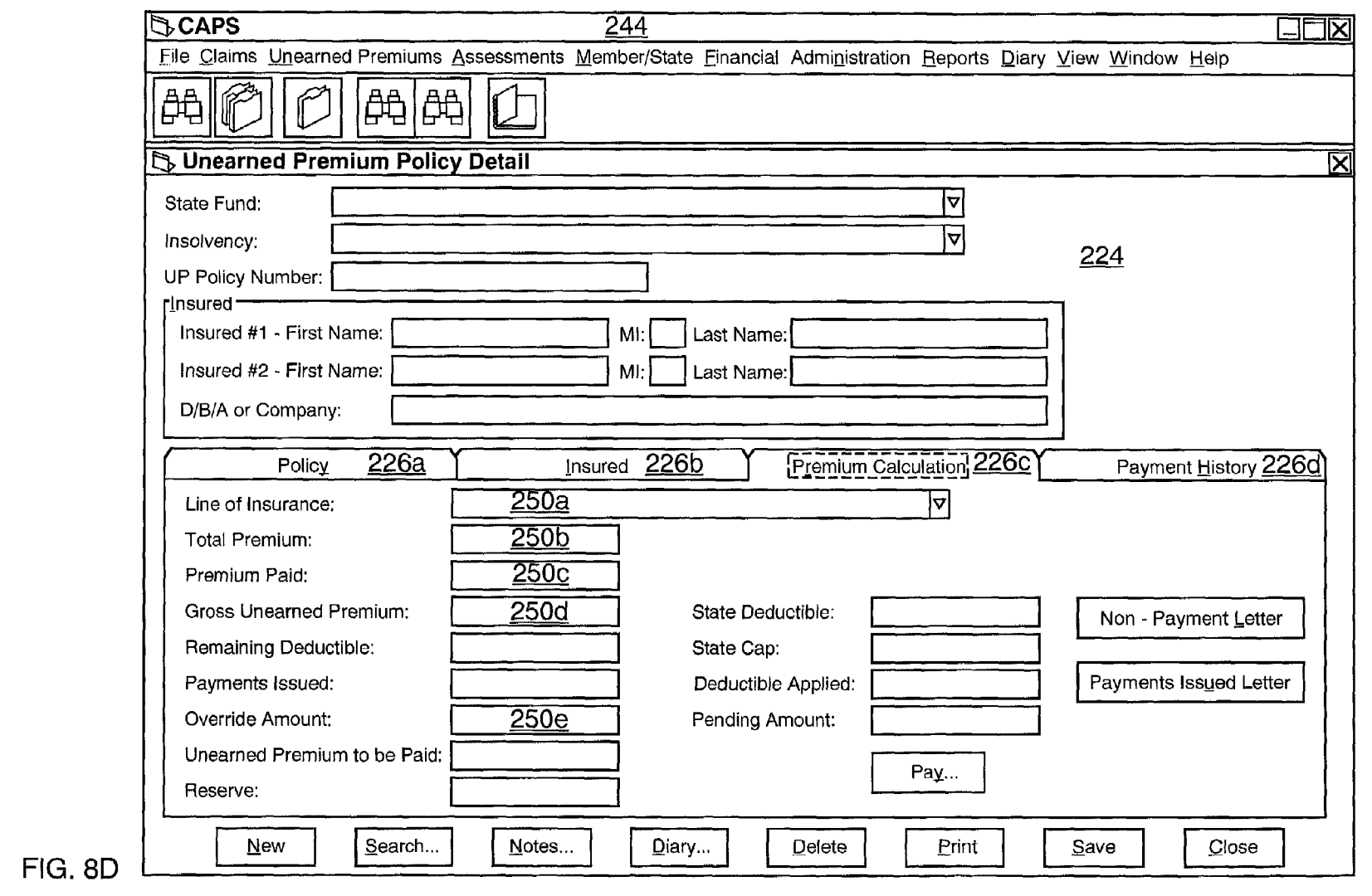

Referring now to FIG. 8D, shown is an example of a screen display 244 as may be used in connection with the active premium calculation tab 226c when entering new information associated with an unearned premium. Shown in the screen display 244 with the active premium calculation tab 226c are different data fields. Line of insurance may be specified an entered in field 250a. A line of insurance as described elsewhere herein refers to a particular type of insurance such as commercial auto, homeowners, and the like. Also included in premium calculation tab 226c a user may enter information in the total premium field 250b, as well as the premium amount paid to date, for example, in field 250c and an override amount in field 250e. Field 250e may be used in connection with raising or lowering reserves and the amount of unearned premium to be paid.

Figure 8E:
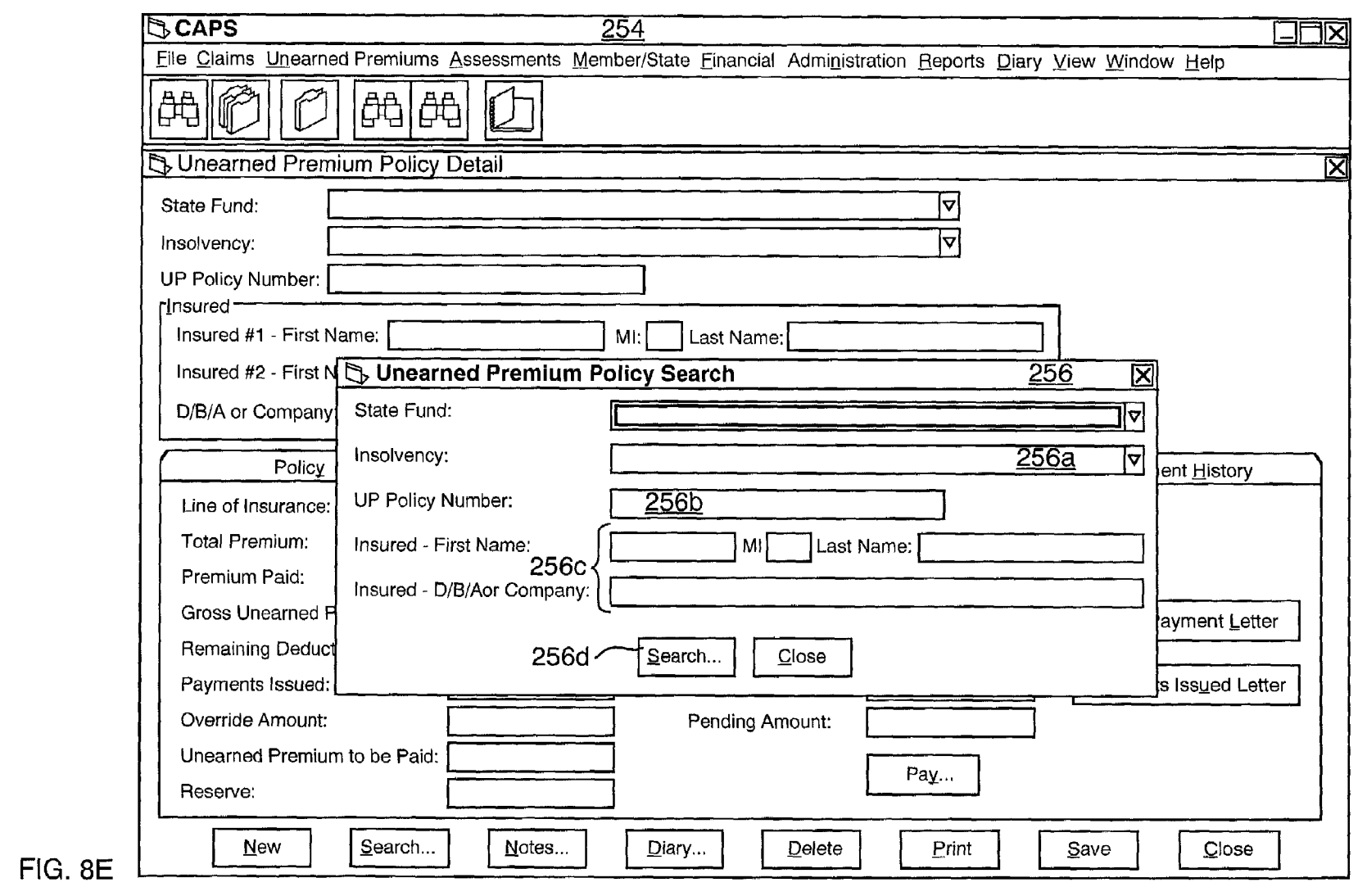

Referring now to FIG. 8E, shown is an example of a screen display 254 as may be displayed in connection with performing a policy search in accordance with unearned premium information. Included as a portion of the display 254 is a second window or screen display 256 as may be displayed such that it appears over the screen display 254. In this example, an unearned premium policy search may be performed by entering different fields of information. In other words, an unearned premium or premiums may be searched for in accordance with entering a state fund insolvency, as well as the UP policy number or insured information. Once this field or fields of information is entered, the query may be performed as a database in connection with the data entered by selecting the search button 256d. It should be noted that data fields such as 256B referring to the UP policy number refers to a policy number. Other data fields may be included in this and other types of screen displays described herein and may vary in accordance with each particular embodiment.

Figure 8F:
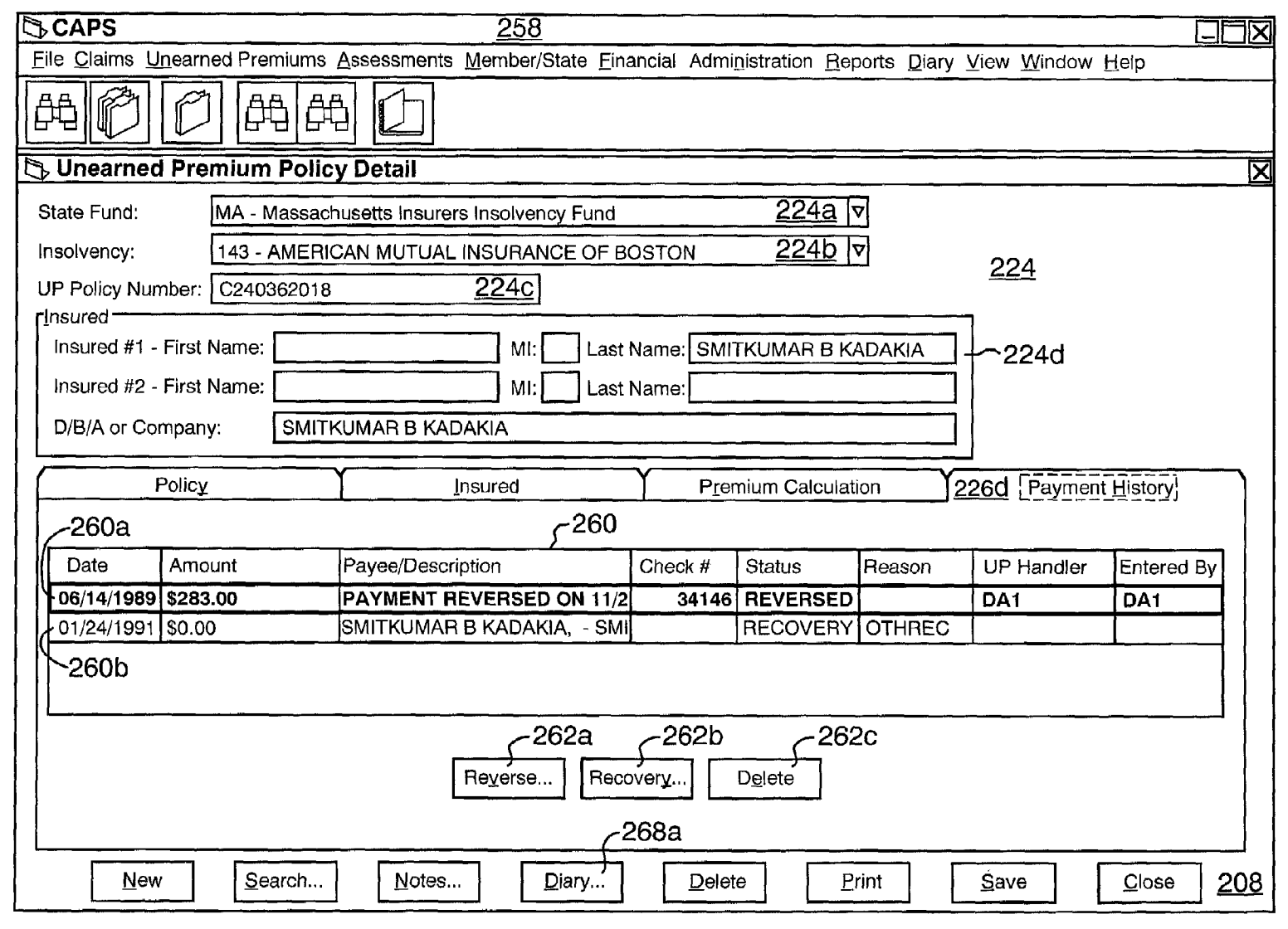

Referring now to FIG. 8F, shown is a screen display 258 that may be displayed in connection with performing and displaying payment history information associated with an unearned premium. Shown is the top portion of unearned premium information 224 as may be specified in fields 224a, 224b, 224c and the like. In accordance with the displayed policy, for example, as indicated by the UP policy number 224c, different payments may have been made on behalf of the unearned premium of the shown policy. This payment history is shown in field 226d. In particular, in this instance two payments have been made as displayed in the tabular form of the chart 260. Two entries 260a and 260b are shown as making payments with different information on certain dates. It should also be noted that different options may be performed in connection with certain payments such as reversing a payment, displaying additional recovery information as well as deleting certain information about a payment or unearned premium.

The foregoing operations such as reverse, recovery and other operations that may be associated with a particular unearned premium may be selected through different types of buttons, such as 262a-262c as may be included in the screen display 258. Included in the bottom portion of the screen 208 are different buttons that may serve as shortcuts in connection with performing or displaying other types of information.

What will now be described are different types of data and operation that may be displayed in connection with an unearned premium through the use of diary entry that may be performed or selected by selecting button 268a.

Figure 8G:
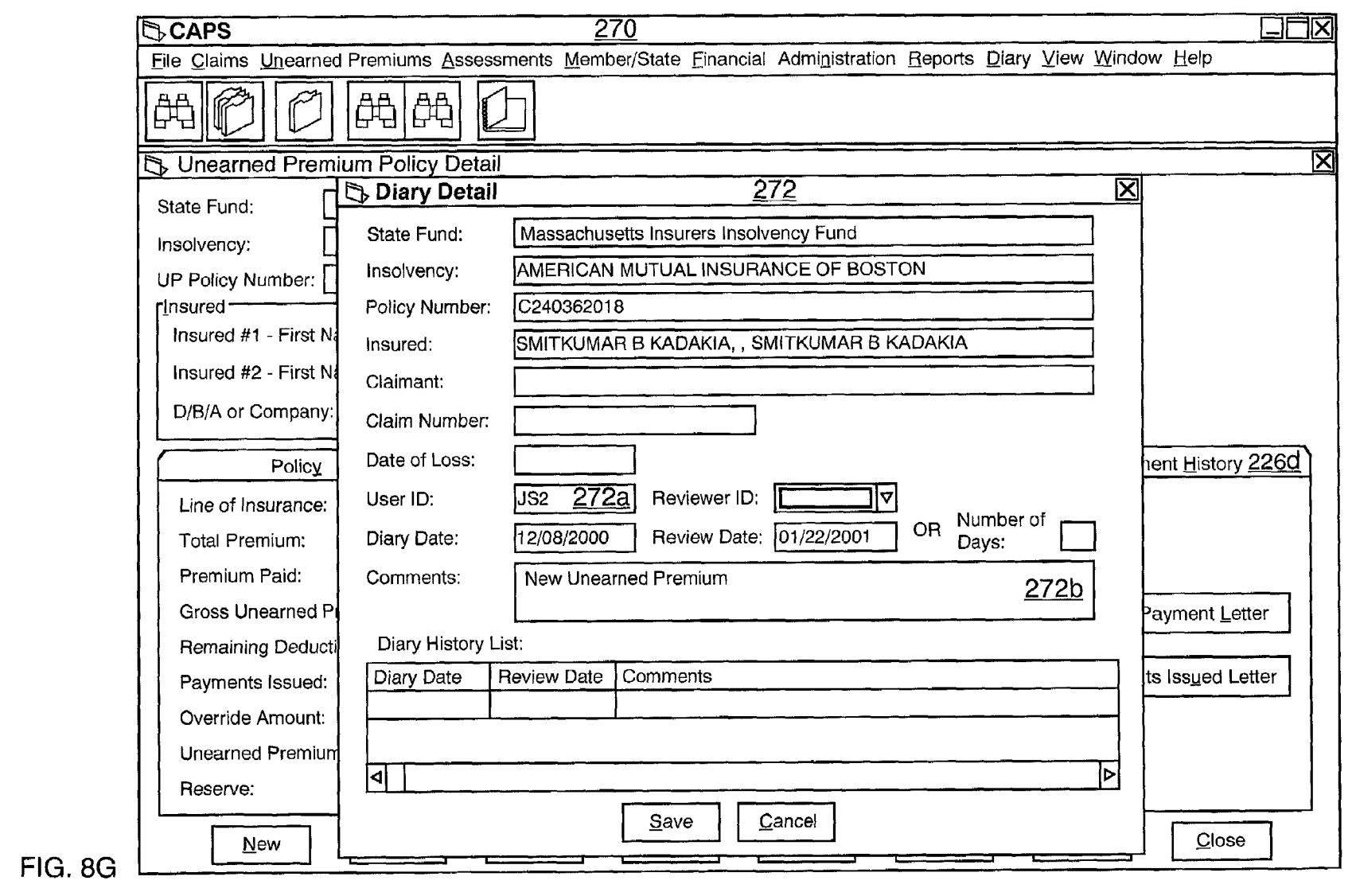

Referring now to FIG. 8G, shown is a screen display 270 as may be displayed in connection with entering a diary entry associated with an unearned premium policy. Generally, as will be described elsewhere in more detail herein, a diary entry may be associated with an unearned premium as well as a claim in this example. A diary entry may be made by a first user in connection with an unearned premium or a claim. One or more other users may be notified through the use of a diary entry of a particular point of which the first user which is to notice and be reviewed by one or more other users. For example, associated with the claim information displayed in connection with screen 258, the user as indicated by user id field 272a creates a diary entry with certain comments as indicated in field 272b. This diary entry may be sent to one or more other users. The diary function enables customized information by a particular user to be sent to other users as well as associated with information about a claim and unearned premium and the like.

Figure 9A:
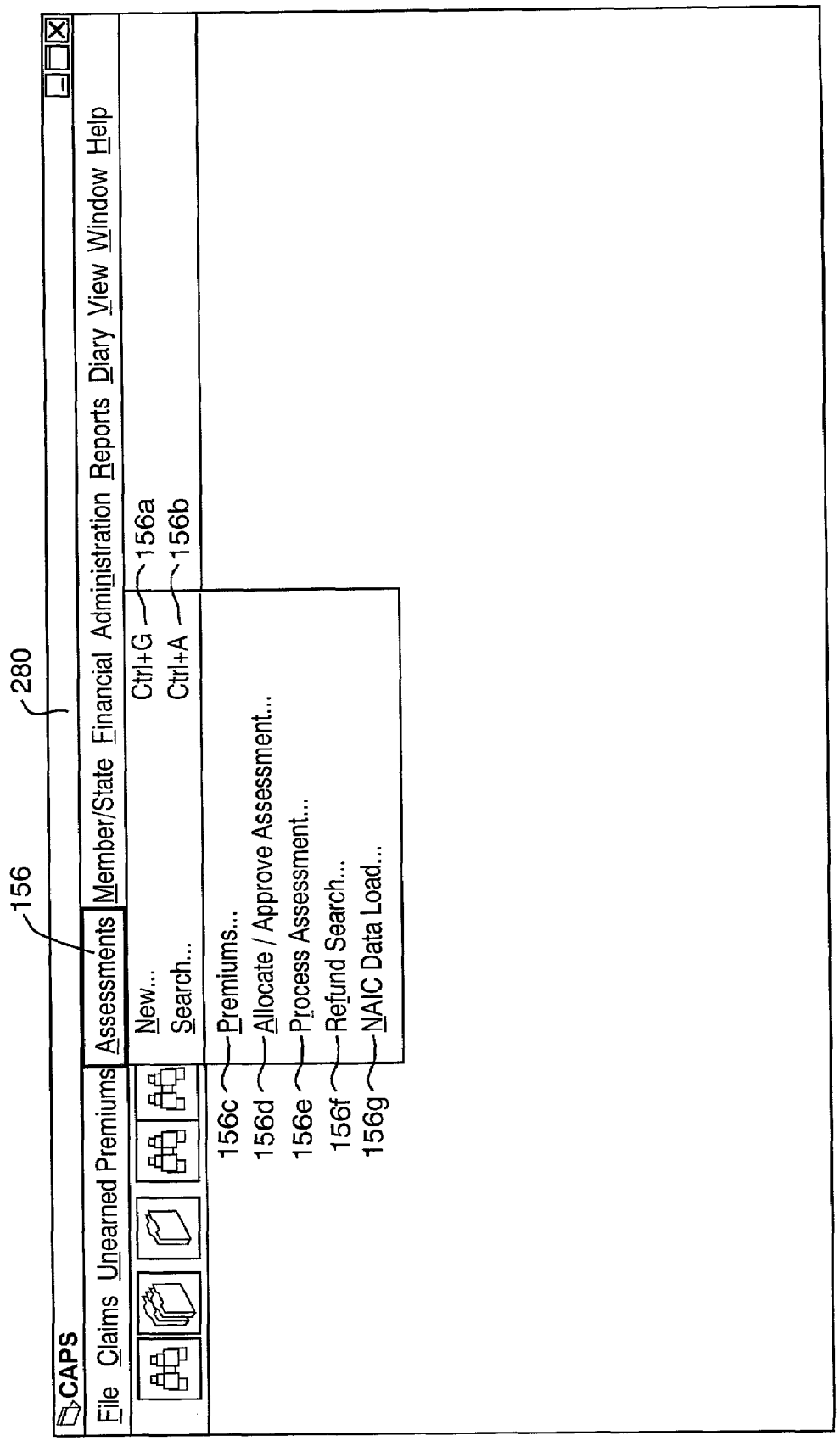

Referring now to FIG. 9A, shown is a screen display 280 as may be used in connection with displaying different processing operations performed in connection with assessments. The assessments option 156 may cause the display of the menu shown in FIG. 9A of screen display 280. A new assessment may be performed as well as a search in connection with assessment processing. Additionally, assessments are performed in connection with premiums and other operations as indicated by other fields 156c-156g. It should be noted that the ellipses or three dots following an option as in 156c-156g may indicate as in this embodiment that a subsequent menu may be displayed for further selection or refinement in connection with a processing operation. As known to those skilled in the art, assessments and associated processing relate to appropriating monies in different accounts as may be associated with different state funds for payments such as those in connection with claims and unearned premiums. Generally, an assessment may be performed on a periodic basis such as annually to assess the monies that will be needed in the allocation or paying out of monies in connection with a particular insolvency. Additionally, assessments may be performed as needed for example in connection with additional funds that may be needed at different points in time. An assessment may be characterized as a technique used to maintain an estimated amount of funds available to pay out claims as needed and unearned premiums and other monies associated with insolvencies.

Figure 9B:
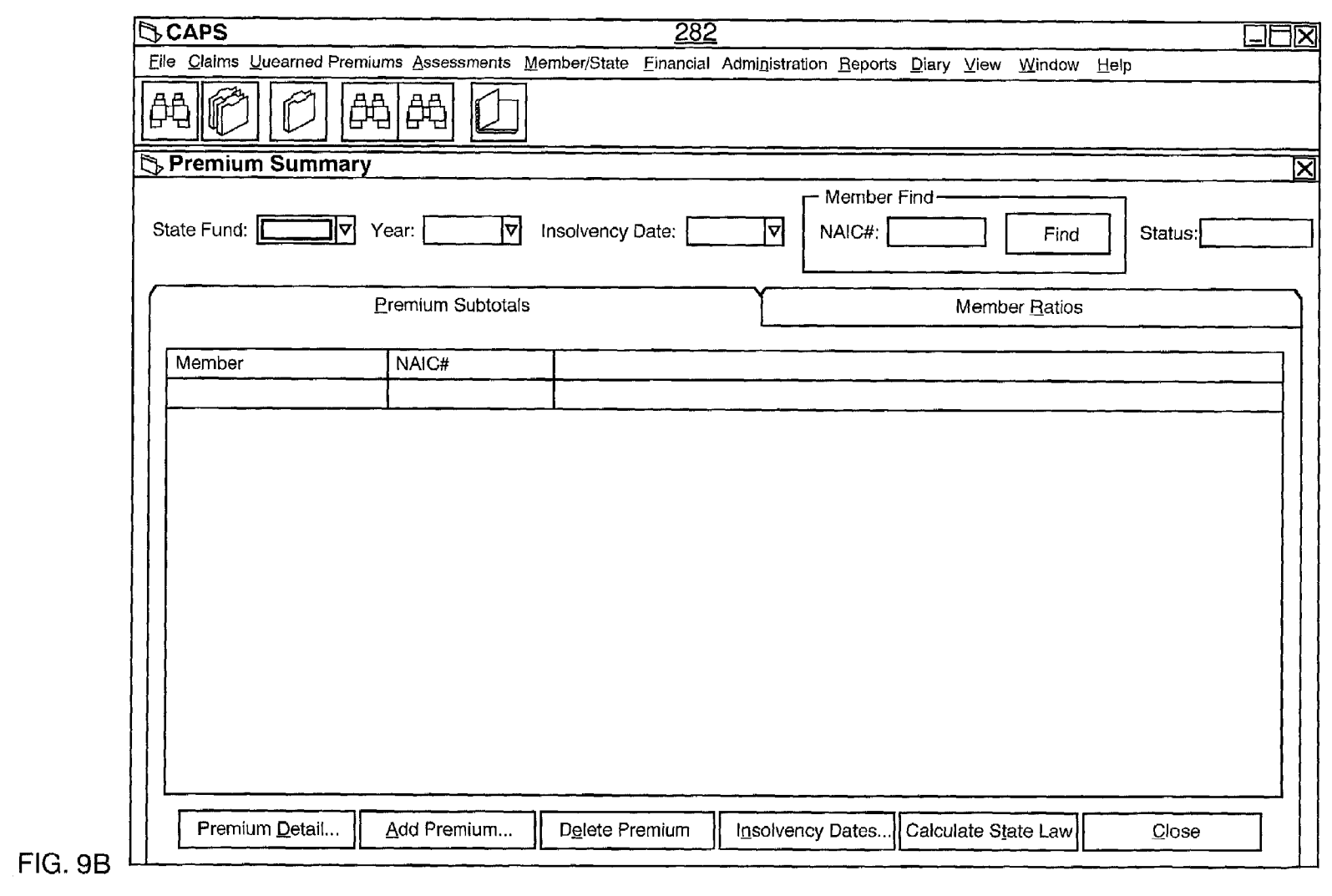

Referring now to FIG. 9B, showing is an example of a screen display 282 as may be used in connection with premiums written by all solvent members by state by year.

Figure 9C:

Referring now to FIG. 9C, shown is an example of a screen display 290 as may be displayed in connection with performing an individual assessment query or search. In one embodiment, the screen display 290 may be reached through an assessment search option such as 156b described in connection with other figures. Included in the screen display 290 is another subwindow or menu display 292 in connection with entering information for searching for different types of assessment records. In this example, information may be entered as in fields 292a and other fields in the top portion 294 of the screen display 292. Upon entry of this information such as an insolvency selected and entered in field 292a, assessment information may be displayed in tabular form, for example, in fields of grid 296. The grid as indicated by 296 may display as in this example different types of assessments performed for the selected or entered insolvency corresponding in field 292a.

Figure 10A:
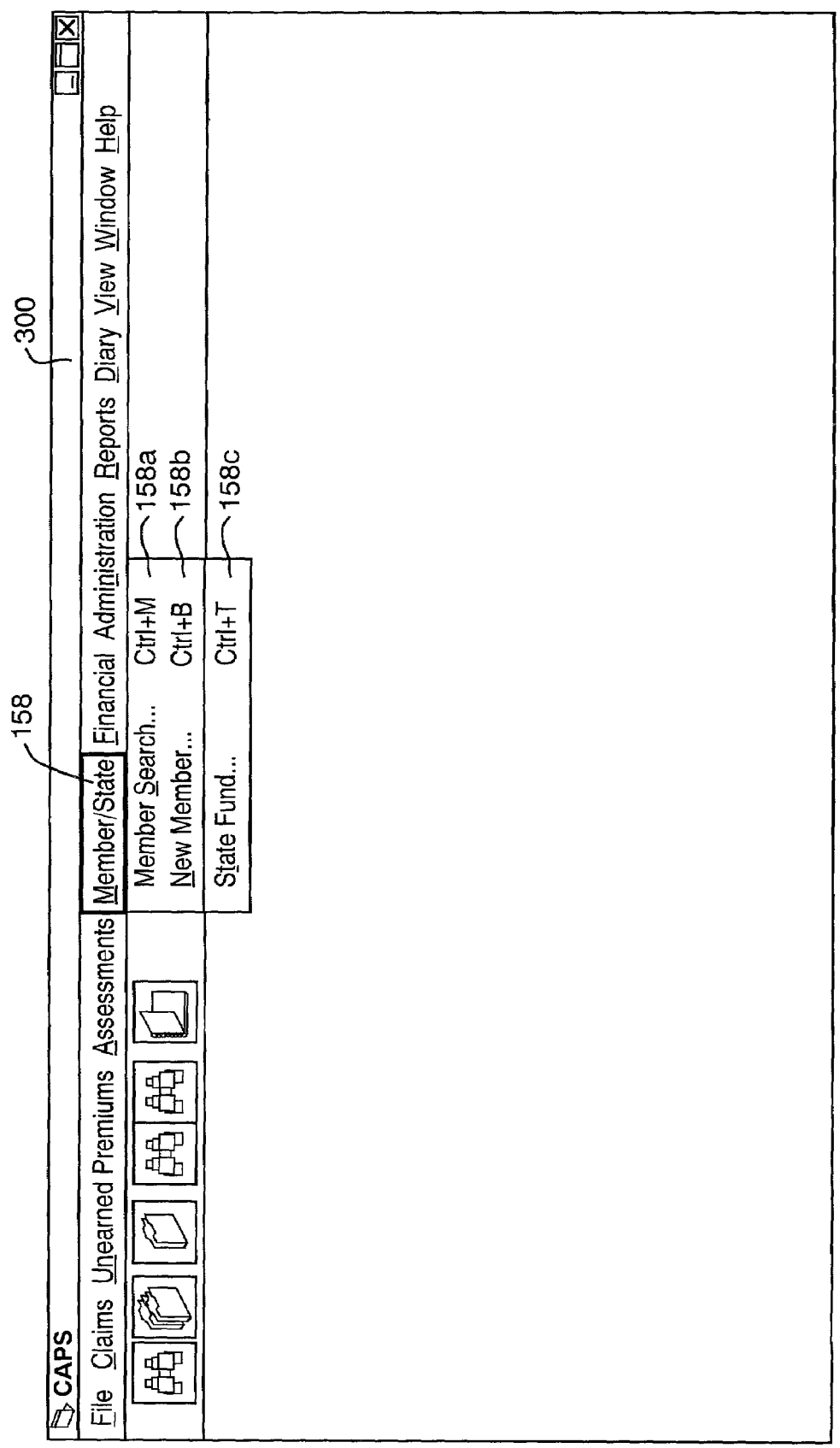

Referring now to FIG. 10A, shown is a screen display 300, that may be used in connection with displaying different types of options in connection with member and state processing operations. The member and state processing operations 158 are indicated by menu options 158a-158c in this particular example.

Different types of functions may be available in accordance with member and state information include a member search 158a. This may include, for example, the ability to enter new member information 158b, as well as the ability to obtain information on performed processing in connection with a state fund.

It should be noted that in terms of a hierarchy, a state fund may correspond to each particular state for which the system of FIG. 10 may perform insolvency functions. A member is a licensed insurance company that administrates and sells, for example, different types of insurance. A more detailed description of this relationship as may be included in one embodiment is described elsewhere herein in more detail.

Figure 10B:
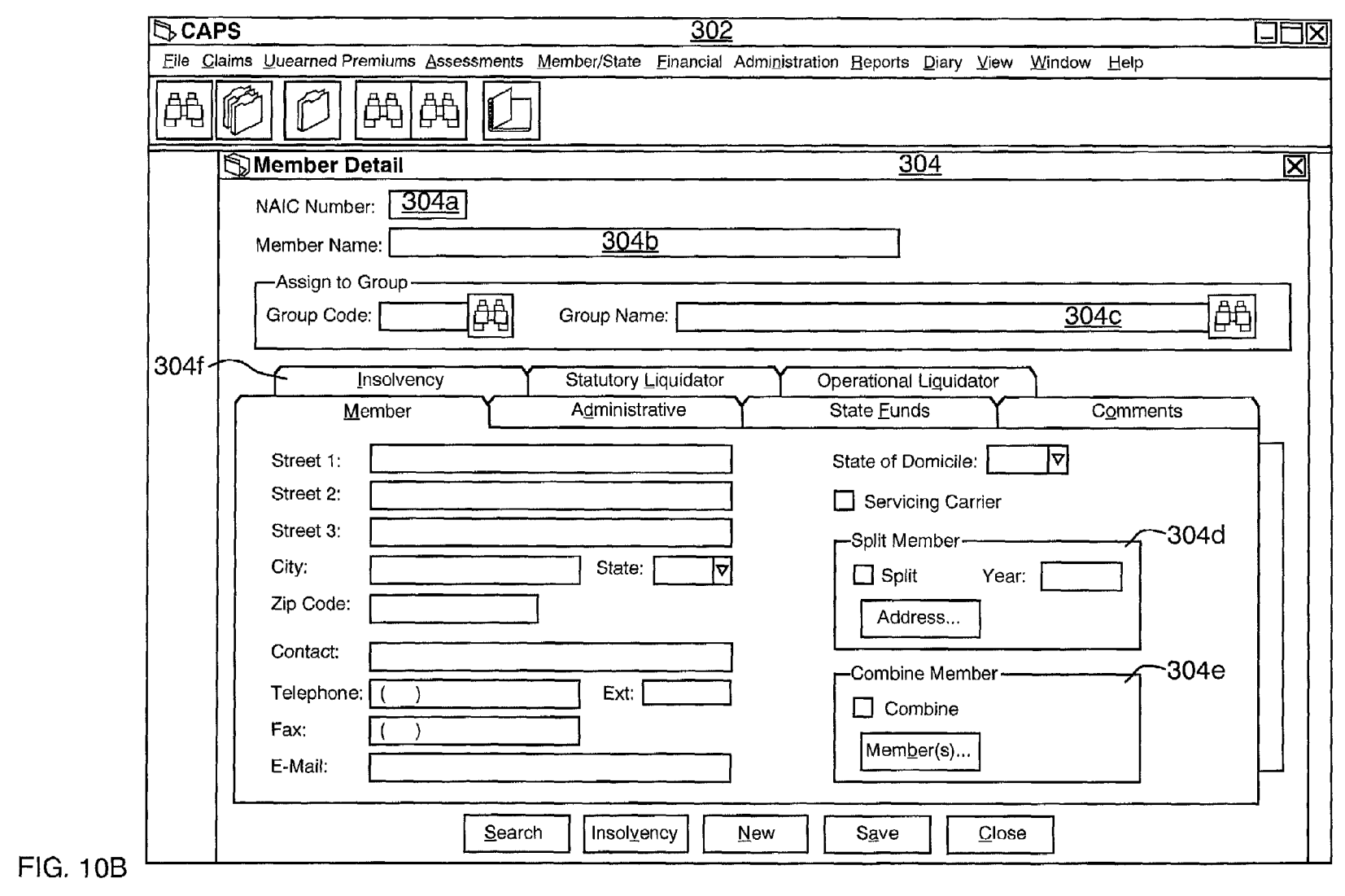

Referring now to FIG. 10B, shown is an example of an embodiment of a screen display 302 that may be displayed in connection with entering new member information as by selection menu option 158b. In this example, in connection with entering a new member information, the member detail screen 304 may be displayed as a subwindow or second window on top of the screen display 302. The member detail screen display 304 includes general information about a member, such as the NAIC number 304a, as well as the member name 304b and associated information in field 304c, such as an associated group name and code.

It should be noted that certain information associated with a member may be modified as a member's status changes from solvent to insolvent. Accordingly, additional or different functionality may also be available in accordance with the insolvent status of a member. For example, upon a member becoming insolvent, additional information fields and processing, such as associated with tab 304f, may be activated. Each member may be associated with one or more state funds and corresponding insurance account(s). A member may also be disassociated with one or more particular insurance accounts, for example, if a member chooses not to write policies for one or more LOI (line of insurance) associated with a particular account.

In this example, the NAIC number corresponds to descriptions as may be specified by the "National Association of the Insurance Commissioner" (NAIC) is associated with each member. In field 304b, a member name is entered. Additionally, members may be assigned or associated with a group as indicated by the information entered in field 304c, by the group code and name. In this example, in terms of a hierarchy, a state fund may have associated with it one or more accounts in which each account may be aligned with one or more particular lines of insurances in accordance with state statute and other types of information. Different member companies may be associated or assigned with a particular group. For example, Metropolitan may be a particular group and have one or more members such as Metropolitan corresponding to home insurance, Metropolitan Life and Auto, and the like.

As described elsewhere herein, different members may be split or combined for example as indicated by fields 304d information and 304e information respectively. In this example, as described in more detail herein, a member may be split if it is divided into two or more business entities. Similarly, a member may be combined with another member if there is an acquisition, for example, by another member or other company.

In one embodiment, member information may be combined by having the link or relation between different entities that may be already included in the database rather than making a new copy of information. In other words, data already in the system may be reassigned or reassociated with other data included in the database. The combine member option that may be implemented in a particular embodiment may accordingly perform these functions, for example, in connection with a merger of two or more companies.

Figure 11:
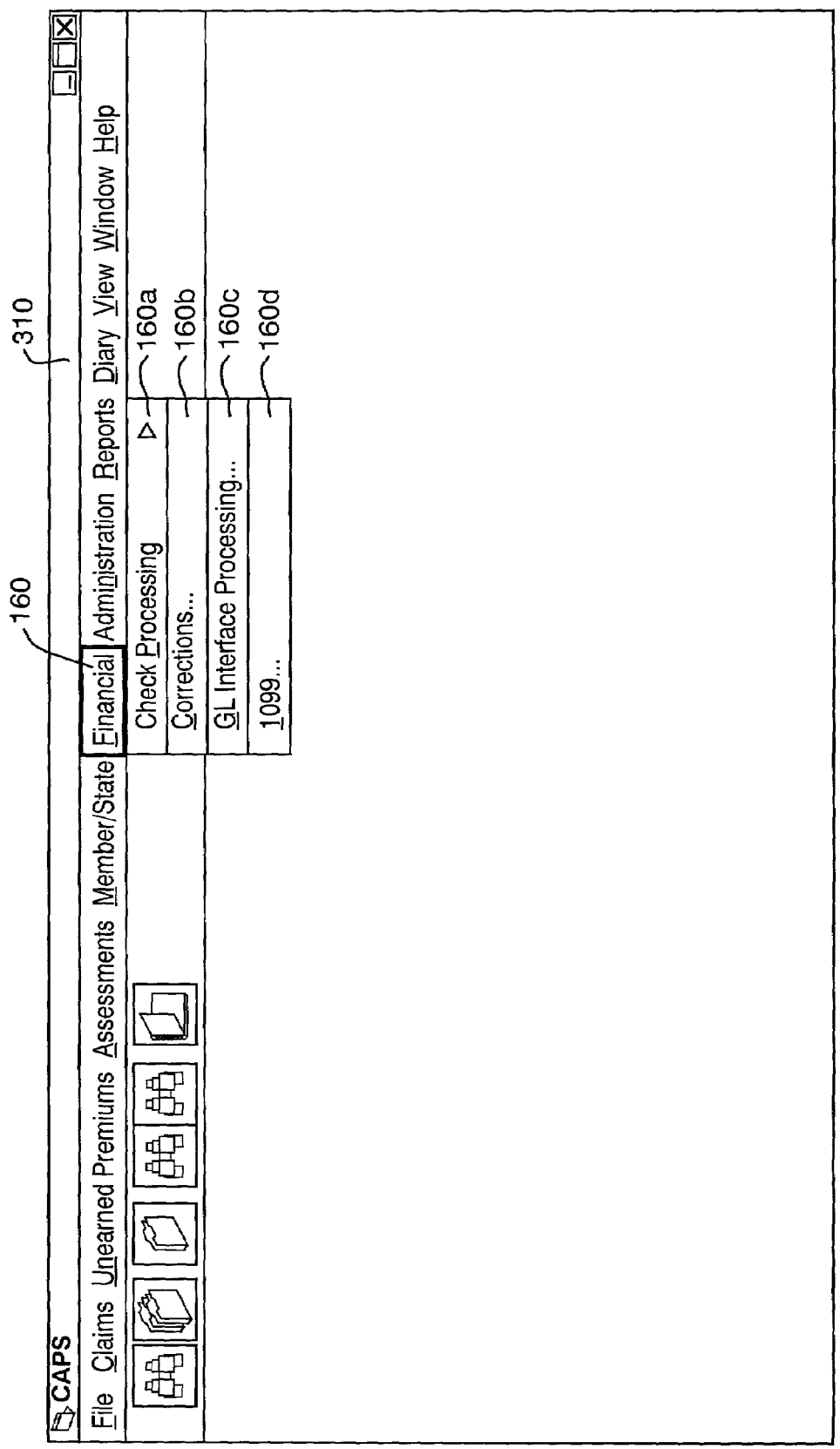
FIG. 11 is an example of an embodiment of a screen display used in connection with financial processing operations.

Referring now to FIG. 11, shown is a screen display 310 that may be used in connection with displaying menu options in accordance with processing operations for financial processing. Included in the screen display 310 is a display of the different operations that may be performed in connection with financial processing 160. The menu options 160a-160d indicate different types of financial processing operations. For example, check processing operations may be displayed by selecting option 160a which may lead to one or more subsequent menu options displayed on submenus in a more detailed hierarchy. Corrections may be made to different types of financial processing operations by selecting menu option 160B. Additionally, GL (General Ledger) interface processing as described in more detail elsewhere herein may be performed by selecting menu option 160c. Associated IRS form 1099 processing in accordance with financial information may be performed by selecting menu option 160d.

Figure 12:
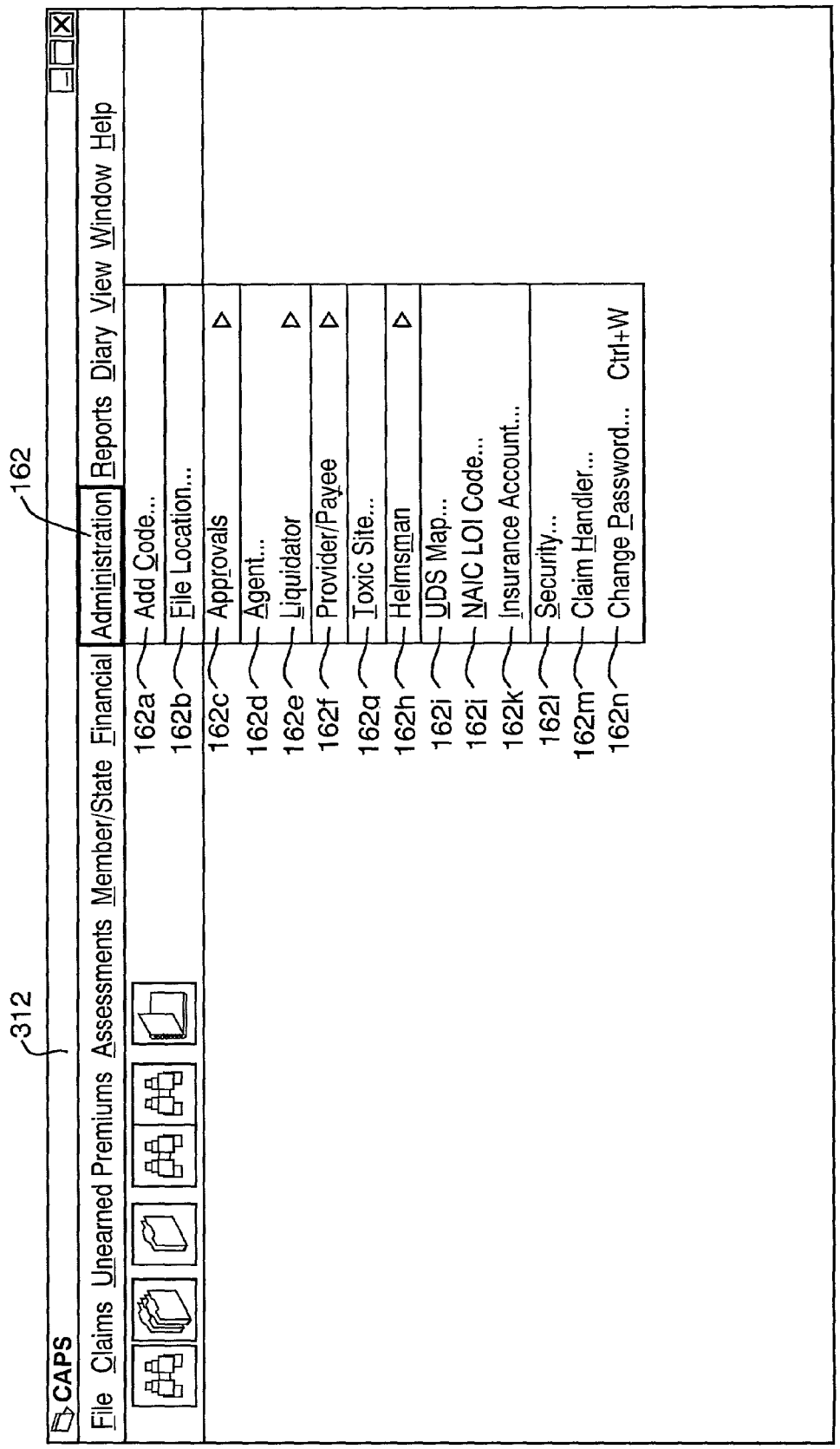
FIG. 12 is an example of an embodiment of a screen display showing menu operations used in connection with administration.

Referring now to FIG. 12, shown is an example of an embodiment of a screen display 312 that may be displayed in connection with selecting a particular administrative function to be performed. In this embodiment, different administrative tasks may be performed in connection with different functions as indicated by the variety of menu options shown here. These may vary in accordance with each particular embodiment.

Figure 15:
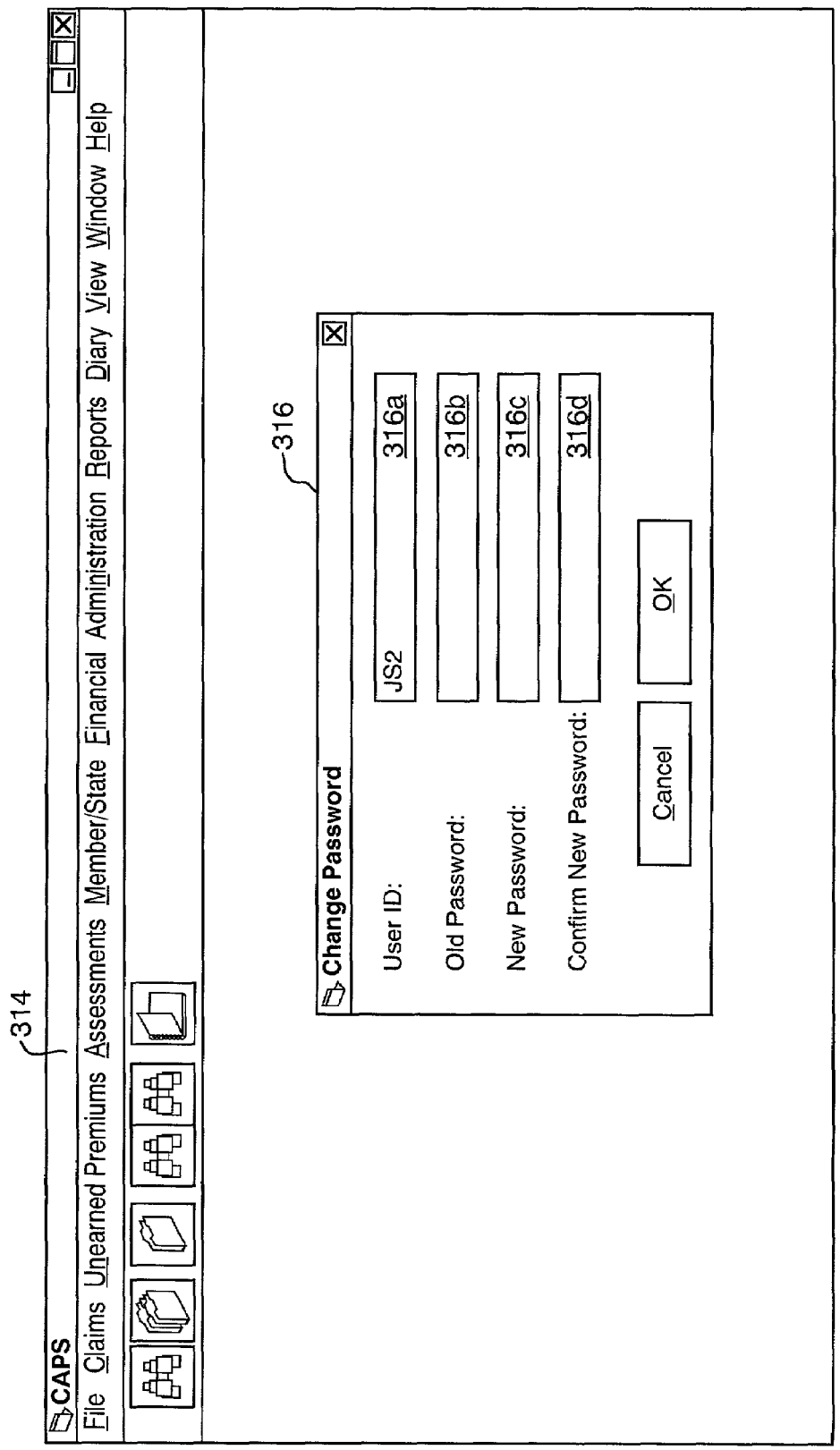
FIG. 15 is an example of an embodiment of screen display used in connection with changing a user password.

Referring now to FIG. 15, shown is a screen display 314 with a subwindow or subdisplay 316 as may be displayed in connection with selecting the change password operation 162n. The screen display 316 are those fields that may be used in connection with performing a change of a password of a particular user account. These may be performed by a user administrator or in accordance with other types of granted authority as described elsewhere herein.

Figure 13:
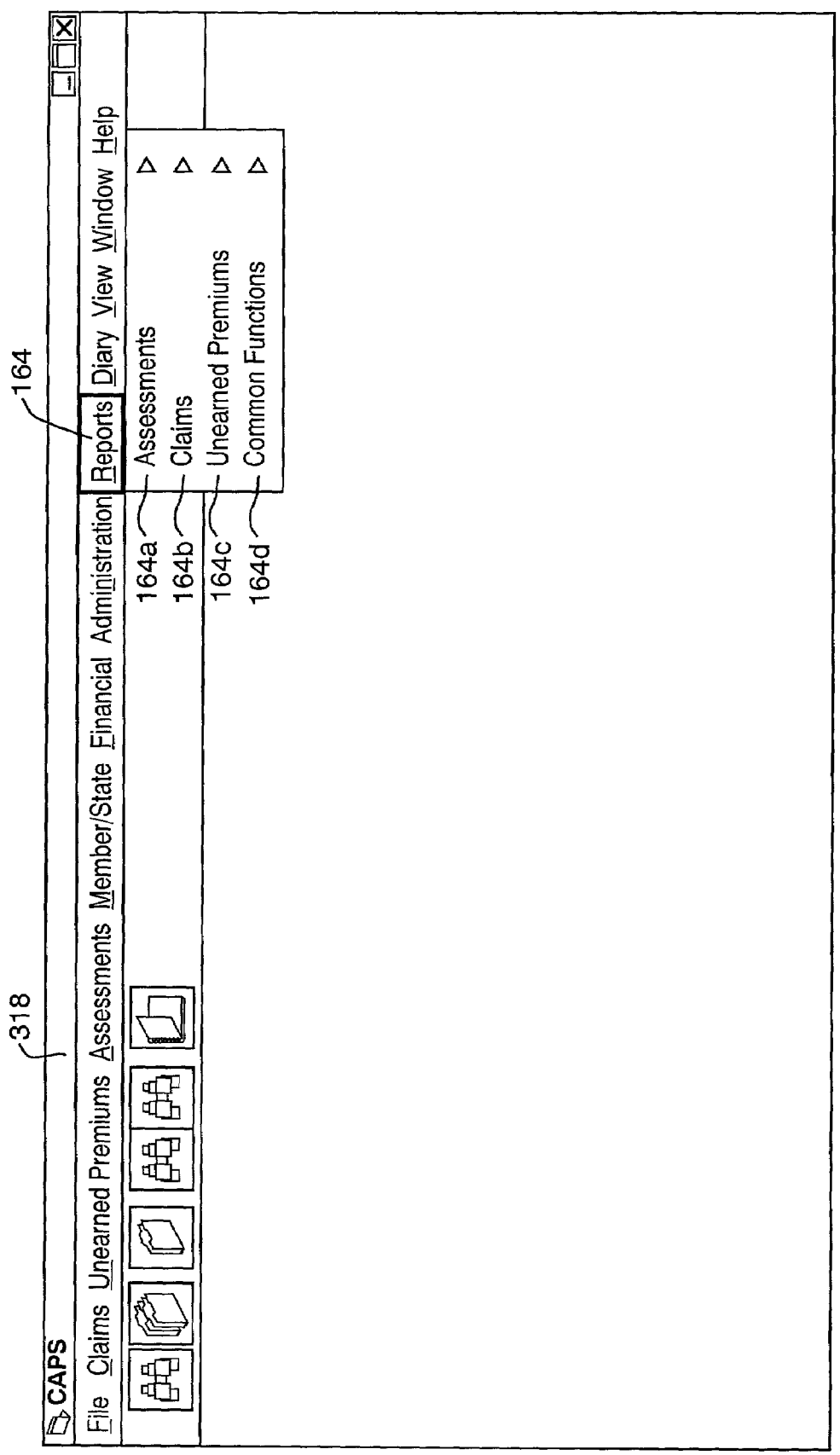
FIG. 13 is an example of an embodiment of different menu options used in connection with reporting.

Referring now to FIG. 13, shown is an example of the screen display 318 as may be used in connection with displaying different reporting operations. Shown in this example, different reports may be generated in connection with assessments with selecting option 164a, claims processing by selecting menu option 164b, unearned premium operations by selecting menu option 164c, and other functions by selecting the common functions menu option 164d.

Figure 14:
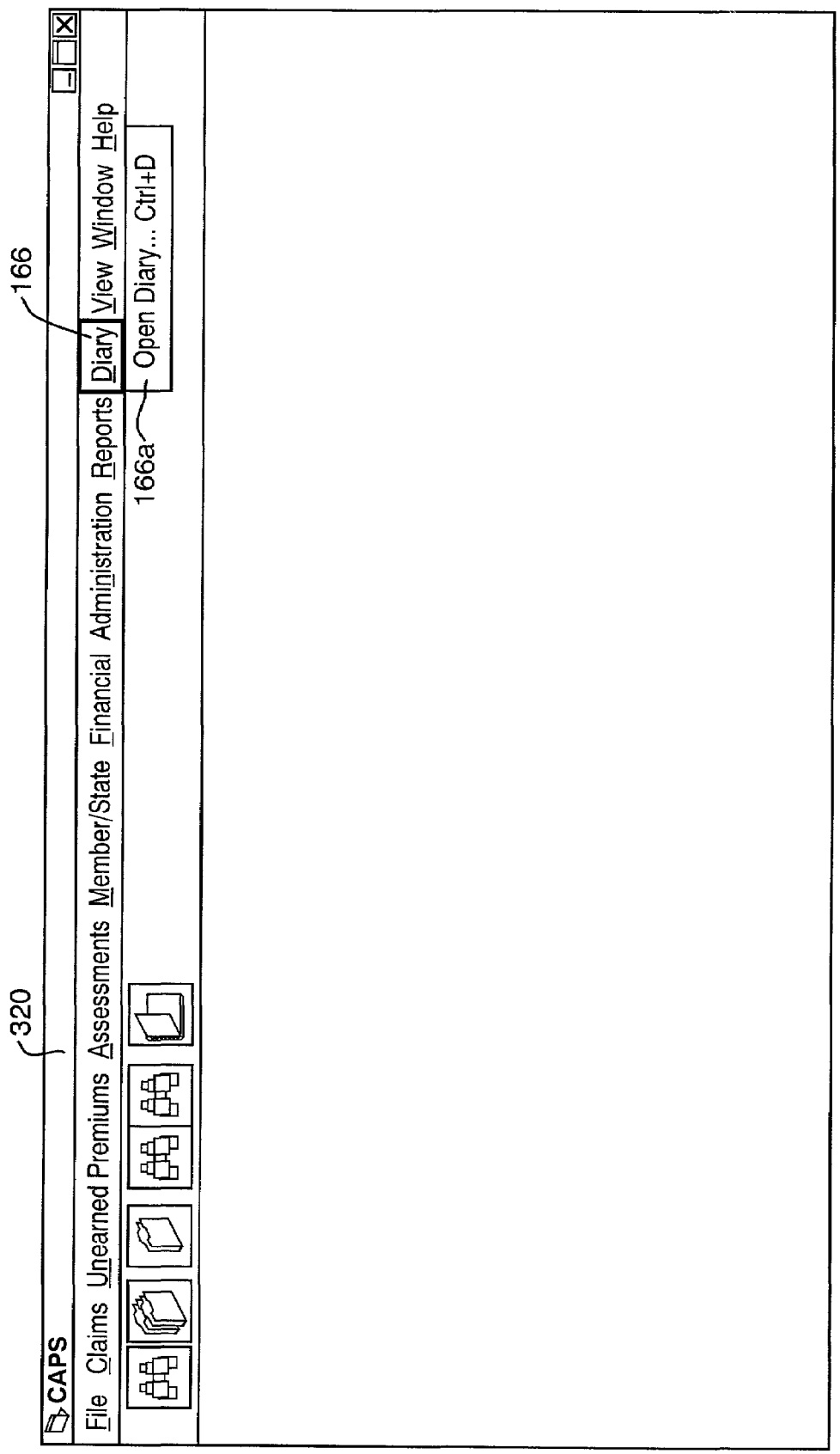
FIG. 14 is an example of an embodiment of a screen display of menu options used in connection with diary operations.

Referring now to FIG. 14, shown is a screen display 320 as may be displayed in connection with diary processing operations. In this example, the diary option 166 includes a single menu option 166a for opening a particular users diary in this example as described elsewhere herein, a user may be sent notification as to the occurrence or entry of a diary which requires his or her attention. In other words, diary entries may be created by a user and one or more other users may be alerted or notified that their attention is required with regard to reviewing or examining a particular diary entry created by another user. Subsequently, when a user logs on for a particular user ID, they may receive notification messages that one or more diary entries have been entered which require their attention or review. A user may subsequently, after logging on, access the diary entries upon which they were notified as by selecting menu option 166a. Diary entries as described elsewhere herein may be associated with one or more claims as well as an unearned premium entry. Diary entry creation may also be automated, as described also in more detail elsewhere herein.

Figure 16:
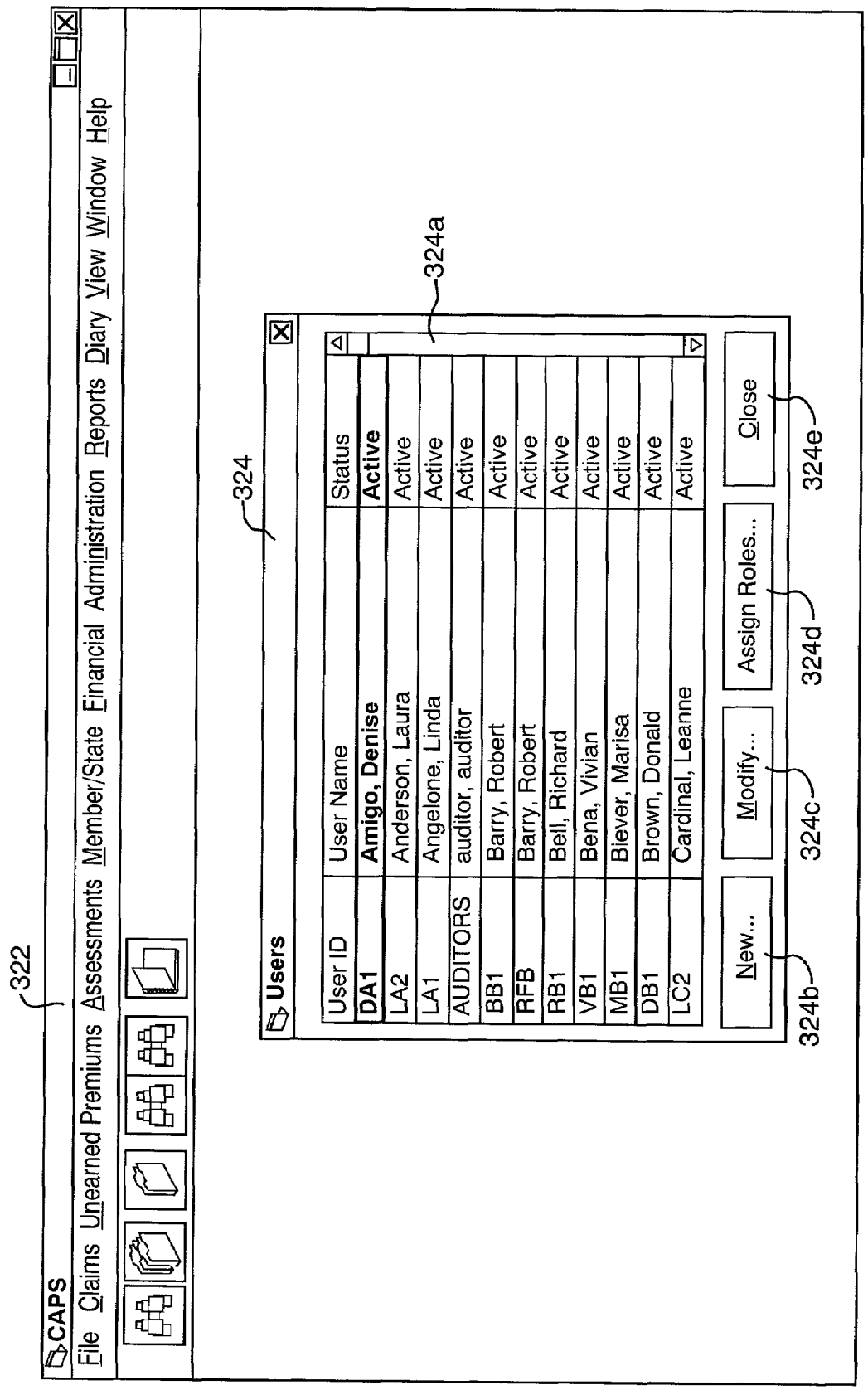
FIG. 16 is an example of an embodiment of a screen display of users of the system.

Referring now to FIG. 16, shown is a screen display 322 that includes a subwindow or a submenu screen display 324 that may be used in connection with performing administrative operations. It should be noted that the screen display 322 in one embodiment may be reached using items 16-21 administrative options described in connection with other figures herein. The subwindow display 324 includes a list of users with an ID, a name and a status corresponding to each of these users. This is displayed in Table 324a. As described elsewhere herein, different roles may be assigned or associated with a particular user ID. In other words, by assigning roles, a user is granted or restricted in terms of different operations or function data entry in the light that they may perform. What will be described is a subsequent menu display, for example, in connection with selecting the assigned role button 324d.

Figure 17:
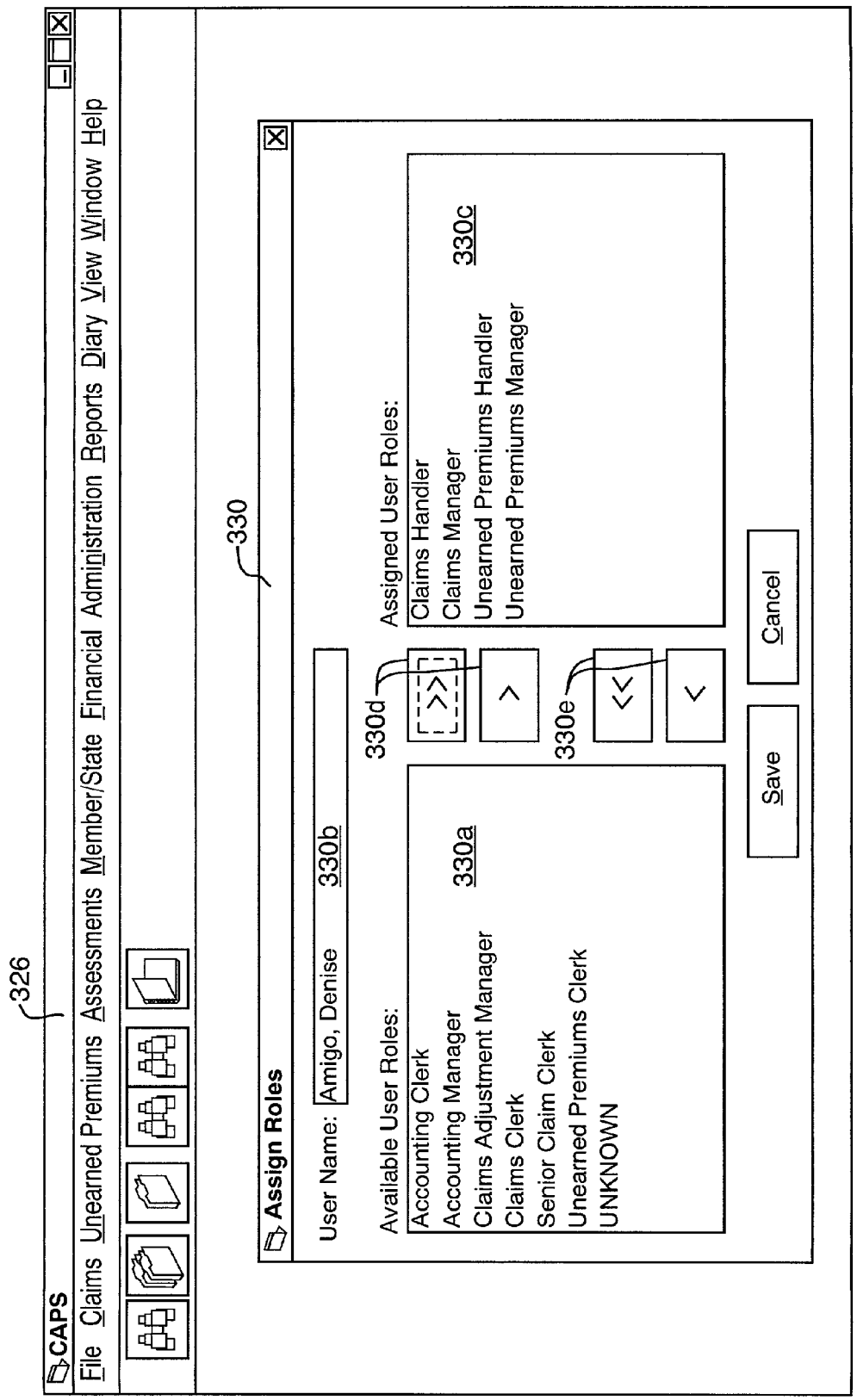
FIG. 17 is an example of an embodiment of the menu and screen displays that may be used in connection with assigning roles in accordance with users and their different tasks.

Referring now to FIG. 17, shown is a screen display 326 with a subwindow or menu 330 may be displayed upon selecting the assigned roles button 324d. The subwindow 330 provides for the display of user roles available for a particular user, for example, as displayed on the left-hand side in area 330a. The currently assigned user roles to date for the particular user name entered in field 330b are displayed in the portion 330c of the screen. Additional user roles may be assigned or deleted. For example, by selecting an available user role from the portion 330a, and selecting button 330d, an additional user role may be assigned and subsequently displayed in the window portion 330c. Similarly, a role that is currently assigned to a user and displayed in 330c may be deleted by selecting a particular user role from the screen portion 330c, subsequently selecting button 330e, causing this user role assigned to be deleted and eliminated from the screen portion 330c.

Shown in this example, different user roles that are available to the assigned or associated to a particular user ID are accounting clerk, accounting manager, claims assistant manager, claims clerk, senior claims clerk, unearned premium clerk and unknown or other types of options. Different types of responsibility and operations may be performed in accordance with different types of information or user roles selected. For example, different accounting operations may be performed with different types of account user roles. A manager of any level may perform or be allowed to perform different operations than a clerk. It should be noted that being able to perform different administrative functions such as assigning user roles, granting authority to different types of users may only be performed, for example, by a limited number of users. In one embodiment, administrative functions such as this may only be performed by system administrators or different types of managers.

Figure 18:
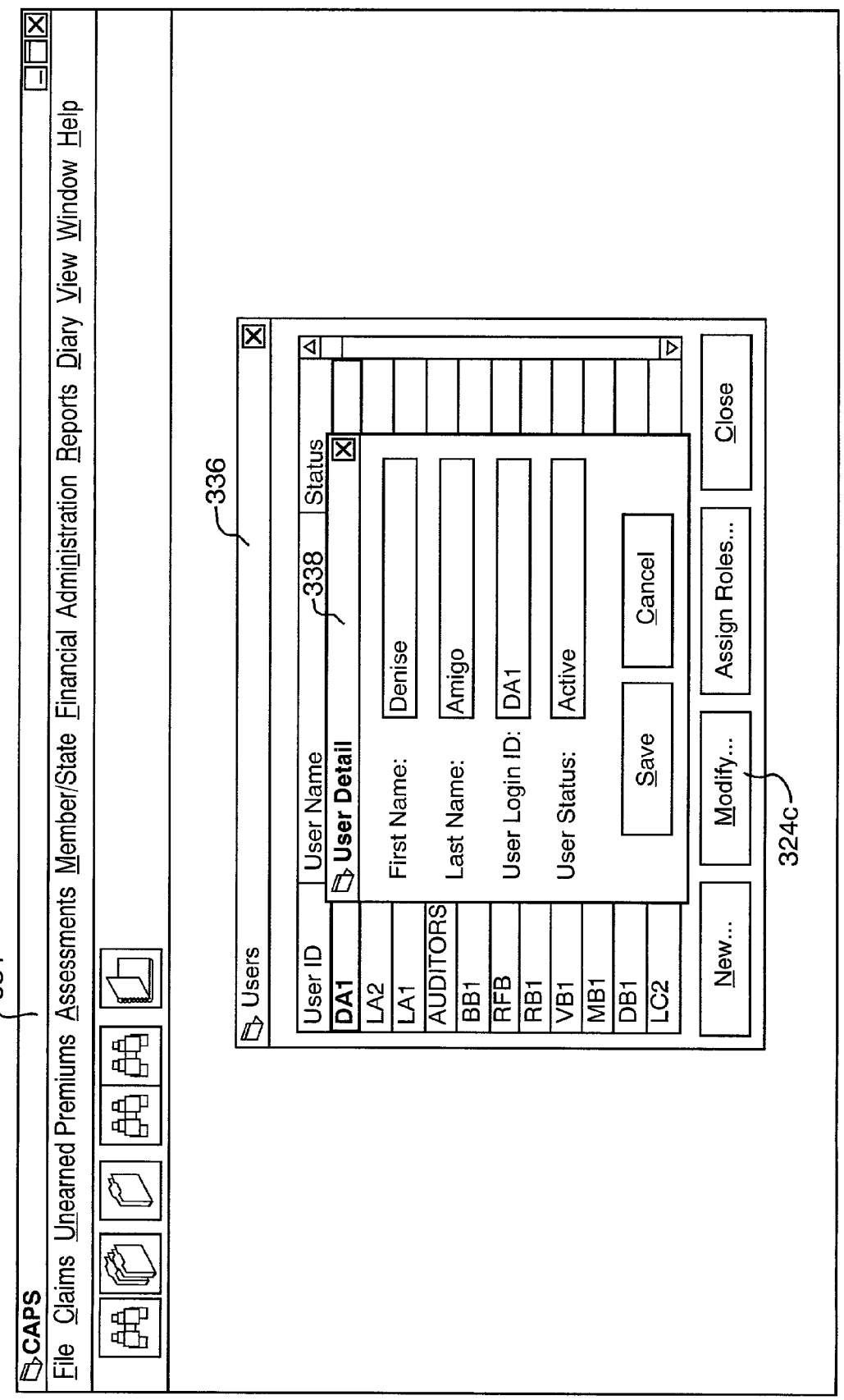
FIG. 18 is an example of an embodiment of screen displays used in connection with performing account and user information management.

Referring now to FIG. 18, shown is a screen display 334 as may be displayed in connection with performing administrative tasks in connection with different user accounts and IDs. In this example, subwindows 336 and subsequently 338 may be displayed for example by selecting the modified button 324c causing the subsequent display of window 338.

Figure 19:
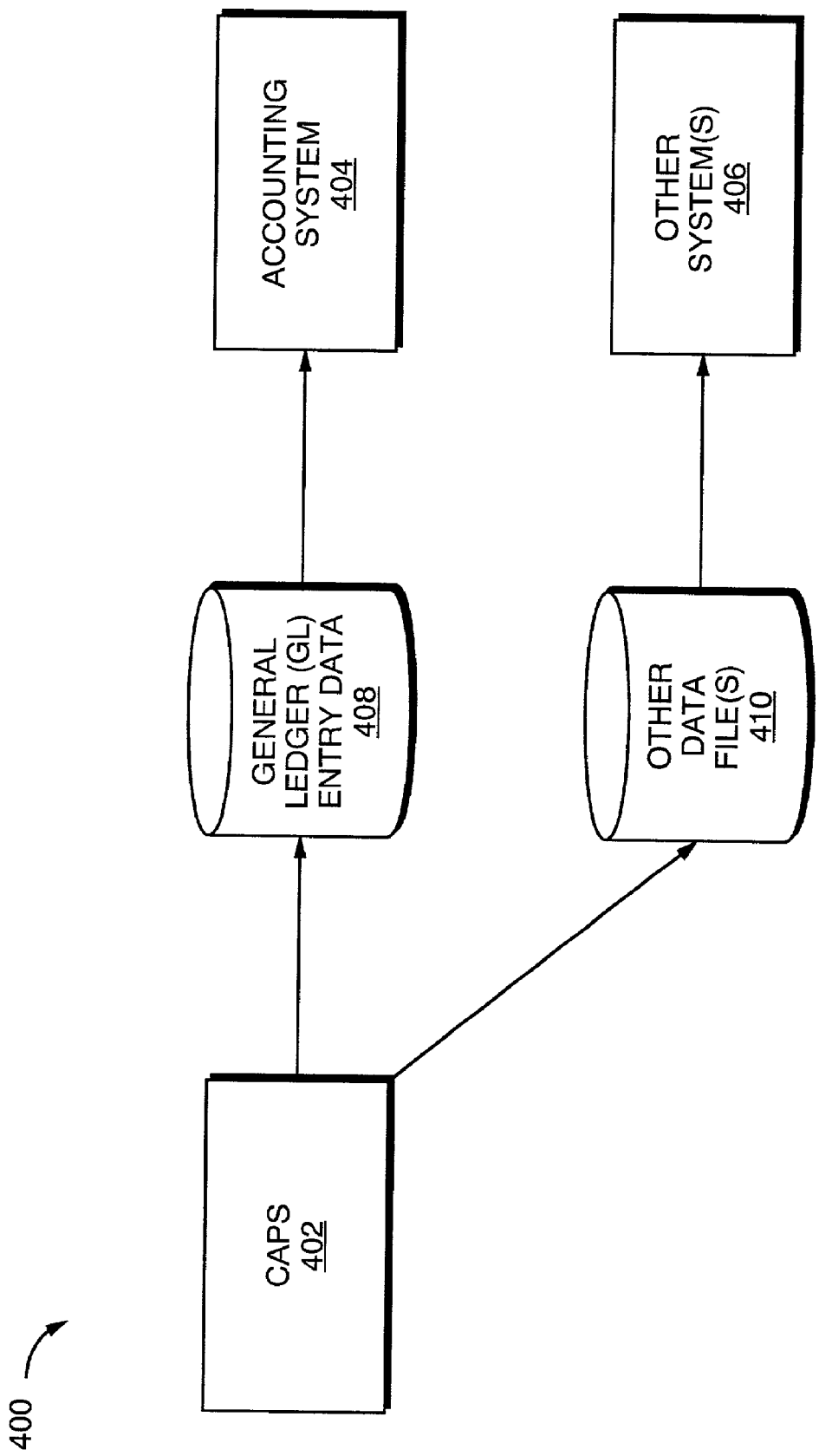
FIG. 19 is an example of an embodiment of a system used by an insolvency service provider in connection with other systems.

Referring now to FIG. 19, shown is an example of an embodiment of a representation of a system as may be used by an insolvency service provider to perform services described herein in connection with other systems. In the representation 400, the system providing insolvency services, for example, in managing property and casualty guaranty funds is described elsewhere herein, for example, in connection with the system 10 of FIG. 1. In FIG. 19, this system is referenced as CAPS (Claims, Assessments, Unearned Premium System) in element 402. As part of this system and described elsewhere herein, is an output file 408 produced by the CAPS system that includes general ledger data entries. These entries may be referred to elsewhere herein as GL entries and associated processing and menu items. In this example, the data file entries 408 may be used as input to an accounting system 404. The format of the data file 408 is in an input file format customized or used by the accounting system 404. The format(s) may vary in accordance with each embodiment and systems. The CAPS system may also produce as output other data files 410, in any one or more of a variety of formats, that may be used as input into one or more other systems 406. In other words, just as CAPS may produce an output file in a format particular for use by the accounting system 404, CAPS may also produce other output files for use as input files by other systems 406.

Figure 20:
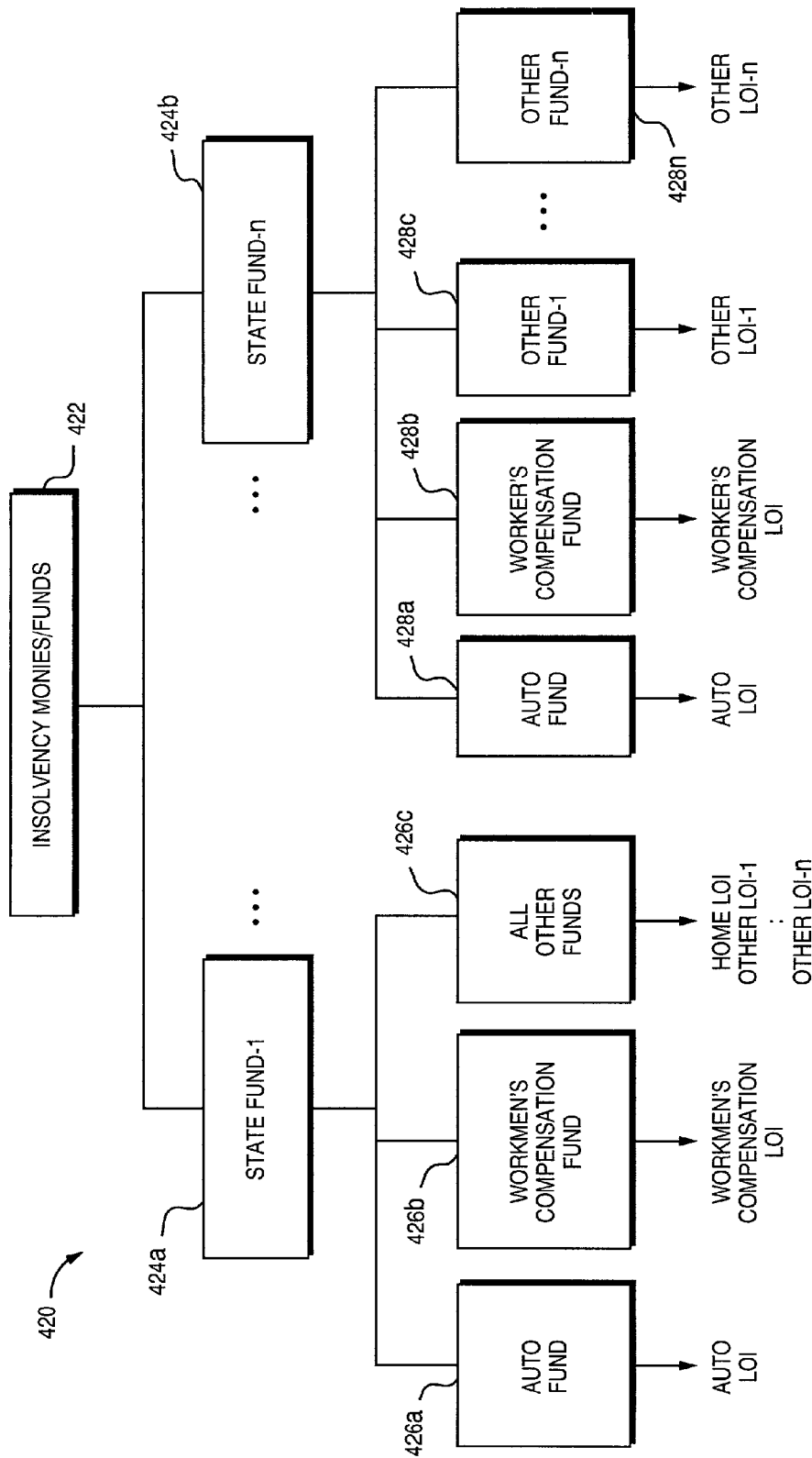
FIG. 20 is an illustration of an embodiment of the hierarchical representation of the various funds and relationships to lines of insurances (LOIs).

Referring now to FIG. 20, shown is an example of an illustration of one hierarchical organization of insolvency funds or monies. The representation 420 represents a fund structure of different accounts per state for which insolvency services may be performed. Additionally, shown is a relationship between the different LOIs and the different funds or accounts per state. In the representation 420, the element 422 represents the total of all insolvency monies or funds managed by the system 10 of FIG. 1 in connection with insolvencies. These monies 422 may correspond to, or be dividable amongst, insolvencies managed for several states. Each state may be represented by a state fund, such as one of 424a-424n. Within each state, different state accounts may exist. Funds or monies corresponding to one or more LOI may be associated with a particular account, such as one of 426a-426c. For example, Rhode Island (RI) may correspond to state fund 424a and each of the accounts 426a-426c may correspond to one or more LOIs within RI. In this example, state statute, rules, and regulations may require separate accountings and fund management for each of the auto LOI, and the Worker's Compensation LOI. However, one large "pot" or account may be managed for all other LOIs, for example, including homeowner's insurance, inland marine insurance, and the like. Other state rules, regulations, and statutes may require different organization and management of state funds. For example, another state may require an individual account for each LOI, rather than, for example, permit an "all other funds" as 426c in RI. This alternative, for example, may be illustrated by the representation of state fund 424b, and associated accounts 428a-428n.

It should be noted that one or more UDS codes may be associated with one or more LOI. UDS codes are uniform codes that may be used throughout an industry, such as an insurance industry. Similarly, one or more NAIC codes as specified by the NAIC apply to each state. NAIC codes are those specified by the NAIC in accordance with NAIC format.

In one embodiment, for example as represented in 420 of FIG. 20, the organization of funds, associated accounts, and the like may be specified in accordance with state statutes, rules and regulations. This organization may be established, for example, in connection with processing performed at step 102. As state particular information may change, such as a new statute, or an amendment to an existing statute, and the like, the organization and management of funds may change. Additionally, any changes or additional rules, and the like that may affects calculations, for example, in connection with unearned premiums, and assessments, are reflected in the system 10. In other words, the design of the system 10 provides for customization in accordance with particular rules. Additionally, it provides a flexible system for easy updating to reflect such additions and amendments. Such functionality and processing in connection with establishing and modifying information in connection with the foregoing may be performed by different processing modules as described in more detail elsewhere herein.

What will now be described are different functions as may be included in one embodiment of the system 10 of FIG. 1. Any number of these functions may be performed in connection with modules, for example, described in the client and/or server modules, respectively, 14a and 12, and functionality also described elsewhere herein in connection with menu and screen displays.

Notes processing and functionality may be performed in connection with claims and unearned premium processing. In one embodiment, a note may be created by using buttons included in an unearned premium and/or claims processing screen displays described elsewhere herein. A note is created in one embodiment using a button located at the bottom of a screen of a CBN or a claim. Notes screens allow for the creation of general notes or specific notes annotating information for a claim, or a claimant. Notes are pieces of information explaining what the claim is about, how the claims is handled, a claim's progress, and the like in a free-form.

Generally, notes processing functionality allows users to enter claim information and unearned premium information in text format within the claim file. This functionality captures a majority of the information and data with respect to a claim so that any handler may pick the claim and understand history associated therewith. Functionality associated with notes processing includes adding an unearned premium or claim note, modifying and inquiring as to the category of a claim note, duplicating a note from one claim or unearned premium to another, and generating a claim or unearned premium claim notes report. These functions may be implemented by each having a corresponding menu item with claims and/or unearned premiums and/or report generation, and the like. An embodiment may also provide for sending a note for review by one or more other users, such as managers and the like.

In connection with a claim, a note may include particular information about a claim including the date that this entry was made for this note, the claim number, the claimant number, the claimant name, the category of the type of claim such as disability, medical, etc., the reviewer ID, the user ID who entered it, and a text field for entering information about the claim. One or more notes may be displayed in a tabular or the type of arrangement and provide certain functions such as sorting in accordance with a particular column heading of information, as well as reporting claims for reporting notes associated with a particular claim. Data entry for this and other types of information may be done in a form-like window and may be displayed once entered in the form of a table. Additionally, an embodiment may include a searching or querying function performing a search of notes in accordance with particular information and criteria, for example, such as by claimant, by category, user or reviewer, as well as a particular time period, and the like.

An embodiment may include functionality in connection with making claim payments. The system 10 of FIG. 1 may request a claim payment, set up a repetitive payment, modify a claim payment request, delete a claim payment request, reverse a claim payment and generate payment reports as needed. Claim payment functionality may extend to all types of claims. Payment approval, setting reserve levels and check processing requirements may be captured in separate conceptual designs described elsewhere. Certain functions that are performed in connection with claim payments may include the ability to add a claim payment request, change or inquire as to a particular claim payment request, delete a claim payment request, add a claim payment reversal, add repetitive payment requests, change repetitive payment requests and delete repetitive payment requests.

Additionally, an embodiment may also include the option of blocking a claim from issuing a payment. In one embodiment, a claim which is currently being worked on, may be open and displayed in window. A user may access a payment list option which results in a display of all the payments associated with a particular claim, as well as other information about each of these payments. Payment window displays may include options, such as in connection with menu options and/or buttons, for creating, modifying, or inquiring about a particular payment.

In terms of a user interface, the payments associated with a particular claim may be listed in tabular form or other type of arrangement. Subsequent to selecting a particular payment from the window, certain information may be modified for a selected claim. For example, as a user interface may be displayed having different fields represented in a forms-like format with different data fields, for example, as described in connection with other data entry screen displays described elsewhere herein.

From the payments list window, as with the notes, additional functionality may be available, for example, such as sorting payments displayed by a particular field as well as performing certain actions with respect to a selected payment or payments from the list. In one embodiment, a payments list may have the following columns in a display format for each payment:

date that the payment was created, a claimant number, a payee name, a type of payment being made such as for an expense, or a loss, a code related to the type of coverage provided, a user ID as to the creator of the payment, a status with regard to the payment such as if it is pending, paid, or approved, an amount and a check number as paid out for the specific payment, as well as a date of a disability if one exists in connection with the payment.

The different options that may be performed with respect to a payment such as to view, modify, delete, reverse payment, print and the like may each correspond to a particular button displayed in accordance with the payments list window.

When selecting a payment, different types of modes may be used to access a particular payment and the fields included and associated with a particular payment. When a user selects an option, such as to view information, it may be displayed in one form as opposed to another when a user wishes to add or modify a particular payment which may display the information in a graphical user interface form like format rather than in a tabular form for example that may be displayed when its only a read operation.

The details associated with a particular payment, such as in connection with a view, modify, or add operation may differ from those items or particular fields displayed in connection with, for example, a payment list option for each particular payment made. For example, when displaying details of a payment in connection with a read or a modify operation, all fields which may be viewed or modified may be displayed accordingly. This may include those fields as previously described in connection with the payment list window as well as additional information such as taxpayer ID since as this check should be reported to the federal government.

Portions of this claims processing payment may also be integrated and connected with other modules, such as in connection with initially entering information associated with a new tax ID number for a particular taxpayer record. In other words, when a payment is first entered or subsequently modified to enter a new tax ID, there may be a check to see whether there is an existing taxpayer record corresponding to this taxpayer ID. In the event that no existing taxpayer record exists in the system, another window interface may be displayed to the user to enter additional information in connection with the tax ID which may be stored in the database.

It should be noted that an embodiment may include a sub-hierarchy or organization of information associated with a particular payment. For example, this may be displayed by a particular window with different tabs that may be activated displaying different portions of the information stored in the database for a corresponding payment. In one embodiment for example, address information may be displayed as one subset of information associated with a payment. An embodiment may also include detailed information in connection with a particular payment such as different amounts paid out. An embodiment may also include general information in connection with a payment such as status and user. This may vary in accordance with each embodiment.

Also associated with payments is a repetitive payment option which at the creation of a single record for example may result in the generation of several number of payments that may be generated automatically on a repetitive basis by the system. It should be noted that the repetitive payment option may be selected as a button from the bottom of the payments list. Functionality for reversing a payment reverses the effect of a payment and accordingly, adjusts reserves, deductibles, and other operations. Additionally, a general ledger may be updated via a direct right to the file for accounting purposes.

It should also be noted that different types of payments may only be allowed in accordance with different security options, for example, in accordance with particular users or particular authorization associated with a particular user of the system. In one embodiment, payments for claims may be made using the payment button option included in a module screen display, such as in connection with unearned premiums and claims.

An embodiment may include functionality for creating or modifying an existing taxpayer and information as well as search for the set of taxpayer records based on certain selective criteria. This functionality may be used, for example, in connection with generating state and/or federal tax records, forms, and the like, such as tax form 1099 in payment to adjusters, lawyers, and the like. It includes functionality for adding or modifying taxpayer information, searching for a particular taxpayer or taxpayers in accordance with specified criteria, as well as generating a taxpayer report.

Modification of taxpayer information and other types of functions associated with the taxpayer may be associated with different security rules such as only users from the accounting department may be authorized to modify a particular taxpayer record. This may be implemented using rules such as may be included in an SQL procedure. Information associated with a particular taxpayer may include, for example, information as name, business name, a tax ID, an active or inactive status with regard to the database, as well as tax ID search results which identifies fields to be displayed in connection with a query performed which yields this record as part of the query search results.

One of the functions included in this type of modular may be a search option, for example, which may provide the user with the window within which certain criteria may be entered manually in a form like display. The search results may be displayed as described elsewhere herein for other options in a tabular format. At the bottom of the menu or display of a graphical user interface there may be buttons for example with particular options that may be provided to a user in connection with a selected tax record for a particular tax ID.

In one example, a user may enter information such as to search for a particular business name or taxpayer person's name. Upon the selection of a search button which may cause a query to be performed on the database in accordance with the selected or entered information, one or more records may be displayed as search results at the bottom of the screen. Subsequently, the user may select a record from the table corresponding to a taxpayers recorded info nation a user may further activate one of the buttons, as selecting by clicking with the right hand mouse button on the bottom, to perform an operation, such as further viewing or modifying information or printing information associated with one or more selected records.

Different types of information may be included in connection with a particular taxpayer, such as whether a taxpayer entity is a corporation, a partnership, an individual or sole proprietorship and the like. Additional options may be associated with the taxpayer such as the particular IRS form or format and other information. Different views may as described elsewhere herein display different fields in particular formats for a particular taxpayer record. For example, where there is a read only or view mode, the information may be displayed in a tabular form or in a forms like display with certain fields grayed out indicating that these fields may not be modified. For certain operations such as modify, a different type of display may be entered as well as additional fields that may be modified. In one embodiment, the option for creation and modification of taxpayer information may be reached using item 162f of FIG. 12 as described in more detail elsewhere herein.

An embodiment may include payment approval functionality, for example, in connection with approving or rejecting issuance of a payment, and closing of, a claim or an unearned premium. The approval process provides managerial supervision for transactions over a certain amount as well as insuring accuracy of payment and reserves. Certain functions associated with this task may include closing, claim approval, approving a payment request, approving the claim status change, approving a claim or unearned premium claim payment request, approving claim closure, as well as security associated with claims, unearned premiums and the like. In other words, payments as may be associated with unearned premiums or claims may not be paid unless they are approved. Such payment status, such as approved or unapproved, may be reflected in the field on the database as may be associated with a particular claim and/or payment. Claim approval functionality may be implemented in accordance with standard audit rules involving the recordation of specific information with regard to performing certain functions. This is described elsewhere herein in more detail.

There may be particular procedures, such as one or more SQL procedures, which implement the standard audit rules that may vary or change. In this particular system, payments may require approval, for example, if over a certain dollar amount, or if being paid out to or by a particular party and the like. This may be implemented in accordance with certain security procedures. Thus, for example in one embodiment, any payments created over a particular threshold amount may appear in the approval list as pending. In terms of an implementation, a manager or other type of person with a particular ID or status may need to log onto the system, view such items such as the payments and the approval list, and accordingly either approve these items or reject these items. Approval may also be acquired in connection with claims to be closed as well as unearned premiums to be paid out.

When claims are to be closed, they may be added to an approval list displayed in a window for example and someone authorized logs on and approves the status being changed from pending to closed. If something is rejected for example there may be additional information entered as to why the closing is rejected. It should be noted that as associated with each of these functions and others described elsewhere herein, different options such as sorting and other types of user interface details that may vary in accordance with each embodiment may also be added for each type of display.

An embodiment may include auditing functionality that may involve recording of information in connection with particular transactions, operations, and the like, for example, such as in connection with approvals, modifying amounts on payments, and the like. Any changes to data could potentially affect payments the system 10 makes or has other make on its behalf. Thus it may be important to be able to trace information being added, deleted and/or modified with respect to various operations. Tracking changes allows managers to address questions about changes directed to users who make them as well as track day to day user activity. Auditing also has a psychological effect preventing users from making unauthorized changes because they know someone will be tracking and monitoring what is done. Certain functions include providing detail about each type of reserve as well as a history of payments in accordance with particular claims, unearned premiums, users, and the like. Auditing reviews or activity may occur and may be characterized into three different types: standard, historic, and detail in which information as to "who" and "when" may be recorded. The "who" may be represented as a user ID, and as security information as to "who" is logged onto the system. "When" be captured as date and time by the server rather than user or a client's computer system, such client's PC.

Different levels of auditing may be performed and set with regard to users logged on. This auditing may be specified, for example, per user, for a particular time period such as during the evening hours a higher or more detailed level of auditing may be set as well as if a particular level of authority is existed or associated with a particular user, then a higher level of auditing may be performed. A first level of auditing is called standard auditing which includes information on who created the record and when as well as who last modified a record and when. This level of auditing may exist for virtually every table stored in the database. Historic auditing may include information on who has ever modified a record and when. Tables requiring historic auditing are specified within these documents. Detailed auditing includes information on all those who have modified a record, when, the modification occurred and of data prior to a modification. In one embodiment, for example, standard auditing may be provided by default but the necessity for historic or detailed auditing may be specified in accordance with options that may vary with each particular embodiment. Auditing may occur within the security module.

Auditing may be performed in connection with an administrative task operation, such as may be available from a menu displaying different administrative operations. Approval functionality as may be used in connection with claims and unearned premiums may be permitted by role assignment or other security technique that may vary in an embodiment. Similarly, functionality for reviewing payments in connection with unearned premiums, and claims to be approved may be found in related menu operations, respectively, displayed regarding unearned premiums and claims.

Particular payments that may require approval may vary in accordance with specified criteria for each user, for example, in connection with different limits specified and associated with each user, such as reserve limits, check writing authority limit, and the like.

Functionality may be included in an embodiment for data entry and operations associated with state funds and associated hierarchy described in more detail elsewhere. For example, these operations, including initial data entry and creation of state funds, may be performed in connection with processing operations available from the Member/State option from a menu bar as described in connection with screen displays elsewhere herein. For this and other functionality included in an embodiment, the techniques used to actual invoke and perform these operations may vary in accordance with embodiment and its particular organization of operations as may be embodied in, for example, a menu hierarchy.

Operation in connection with state funds provides for capturing state fund information in order to process assessments, claims, and unearned premiums. A history of changes may be recorded with regard to a particular state fund. One embodiment provides for an associated with a particular state fund of up to seven insurance accounts as well as an assessment percent cap limit, an inactive date, and other information associated with each insurance account. Each of these insurance accounts may correspond to, for example, elements 426a-426c described in connection with state fund 1 424a of 420 of FIG. 20. Associated with each state fund, in an organization with tabs similarly described in connection with other screen displays, may be information related to general account information, assessment information, code information for the different accounts, and unearned premium information. For example, in connection with assessment information in one embodiment, one may specify varying gross assessment transaction kinds, such as, for example, regular, reversal, taking, borrowing. When entering state fund information, a choice of three law specific processes may be specified to drive adjustments to net written premium information or required reporting to members. Categories may include, for example, five-year average, certificates of contribution and state of domicile rule, and others that may vary in accordance with state statute. In other words, different menu options may exist for different methods of assessments, and the like, and a user may select one or more as may vary in accordance with state funds, and the like. There may be additional information to capture the five year average to account for run-off premium and certificates of contribution as well as the number of years for amortization.

An embodiment may also provide for certain users to perform administrative tasks in connection with maintaining a state fund, for example, viewing and maintaining lines of insurance and account designations, and the like.

Functionality may be included to add a state fund requirement, to change/inquire as to a state fund requirement, to close a state fund requirement, to add a state fund insurance account requirement as well as inquire or close a state fund insurance account requirement. For each particular state, included is the ability to maintain such as add, modify and enter initially a state fund as well as state law information, assessment, base year information, administrative assessment information, state insurance accounts as well as assessment percent cap and state lines of insurance designation. Associated with a particular state fund may be general information such as name and address. Additionally displayed may be one or more insurance accounts.

It should be noted each of the different techniques that may be used in performing an assessment for example may be implemented in rules specific to that particular technique. In one embodiment, the different rules may be included in different procedures such as those in an SQL procedure.

An embodiment may include the functionality to add new insurance accounts and modifying an existing insurance account as may be associated with a particular state fund. In one embodiment, an insurance account may correspond, for example, to each of 426a-426c in 420 of FIG. 20. The insurance accounts may be activated from the state fund window in which different insurance accounts are opened and associated with a particular state fund. Options provided may include opening and modifying information in connection with an insurance account. Information associated with an insurance account may include date information as to the activity of account.

An embodiment may include functionality to add and maintain member and insolvency information in connection with assessments, claims and unearned premium claims processing. Information for a member may include, for example, the address and other information associated with an insurance company. Members may be added, for example, to one or more state funds. Included as part of the functionality is the ability to add as well as inquire information about a particular member. Searches may be performed in connection with information about a particular member from all of the members included in a database as well as adding additional information as to members such as state information, administrative assessment information, liquidation information and other types of insolvency information. There are different levels of security and audits that may be performed in connection with members. For example, there may be an assessment, claims, and unearned premium security as well as audits performed at the different levels such as historic detail and the like. A member may be associated with a group, such as in connection with a group named field.

Different types of security may be associated with adding a member or changing information about a member such as the group. For example, only an accounting manager or clerk or other member of the accounting department may be able to perform certain types of functions such as payment of administrative fees, and other types of options including withdrawing or adding a member to a state fund as well as adding a member to a state fund's insurance account.

Different options may also be included in an embodiment with regard to different members, such as the ability to combine member information with a primary and other members under it, as well as a split member option. This is described elsewhere herein in connection with splitting of a member, or acquisition or merging of insurance members and other entities as may be described in the database of the system 10. The combined members option may enable the user to reflect merging in acquiring activities that may exist for more than one insurance company allowing the insolvency insurance provider to send one assessment statement for two or more members.

Associated with each insolvent member is information that may vary in accordance with each member such as the reporting frequency, as well as status information and additional information as to liquidator. In accordance with an associated insolvency mode for each member of a state fund may be a trigger date used for all claims in which the trigger date is always greater than or later in time than the insolvency date. Different status may be associated with a member, for example, indicating whether a member is solvent or insolvent.

Functionality may be included in an embodiment to add and modify liquidator information. In one embodiment, this functionality is associated with item 162e described in connection with other figures elsewhere herein. Information may be maintained on two different types of liquidators, operational and statutory. A statutory liquidator is one that is appointed by a court to handle the liquidation of an insolvency who is normally the commissioner of insurance for the state in which insolvency has occurred. The operational liquidator may be assigned by the statutory liquidator to handle the day-to-day liquidation questions and issues that, for example, operators and managers of this system described herein as provider of the insolvency services may have. In other words, the operational liquidator may serve as an interface or source of information for a provider of services in connection with the insolvency.

An embodiment may include function for entering and maintaining operational and statutory liquidator information once a member has been declared insolvent. Various operations may be provided with respect to a liquidator such as adding a new liquidator and information associated therewith as well as modifying information associated with a particular liquidator and searching or clearing the database with regard to certain information that may be included in a liquidator record.

An embodiment may include functionality for adding lines of insurance (LOIs) and performing additional tasks in connection with existing lines of insurance, such as, for example, modifying an deleting one of more LOI. As described elsewhere herein, an LOI or line of insurance, for example, may be worker's compensation, commercial auto, fire, homeowners and the like in which each of the foregoing correspond to a different line or a different type of insurance business. In this particular example, a line of insurance is one of the different types of insurance that may be associated with a claim as well as other aspects of the foregoing.

One embodiment may include a standard type of error handling providing for a standard "look and feel" for errors that may be generated in the system 10 of FIG. 1. The system 10 of FIG. 1 may generate different types of errors in accordance with different types of processing operations. For example, front end errors in this example may be associated with the GUI application, such as the client software that may include menu display operations. Back end processing errors may be associated with database access types of errors, such as may be issued by the particular database package. Other embodiments may include different types and categories of errors and display different message formats accordingly.

A global error handling facility, as may be included in the data storage system 12, may receive all errors occurring within the system 10 for all operations performed, including front end, back end and other errors.

The error handler portion of this may display an error message to the user and/or generate an error log file at the host site. Additionally, an embodiment may also send information to the server portion of the application. It should be noted that as an administrative function, for example, there may be provided the capability for different types of users to be able to examine different types of entries made in a log file for example on a client's working or host system from the server such as in administrating the system. The occurrence of certain errors, such as internal errors, for example, in connection with performing a database operation, may be made to the database administrator.

An embodiment may use any one or more of a variety of techniques in connection with storing and organizing data in the system 10 of FIG. 1. In one embodiment, a relational database organization may be used. As known to those skilled in the art, any one or more of a variety of commercially available database packages may be used in connection with creating, maintaining, and performing database operations.

Different methods may be used in accessing a relational database including data access objects, remote data objects, Active-X data objects each having methods for accessing a database in accordance with each of the different types of objects. Each of these three different methods may be used in accordance with the different types of system details.

One embodiment uses Active-X data objects, for example, as may be included and used in Microsoft operating system and software. Stored procedures or direct SQL operations may be used in performing data retrieval using any of the foregoing database connectivity methods. One embodiment uses stored procedures rather than direct SQL statement execution to reduce runtime processing. As known to one of ordinary skill in the art, when direct SQL statements are executed, they may be interpreted by an SQL server and executed. The SQL engine may also process a stored procedure from SQL which is converted into a "compiled" form eliminating the translation step when the procedure is run. In other words, running direct SQL statements requires the combination of traditionally performing a complete translation and execution of the procedures. Alternatively, creating a stored procedure in SQL provides for a translation into an intermediate form which may subsequently be executed more than once. The execution of a stored procedure in cache or in a memory type of storage for compiled SQL code may improve system performance.

Functionality may be included in an embodiment providing for security, such as the security module 34*a*. In one embodiment, a security module contains the functionality for adding a user, modifying characteristics or other information stored about a user, and assigning security roles associated with a particular user. The accounting manager, claims manager, and unearned premiums manager are different types of roles which have the ability to assign user access to the system.

In one embodiment, different types of account creation may be permitted by other users. For example, a user I.D. associated with a certain level of security or permissions associated with an accounting manager or claims manager may be allowed to create a user with other certain capabilities. In another embodiment, only one person the database administrator is allowed to create a user I.D. in the system. In other words, rather than associate the capability of creating a new user with particular capabilities and associating this type of permission with an I.D. or level of security, only the database administrator or administrators are allowed to create a user I.D. in the system. Thus, an accounting manager, claims manager and the like may notify the database administrator that a user account needs to be created.

The number of layers or tiers in each security hierarchy as well as the associated permissions and securities associated with a particular I.D. that may be created may vary in accordance with each embodiment. For example, in one implementation, there may be a two tier type of user in which there is an administrator and all others. However, associated with all others may be different types of accesses or permissions that are allowed. Similarly, different types of user I.D.s or associated securities associated with a particular I.D. may have the ability to perform certain functions in addition to creating a new user, such as modifying a user and assigning particular roles to a user.

In connection with creating a new user account, user I.D. information may be entered through a graphical user interface and accordingly, a user I.D. record may be included and stored in the database as part of an accounting procedures allowing certain users with a user I.D. that may be entered to allow access initially to any information stored in the database. This is generally known in the art and is similar to other types of password mechanisms. In one embodiment, information that may be recorded for a particular user includes first and last name, user I.D. and user status which may be set to active or inactive as an account may be enabled or disabled.

In connection with the option of modifying a user and functions associated therewith, different information associated with a user may be entered in accordance with a particular user I.D. and stored in the database.

As described elsewhere herein in connection with screen displays, different roles may be assigned to users. In one embodiment, the available user roles may include an accounting manager, an accounting clerk, a claims manager, a claims assistant manager, a claims handler, a claims handler assistant, a senior claims clerk, a claims clerk, an unearned premiums manager, an unearned premiums claims handler, and an unearned premiums clerk. Each of these roles accordingly allows and provides a user with particular types of access and options. In other words, if a role is related to unearned premiums such as an unearned premiums clerk, such a person with solely the unearned premiums clerk assigned role may be unable to access information stored in the claims or accounting modules in performing the job function. It should be noted that an embodiment may allow the selection of one or more assigned user roles from the list.

Functionality may be included in an embodiment for mapping Uniform Data Standard (UDS) code to NAIC line of insurances as well as provide various administrative operations in connection with codes such as removing, modifying and deleting a coverage. Generally, software within this module provides the ability to use UDS coverages and codes within their own database in order to utilize industry standards. In other words, UDS codes are those standard codes used in the insurance industry. These may be mapped to the NAIC/LOI codes. The UDS mapping conceptual design has security and audit rules. In one embodiment, this functionality may be available in connection with item 162I described elsewhere herein.

In order to map a NAIC line of insurance to uniform data standard coverages, as well as other operations in connection with UDS coverage codes, in one embodiment, a user may access the UDS mapping window and identify accordingly as needed particularly UDS coverages and NAIC LOI codes to be mapped.

For example, in one embodiment, a particular UDS coverage code may be mapped to a selected single NAIC LOI code. Once a UDS coverage is mapped to a particular NAIC LOI, it cannot be mapped to another NAIC LOI. In one embodiment, claims managers may be allowed to perform this functionality in accordance with security requirements. Similarly, different types of roles may be required to be associated with a particular user I.D. in accordance with security requirements to perform other operations such as remove UDS coverage, add or modify or delete UDS coverage.

An embodiment may include functionality to add an agent to an insolvency, modify any agent, view an agent and delete an agent. One or more agents may be associated with a particular insurance company that is an insolvent member.

For example, an insolvent insurance company called ACME Insurance Company may have John Smith Insurance Agency as well as the Joyce Brown Agency. Included in the agent list may be an entry for each of them associated with the particular insurance company. Each of the different agents or group of agents may be associated with a particular insolvency selected. As with other functions described herein, different types of user roles or accesses may be required to perform particular operations in connection with an agent. For example, claims managers and/or types of managers may be the only ones authorized as well as senior clerks to modify or add an agent. There may be no security restrictions on viewing agent information. Other conditions may exist in order for an operation such as deleting an agent and information to be performed. For example, an agent may not be deleted if the agent is attached to a claim or a policy. In other words, there may be dependencies in addition to user roles which restrict the type of functions and when they may be performed.

An embodiment may include functionality for tracking file location of each claim file. This relates to recording the physical location of a file, such as building, city, state, floor, shelf, and the like. An embodiment may include functionality, for example, in connection with entering claim information, related to file location information. An embodiment may include the ability to add a new file location as well as view an existing file location modify and delete a file location.

This file location function may be used in connection with efficiently tracking paper claim files. In the process of insolvency of an insurance company, the system keeps a record of the location of the actual paper files that may be received from a liquidator in connection with an insolvency. The actual location of this paper file is indicated by the file location as to where the paper copy of the claim resides that has been received. It should be noted that as the number of file locations increases, this may impact the speed at which a file location window opens since it holds all of those files for example in the display. This module includes techniques providing access to the file location window that is automatically populated from the database with a list of all of the file locations of all existing claims within the system. Additionally, file location information and associated processing may allow a user to create, modify, delete, view, print, and the like with regard to file location information.

In one embodiment, each file location in this embodiment has a file location code, and accompanying description name and address allowing the system to track the physical location of each claim file. Adding a new file location is functionality that may be performed only by a claims manager, a claims assistant manager and unearned premiums manager. In connecting with viewing an existing file location, this operation may be performed by all users since it is for example read only. Similar access and user role security information may be required to modify an existing file location. To delete an existing file location, only the claims and unearned premiums manager may be allowed to perform these operations in one embodiment. Read only operations that may be additionally included such as printing file location master lists may be provided for use by all users.

In one embodiment, attributes in connection with file location detailed information includes a physical address of where the file may be stored including the name, street address, city, state and the like as well as a physical location description textually describing where the file may be stored.

Functionality for file location may be accessed and used in connection with claims processing as well as unearned premiums.

An embodiment may include functionality allowing a user to add a new claim handler and modify a claim handler limit. Generally, a user may be assigned a role as a claim handler or unearned premium handler. In other words, to become a claim handler or unearned premium handler, a user I.D. may first be created and entered with the appropriate security role defined for example as a claim handler or an unearned premium handler. A list of claim handlers may be displayed for example by selecting an option from a claim handler window. This may display the list of all those claim handlers such as those assigned with a particular security role of claim handler or unearned premium handler in the window. Information that may be displayed for example includes the handlers user I.D., name, as well as associated information for the particular claim handler or unearned premium handler. For example, in connection with a claim handler, information that may also be displayed and of importance is the claim loss limit per check, the claim loss limit per claimant, the claim expense limit per check, the claim expense limit per claimant, the reserve loss increment limit, the reserve expense increment limit, the reserve loss aggregate limit per claimant, and the reserve expense aggregate limit per claimant.

In connection with an unearned premium claim handler additionally, if this claim handler may handle unearned premiums, they may each include additional information and limits such as the unearned premium limit per check and the unearned premium limit per claim. Each of the foregoing limits for example may be associated with different types of transactions that a claim handler or unearned premium handler may encounter in their assignments. The functionality of adding a new claim handler associated limit information may be performed for example for security reasons only by claims managers and unearned premium managers. Similarly, information associated with claim handler information may only be performed by the claims manager and unearned premium manager. In this instance due to the confidentiality as to the limits associated with each claim handler and unearned premium handler, the functionality or viewing or printing information may not be accessible by all users. For example in one embodiment, the functionality for printing a claim handler master listing report may only be performed by a claims manager, a claims assistant manager, a claims handler, a claims clerk, and an unearned premium manager, unearned premium handler or unearned premium clerk.

Functionality may be included in an embodiment for adding and maintaining database information in connection with the different types of codes that may be included in an embodiment. Additionally, an embodiment may include the ability to map or associate different types of codes with other codes, for example, such UDS codes and NAIC/LOI codes. Generally, an embodiment may include functionality for adding new codes and descriptions for assessments, claims, and unearned premium processing. In one embodiment, addition and maintenance operations, for example, as may be performed in connection with code information may be performed only by claim managers, claim assistant managers, unearned premium managers and accounting managers.

Code lists in this example may be used in connection with the status of different types of items. For example, the category of codes that may be displayed in connection with a claim status would list all of the code possibilities that are valid for the claim status field in connection with other records described herein. If a different category of code is selected, a different set of corresponding codes may be displayed. The exact code list categories as well as the codes within a particular category may vary with each particular embodiment.

An embodiment may include functionality to enable recovery of either an unearned premium or a claim. This module may provide for entry and recordation of claim recovery information to insure accurate, up-to-date recoveries of claims in the general ledger as may be used in connection with the accounting system. In one embodiment, the claim recovery process and information window may only be accessible by users with security or roles in accordance with a claims manager, a claims assistant manager, and a claims clerk. Similarly, for unearned premium recovery information, this may only be accessible in one embodiment by an unearned premium manager. Information as may be related to recovery, for example, in connection with a claim, may include monies obtained from a legal judgment, salvage, and the like.

As for other types of functionality described herein, the security and associated roles required to perform operations such as this may vary in accordance with each particular embodiment.

In connection with one embodiment, information in a recovery window may be pre-filled with default information, for example, in connection with a claim such as the state fund, insolvency, policy number, claim number, date of loss, insured, and the like. Similarly, default or pre-filled information may be displayed in connection with unearned premiums with an unearned premium recovery being entered such as state fund, insolvency, policy number, who the insured is and the like. The different types of recovery that may be included in an embodiment may include, for example, salvage, net worth, COLA, second injury fund, subrogation, and the like.

In this embodiment, a warning may be given if the net amount exceeds an amount of payment for this claim. This may be expressed, for example, as the total amount of payments minus the total amount of reversals, minus the total amount of recoveries. If this amount is greater than or equal to the recovery amount, a warning may be issued to a user. A similar warning may be issued for an unearned premium recovery amount where the recovery of a given claim in which the net amount exceeds the amount of payment for this unearned premium. In one embodiment, this functionality may be reached from item 262b of a screen display such as described in connection with FIG. 7B elsewhere herein.

Functionality may be included in an embodiment in connection with unearned premium data entry and operations. In one embodiment, the unearned premium module may allow the user to enter an unearned premium policy, search for a particular policy as well as modify, delete, pay, reverse, and close an unearned premium policy. Functionality associated with an unearned premium processing may include entering policy information, issuing payments, generating reports and the like.

In one embodiment, the unearned premium module data entry functionality may be performed by unearned premium clerks, unearned premium handlers, and unearned premium managers. Information in accordance with an unearned premium policy may include, for example, the associated state fund, the particular insolvency, who the insured(s) are as well as certain policy information. On entering an unearned premium policy, certain steps may be performed in one embodiment. First, the user enters the policy information, such as insured information, premium information, and saves the information causing the general ledger to be updated with the reserve amount.

In connection with an unearned premium policy, an embodiment may include functionality for performing different types of queries or searches performed in accordance with different types of search criteria, such as, for example, in accordance with state fund information and insolvency code as well as insured name and policy number.

Unearned premium policy information may also be modified. However, this functionality may be restricted to be performed by role or security access associated with unearned premium clerks, unearned premium handlers and unearned premium managers. The function of the entering unearned premium policy information in this embodiment may be performed only by unearned premium roles.

The function of paying an unearned premium policy may be performed by unearned premium handlers and unearned premium managers. In one embodiment, the user may select the unearned premium calculation display and activate a pay button that generates a payment and check for the unearned premium amount of the current policy. Accordingly, status and other information may be updated in the database and as displayed in the various windows and screen displays.

The function of reversing an unearned premium payment may be performed only by unearned premium managers in one embodiment. Reversing a selected check, for example, may be performed by selecting a function such as from a pull down menu or button from a graphical user interface display. This may vary in accordance with each particular embodiment, operations such as reversing a payment may affect other things such as the general ledger. In connection with an unearned premium policy may be the function associated with premium calculation tab. It should be noted that the amount of an unearned premium may be calculated in connection with the amounts paid to date as well as pro-rating a premium in accordance with the number of days a policy is in force on a daily rate. Different rules may also be applied in connection with deductible amounts that may vary with state. For example, for states such as Virginia, an amount of a state deductible may be a flat rate such as $50.00 or as in contrast other states such as Connecticut may have a deductible based on the percentage of the unearned premium to be paid.

What will now be described is additional functionality that may be include in an embodiment in the claims processing module. It should be noted that other embodiments may vary in accordance to what functionality may be included in connection with claims processing functionality. The precise functionality included in each embodiment may vary in accordance with different requirements of a particular implementation.

One embodiment of the claims processing module includes functionality to map and unmap a code coverage to an insolvency. Mapped code coverages may be assigned to a claim. An example is described in more detail in connection with FIG. 21.

One embodiment of a claims processing module may also include functionality for managing a claim as well as initially creating a claim. Functionality that may be available for managing a claim may include, for example, amending or modifying fields of a claim, deleting a claim, adding a partial record which will become a claim at some later point in connection with additional information as obtained, adding a claimant, modifying a claimant, searching for a claimant in accordance with user entered criteria, and printing a claim report and closing a claim.

Functionality may also be included in an embodiment in connection with claim coverage information. This may include adding a new claimant, modifying an existing claimant, adding new coverage information as well as amending or modifying coverage information, entering an initial reserve amount, and modifying an existing reserve. Generally, as described elsewhere herein an initial reserve as well as an existing reserve refers to an amount that may be associated with a claim in connection with amounts to be paid with respect to a claim. As an analogy, this is an estimate as to the amount of monies to be paid out from the funds described elsewhere herein.

An embodiment of the claims processing module may include functionality for viewing claim totals in accordance with coverage and/or claimant information. An example as may be included in one embodiment is described in more detail in connection with FIGS. 22-23. Different types of claims may also be included in the claims processing module including those associated with toxic waste claims, for example, as may be involved in the clean-up effort. Functionality may be included in an embodiment of the claims processing module to perform different administrative functions in connection with toxic site claims including adding, modifying and deleting information in accordance with a toxic site. An embodiment of the claims processing module may include functionality for diary entries but these are described elsewhere in more detail herein. Generally, the diary management includes functionality such as viewing a list of diary entries, searching for a diary entry, creating a new diary entry, modifying or amending an existing diary entry as well as deleting a diary entry. Additionally, as described in more detail also herein, the diary function may also include an alert or notification process by which one or more different users may be notified by another user as to the existence of a particular diary entry for them to review or examine. Diary entries may be associated with claims as in this example. As also described herein, an embodiment may include the diary function integrated into the unearned premium module as well as other types of modules included in the system.

Also included in the claims processing module is service provider and pay functionality allowing the system to handle contacts and taxpayers. It may include functionality to perform administrative functions in connection with this option such as adding, modifying, and searching for a payee or a particular provider by type as well as report generation.

In connection with handling insolvency coverage mapping, functionality may be included in an embodiment of the claims processing module providing form mapping and unmapping a code coverage to and from a particular insolvency. Functionality included in this module may provide for adding as well as modifying, deleting information associated with an insolvency line and coverage information. In one embodiment, this type of functionality provided in connection with specifying UDS coverage codes. An example of a screen display as may be included in one embodiment is described in more detail in connection with FIG. 21.

Referring back to FIG. 20, associating one or more UDS code coverages with a particular insurance account assigns one or more UDS coverages and associates them with a particular account such as 426a or 426b in the like in the representation 420 of FIG. 20.

Functionality may also be included in the embodiment to enter, modify, or delete a claim. Additionally, partial claim information may be entered in connection with what has been termed a CBN as described elsewhere herein. The CBN functionality may have multiple uses. An example may be when only partial information is available for a claim being created, a partial claim as a CBN record may be created and when all of the information has been obtained, they have a corresponding status changed from "CBN" to "claim".

Functionality for adding a claim may be restricted to different types of roles such as i a claim clerk, senior claim clerk, claim handler assistant, claim handlers, and claim assistant managers as well as claim managers. Other embodiments may restrict access or certain functions as described herein to different types of roles in accordance to this embodiment. It should also be noted that other associated functionalities such as in connection with modifying or amending claim information may be similarly restricted to the same personnel. As described elsewhere herein also in connection with modifying the claim information, detailed audit may be enabled in an embodiment such as to track what fields are modified and their before and after values as well as who is the user that is modifying the different fields.

Deleting claims entered in error may be restricted in one embodiment to claim managers only. As described elsewhere herein, an embodiment may also include an option for entering partial claim information. In one embodiment, this is indicated in the status field of a claim. Functionality for adding partial claim information may be performed by all types of users in this system. This partial information status is indicated as a CBN as distinguished from a claim status which has a number of different specified and required fields. For example, with a CBN, only information about the insurers last name and claimants name and policy number may be entered. Other embodiments may also vary the minimum information required for entering a partial claim or CBN as well as with entering information for a full-fledged claim.

In one embodiment, a partial claim or CBN may be converted to a full claim when all of the necessary and required information has been obtained, for example. The functionality of converting the CBN status may be performed by claim handling personnel, for example, as previously described in connection with functionality for adding and modifying claims.

Functionality may also be included in an embodiment for adding one or more claimants as well as modifying information associated with a claimant. An example of a claimant is someone making a claim with respect to an insurance policy. An embodiment may also include the capability or functionality for searching for a claim in accordance with desired search criteria may include, for example, a claim number or partial claim number, claimant information such as claimant name or company, insured information, different types of code coverages, date of loss, state fund association, insolvency number, related claim and partial information thereof as well as policy number or partial information thereof. In other words, where ever partial information has been indicated rather than be required to enter a full numerical or alpha numerical field of information, a wild card or other type of information may be entered in accordance with entering part of the actual field value. In performing a search, certain required information may be needed to perform a search, such as one of the following: claim number, claimant name, insured name, date of loss, policy number, and the like. In other words, although a user may search in accordance with a variety of different fields and partial values thereof a minimal amount of information may be required to perform an inquiry or search of the database. This may vary in accordance with particular information stored in the database as well as the implementation details.

Additional functionality may be associated with a claim such as printing a claim report. The functionality of closing a claim may be restricted to different types of claim personnel. In one embodiment, the issues or roles may correspond to those such as managers or senior claims clerks or claim handlers and may vary in accordance with each embodiment. More detail as to fields included in one embodiment when entering a claim are explained in more detail herein and associated with other figures.

An embodiment as part of its claim processing may also include information for entering and modifying a claimant, entering and modifying information regarding coverage and entering or modifying information in connection with the reserve of the particular claim. It should be noted that certain types of functionality such as adding or modifying an amount per reserve may cause another action to be taken with regard to another system. For example, when the user enters or adjusts a reserve, a posting is made to the general ledger file as described elsewhere herein for making an entry in connection with the accounting system. When a user also enters or adjusts a reserve amount above a users preset reserve aggregate or increment limit, then a diary may be sent to a claim manager for review as a form of notification or alert.

An embodiment may include functionality associated with claims processing for adding a new claimant as well as modifying information about an existing claimant. This type of functionality as well as those other types herein may be restricted to particular roles such as claim clerks, managers and the like. An embodiment may also include functionality for adding a new coverage, deleting an existing coverage as well as entering an initial reserve and modifying an existing reserve.

In connection with entering and modifying a reserve amount, amounts may be posted accordingly in a general ledger with an initial reserve amount or a reserve adjustment. Reserves entered which are greater than a user's preset reserve or increment limit or aggregate limit, a diary is sent to a claim manager. As described elsewhere herein, a diary entry may be sent to a manager as part of an automated process when the aggregate reserve amount or the increment exceeds a user's authority or limits assigned, for example, in accordance with particular user role for particular user ID. Subsequently, when the manager such as the claims manager, logs onto the system with his or her user ID, a message may be displayed on the manager's diary notifying the claim manager of the existence of a diary entry that the manager needs to review. In the embodiment for the claimant associated with detailed information may be information regarding the coverage or the reserve associated with this particular claimant. There may be a breakdown in terms of expenses and losses that are paid out and may be noted respectively as an expense reserve and a loss reserve. Additionally, in connection with claimant information, more detail may be included with regard to the claimant's injuries and the like. For example, there may be an indication to which body part or body parts have been injured to the claimant as well as the different types of injuries for the corresponding part or parts.

Different calculations may be included in an embodiment with regard to claims. In other words, total amounts paid out may be viewed by claim, claimant as well as coverage type. Other types of calculations that may be included and associated with the claim may include the total loss paid, the total expenses paid, the total recovery received in accordance with coverage. Similarly, different totals may be made with respect to or viewed with respect to a particular claimant, in claim.

An embodiment may include the ability to track claims in connection with a toxic site. Functionality may be included in an embodiment to add, modify and delete the information associated with the toxic site. In one embodiment, the toxic site, is first created or entered before it may be attached or associated with the claim. Toxic site information being added for the first time or modified may be performed in one embodiment by only claim managers or assistant claim managers having the appropriate security permissions. Similarly, deleting the toxic site and information associated therewith may similarly be performed by user roles such as different managers with the appropriate security permissions. Information that may be included in connection with a toxic site may include an identifier as to a particular type of toxic site, for example, such as an "EPA" type.

What will now be described in connection with FIGS. 21-24 are examples of screen displays as may be included in an embodiment in connection with functionality provided for use with claims processing operations and other modules, such as unearned premiums, and the like. For example, in one embodiment, the screen displays included in FIGS. 21-24 may be reached directly or indirectly from the claims processing menu.

Referring now to FIG. 21, shown is an example of an embodiment of a screen display 500 that may be displayed in connection with mapping different coverage codes with different insurance accounts. Shown is information that may be included in a top portion 504 of the screen 500 which includes information describing the insolvency, state fund, and particular insurance account. In this example, "Johnson Mutual Insurance Company" is identified as being insolvent and wrote "auto" policies for the state of New Hampshire (NH). Included in the bottom portion of the screen is a list of coverages 502 that may be mapped or selected and associated with this particular insolvency. For example, different types of coverages for which claims and the like may be paid out in connection with this particular account include commercial auto liability for different coverages such as uninsured motorist, personal injury protection as well as medical payments. The mapping and unmapping of a particular coverage code being associated with a particular insolvency displayed in the area 504 may be done, for example, by selection of a button 506a at the bottom portion of the screen.

Referring now to FIG. 22, shown is an example of an embodiment of a screen display 510 that may be used in connection with displaying information for particular claimant and the totals associated with this particular claimant. Different types of expenses that are totaled include: total loss reserves, loss paid, loss pending, as well as different expenses and recoveries.

In this example, claim information is displayed in the portion of the screen 514. Also shown under the claimant tab is a particular claimant 512 and in the different coverages as identified in the coverage list 516 for this particular claimant. In other words, this particular display of information shows for this particular claimant identified in field 512 the different types of expenses paid out for the different types of coverages as well as the amount which has been reserved or estimated with regard to this particular claim.

Referring now to FIG. 23, shown is an example of an embodiment of screen display 520 that may be used in connection with displaying totals in accordance with a particular type of coverage. In this example, information for the claim identified in the upper portion 522 may have totals associated with claim calculations displayed in accordance with a particular coverage identified in field 524. In other words, rather than list a particular claimant and associate a coverage as shown in connection with FIG. 22, this display of information shows the particular totals displayed for all claimants for a particular type of coverage.

Referring now to FIG. 24, shown is an example of a screen display 530 that may be used in connection with diary entries. In particular, the screen display 530 may be displayed in the form of a window or graphical user interface to a user, for example, in connection with creating a diary entry of a particular claim. In this example, a diary entry is created or generated when a new claim is entered. Information as included in portion 532 of screen 530 may be automatically prefilled in the window and obtained, for example, from the claim corresponding to this particular diary entry. The comment field 534 may include information such as a new claim and other types of facts identifying this particular diary entry and the associated claim. Additionally, in field 535a, the user may select one or more reviewers for which this diary entry is reviewed by. Additionally, a review date as indicated in field 535b may indicate a date upon which this diary entry must be reviewed. The review date may indicate a date upon which this diary entry may send notification to the different reviewers indicated in field 535a.

It should be noted that a new diary entry, for example, may be created and viewed by managers or other users, such as may be indicated by the reviewer ID field in the display of FIG. 24. This field and the values included therein are selectable by the creator of the diary entry. It should be noted that in the example of the screen display FIG. 24, this diary entry, for example, may be created for a new claim such as indicated by the comments field. Similarly, an embodiment may include functionality for creating a diary entry associated with a new unearned premium.

In one embodiment, the screen display for entering information for the diary detail information includes the same fields as in FIG. 24 associated with the claim. However, the comment field may include different data, for example, such as rather than stating "new claim" may rather include "new unearned premium" as the type of description.

It should be noted that at the bottom of the screen display is the diary history list 536 which in this example appears currently empty. Subsequently, the history 536 may be updated as a diary entry is later modified or updated. It should be noted that certain fields such as the review date may be calculated automatically and/or prefilled in accordance with details that may vary in accordance with each embodiment.

As described elsewhere herein, for other types of subsystems, diary entries may be created automatically when certain changes are performed. What will now be described are the trigger events that may be included in one embodiment for automatically creating and generating a diary entry.

As described elsewhere herein, the claims processing module as well as, for example, the unearned premiums module may include functionality for one or more associated diary entries. Diary entries may be created manually as well as generated automatically, for example, in accordance with sending an alert or notification message in accordance with predetermined criteria, such as reserve amounts being exceeded in connection with a particular claim by a user.

One embodiment may include functionality for creating a diary entry, searching or querying for a particular diary entry or entries in accordance with predetermined criteria, as well as modifying a particular diary entry. Another use for a diary entry in terms of an automated process or generation, for example, may be in connection with a claim that goes untouched for a particular period of time. Accordingly, for a claim that has had no entries or actions within a particular period of time, a message or diary entry may be generated and sent to one or more people or users such as different types of managers, agents and the like associated with a particular claim.

As described elsewhere herein in more detail in connection with other screen displays, diary list functionality may be available and invoked by a button on a toolbar or menu item. Search and modification of the diary entry functionality may also be included on the diary list window, for example, for use within claim and unearned premium systems. Accordingly, there may be a link such as a button in connection with a claim or an unearned premium as well. Within the claims processing module, diary functionality may be included in an embodiment for partial claims or CBNs as well as actual claims.

In one embodiment implementing the function of deleting a diary entry, "deleting" a diary entry action by a user does not necessarily mean that the diary entry is physically removed from the database. Rather, a diary entry may simply be marked for deletion and not be seen or viewed on any diary list such as in connection with a user query or data retrieval. However, diary entries marked for deletion may be available if a user runs an ad hoc report specifically asking for deleted diary entries. In other words, in this context, a delete functionality included in an embodiment may not physically delete a diary entry or entries from the systems, but rather control whether or not the diary entry is included in specific operations such as data queries and the like. This may vary in accordance with embodiment and implementation.

When modifying or amending information in a diary entry, an embodiment may create a new diary entry in the diary entry history list in order to display the history of all diary entries pertaining to a claim or unearned premium, for example. The functionality of a history list may optionally be included in an embodiment showing and recording those changes made in connection with a particular diary entry. In one embodiment, all users may create their own diary entries.

In one embodiment, one or more events may trigger the system to automatically create and generate a diary entry. Referring now to FIG. 25, shown is a chart which summarizes for one embodiment the different actions that may trigger the automatic generation of the diary entry. It should be noted that a particular embodiment may vary the trigger events that may cause the automatic creation of a diary entry as well as not provided for any type of automated diary entry creation and generation.

In connection with monies that may be paid out, for example, additional information such as tax information may need to be captured in an embodiment in accordance with, for example, federal government requirements. In connection with services and external dependencies such as this, functionality may be included in an embodiment responsible for the creation, modification as well as searching for a particular service provider or additional payee. For example, a provider of service may include, for example, a defense attorney, a medical or healthcare provider or other type of service provider used in connection with a claim. Additional payees may include, for example, a finance company, a mortgage company, an assignee or other payee used in connection with the processing of unearned premiums. A service provider or additional payee may be added, for example. As with other functionality described herein, different types of information may be required for appropriate data entry in a particular embodiment as well as the access for performing a particular operations such as adding or modifying information being restricted to a particular user role and assign security. In one embodiment, the ability to add a service provider may be in accordance with assigned roles. In connection with a service provider and payee, taxpayer ID number such as the Social Security number or employee identification number may be required as well as information such as in accordance with when a particular W9 or other type of tax form has or will be sent.

Referring now to FIG. 25, shown is an example of an embodiment 540 of the table displaying what actions may trigger automatic diary entry creation. The table 540 in this example consists of six columns summarizing information in connection with automatic diary entry creation. Summarizing the information in table 540, in column 542 there is indicated a particular function having an associated action indicated in field 544 indicating when an automatic diary entry may automatically be created. For example, in connection with approval functionality, when a claim payment is deleted, a diary entry may automatically be generated with a particular diary type such as claim payment approval being indicated in the comment field. Fields 548, 550 and 552 of an associated record indicate the different types of objects for which this diary entry may be automatically created. These are indicated by a check in the appropriate column or columns. For example, with regard to the approval when a claim payment is deleted, this pertains only to claim processing in this particular example. Other types of functionality may be associated with the processing of unearned premiums as indicated with a check mark in appropriate columns 550 as well as generic 552 being indicated. Generally, as shown in column 552 an indication of generic means that at the state the diary entry is created, no claim or unearned premium data may be available.

Figure 26A:
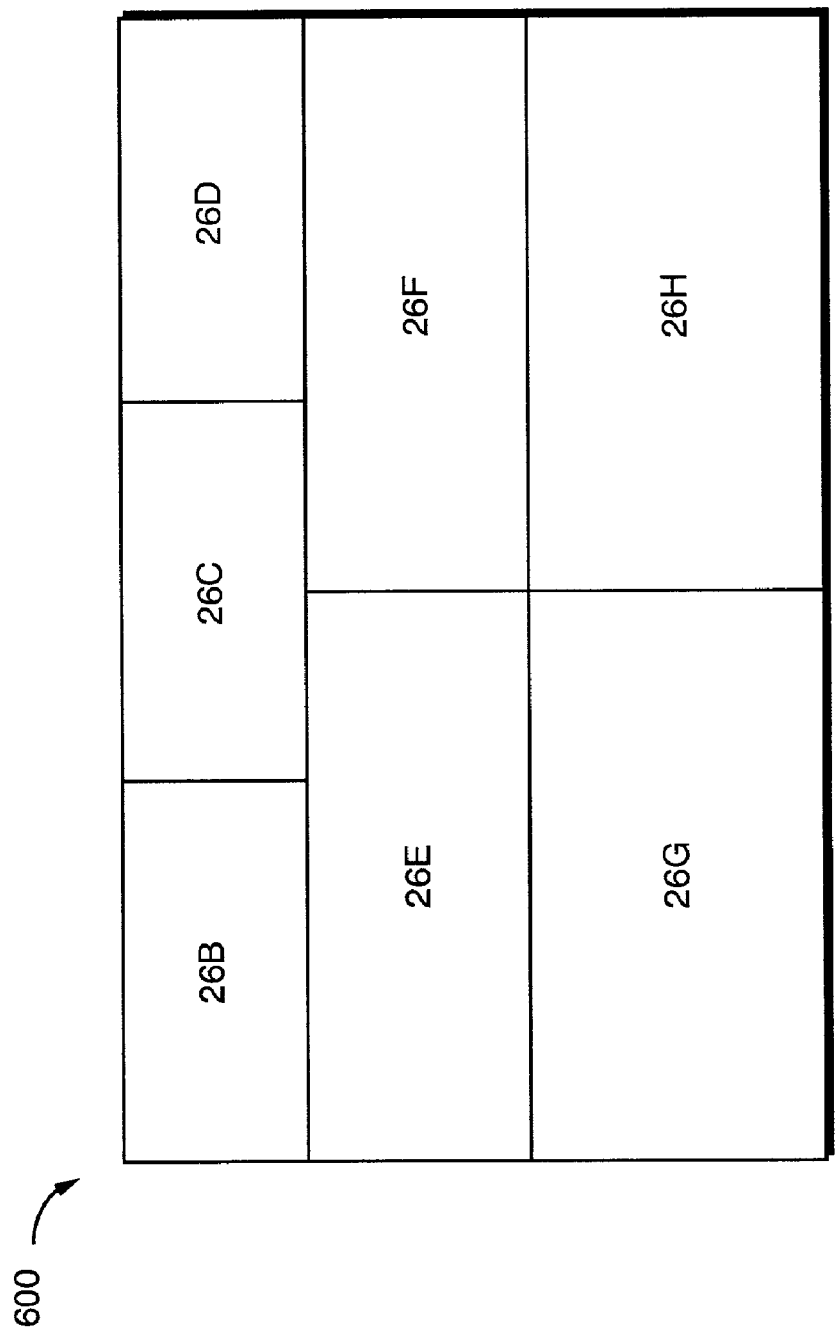
FIG. 26A illustrates the relationship between FIGS. 26B through 26BB in forming an example of one embodiment of a representation of a database schema 600 for unearned premium and claims processing, and other common functionality.
Figure 26B:
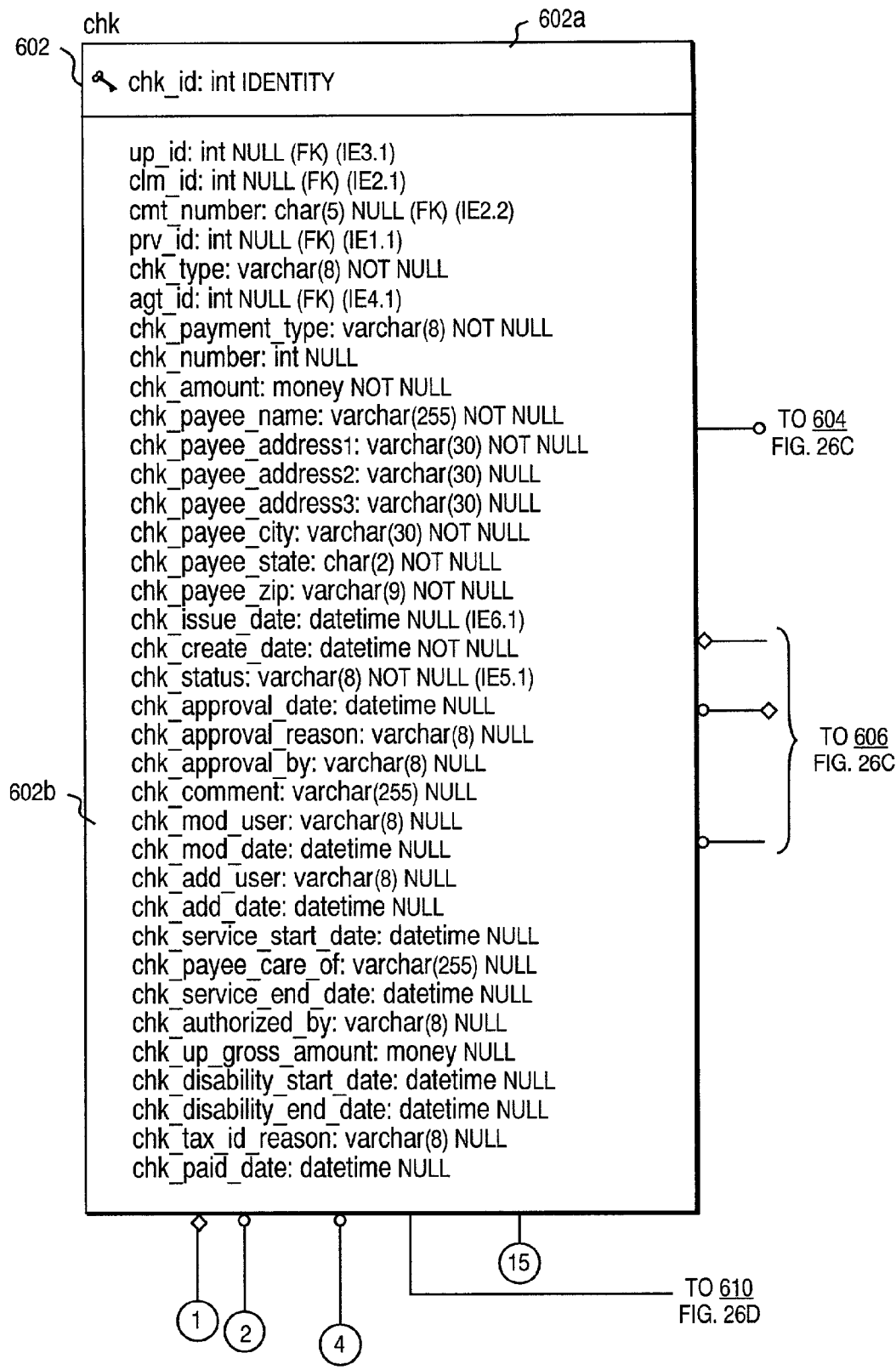
FIGS. 26B through 26BB form an example of a representation of one embodiment of a database schema that may be used in connection with claims and unearned premium processing and other common functionality used between different modules.

Generally, as described in more detail in paragraphs that follow, FIGS. 26B through 26BB form an example of one embodiment of a database schema that may be used in connection with unearned premiums, claims processing, assessment processing and common functionality between modules included in the system 10 of FIG. 1. Referring now to FIG. 26A, shown is an example of an embodiment of a representation of the relationships between FIGS. 26B through 26BB.

Referring now to FIGS. 26B-26F, shown is an example of a first portion of the database schema representation in one embodiment that may be used in connection with representing data and relationships between data items used in connection with unearned premiums, claims processing and other common functionality that may be used by one or more modules in the computer system 10 of FIG. 1. It should be noted that for the description accompanying FIGS. 26B-26BB and FIGS. 28A-28E, the database schema representation illustrates relationships between different entities which may be implemented, for example, as objects for use in a database. In this embodiment, the database schema of FIGS. 26A-26CC and FIGS. 28A-28E is drawn using functionality of the Erwin software system by Computer Associates, Inc. Generally, described and shown is an entity relationship (E-R) model using this tool. This tool, and others, uses different notations for representing relationships between the entities. For example, in the representation included herein using the Erwin software tool, a portion of the lines drawn between entities describe an "identifying relationship" using the IDEF1X notation of the Erwin tool. An identifying relationship between two tables is a relationship in which an instance of child table is identified through its association with a parent table which means that the child table is dependent upon the parent table for its identity and cannot exist without it. In an identifying relationship, one instance of the parent table is related to multiple instances of the child. In reference to the database schema herein, the identifying relationship may be represented as a solid line with a diamond or filled circle at either end of the line. Other lines are included in the representation in accordance with the options of the software tool used herein. Other examples may use other notation that may vary.

It should be noted that each of the entities, such as 602, represented in the database schema includes a top portion, 602a as bounded by an upper box, and a lower portion 602b. The upper portion indicate primary key data items used in connection with, for example, performing queries and other database operations. Each row or record of data included in the lower portion corresponds to a data item associate with an entity. Each record of data corresponding to a data item in this embodiment may be in a format that may be described as:

<ID-NAME>:<DATA DESCRIPTION><Default Value> in which <ID-NAME> represents an identifier name for the data item, <DATA DESCRIPTION> is a description of a type of data that may be stored in connection with this item, such as a size of the field, for example, a number of digits or characters, and a data types, for example, such as integer, character, and the like. <Default Value> represents a default value, for example, that may be used when performing calculations, displaying a value associated with the data item in a graphical user interface, and the like. It should be noted that a particular embodiment may include different items associated or included in each entity other than as describes herein and may vary in accordance with embodiment.

What will now be described are general descriptions for each entity that may be included in an embodiment using the schema of FIGS. 26A-26BB. Entity 602 corresponds to a check that may be issued, for example, using computer system 10 of FIG. 1 for payment in connection with claims. Entity 604 corresponds to check staging information. Entity 606 corresponds to provider information such as a provider of service, for example, a taxpayer, finance company, adjuster and the like. Entity 608 corresponds to UP_Policy data which represents unearned premium policy information.

Referring now to FIGS. 26G-26J, shown is another portion of a representation of the database schema 600 for claims, unearned premium, assessment and other common functionality. Entity 612 is a representation of the member information. Entity 614 is a representation of the member group to which a member may belong. Entity 616 includes member financials and information associated with the financial status of a member. UDS coverage code entity 618 shows different fields that may be included in an embodiment in connection with UDS coverage code information. Entity 620 includes a representation of information that may be stored in connection with a line of insurance (LOI). Entity 622 describes those items that may be used in connection with insolvency UDS coverage codes. Entity 624 refers to an insolvency line of insurance entity. Entity 626 corresponds to split information, for example, as previously described herein in which a member may split into multiple members in connection with a corresponding business transaction. Entity 628 represents an assessment transaction and the information that may be included in it and associated with it. Entity 630 represents an entity corresponding to a claimant injury and associated information.

Figure 26C:
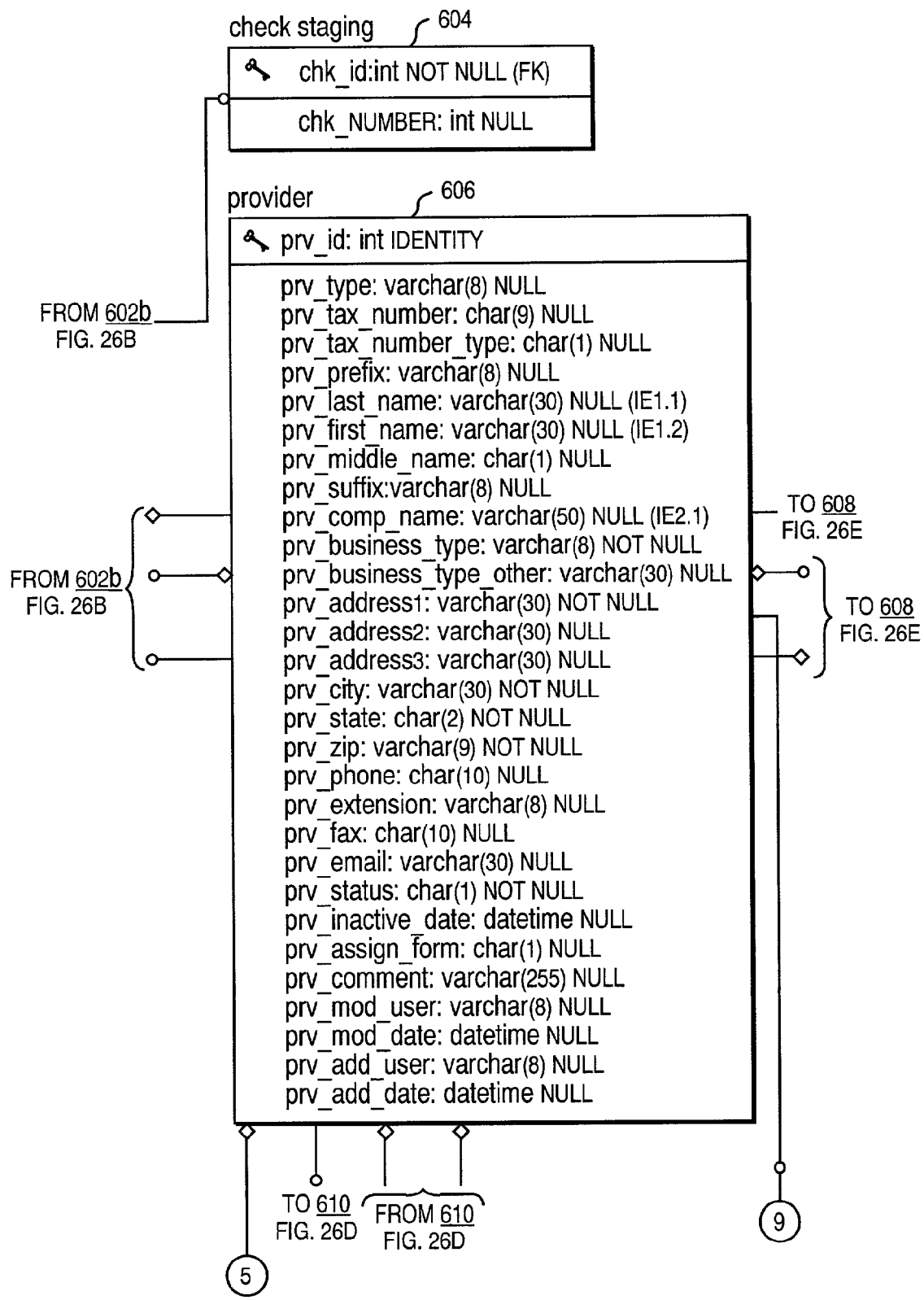
FIG. 26CC is a higher level view of a database schema illustrated in FIGS. 26B-26BB and FIGS. 28A-28E.
Figure 26D:
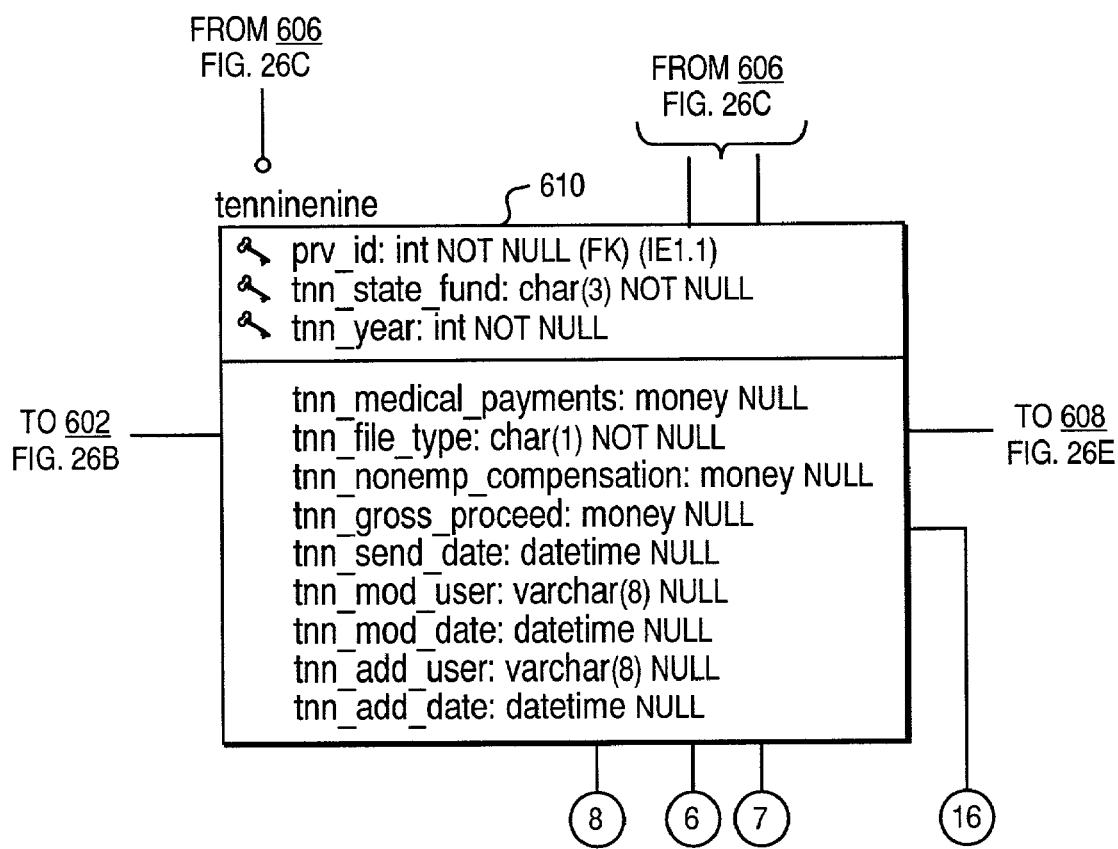
Figure 26E:
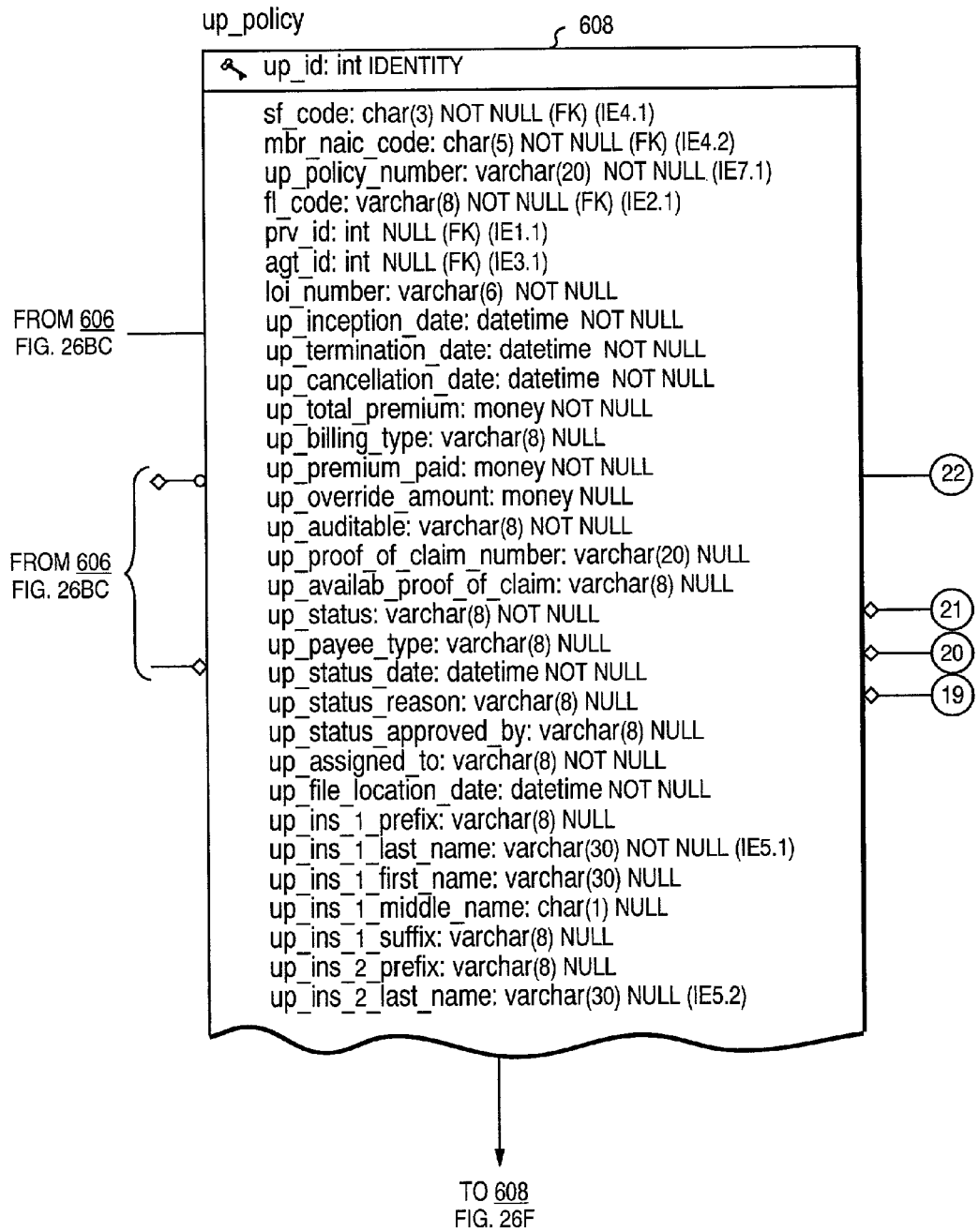
Figure 26F:
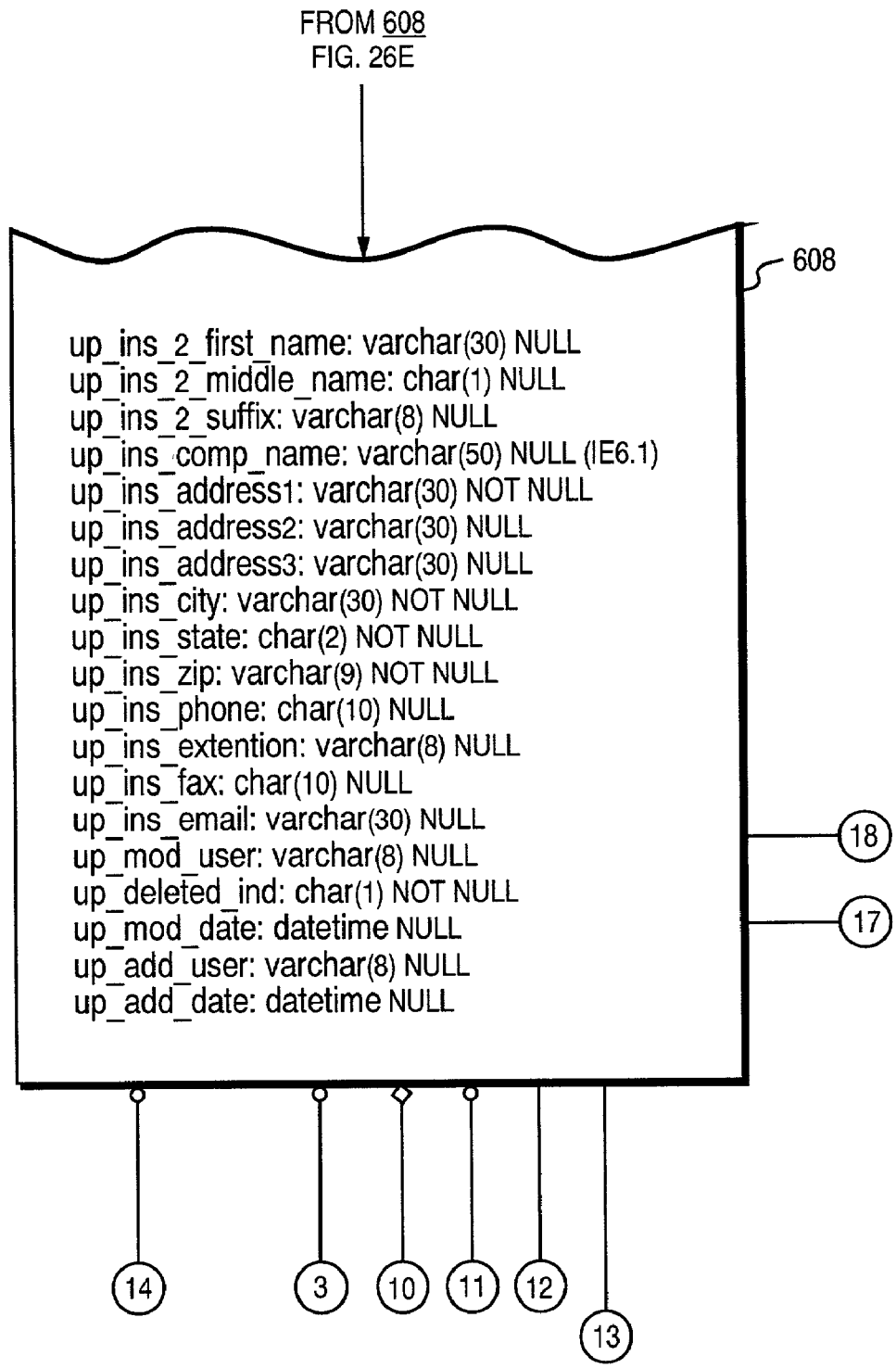
Figure 26G:
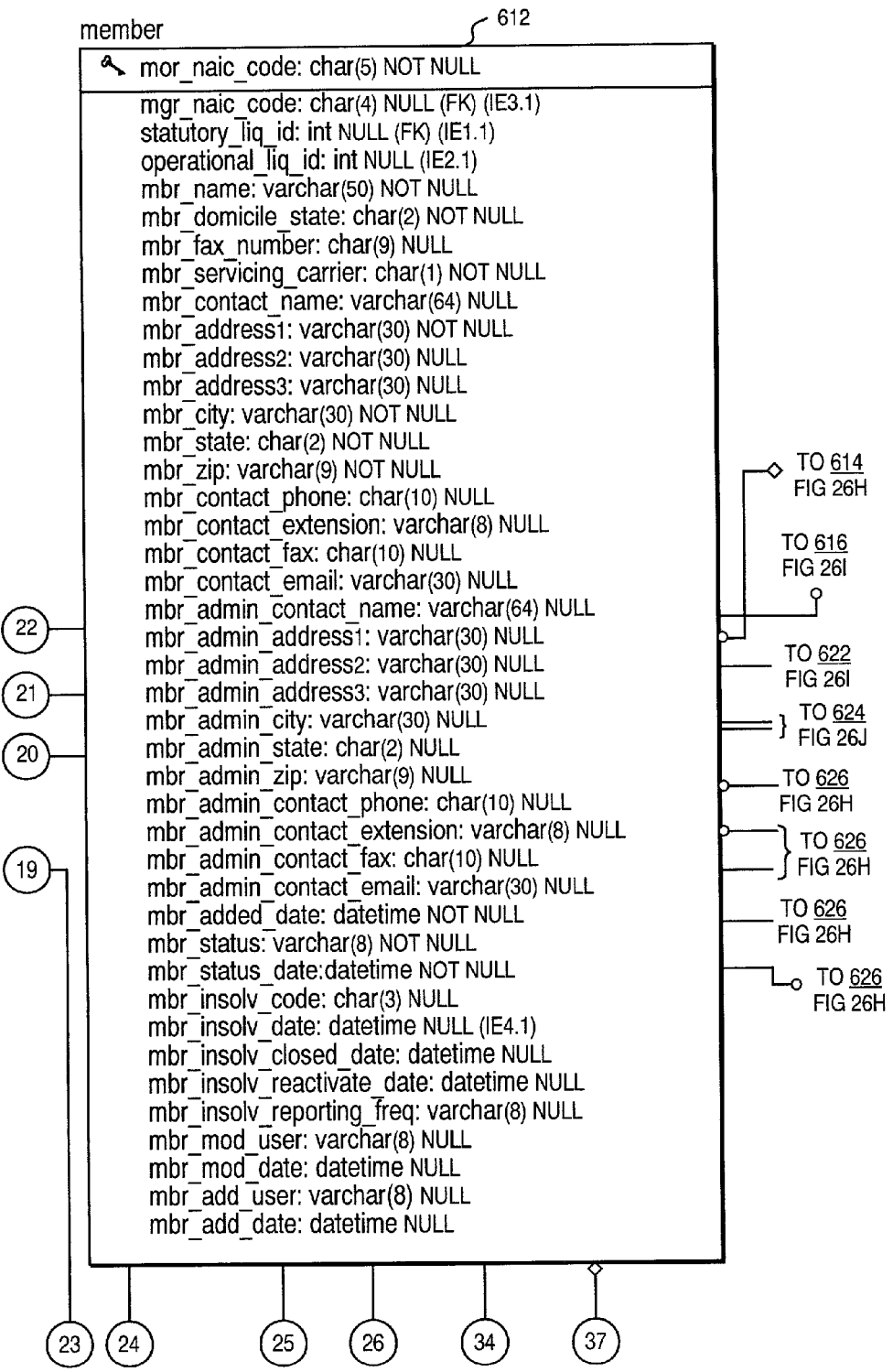
Figure 26H:
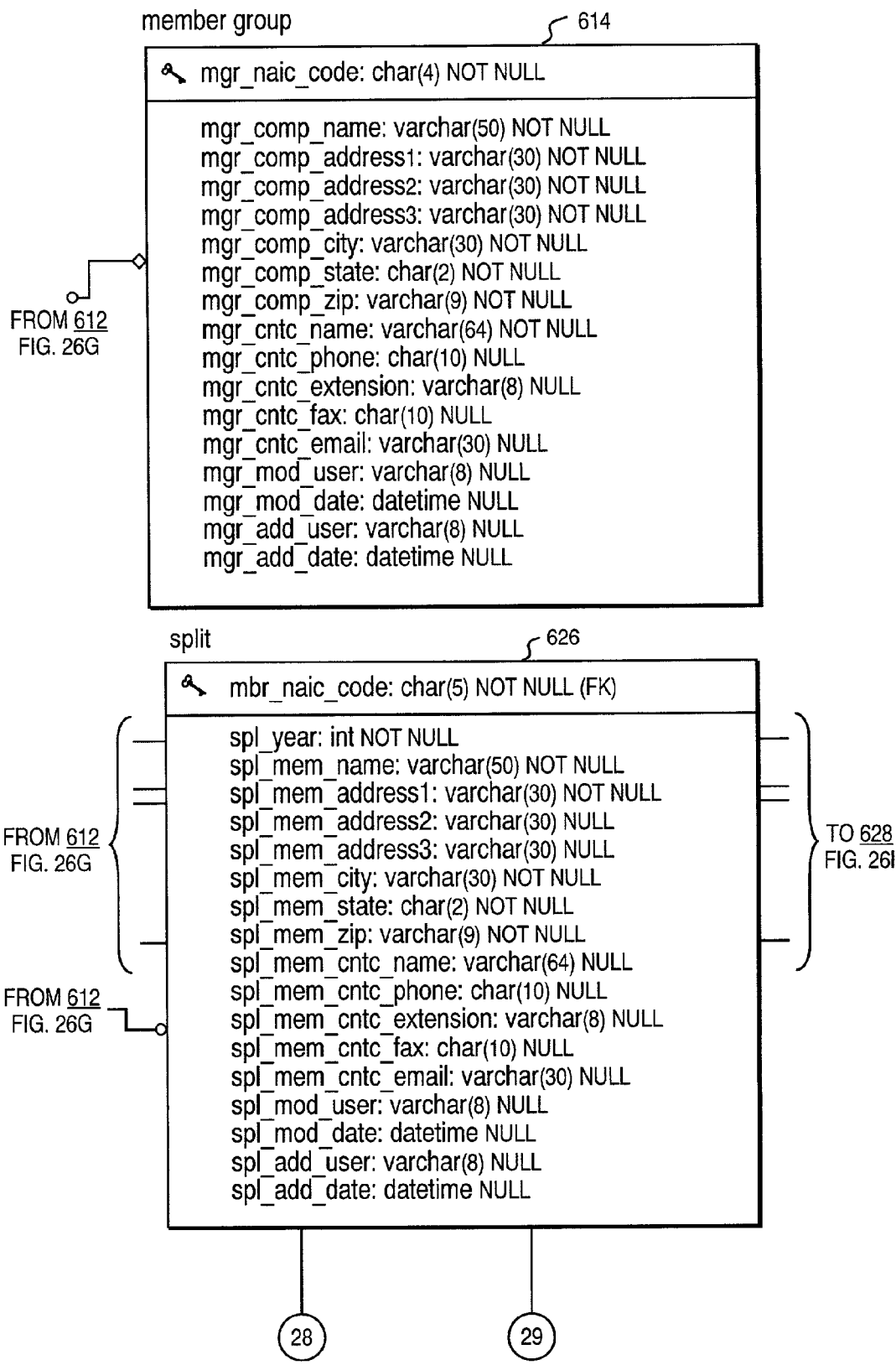
Figure 26I:
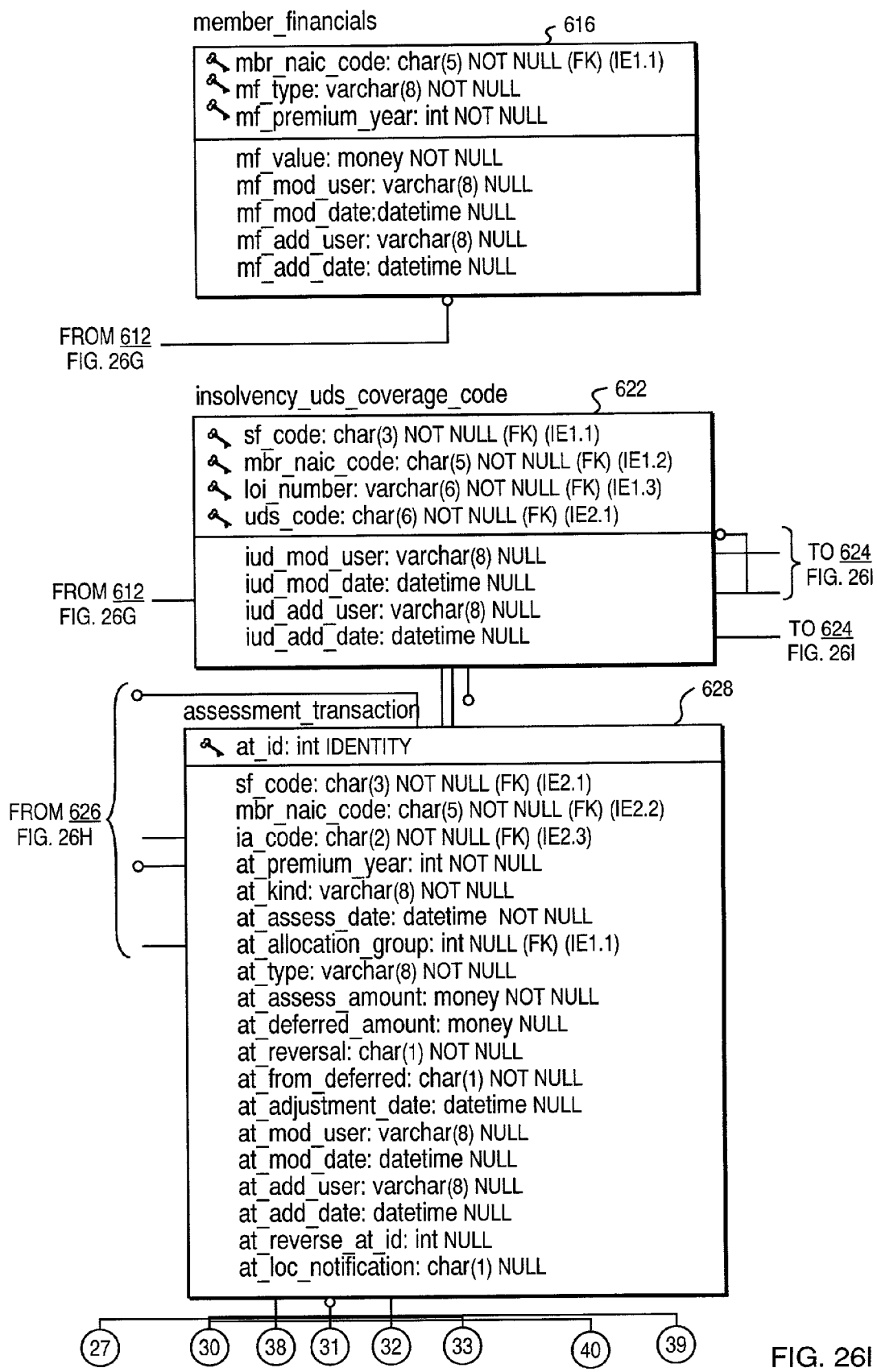
Figure 26J:
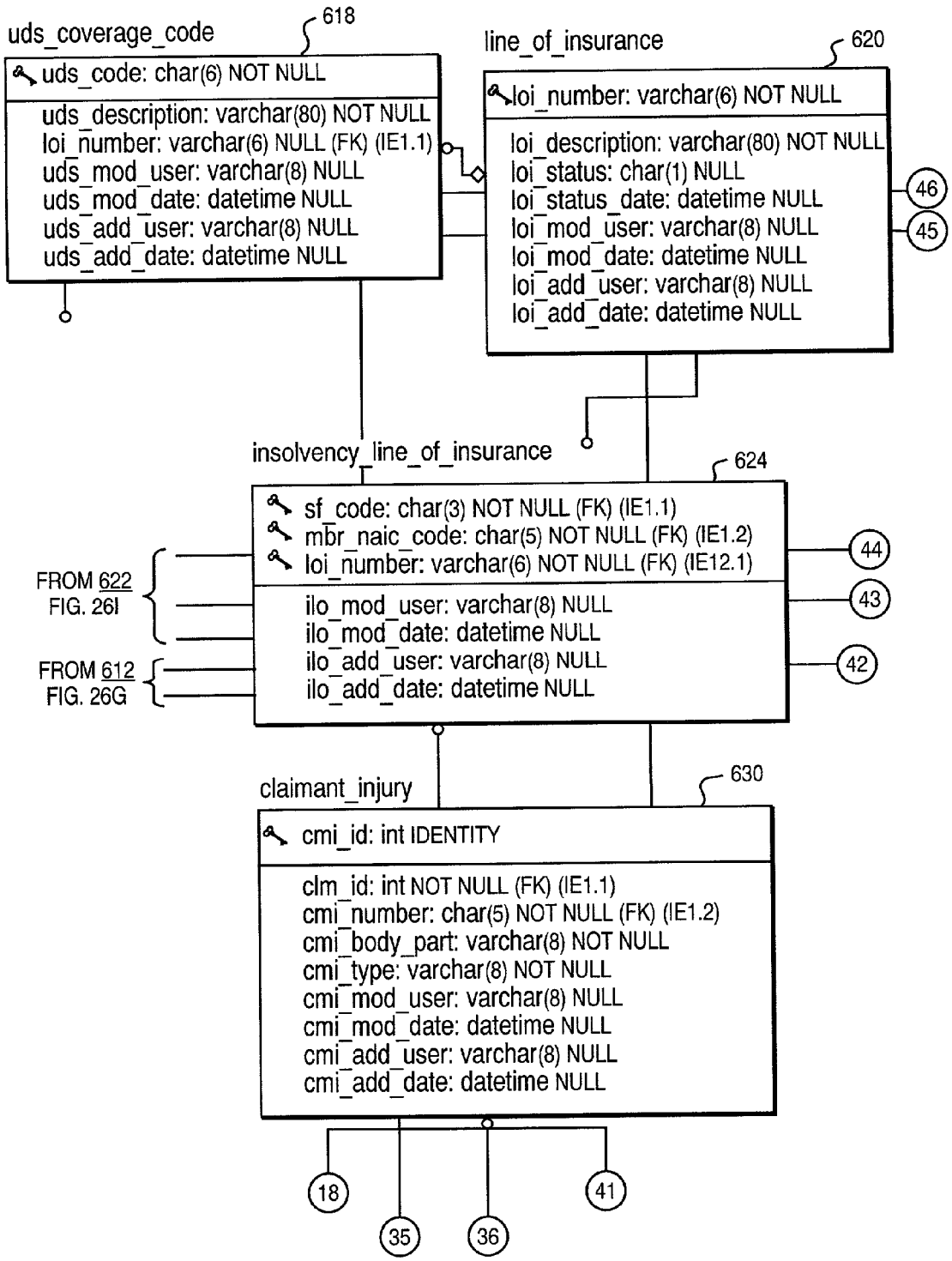
Figure 26K:
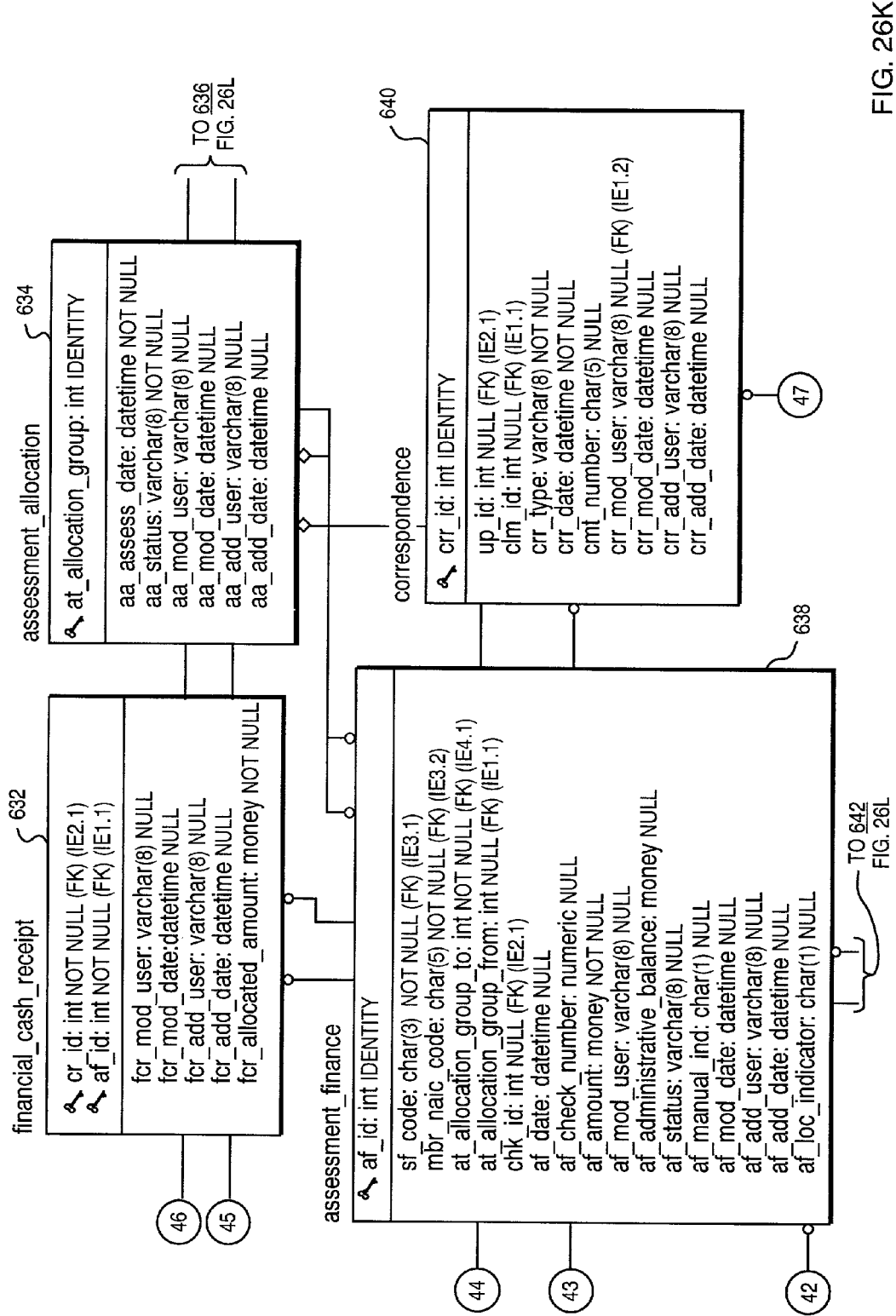
Figure 26L:
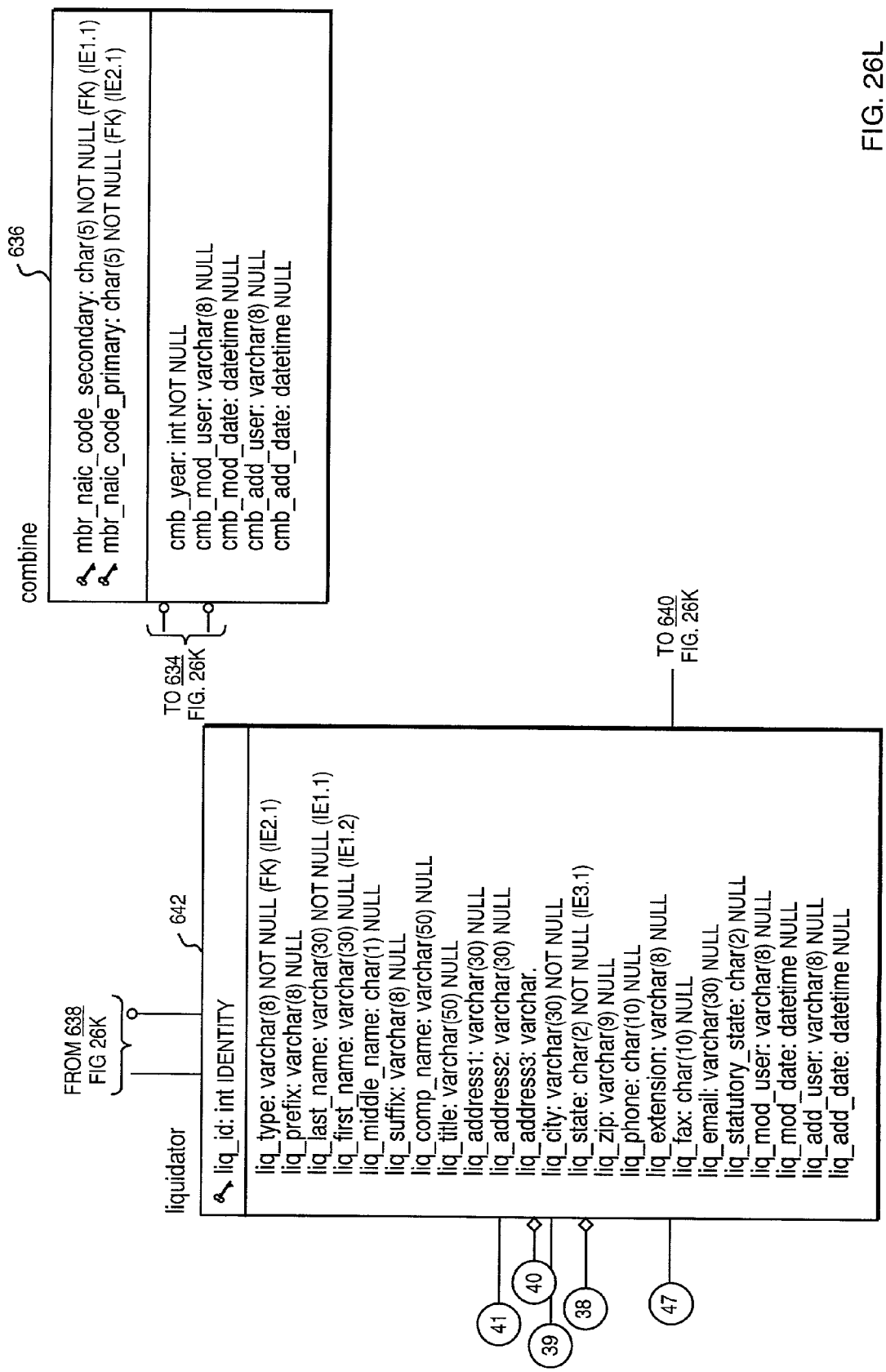
Figure 26M:
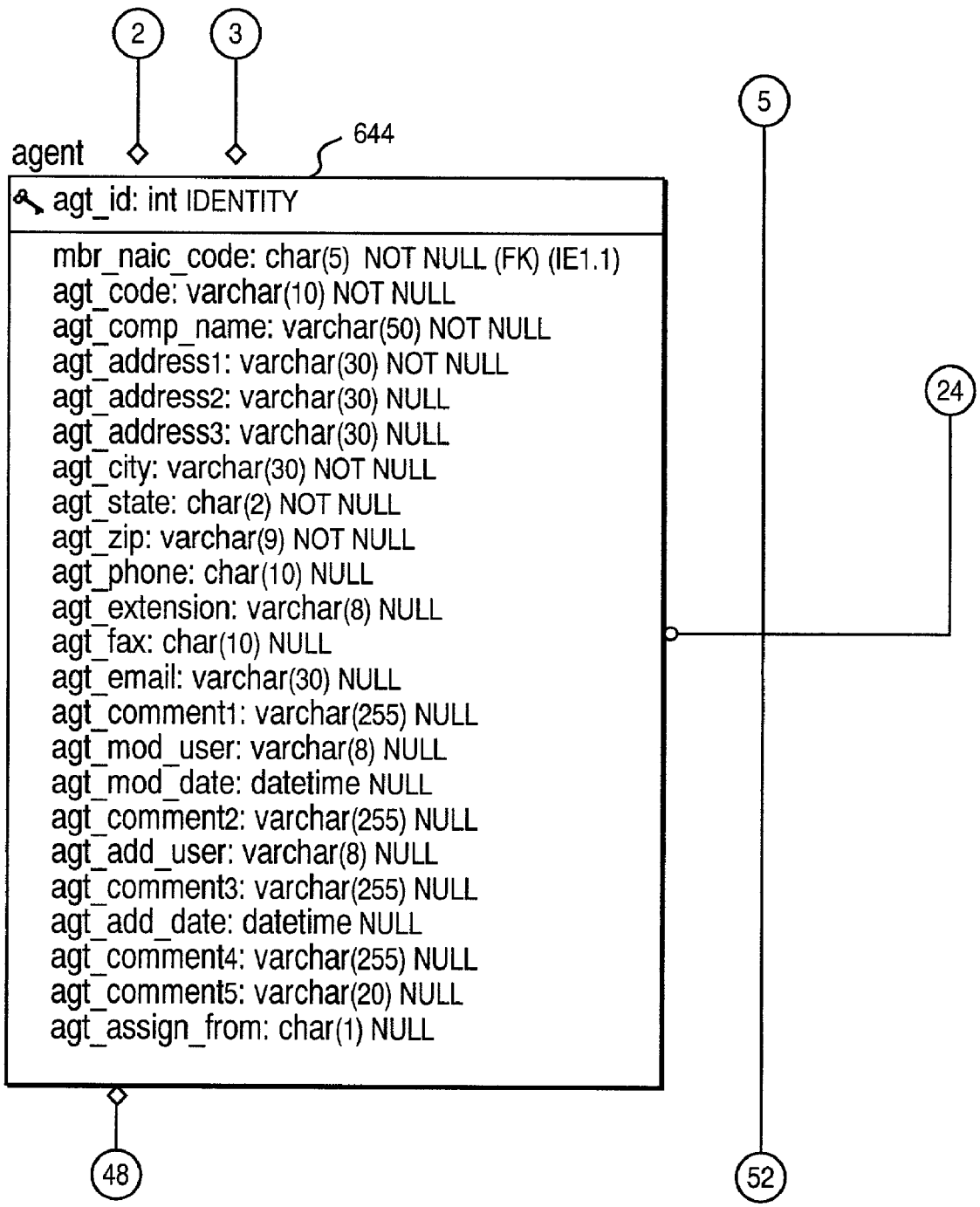
Figure 26N:
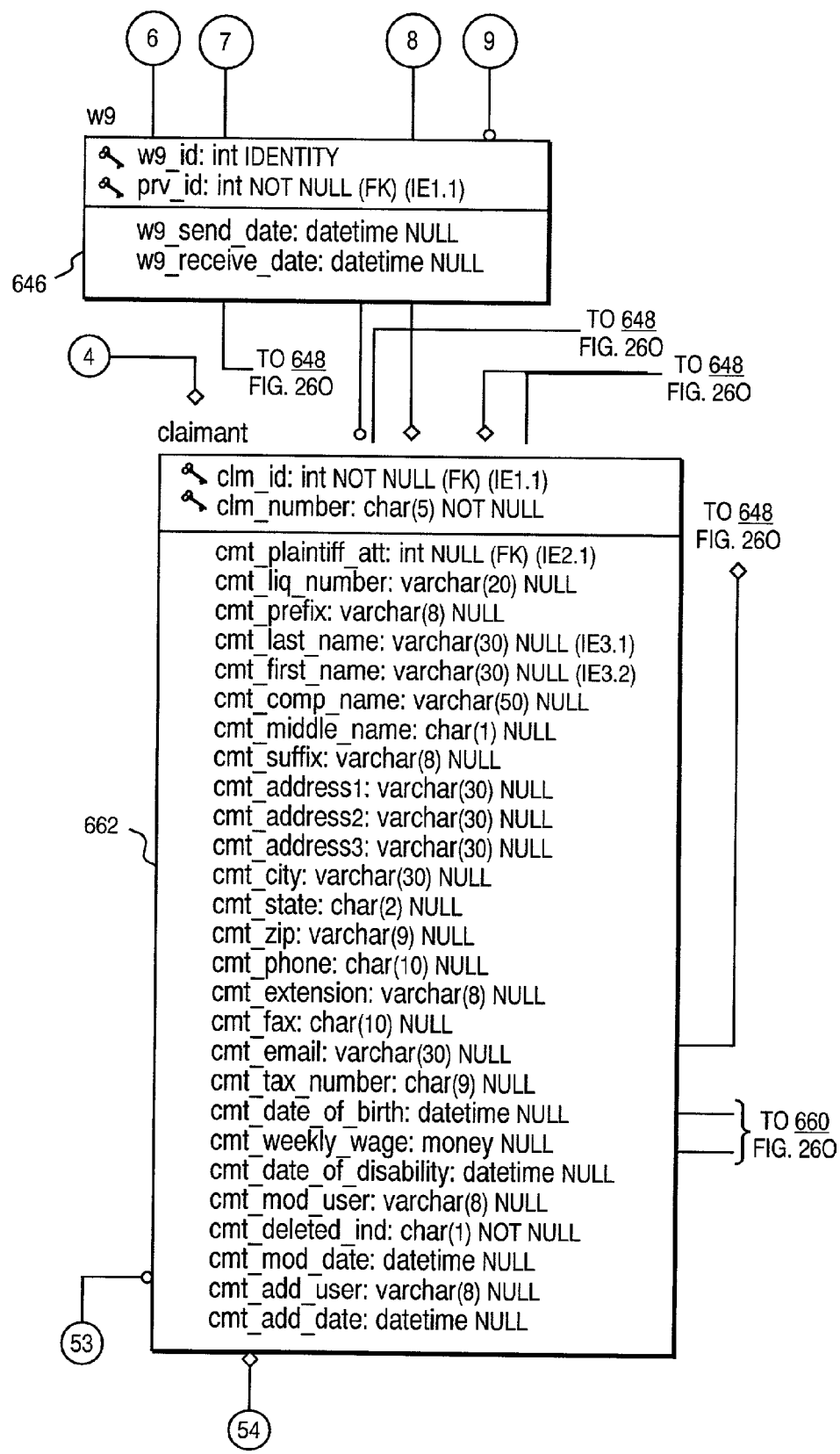
Figure 26O:
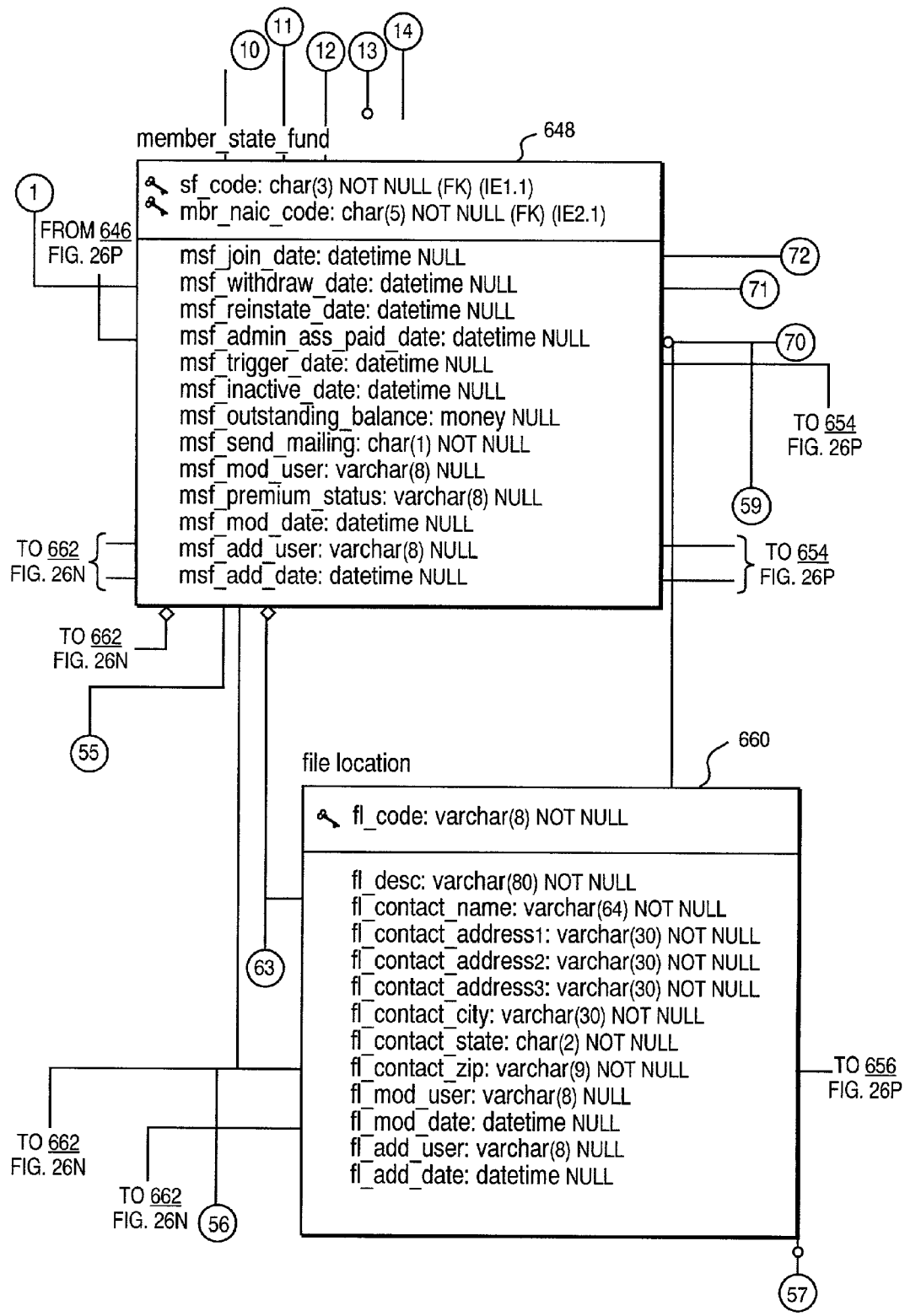
Figure 26P:
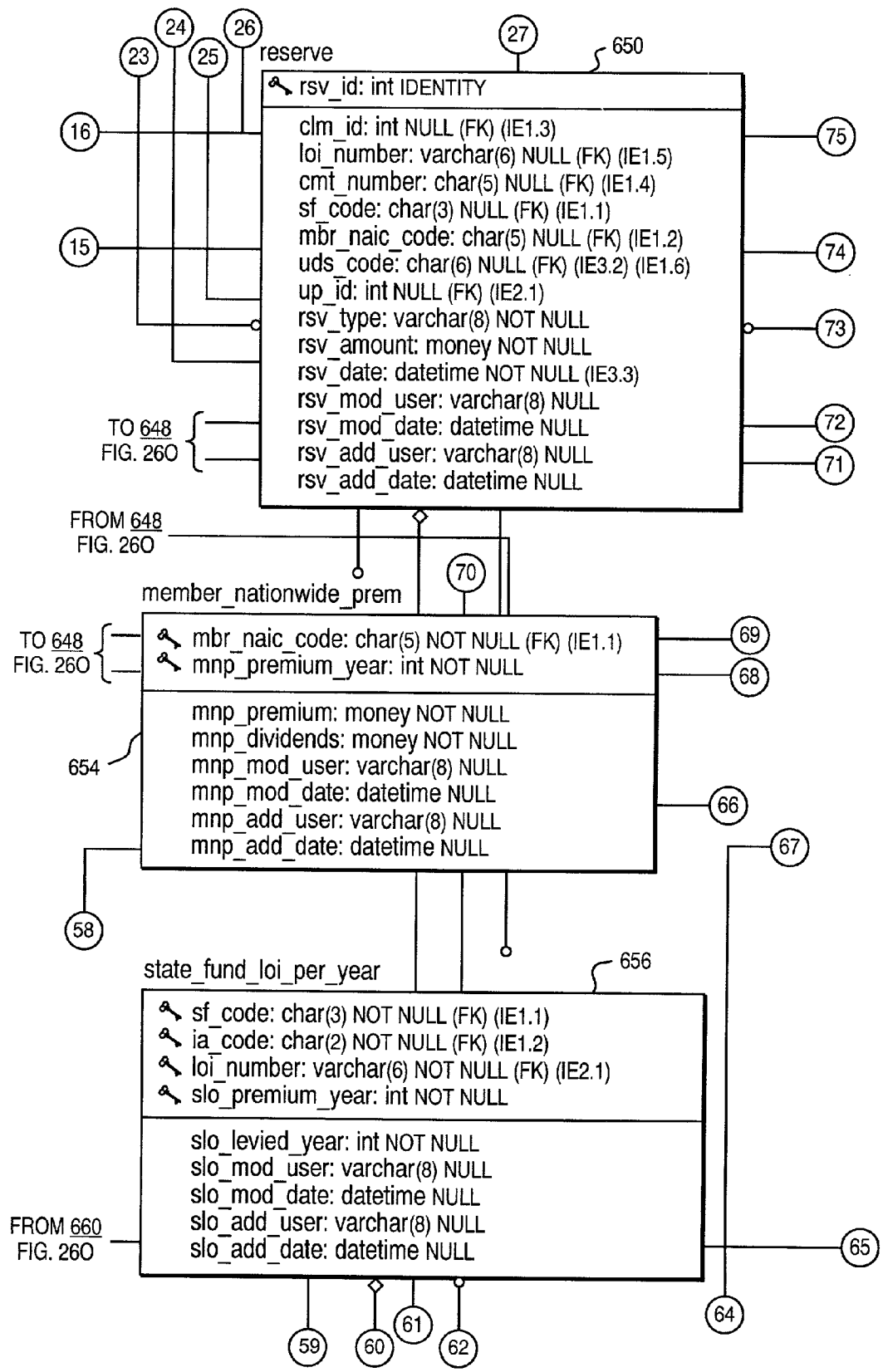
Figure 26Q:
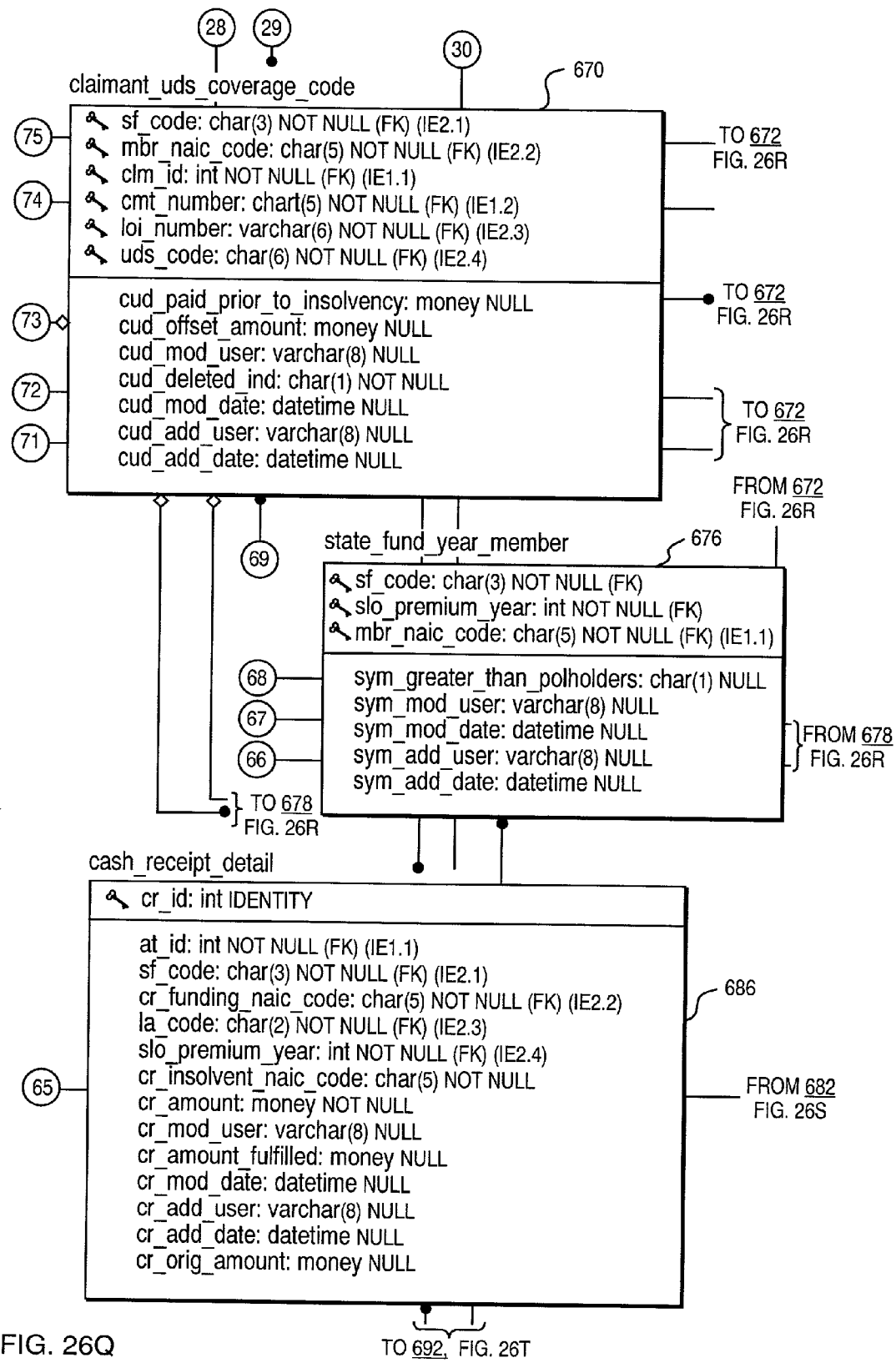
Figure 26R:
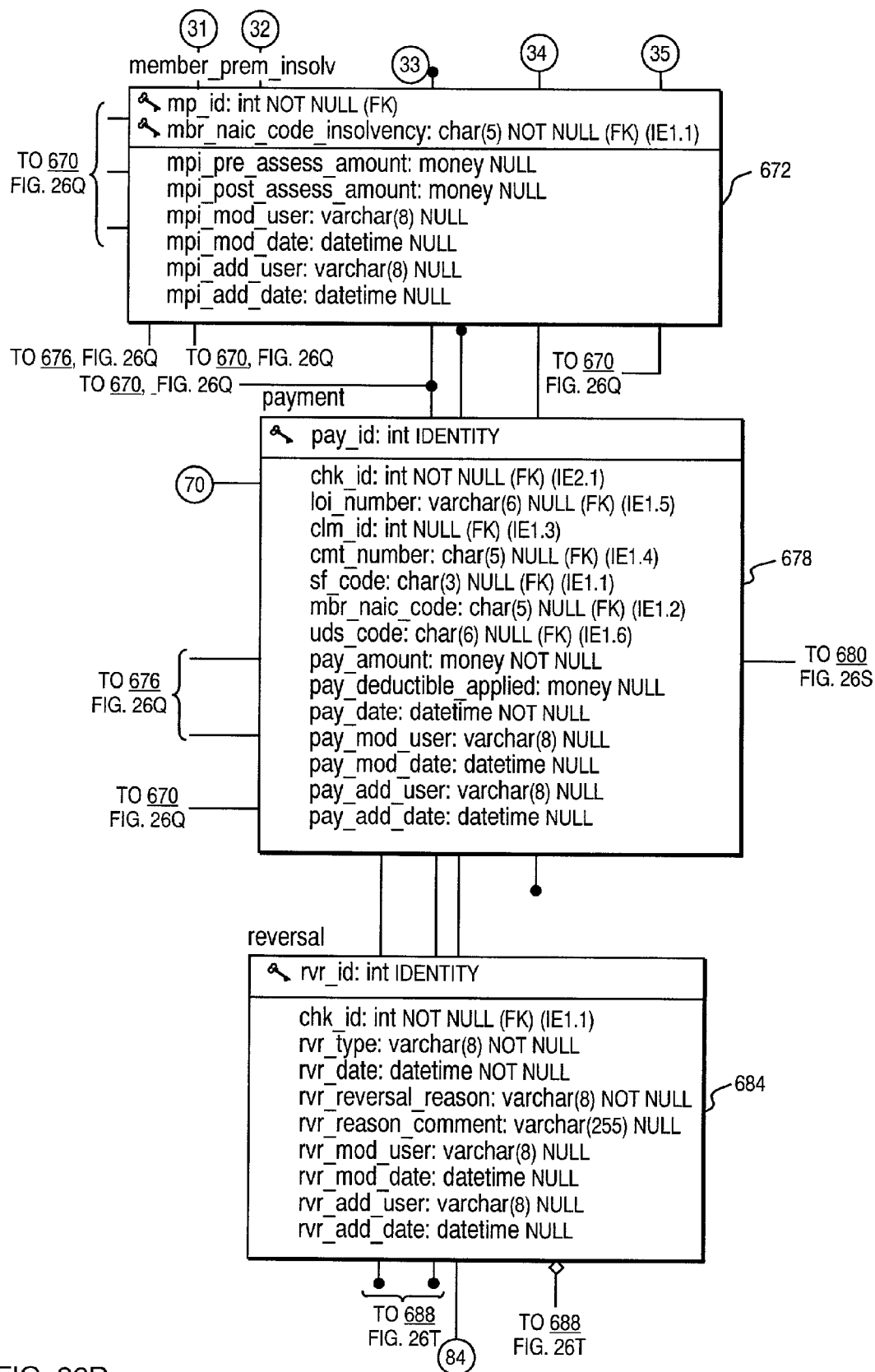
Figure 26S:
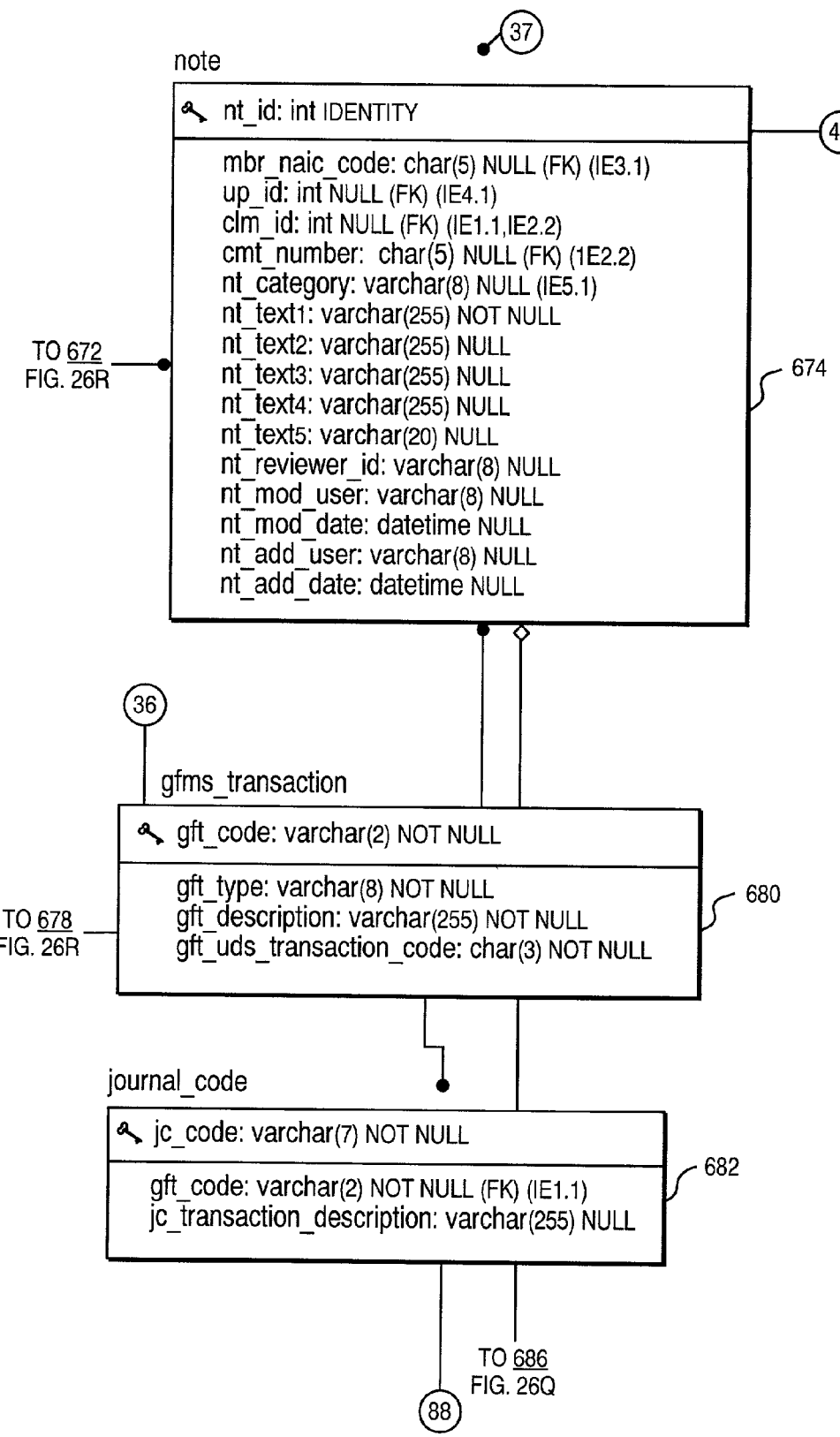
Figure 26T:
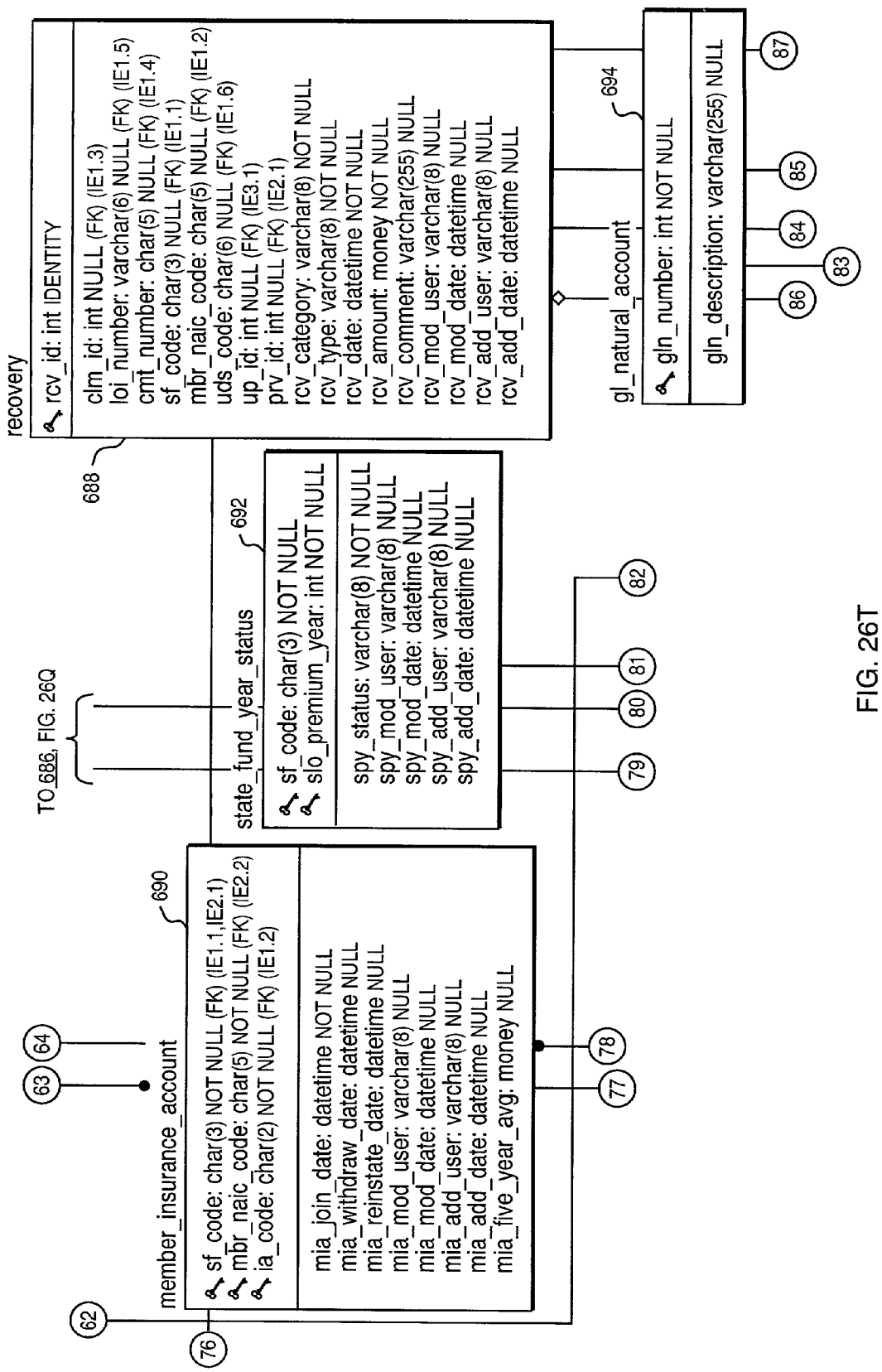
Figure 26U:
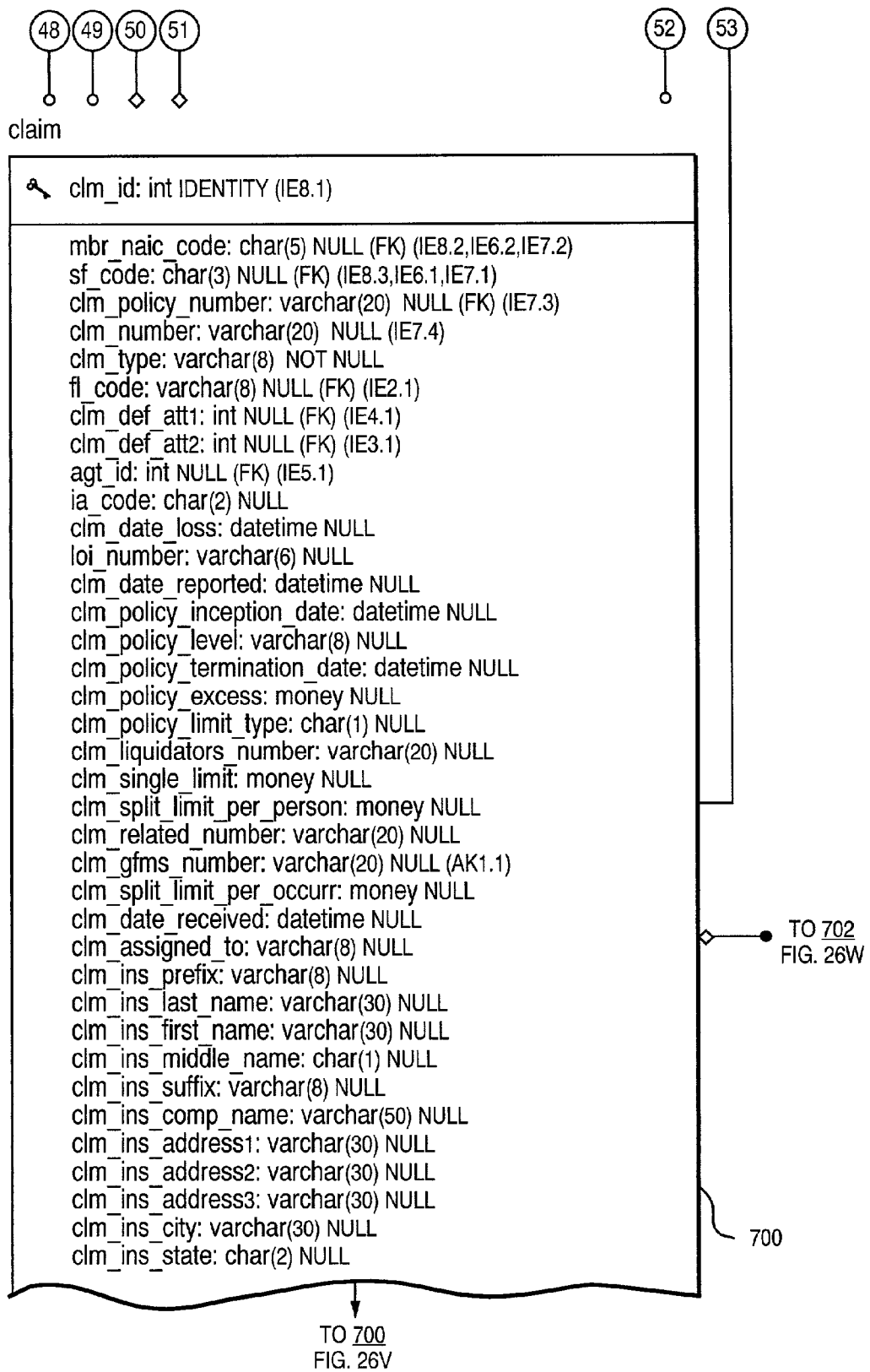
Figure 26W:
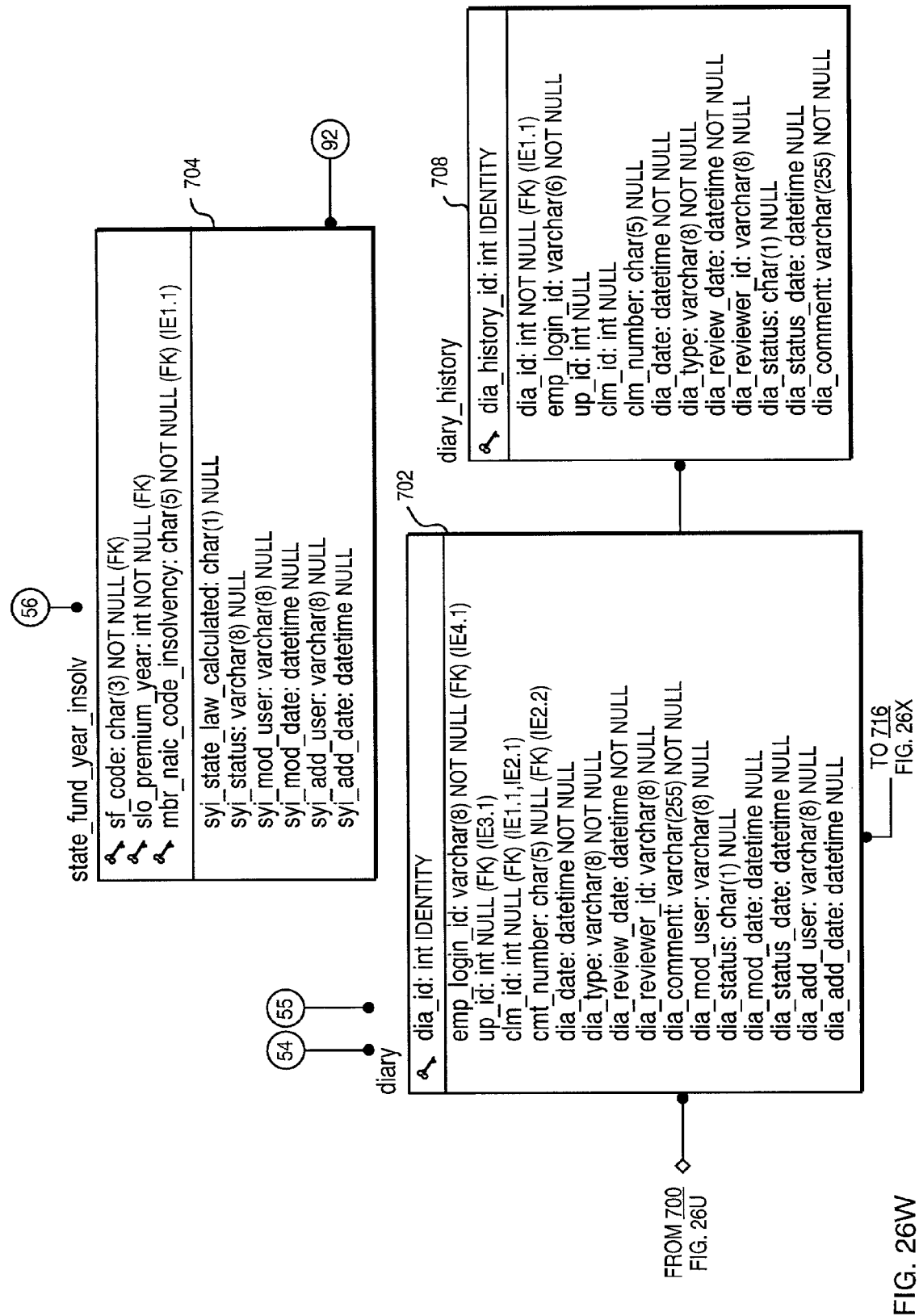
Figure 26X:
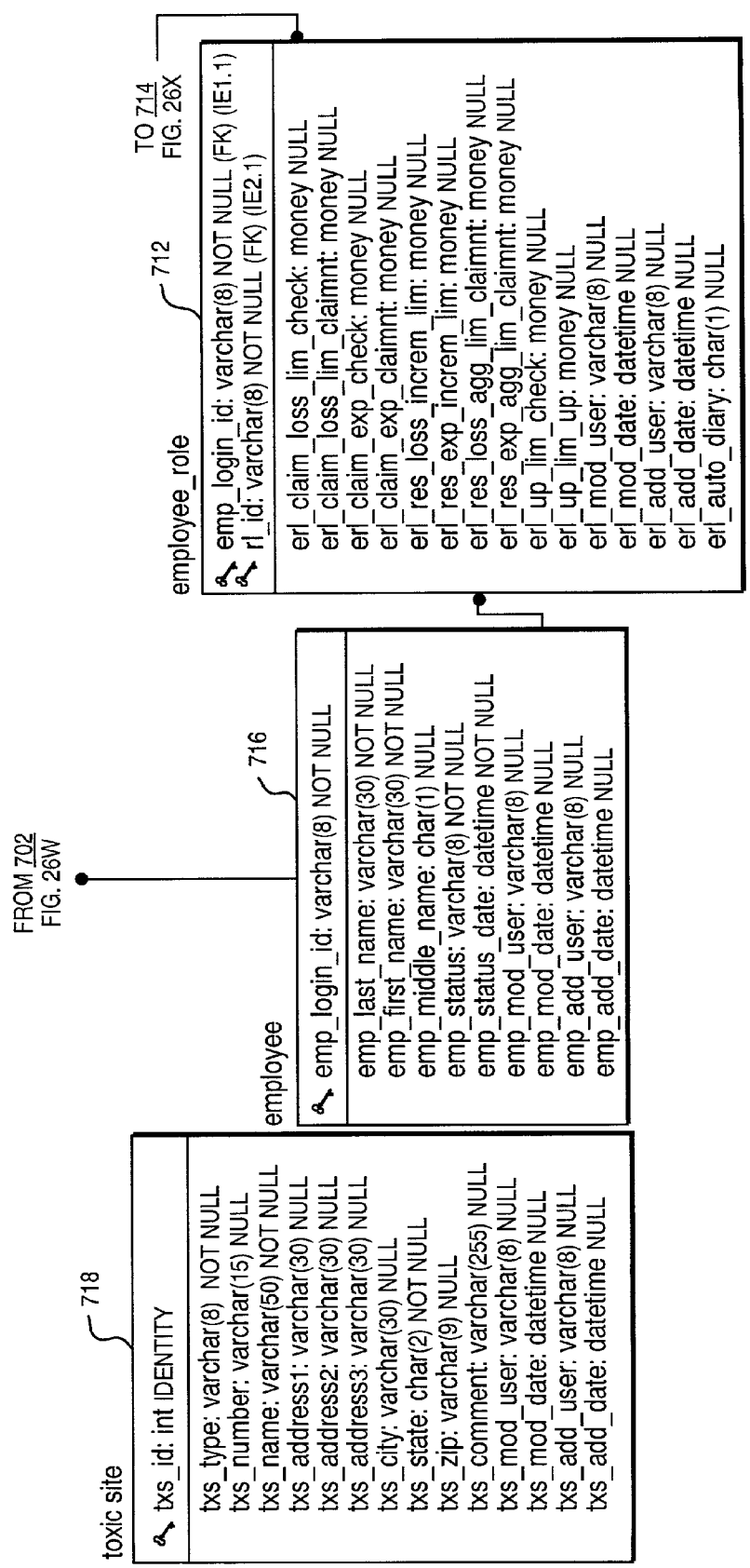
Figure 26Y:
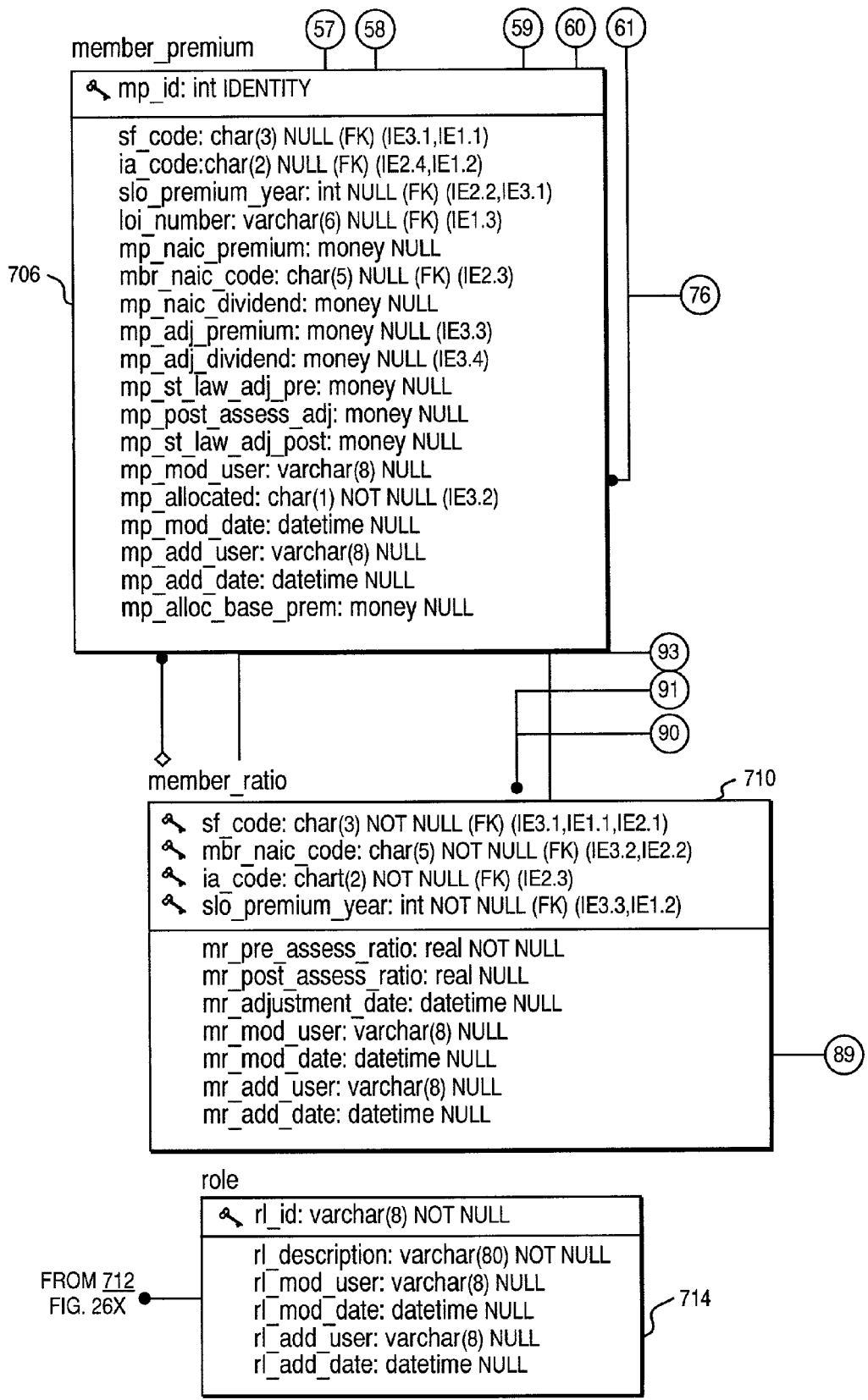

Referring now to FIGS. 26K-26L, shown as a third portion of a representation of a database schema 600. Entity number 632 represents information stored in connection with a financial cash receipt. Entity 634 represents assessment allocation information. Entity 636 represents information for combining members. Entity 638 corresponds to an entity representing an assessment financial status and information. Entity 640 represents assessment correspondence information. Entity 642 represents liquidator information and data.

Referring now to FIGS. 26M-26P, shown is a fourth portion of an example of the representation of the database schema 600 that may be used in connection with unearned premiums, claims, assessment processing, and common functionality processing. Entity 644 corresponds to an agent entity and associated information. Entity 646 corresponds to information that may be used in connection with a W-9 IRS tax information form. Entity 648 corresponds to member state fund information. Entity 650 represents reserve information. Entity 654 corresponds to a members nationwide premium information, for example, as may be used in connection with assessments. Entity 656 corresponds to the state fund lines of insurance per year and associated entity data. Entity 660 represents a file location entity and associated information, and entity 662 includes the claimant entity and associated data.

Referring now to FIGS. 26Q-26T, shown is a fifth portion of a representation of the database schema corresponding to 600 in accordance with FIG. 26A. Entity 670 corresponds to an entity for the claimant UDS coverage code information. Entity 672 includes member premium insolvency information. Entity 674 represents a note entity and corresponding information. Entity 676 represents the state fund year member tracking policy holder information per year, per member, per state. Entity 678 represents a payment and associated information. Entity 680 corresponds to a system transaction such as in assigning a value and information in accordance with records stored within the system of this particular implementation. Entity 682 corresponds to a journal code entity which relates to an outside accounting module. Entity 684 corresponds to a reversal entity and associated information. Entity 686 corresponds to a cash receipt detail and associated information. Entity 688 corresponds to a recovery entity and associated information. Entity 690 corresponds to a member insurance account entity and associated information. Entity 692 corresponds to a state fund year status entity and associated information. Entity 694 corresponds to a GL (General Ledger) account entry and associated information. It should be noted that entity 692 represents information regarding premiums in connection with assessment processing, by state, by year.

Referring now to FIGS. 26U-26Y, shown is yet another portion of the database schema 600 in accordance with the previous descriptions shown in FIG. 26A. Entity 700 corresponds to a claim entity and associated information. Entity 702 corresponds to a diary entry or note and corresponding data. Entity 704 corresponds to a state fund year insolvency and associated information. Entity 704 represents assessment information that may vary by state. This is similar to the information represented by entity 692 with the difference that this describes information on an insolvency level of granularity. Entity 706 corresponds to member premium information entity. Entity 708 corresponds to a diary history entity and associated information. Entity 710 corresponds to member ratio information, for example, as may be supplied by the NAIC and used in connection with performing assessments. Entity 712 corresponds to an employee role, for example, as may be assigned in connection with different security roles and functions. Entity 714 represents a particular role that an employee may be assigned. Entity 716 corresponds to an employee and employee information. Entity 718 corresponds to the toxic site and associated information.

Figure 26Z:
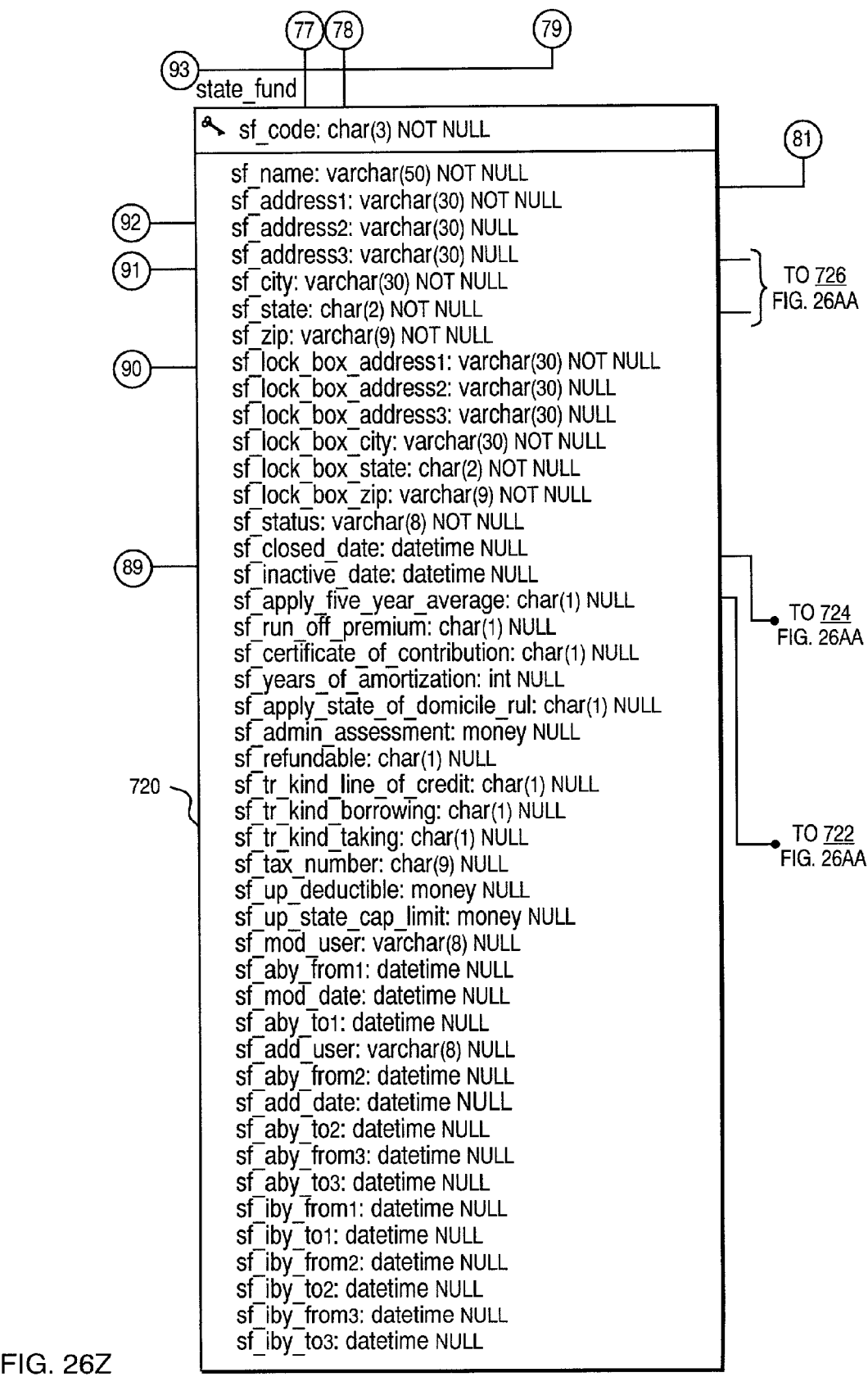
Figure 26A:
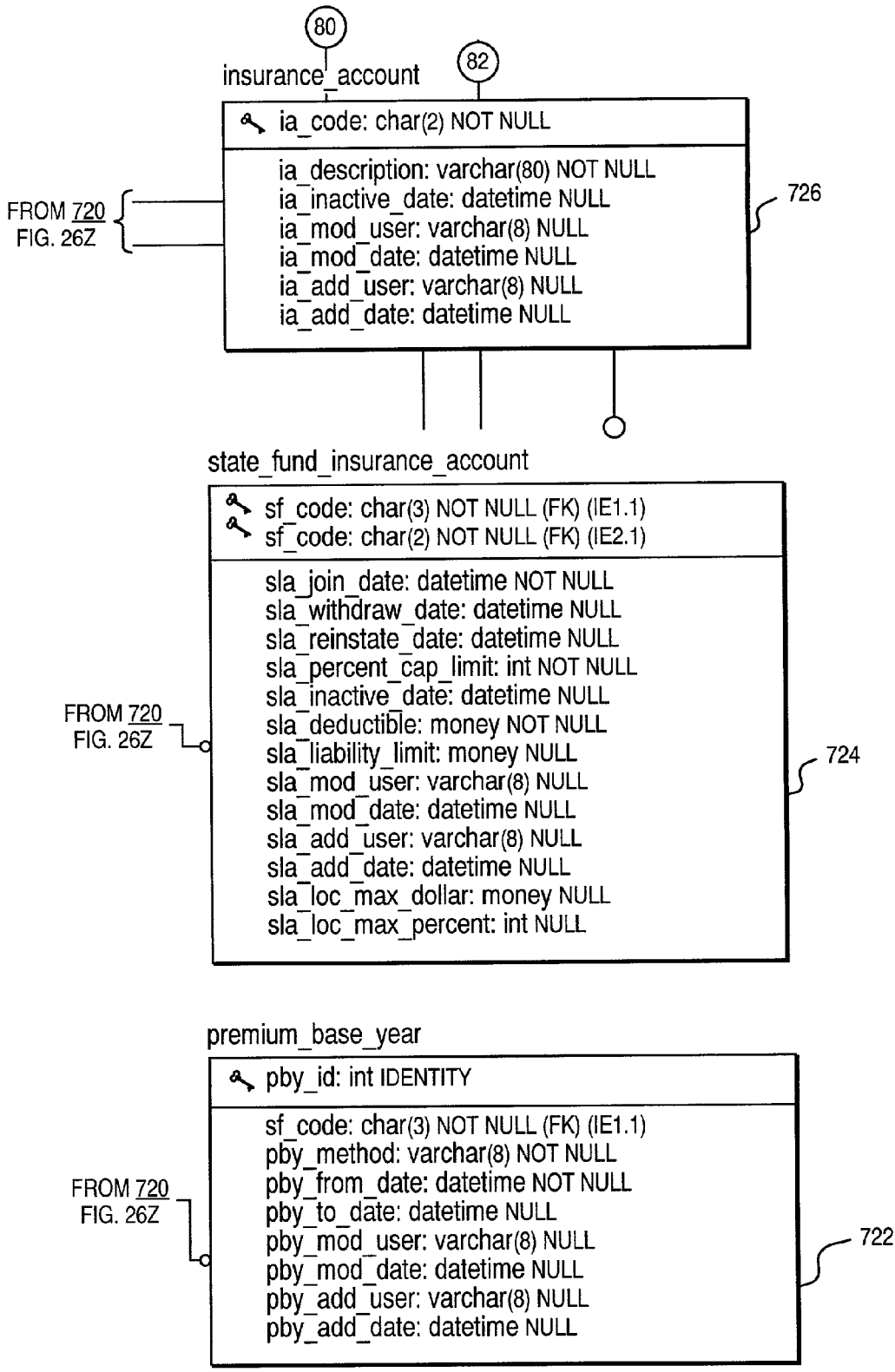
Figure 26B:
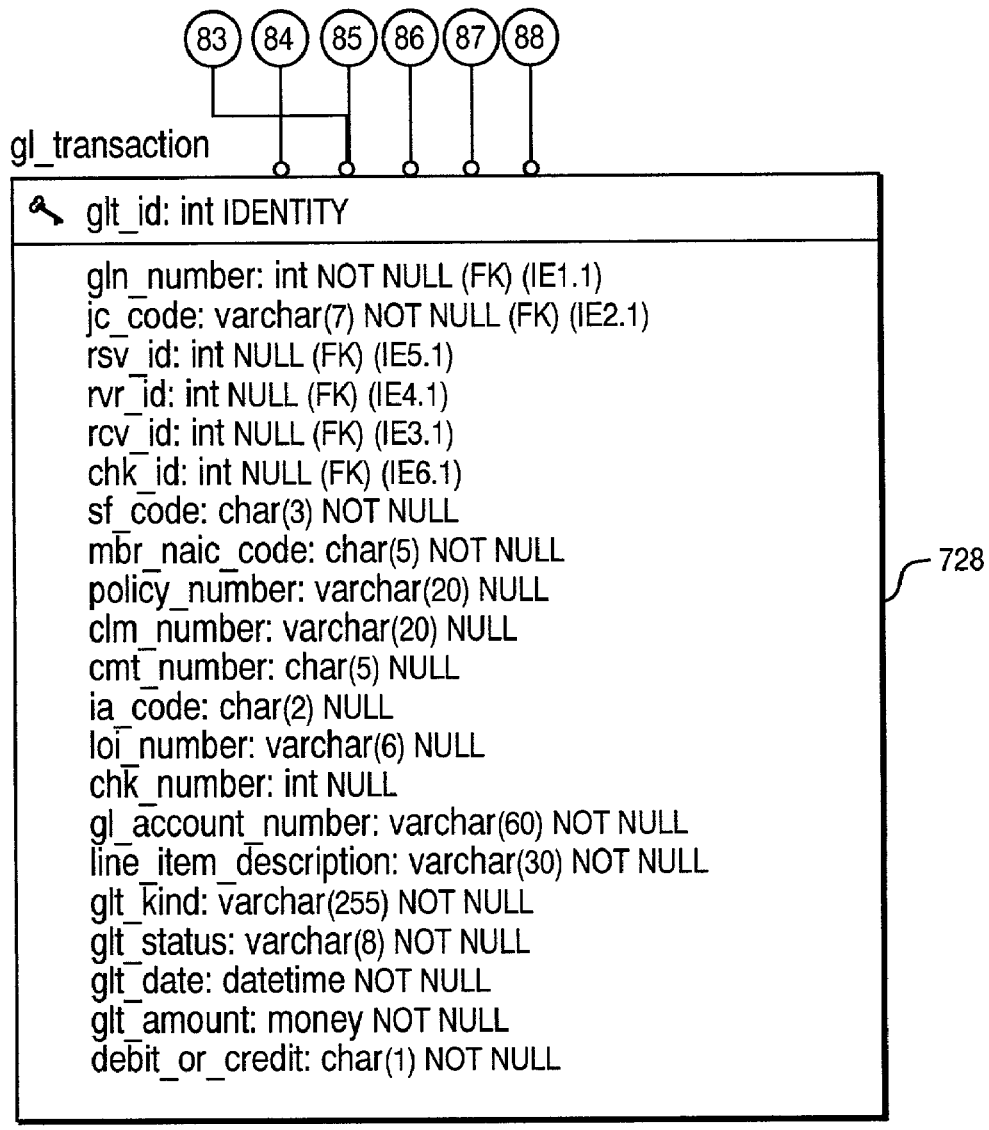
Figure 26C:
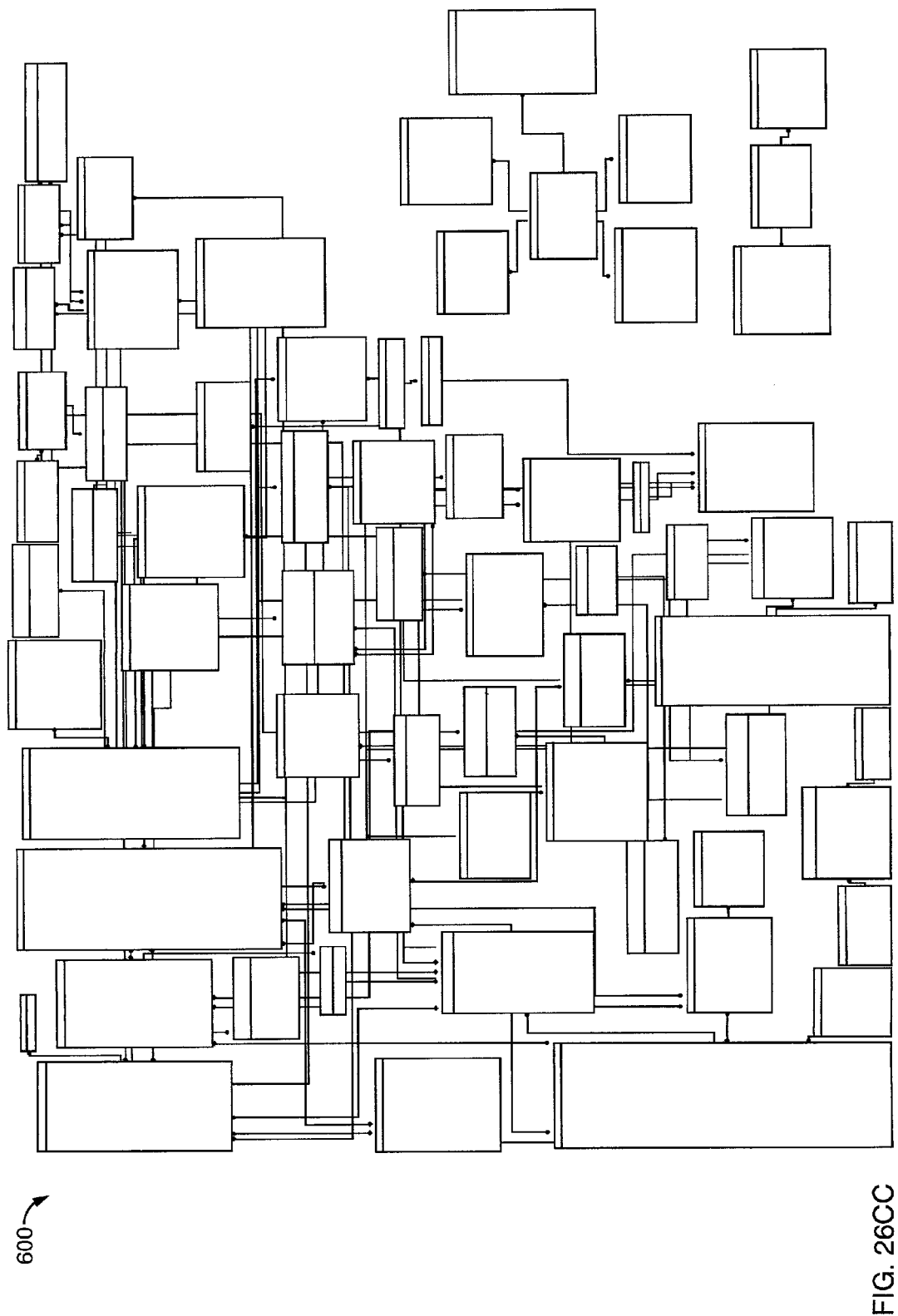
Figure 28A:
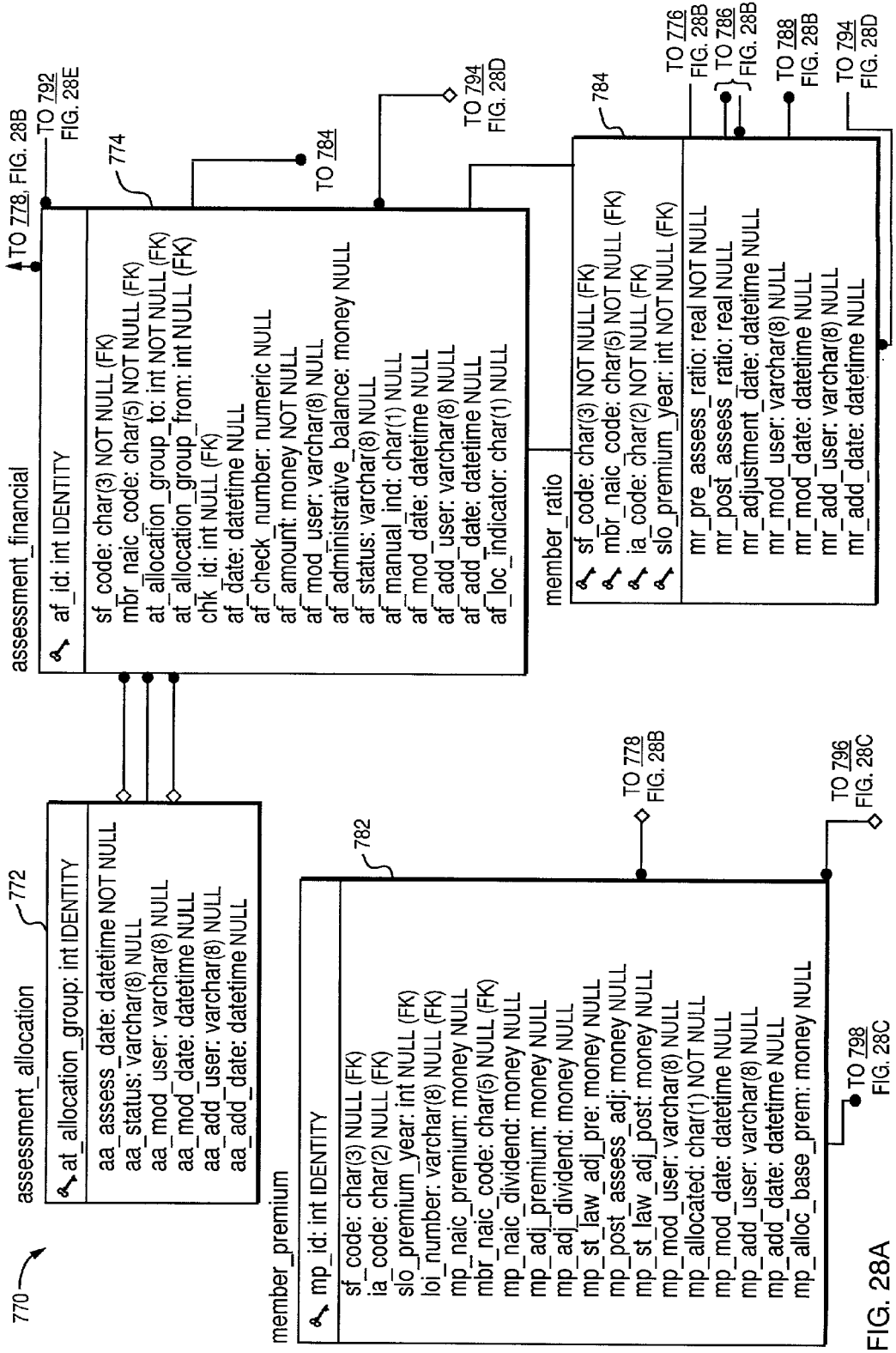
FIGS. 28A-28E are an example of a representation of a database schema in one embodiment that may be used in connection with assessment processing.
Figure 28B:
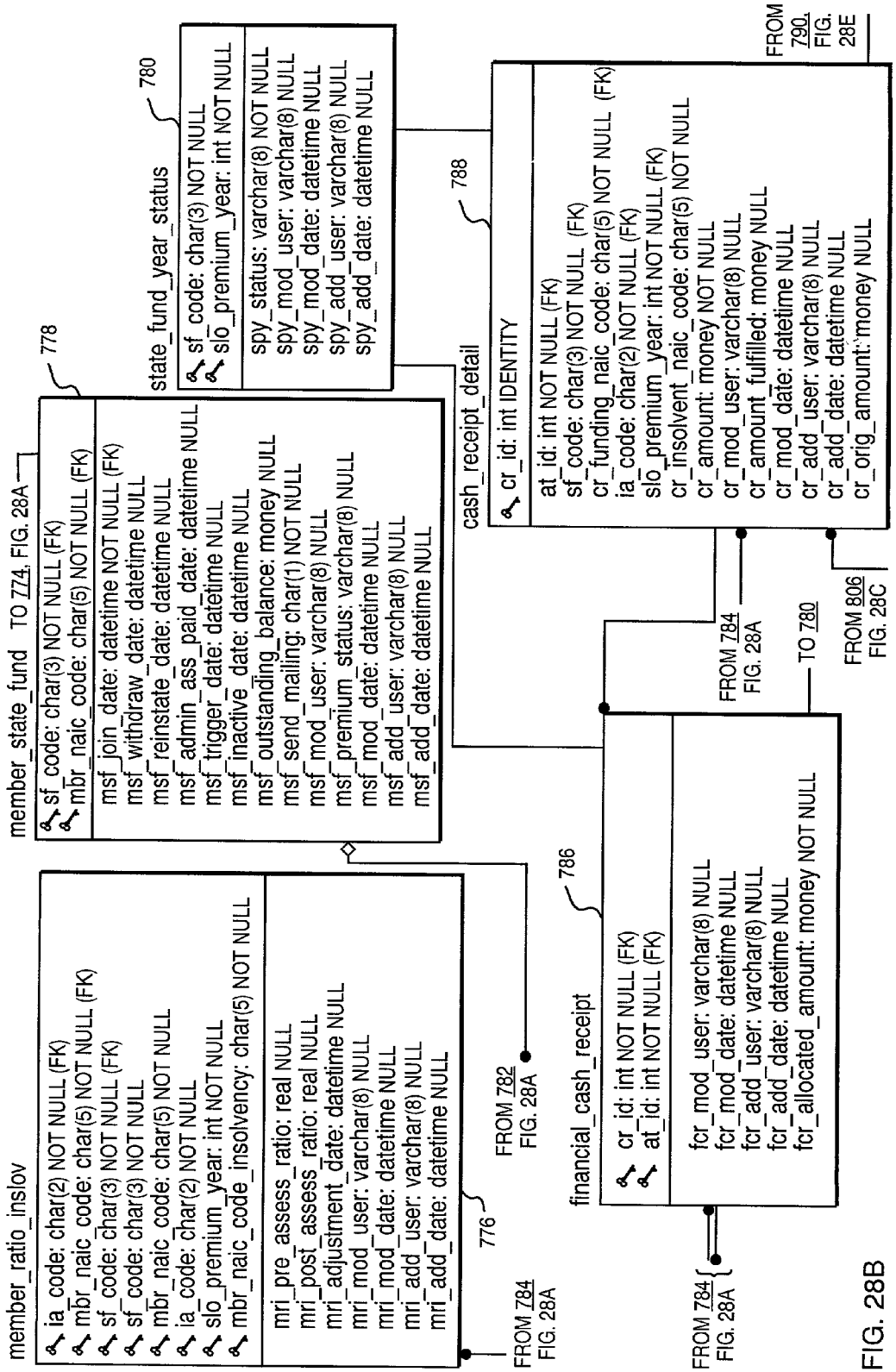
Figure 28C:
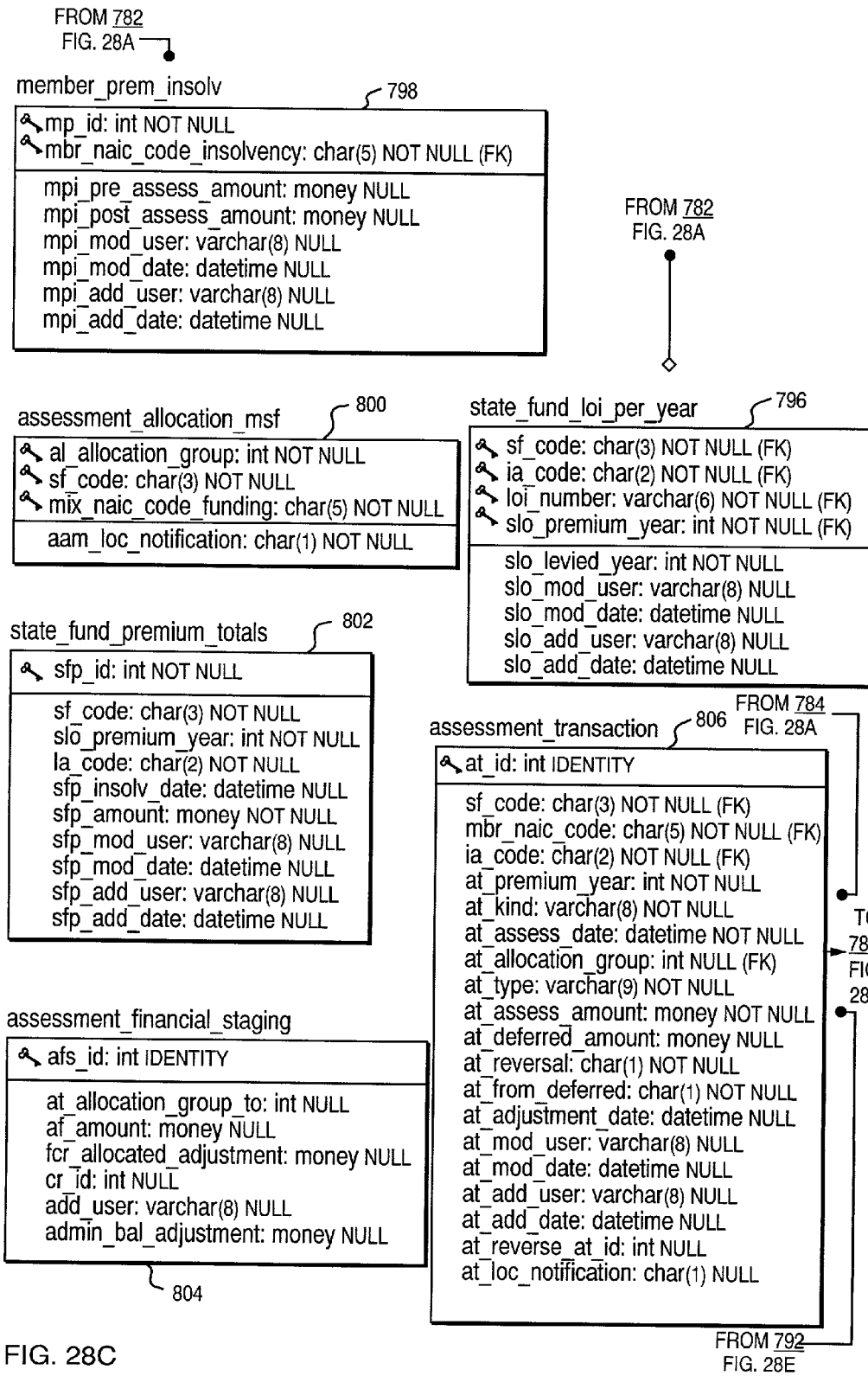
Figure 28D:
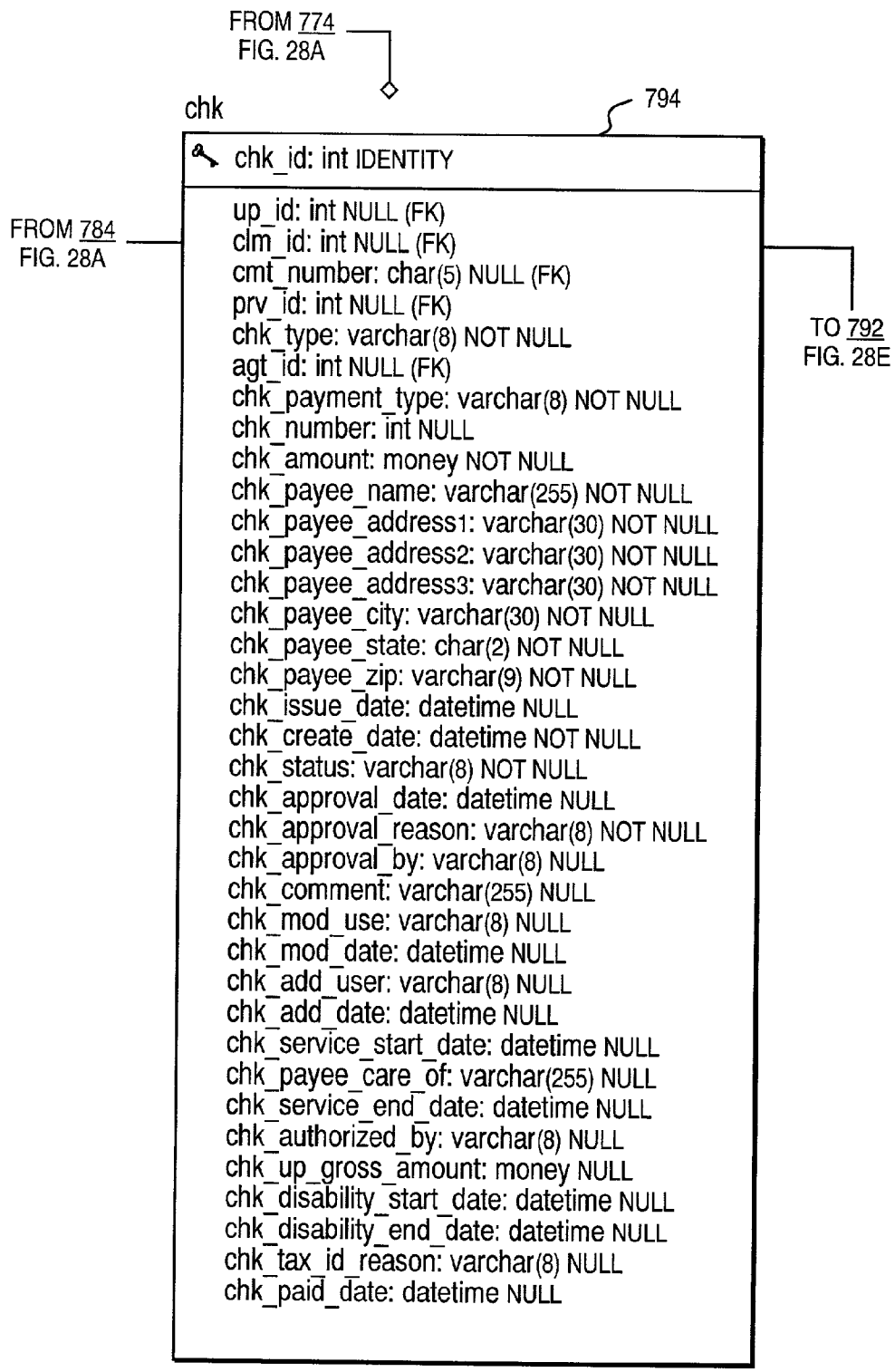
Figure 28E:
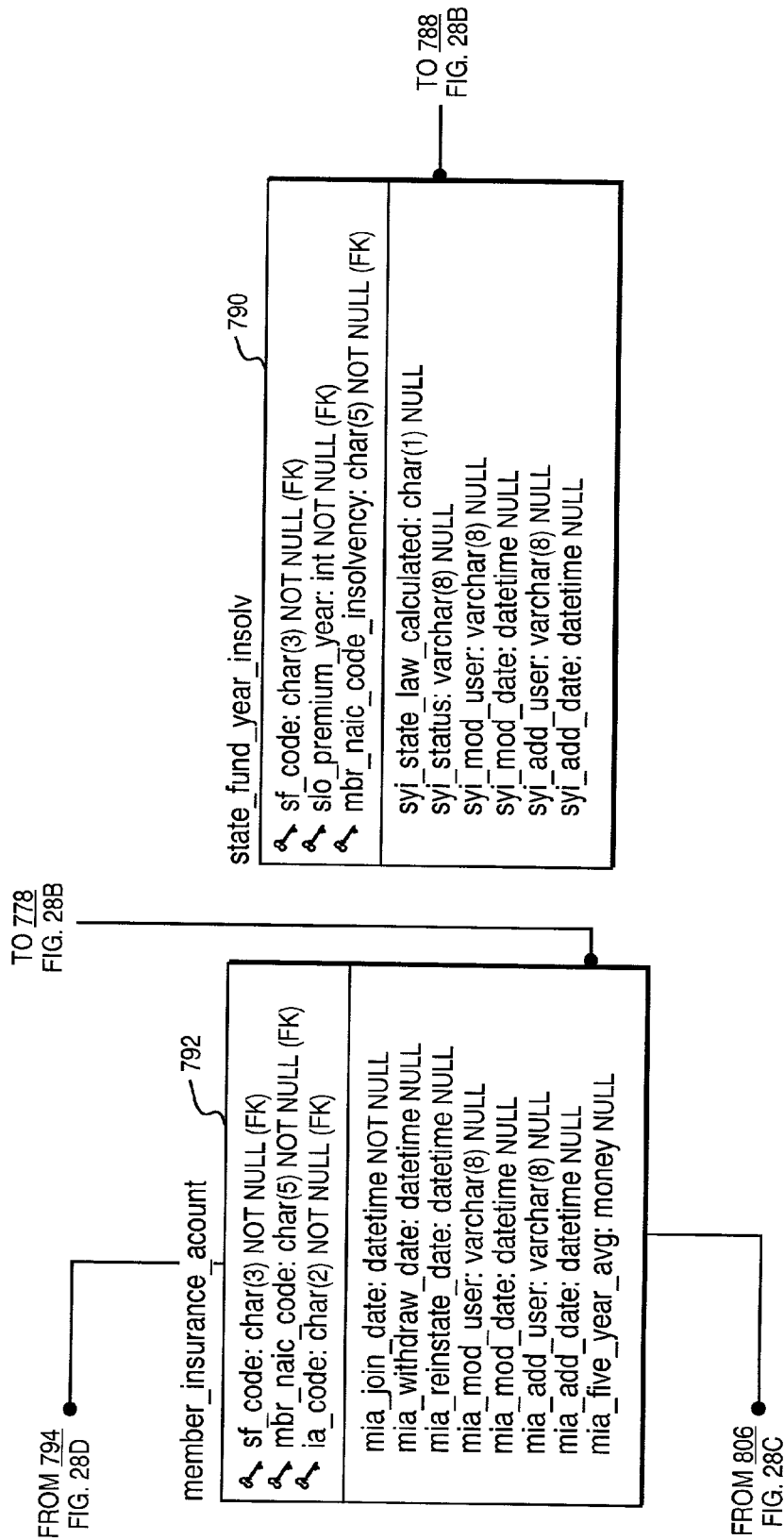

Referring now to FIGS. 26Z-26BB, shown is another portion of the database schema 600 as described previously in connection with FIG. 26A. Shown in FIGS. 26Z-26BB are details of the state fund state entity 720 and associated information, the premium base year entity and associated information 722, the state fund insurance account entity and associated information 724, the insurance account entity and associated information 726, and the GL transaction entity 728 and associated information.

It should be noted that in connection with FIGS. 26B-26BB, various offline connectors are also shown as connecting common entities in the database schema description between the different entities representing relationships between the entities.

Referring now to FIG. 26CC, shown is another representation of the database schema of FIG. 26A and as collectively represented in FIGS. 26B-26BB and FIGS. 28A-28E.

Included in the NAIC database schema representation 750 is the NAIC nationwide entity 752, the NAIC load entity 754, the NAIC member premium entity 756, the NAIC demographics entity 758, the NAIC net income entity 760, the NAIC surplus entity 762, and the NAIC load audit information 764. Generally, the NAIC nationwide information 752 includes nationwide premium information for all solvent members within states requested from the NAIC. The NAIC member premium entity 756 represents information for premiums of the different member insurance companies. The NAIC demographic 758 includes the different types of information provided in accordance with demographic information. Entity 754 represents a control table including status information about other tables included in FIG. 27 except for entity 764.

Referring now to FIGS. 28A-28E, shown is an example of a representation of a database schema for assessment module data that may be included in the database. The assessment data 770 includes a variety of different entities that may be included in an embodiment. The format used in FIGS. 26A-26BB and FIGS. 28A-28E are similar, for example, in the form of an entity and the relationships between entities as may be illustrated by the connectors.

In connection with performing operations, such as assessments, different states may have different rules, statutes and the like setting forth how the funds are assessed and how such funds may be maintained and managed. For example, one state may allow a taking of funds from different insurance accounts while another state may allow for a borrowing of funds between different accounts. Other states do not allow such a taking. Such rules may vary in accordance with each state and may, for example, affect assessment processing, claim payments, unearned premium payments and the like. By having modularized structure as described herein, an embodiment may compartmentalize specifics, such as rules, that may vary in accordance with state, such as by associating a particular customized SQL procedure with performing calculations and including rules as may vary with each state. This may provide for minimum impact on coding changes, for example, and other code maintenance benefits.

In connection with performing different processing operations, different types of data may be used and produced. For example, in one embodiment, NAIC may provide data used in connection with performing assessments, such as information as to the number and ratio of premiums written in each state, LOI, and the like. Claim information for active or pending claims at the time of an insolvency may be provided by different sources in any one or more of a variety of different forms. The system may also produce data in a variety of different output forms, as described elsewhere herein.

The claims processing module and associated functionality may include information tracking what has been paid on a claim before an insolvency occurred. This information may be useful, for example, in tracking different amounts of a claim, and the like including those monies prior to an insolvency. These may include, for example, tracking an aggregate amount or amounts paid out on a claim, such as in connection with the total amounts, for example, as described in connection with FIGS. 22 and 23. In one state, such as MA, personal injury protection (PIP) amounts may be tracked in connection with a claimant per an insured's automobile policy.

Certain policies and coverages on policies have limits, such as no fault medical benefits in Massachusetts. Tracking and totaling amounts paid enables the coordination of insurance benefits.

As described herein, alert messages or notifications may be sent to one or more users on a the system in accordance with predetermined criteria, for example, when a use exceeds authority, reserve amounts, and the like. Limits may be specified and associated with a particular user id, or account, for example, in accordance with different job functions performed. For example, a reserve limit maximum may be associated with a particular user who may be handling particular types of claims. A claims clerk may be processing claims dealing only with towing claims and there should generally be no need to exceed a limit of $200.00 paid out in a claim, or requested to be reserved with respect to a claim. Upon the occurrence of such an event, an alert message or notification may be sent to one or more other users, such as a claims manager, and the like. Such messages may be received by a manager, for example, when the manager reviews his or her diary, or approves claim payments.

As described in more detail elsewhere herein, partial claim records, as may implemented using a record type of CBN, provide for creation of an incomplete or partial claim record. In one embodiment, a CBN and associated information may be entered, for example, when insufficient information is obtained for entry of a complete claim. Rather than provide for no data entry until all claim information required is available, an incomplete claim entry may be made with a corresponding special status as may be indicated and designated in a status field displayed in connection with the data entered and displayed. When the status corresponds to a CBN, there may be no required minimum number of data fields and values associated with a record. Alternatively, for a status associated with a complete claim, certain data fields are required for a data record to be entered and saved, for example, in the database.

A claim's status may be modified from "CBN" to that corresponding to a complete claim when additional needed information is obtained. Such a function associated with incomplete claim information and record creation may be useful in a variety of situations. For example, CBN status may be entered for those claims "in process", such as while physically locating a file with other information needed. This provides for partial claims data entry and creation. In another example, an insurance company in a particular state may be declared insolvent. A policyholder may notify the insolvency service provider of the occurrence of an accident in which the policyholder was involved and others were injured. These others may be making later claims under the policyholder's auto policy but no actual claim has yet been made by another. The use of the CBN or partial claim status, for example, may allow a claim handler to create a CBN status entering partial information, notes, such as those in connection with the policyholder's version of events, and the like. Subsequently, this information may be updated or added to when an actual claim is later made by another.

It should be noted that in the foregoing description, a claim may be blocked from further financial processing operations and financial claim entries. Mechanisms described herein, such as use of diary entries automatically created, may be used to notify other users associated with this blocked claim as to its status and may also include other information, such as a text description as to why the claim is blocked.

It should be noted that in one embodiment, portions of the functionality described herein is written in Visual Basic and using SQL procedures as described herein. Different security checks may be performed in accordance with the use of, for example, security objects of Visual Basic and database access operations such as in connection with SQL procedures.

As described elsewhere herein, an assessment and associated operations may be performed by the assessment module 40. Assessments may be performed, for example, when a determination has been made that additional monies are needed to pay for claims of one or more insurance insolvencies. A determination is made as to whether or not an assessment is actually levied. This determination may be performed, for example, at predetermined times, such as annually. Additionally, a determination may be performed in connection with an occurrence of an event, such as upon the occurrence of a new or large insolvency.

Insurance companies file annual statements with the NAIC. Information that is included in these annual statements may be used in connection with an assessment that may be performed by the system 10 of FIG. 1. What will now be described are operations that may be performed in connection with an assessment.

As described elsewhere herein, state insurance accounts are associated with one or more lines of insurance (LOI) for each state, for each premium year. This mapping may change depending on, for example, coverage provided by state or other statutes. Once this mapping is performed, data included in the NAIC provided data, such as may be provided from annual reports filed by insurance companies, may be loaded. This functionality may be performed in connection with a user selecting, for example, the NAIC Data Load option 156g from FIG. 9A. In this embodiment, loading the NAIC data may be performed in a two step process. The first step includes performing a staging of the NAIC data in which it is loaded into a temporary area for viewing, and the like. Subsequently, the data may be permanently loaded into the database included in the system 10 populating other data tables, for example, premium tables as shown in connection with FIG. 9B. In other words, other portions of the database and NAIC data that may also be displayed and used in connection with other operations are updated when the NAIC data is actually "loaded". Until the completion of the second step, the NAIC data is in a holding area for clean-up, and other operations as may be needed.

Figure 29:
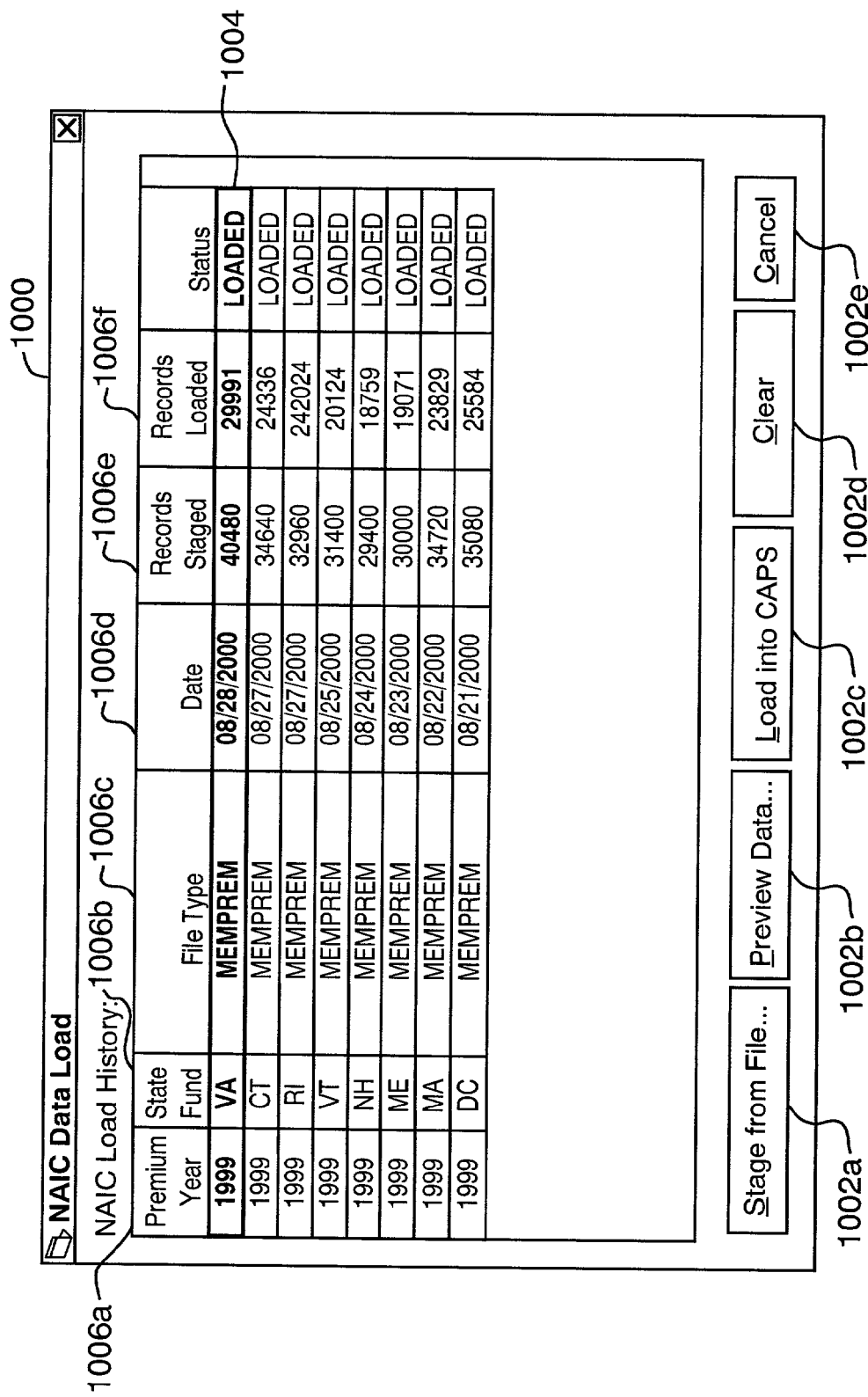

Referring now to FIG. 29, shown is an example of a screen shot 1000 that may be displayed in connection with selecting the NAIC data load option 156g from FIG. 9A. This NAIC data load window 1000 may be considered the starting point for all NAIC load activities displaying the current status of all of the NAIC files and data included therein. The user may stage data from the NAIC input files, preview this existing staged data loaded into the temporary area and finally load the staged data into the database permanently from its temporary area. Displayed in connected with the screen shot 1000 is the NAIC load history. This load history information may include a running list of past and current data load activity. For example, in connection with a single record 1004, information that may be included is the premium year 1006a for which the data is staged or loaded, an associated state fund 1006b for which the data is staged or loaded. Additionally, a file type 1006c indicates the type of data that is staged and/or loaded. In this example, it may be one of five types including member premium, demographics, surplus, net income, nationwide premium.

Also included is a date 1006d that the data was staged or loaded as well as the number of records staged 1006e from the NAIC file into the temporary holding area. The records loaded 1006f indicate the number of temporary records loaded from the staged area into and integrated into the actual database. Note that the records loaded column may be indicated as blank when the data is currently in the staged status and not yet loaded from the temporary area and integrated into the database. The status column 1004 indicates that the associated data is either staged in which the data may be previewed or actually loaded into the database.

In this particular example, a user may highlight various rows in the grid to perform associated functions. For example, highlighting a row with a staged status may allow the user to either preview that file or load it into the CAPS database permanently. The grid may be sorted by date in descending order with the most recent rows of data in accordance with the actual date appearing first.

Referring now to FIG. 31, shown is a screen shot 1010 that may be displayed, for example, in connection with loading data from the NAIC files into the temporary file staging area. This screen shot 1010 may be displayed, for example, in connection with selecting other staged from file button 1002*a* in connection with FIG. 29. In connection with the screen shot 1010, the user enters various information such as different file types, premium years and state funds in order to load a particular NAIC data file into the temporary staging area in accordance with, for example, a particular premium year, state fund and/or file type.

Upon successfully importing NAIC data into the file staging area, a new entry may appear, for example, in the screen shot 1000 of the NAIC data load. This data may be listed at the top of the load history grid as the most recent, for example, such as entry 1004 as the most recent displayed in connection with the screen shot 1000.

Referring now to FIG. 30, shown is an example of a screen shot 1018 that may be displayed in connection with reviewing NAIC data. In this example, the screen shot 1018 may be displayed, for example, upon a user selecting the preview data option from button 1002*b* of screen shot 1000. The data displayed in connection with the preview data button 1002*b* as in connection with the highlighted portion of screen shot 1000. In this example, screen shot 1018 displays detailed data in connection with the state fund of VA or Virginia for member premium information in the year 1999 as noted in element 1004. The data associated with this file may be previewed and displayed in screen shot 1018.

Referring back to FIG. 29, it should be noted that the "load into CAPS" button 1002*c* is grayed out indicating that it is inactive for the currently highlighted row 1004. This is because this data that is highlighted has a status of loaded. The grayed out button 1002*c* to actually perform a load operation is only active in connection with a row of the load history which has a status of staged that is highlighted. Data that is already loaded into the system with such a status is permanent and is not able to be reloaded. If a user now selects the load button 1002*c* in connection with a highlighted row such as 1004 but a status is indicated as staged, the user may be prompted with a warning message that they are about to load the staged data permanently into the system. If the user then selects to continue, the staged data may be loaded into the system permanently integrated into the database. This process may take a particular amount of time in accordance with the amount of data to be integrated into the database. Once completed, a message may indicate to the user's success or failure of the operation. If successful, the row in the grid of screen shot 1000 will have a status of loaded.

It should be noted that when loading member premium data, the LOIs may be mapped with those specified in the NAIC data. This may be done when previewing the data. Any LOIs that are not mapped and included in the system may be highlighted. The user may then modify that state fund and premium year line of insurance in the state fund window. In other words, the user may either add or delete a line of insurance to map to a particular account or state fund.

A different type of data that may be loaded is the demographic information. The demographic information may include, for example, business type, state of domicile, or group code.

Figure 32:
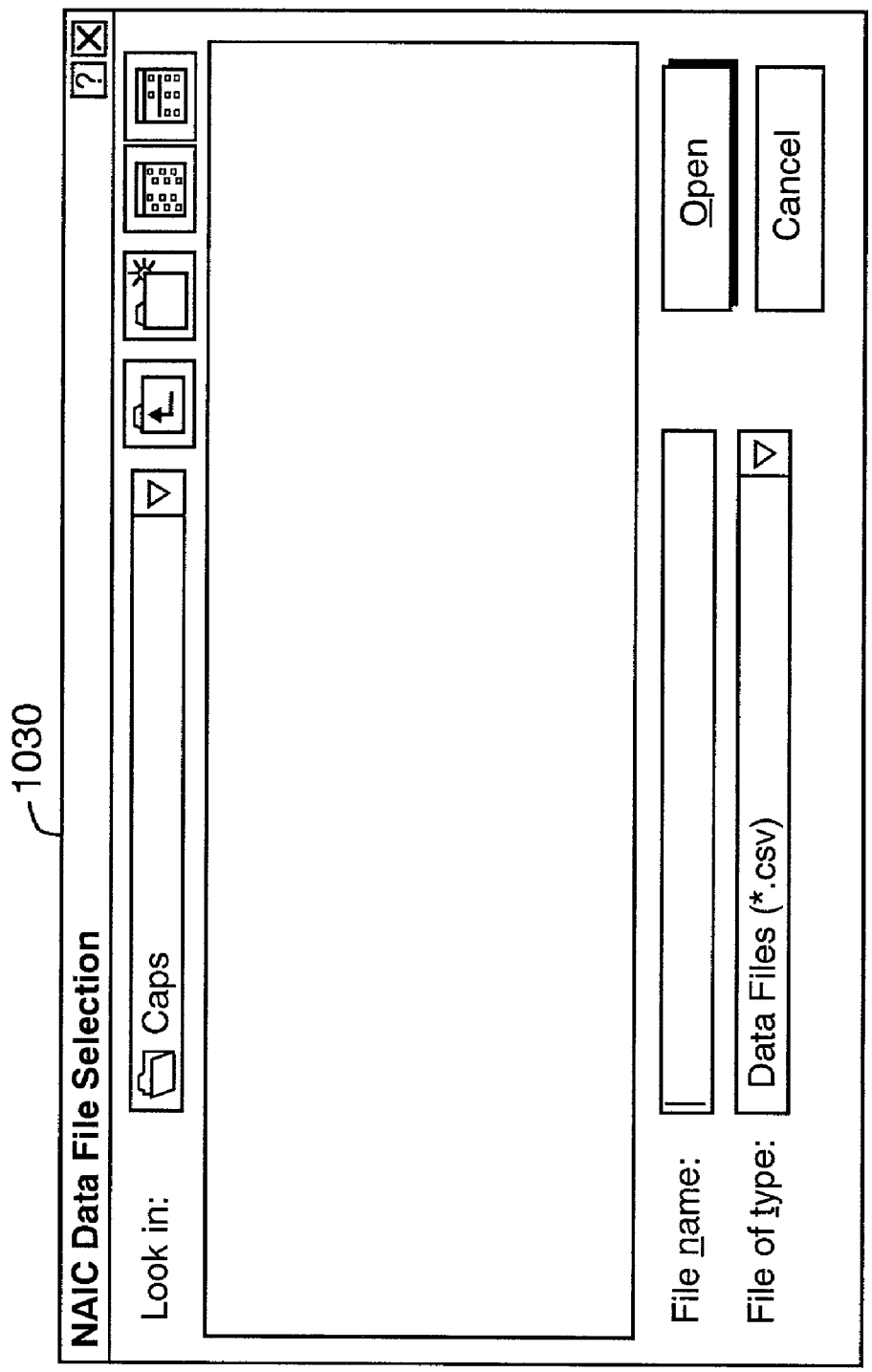
Figure 33:
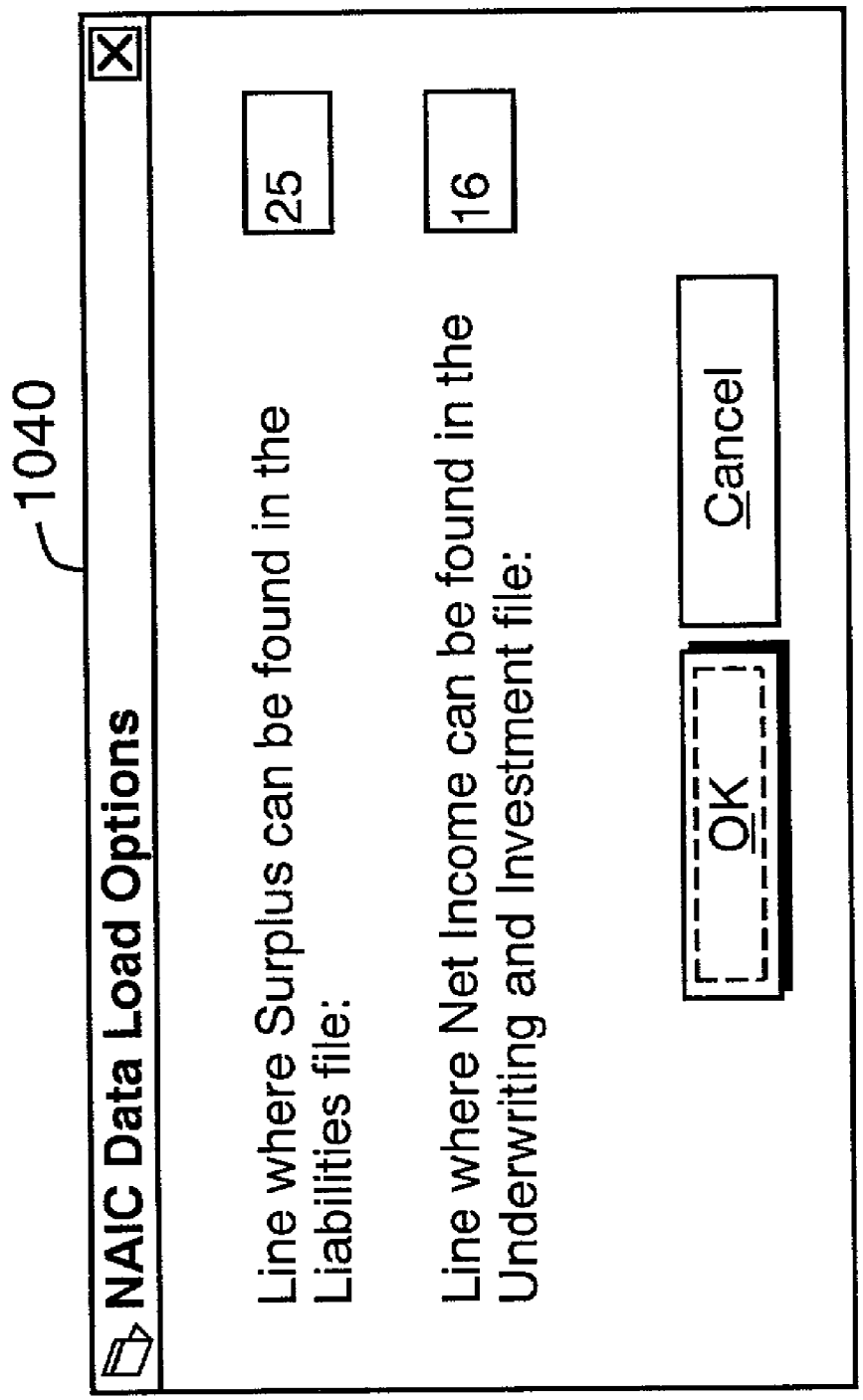

Referring now to FIG. 32, shown is an example of the screen shot 1030 that may be displayed in connection with loading an NAIC file, for example, in connection with screen shot 1010. In particular, the open file icon in screen shot 1030 may be displayed in connection with opening a file such as that may be designated in the file name field of screen shot 1010. Referring now to FIG. 33, shown is an example of a screen shot 1040 that may be displayed in connection with NAIC data load options. The screen shot 1040 may be displayed, for example, upon the user selecting the options button 1012 from screen shot 1010. The NAIC data load options window allows a user to change preset defaults regarding where certain elements may be located within the NAIC file. For example, in a liabilities file, surplus may be indicated on a particular line number such as line number 25 for each member. Similarly, in an underwriting and investment file that is opened, net income may be located on line 16 for each particular member. Since NAIC provided data may move or be located in different lines in accordance with the different years and data provided by the NAIC, in other words, the format may change, use of this override load option provides a means for accommodating those changes in according with the changing file format and data format that may be provided in accordance with NAIC data. It should be noted that those options indicated in the data load options screen 1040 are stated only for those files currently being staged and are permanently stored. Functionality may vary in accordance with each embodiment.

Referring back to FIG. 30, the screen shot 1018 provides for a data preview of a particular file. As previously described in connection with screenshot 1018, the member premium allows the user to preview the staged data before it is actually loaded into the system. Furthermore, any lines of insurance that do not match the current state fund and premium year may be highlighted on the screen. The user may then reconcile these before loading the data permanently. Additionally, a user may view data after it is loaded.

It should be noted that in this example, most insurance companies report data to the NAIC and the data provided by the NAIC is a "superset" of the data that may be loaded into the system 10 of FIG. 1. In this embodiment, those companies that are members may have their premiums and other information loaded into the system 10 of FIG. 1 although all NAIC data may actually be reported.

Other file types may have other screen shots, for example, displayed in connection with the different types of data included in a file. That data displayed in connection with screen shot 1018, for example, includes those data fields that are relevant for member premium.

Once the NAIC data has actually been loaded and integrated into the system 10, premium tables and other types of data fields may be populated. In other words, loading of the NAIC data causes integration of the NAIC data into other data entities as described elsewhere herein.

Subsequently, the premium item from the menu of FIG. 9A 156*c* may be selected in connection with viewing and editing premium information of member insurance companies in preparation for an assessment. In connection with the premium menu option 156*c*, the assessment may be properly allocated in accordance with member ratios generated for each member for each insurance account within a state fund. A member's ratio determines the portion of the assessment that a particular member may be charged and/or refunded. The process premium functionality that will now be described may be used to fine tune data loaded from the NAIC. Generally, the data received from the NAIC may be adjusted to account for, for example, reclassifications, allocations, and other discrepancies. An embodiment may also use functionality that will be described in connection with the premium option 156c to enter every premium for each state fund member by line of insurance without, for example, actually importing any data using the NAIC load data option. However, this may be a very laborious task and the NAIC load data option may alternatively be the preferred way of performing this to load the large amounts of data and then modifying them as necessary using the premium option 156c.

Referring now to FIGS. 34 and 35, shown are examples of screen shots 1100a and 1100b that may be displayed in connection with selection of the option 156c from FIG. 9A menu. It should be noted that in connection with the premium subtotals tab, the screen shot 1100a and 1100b show left and right portions of data that may be associated with a scrolling motion. In other words, using the arrow keys included at 1102, for example, in connection with FIG. 34, a user may move left and right through the data displayed in connection with the premium subtotals tab and display varying portions as included in screen shots 1100a and 1100b. The screen shots 1100a and 1100b display various insurance account information for premiums in accordance with each member.

It should be noted that the various accounts such as auto, other and worker's compensation that may be displayed in connection with the premium's subtotal are dynamically displayed and may be updated in response to the creation of a new insurance account or a modification to an existing insurance account.

Referring now to FIGS. 36 and 37, shown are screen shots 1140a and 1140b that may be displayed in connection with the member ratios tab of the premium summary window. Previously described in connection with FIGS. 34 and 35 are the premium subtotals tab of the premium summary window that may be displayed in connection with selection of menu option 156c by selecting the member ratios tab such as 1104 from screen shot 1100a. The member ratios tab may be displayed as shown in connection with screen shots 1140a and 1140b. Similar to that as described in connection with the premium subtotals, screen shot 1140a shows the left hand scrolled portion of the data associated with a particular member for the member ratios and screen shot 1140b shows the right hand portion of the scrolled right data in connection with a particular member.

In connection with the premium summary window such as with the premium subtotals tab and the member ratios tab, member premium totals and the member ratio totals respectively are separated by each insurance account. The information displayed in the grids in each of the tabs is read only in this particular embodiment and may be modified in connection with other operations.

Generally, the information included in the premium subtotals tab with screen shots 1100a and 1100b indicate premium for each particular member as may be included in a particular account.

The information that may be displayed in connection with the premium summary, including the premium subtotals and member ratios tabs, may be displayed for a particular state fund and year. The state fund may be specified in field 1108a of screen shot 1100a. The year may be specified in field 1108b of screen shot 1100a. Given each of these two fields of the state fund and the particular year, the member premiums and ratios may automatically be retrieved and populated within the remainder of the fields displayed in connection with FIGS. 34 through 37. In connection with the premium subtotals tab displayed in screen shots 1100a and 1100b, the "premium detail", "add premium" and "delete premium" buttons provide a way for adjusting the premium figures associated with a particular member. These buttons may be enabled when the state fund and year fields are populated.

The status field 1110 of screen shot 1100a is a read-only value that may indicate the status of the member premiums for that state fund and year currently being displayed. In this example, one of four statuses that may be displayed in the field 1110 include: unposted, calculated, allocated, and approved. These will be described in more detail in paragraphs that follow. In this embodiment, "unposted" refers to premium data having this status until member ratios as calculated. When the status is "unposted" or "calculated", all pre-assessment premium amounts may be edited. This includes all amounts in columns to the left of the first insurance PA or post assessment adjustment account as indicated by line 1111. Once the member ratios have been calculated for that year and state fund, those premiums are given a "calculated" status. Once the "calculated" status has been reached, the ratios may be then displayed in the member ratio tab. These premiums may not be returned to an "unposted" status at this particular point. With an "unposted" status, all pre-assessment premium amounts may be edited, as described elsewhere herein. These amounts include all columns displayed, for example, in connection with FIGS. 1100a and 1100b that are to the left of the first insurance post-adjustment or PA column as delineated by line 1111.

An "allocated" status is associated with a premium when the first assessment is allocated which makes use of those premiums. Premiums having an allocated status may not have their pre-assessment values edited. If the assessment is subsequently unallocated and the premiums are in the allocated status, then the premiums are returned to a calculated status.

Premiums reaching a state of "approved" occur when the first assessment is approved which makes use of those premiums. Premiums having an "approved" status may not have their pre-assessment values edited. It should be noted that the approved status is differentiated from the allocated status in that once premiums have the "approved" status, it may not return to the calculated status where they may be edited.

It should be noted that data displayed in connection with the premium subtotal tab and the member ratios tab may be modified in connection with other functionality that will be described herein.

After viewing member premiums and making any changes in connection therewith, member ratios may be calculated. Prior to any member ratios being calculated, the information that may be displayed in connection with member ratio step is blank. Once the member ratios have been calculated, member ratio information is displayed in connection with the member ratios tab. It should be noted that the member ratios may be recalculated as often as required to reflect any changes that have been made to member premiums as long as those premiums remain in a calculated status. The member ratios are based on each state and insurance account and represent a market share of assessable premiums in the state for each of the solvent members. Generally, the member ratio associated with an individual member is a fraction or ratio representing a percentage of the amount of business per member over the total premiums for all of the members in a state for a particular insurance account where the members included are solvent members. It is from these solvent members that assessment monies to handle paying claims and other costs associated with insolvent members are collected.

In certain instances, the premium base needs to be adjusted depending upon what insolvency the assessment is based. In this case, an insolvency date is used to differentiate between state fund and premium year bases.

Referring again to FIGS. 36 and 37 for screen shots 1140*a* and 1140*b*, the "calculate ratios" button 1142*a* is grayed out indicating an inactive status. It should be noted that in this particular example of screen shots 1140*a* and 1140*b*, the status indicated in field 1144*a* is approved thus indicating that the ratios may not be calculated as other calculations have been performed using these ratios. With an unposted or calculated status, the calculation of the ratios uses the premium information associated with a particular member as well as the total amount of premiums written for all members that are solvent in a particular state. As the premium amounts may be adjusted, subsequent calculations of the ratios may also change, for example, in connection with selection of the "calculate ratios" button 1142*a*.

It should be noted that there are instances where a ratio may be adjusted for a single member without affecting the ratios of the other members. This may occur, for example, when a member's premium information has changed after an assessment has been "approved" and a statement and/or checks have been sent out. The re-calculation of an individual member ratio may be done via the "member ratios" tab in connection with the "recalculation" button 1146*a* to recalculate the ratio of a single highlighted member. When a single member's ratio is recalculated, only the numerator putting of the ratio is affected. In other words, the premium total used as the denominator is not recalculated thereby, not affecting all other member ratios. This, the total sum of ratios may be slightly more or less than 100% after a single member's ratio is recalculated.

Referring now to FIGS. 38 and 39, shown are screen shots 1150*a* and 1150*b* that may be displayed in connection with the selection of the premium detail button 1106*a* from screen shot 1100*a*. Screen shots 1150*a* and 1150*b*, respectively, include the left and right portions of data that may be associated with premium totals separated by line of insurance for a single member selected from the premium summary window. In other words, selection of the button 1106*a* from screen 1100*a* displays, for the highlighted member, details of each line of insurance on the member's annual statement. Displayed in connection with screen shot 1150*a* and 1150*b* are those lines of insurance and associated insurance account information for the solvent member American Bankers Insurance Company of Florida. This detailed display may be used, for example, to modify premium values associated with a particular line of insurance for a particular member.

It should be noted as described elsewhere herein, certain fields and data included therein may be modified only in accordance with particular security levels of a user logged into the systems as well as in accordance with the different status, for example, as may be displayed in connection with the screen shots described herein.

In connection with information displayed at screen shots 1150*a* and 1150*b*, the NAIC premium column 1152*a* indicates the original value, for example, as included in the NAIC data. The adjusted amount or substitute value is displayed in the adjusted premium column 1152*b*. Similarly, for the NAIC dividend 1152*c*, a substitute dividend may be specified in the adjusted dividend column 1152*d*. Additionally, note that there is a state law adjusted column 1152*e* which, in this example, overrides all NAIC and adjusted premiums and dividend amounts. In other words, an adjustment may be made to column 1152*e* in accordance with state statute. This overrides all other data inputs as described herein. The post assessment adjustment overrides all NAIC adjusted premiums and dividends and the state law adjustment. The state law post assessment adjustment overrides all other adjustments. However, entering data into these overriding adjustment fields does not prohibit the user from entering or modifying data in those fields that have been overridden.

Certain lines of insurance, such as 1154*a* and 1154*b* may have more than one insurance account associated with them. In these instances, the user may need to either double click on the row of the insurance account or highlight the row and click the "allocate" button causing an allocation window as in FIG. 40 to be specified where the user may then allocate the total amount for that line of insurance among the detailed lines provided. In other words, in connection with an assessment, monies may be obtained from multiple accounts for one entry requiring further allocation. In one example, a user may use this allocation window 1160 to allocate the dollar amounts for a given entry. For example, if one entry has more than one associated insurance account the total amount is further divided. One instance occurs if the amount is a "line 31" line of insurance. In this example, line 31 lines of insurance are treated as those lines of insurance having multiple insurance accounts. Selection of 1154*b* from screenshot 1150*a* may result in a display similar to 1160. The user may then allocate the total amount between multiple accounts 1160*a*-1160*c*, and further indicate what portion of the amount is not included in the assessment in 1160*d*. In certain instances, a portion of an amount may be deemed non-assessable.

For lines of insurance with multiple accounts, the NAIC premium 1152*a* and NAIC dividends 1152*c* include the total for all insurance accounts associated with that line of insurance as in the NAIC data provided. The adjusted premiums 1152*b* and adjusted dividend 1152*d* columns may also display the allocated dollars at that point in time. The difference between the NAIC data, such as 1152*a*, and the adjusted amounts, such as 1152*b* may represent unallocated dollars. For the post assessment adjustment and state law adjustment fields as with other entries, users may allocate premium and dividend dollars freely. However, if any member's dollars are not correctly allocated such that the allocated amount is zero, an error message may appear at the time the user attempts to calculate a member ratio and the member ratio may not be calculated. An unallocated amount may be seen on the process premium summary window and on the allocation window.

Referring now to FIG. 40, shown is an example of a screen shot 1160 that may be used in connection with aggregate write-ins, for example, as used in connection with line 31 write-ins. The window displayed in connection with screen shot 1160 provides for allocating dollars of one lines of insurance among different insurance accounts. In addition to the line of insurance breakdown, the window displays the allocation total and the unallocated dollars. If the allocation is for a line 31, an additional summary of dollars may be displayed for each of the insurance account totals as provided.

It should be noted that the premium 1162*a* and dividend 1162*b* amount fields are populated from the premium detail window values 1152*a* and 1152*c* respectively. If a state law or post-assessment adjustment has been made, then that amount is used in calculations. The net 1162*c* of the premium and dividend is an amount that is to be allocated before member ratios may be calculated. The unallocated amount in 1101 of 1100*b* screenshot represents the number of allocation total dollars minus the total of the premium dollars assigned to each detail line on the window. When all dollars have been allocated, the unallocated amount in 1101 is zero. Member ratios may not be calculated until unallocated dollars (value in 1101) have been allocated for all lines of insurance for all members.

It should be noted that the grid in the upper right portion 1162 displays the totals by insurance account for the selected line of insurance. This may be included in an embodiment and be inactive in connection with line 31 allocations.

Subsequent to processing of the premiums, member ratios may be determined, as described elsewhere herein. What will now be described is how assessments may be generated which result in the overall or state assessment amounts that are combined in the allocation of the assessment. In other words, member ratios multiplied by the assessment amounts equals the amount of the assessments that are allocated and paid in the accordance with each member.

It should be noted that a gross assessment may be performed in connection with selection of a menu option, although not shown, in connection with FIG. 9A. In other words, an additional menu option similar to the "NAIC data load," and "refund search" and the like may be displayed and selected in performing an assessment.

Referring now to FIG. 42, shown is an example of a screen shot 1180 that may be displayed in connection with creating a new assessment. Generally, the user may enter data in connection with screen shot 1180, select the save button 1184b and accordingly cause a record to be recorded with a value specified in the fields. The user may view previously recorded data with the search button 1184a. The state fund field 1182a determines the availability of insolvencies, insurance accounts and kinds. Selecting or changing a state fund value may clear any non-valid fields from other dependent fields. The insolvency field 1182b contains the insolvencies for a given state fund. It should be noted that the type field 1182e in this example may be one of "normal" or a "credit." The "normal" indicates an assessment to be performed. The "credit" type indicates a refund of an assessment to be paid to the members. The "kind" field in this example may be one of four values: regular, taking, borrowing or LOC ("Line of Credit"). These are described in more detail elsewhere herein.

Depending on whether a specified type is "normal" or "credit", the "amount" field 1182g and the "deferred amount" field 1182h may automatically be assigned a positive or negative value, negative for a credit. If "credit" is selected, the premium base year field may be disabled. It should be noted that the "premium base year" method is, for example, the year prior to the year of assessment (default) used in determining the amount of monies allocated to a particular solvent member. For example, the general rule that may be included in the embodiment in calculating the amount of monies a solvent member pays in year "n" may be based on the amount of business that that member did in year "n-1". As described elsewhere herein, other techniques may be used in connection with assessments, such as if the default premium year data is unavailable for this particular member or if an alternate technique is desired.

Refund assessments may require additional or alternative distribution techniques. For example, when a refund is issued, a refund may be in accordance with past assessment ratios. A refund may be allocated, for example, over a period of years based on a period of past assessments rather than for example based on a single year.

In connection with performing a new assessment, it is determined how much cash is in the account or accounts associated by state by insolvency and by account. The guaranty fund board may indicate an amount to be assessed in accordance with each particular set of state fund, insurance account and insolvency, as indicated in fields 1182a-1182c, respectively. The amount assessed is indicated in field 1182g. A deferred amount may also be indicated in field 1182h. A deferred amount may indicate, for example, an amount of the assessment amount 1182g that is to be assessed at a later date or "deferred." Such deferred amounts are not included in calculation performed. Deferred amounts may be, for example, future installment amounts of an assessment. For example, an assessment of a particular insolvency, state fund and line of insurance may be $500,000 to be collected over a period of a year in 4 equal installments. Only $125,000 may be assessed now with a deferred amount of $375,000.

Certain operations, such as the rescind and activate operations, may be performed in connection with deferred amounts. By selecting the rescind button 1184c, data associated with an assessment may be rescinded. The activate operation, as may be associated with button 1184e, causes activation of a deferred amount, or collection of a deferred amount from members.

A user may enter data for performing an assessment by making multiple data entries, for each combination of state fund, insolvency and insurance account. Subsequently, data may be viewed for an assessment by performing a query in accordance with specified search criteria.

Figure 43:
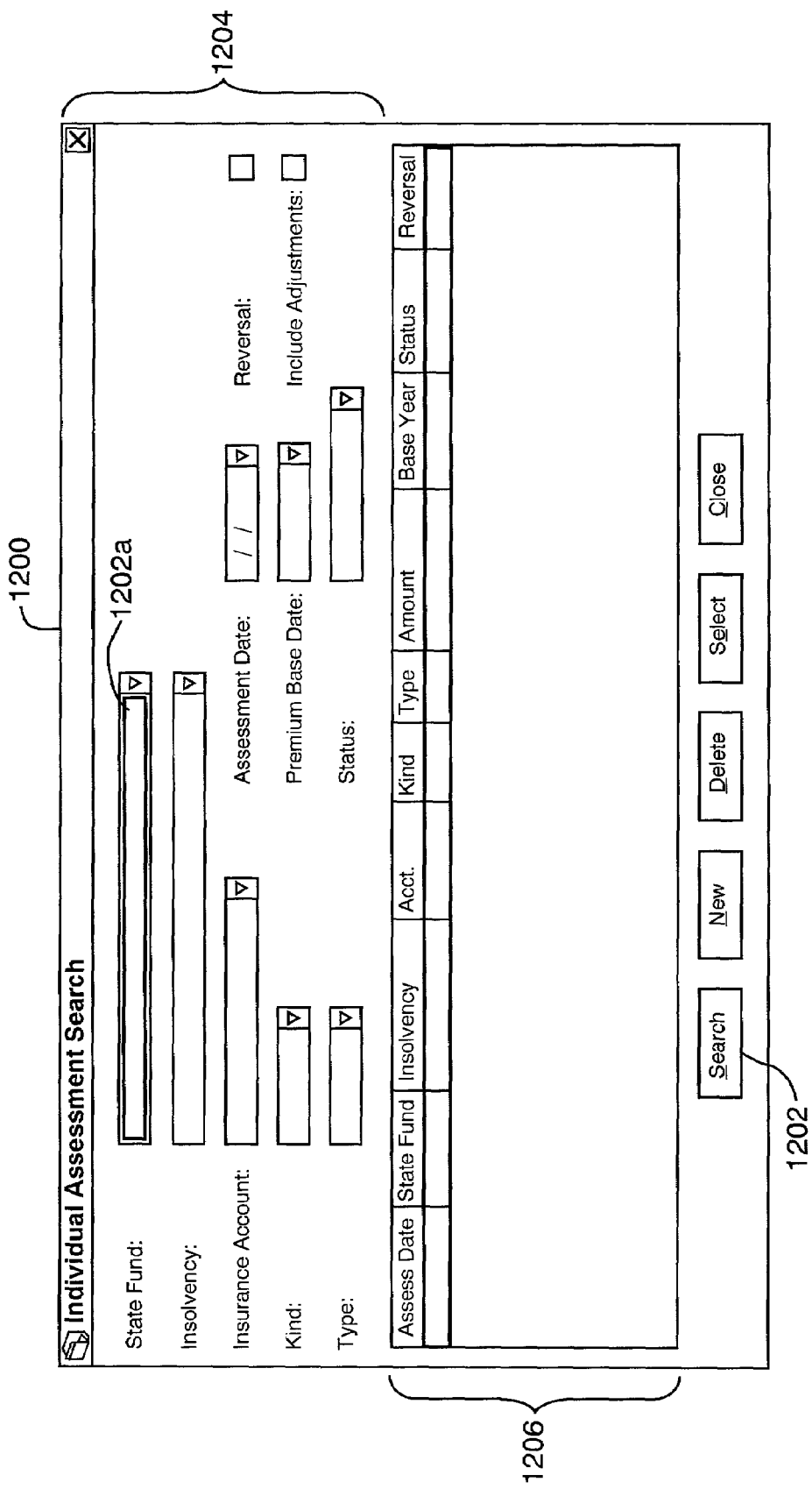
FIG. 43 is an example of a screenshot that may be displayed in connection with searching for assessment information.

Referring now to FIG. 43, data for performing a search may be entered in portion 1204. For example, search criteria may include a state fund 1202a. Additionally, it may also indicate any one or more other data fields included in portion 1204. The search may be performed upon selection of button 1202 and display results in portion 1206.

There may be different kinds of assessments using different automated techniques in connection with performing each type. The particular kind of assessment may vary in accordance with state statute. For example, states, such as Maine and Rhode Island may provide for a "taking" of monies from one insurance account to pay for assessments made in connection with another second account. For a taking in this context, the money is not required to be repaid between accounts. Rather, monies are taken and paid out in connection with insolvencies. Money may be "borrowed" among insurance accounts. Money may be taken from one account, for example, if the maximum amount that is allowed to be assessed in accordance with state law has been assessed. Monies included in one account may be depleted and more may be needed in connection with making payments. Upon this occurrence, additional monies may be "taken" or "borrowed" from other accounts as may also be set forth in accordance with state laws and statutes.

When performing a new gross assessment, an amount to be assessed and/or refunded per account is entered. An amount may be deferred for example in connection with the deferred amount field of screen shot 1180. An assessment may also be activated, rescinded, or reversed as indicated by the appropriate buttons at the bottom portion of screen shot 1180. The activate and the rescind apply to the deferred amount as described elsewhere herein. Generally, the reversal button reverses out or cancels a prior transaction. It may be used to reverse out the old data such as in connection with making an adjustment.

It should be noted that at this point in time that the gross assessment is not actually pro-rated for each member until there is an approval and/or allocation of the assessment in connection with for example, selection 156d from FIG. 9A.

What will now be described is functionality that may be associated with, for example, selecting item number 156d in connection with allocating and approving an assessment from FIG. 9a screenshot. Allocating and approving an assessment provides the functionality for generating assessment totals to the member. Assessment statements reporting these totals may display details to the insolvency and insurance account level for a member. Once member premiums have been established, ratios determined, and gross assessments have been entered, the assessments may then be allocated. The allocation of the assessment is the merging of the assessment dollars and the member ratios functionality. The result of the allocation process is that the assessments by member by are calculated.

Recall that in connection with, for example, screenshot 1180 of FIG. 42, a status of "recommended" may be displayed. The status field in connection with an assessment indicates the level at which this allocation has been performed. In other words, the status of "recommended" indicates a high level in that the assessment has not yet been propagated down to the member level. In connection with data stored in the system 10 of FIG. 1 and data as described in connection with the database schema, for example, in connection with FIGS. 26A-26L and FIGS. 28A-28E, those data fields in connection with members have not yet been affected or updated in connection with the current assessment. In connection with processing an assessment, a status of "allocated" as described elsewhere herein may be selected. In connection with an allocation of an assessment occurs per member. At this phase, the member records are updated, or propagated with data in connection with the current assessment. When an assessment is "approved", cash receipts and check records, for example, may be created in connection with, creating a check file for refunds, and the like.

Figure 44:
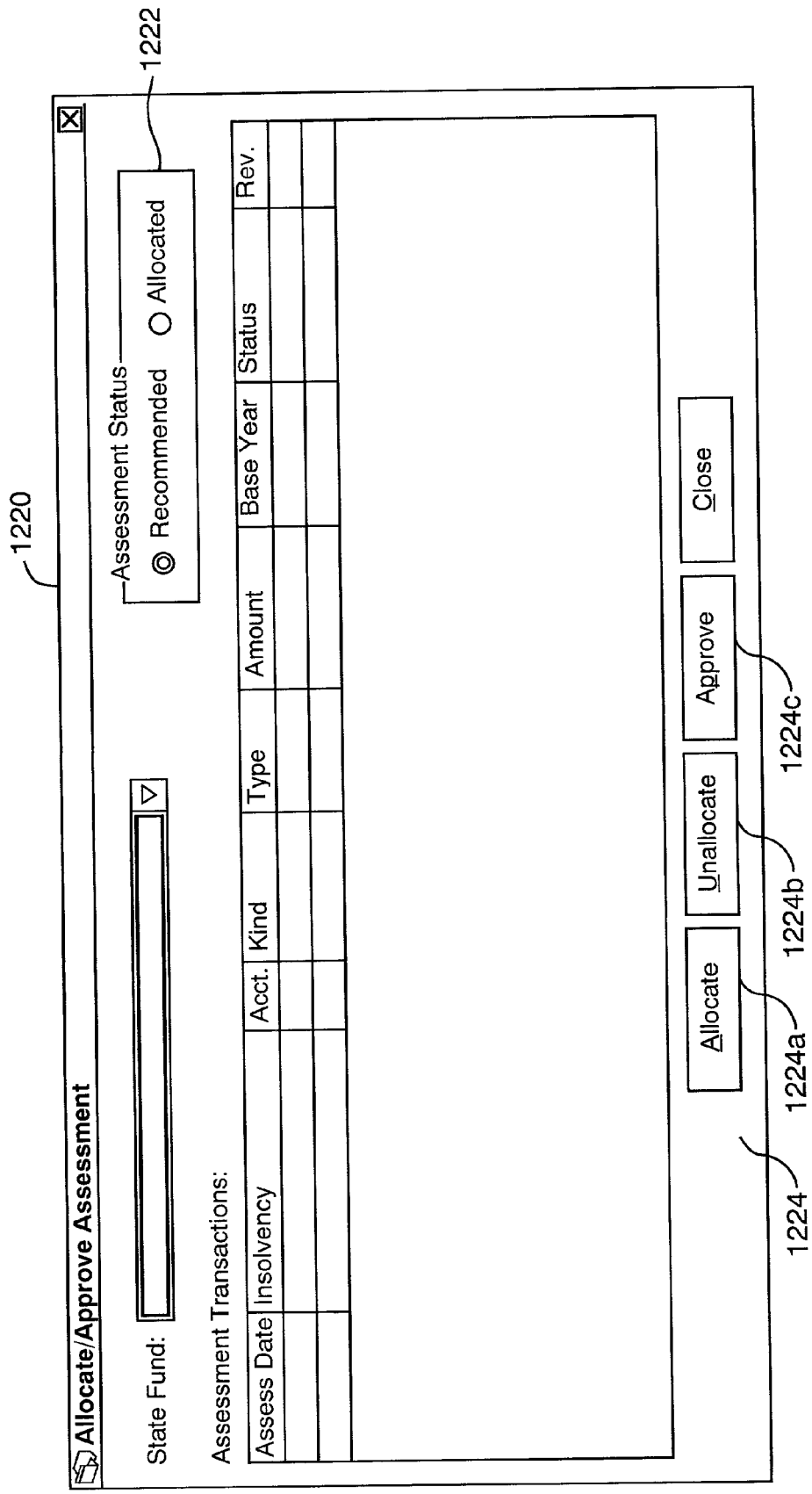
FIG. 44 is an example of screenshot that may be displayed in connection with allocating and/or approving an assessment.

Referring now to FIG. 44, shown is an example of a screenshot 1220 that may be used in connection with allocating and approving an assessment. This screenshot may be displayed, for example, in connection with selection of menu option 156d of FIG. 9A. Included in screenshot 1220, is a right-hand portion of an assessment status 1222 which is indicated by a radio or toggle button of recommended. In particular, assessment may be selected from a list displayed and accordingly have its status changed.

Generally, assessments may be "allocated" at the higher grouping level than at which they are generated. In other words, the generation process for an assessment as described elsewhere herein may be detailed by state fund, insolvency, and insurance account. The allocation of these assessments may be performed at the state fund level. The allocate assessment window for example as displayed in connection with screenshot 1220 may display all of the unallocated assessments for the selected state fund but may only be "allocated" on or unallocated at a state fund level in this embodiment. It should be noted that in connection with screenshot 1220, various buttons may be used in the bottom portion 1224 of the screen 1220 in connection with changing the status of an assessment. Additionally, it should be noted that different types of buttons displayed in the area 1224 may be grayed out displaying them as inactive in connection with a particular assessment status 1222 associated with, for example, a highlighted assessment in the screen portion 1220.

A user may allocate assessments by entering through the appropriate option 156d from FIG. 9A in selecting a state fund, selecting the assessment status of "recommended" and selecting the allocate button 1224a from the bottom portion 1224 of the screen 24. This action may remove all of the "recommended" assessments from the view of the window as they now have the status of "allocated". The user may also unallocate assessments by entering the allocate/approve assessments window in selecting a state fund and then accordingly selecting the assessment status of "allocated" and selecting the unallocate button 1224b that may also be displayed in connection with the bottom portion 1224. This causes those assessments that have previously been "allocated" to be returned to a status of "recommended." A user may approve assessments by entering the allocate and approve assessment window, selecting a state fund, and accordingly selecting a status of "allocated" and selecting on the "approved" button 1224c. This action removes all of the "allocated" assessments from view of the window as they now have a status of "approved".

Once all the premium information has been gathered and assessments for a state fund generated, those assessments associated with this may be "allocated". Allocation may be described as the process of applying member ratios to the gross assessment amounts in order to determine the amount prorated to each individual member, in other words, the individual assessment amounts. When a user selects the allocation feature such as in connection with the allocate button 1224a, all of the "recommended" assessments for a state fund selected are "allocated" to the appropriate member by insolvency and insurance account based on the premium base year. Generally, the logic for calculating the regular kind of assessment includes examining each assessment record having a status of recommended for a selected state and, in accordance with predetermined member ratios associated with selected premium base year, each of the different individual allocations for each member are determined. Once an assessment has been "allocated", this assessment may currently no longer be edited. For changes to be made to the assessment at this point, the user first unallocates the assessment allocation changing its status back to "recommended."

When an assessment is "allocated", a set of member ratios are used, each of which is based on a premium base year. Once an allocation has been performed using one of these premium base years, the pre-assessment premiums and ratios for that year may not be changed. All such premiums which do not already have the status of "allocated" or "approved" are to be given the status of "allocated". The "approved" status indicates that all adjustments made to the premiums are post assessment adjustments and premiums may not be returned to a calculated status by means of unallocating an assessment. Since no changes may be made to an assessment that has been "allocated", unallocating provides a means to adjust either premium information or assessment information before the assessments are once again "allocated".

The user may indicate when assessments have been "approved" and are ready to be sent out to each of the members. Selecting the "approved" button 1224c changes the status of all assessments with a status of "allocated" for the state fund selected to a status of "approved." Once an assessment has reached an "approved" status, it can no longer be returned to a "recommended" status and therefore can no longer be edited. Once a user moves the assessment into an "approved" status, the only way that assessment may be corrected is by using of a reversal assessment functionality. Once an assessment is "approved", all premiums involved in the calculation of the member ratios reached in the assessment are marked as "approved" and may also not be recalculated except on a member by member basis. Selecting the "approved" button finalizes the allocation of the assessment and may trigger the generation of refund checks and the like. At this time, cash receipt records may be generated for all individual members reflecting the "approved" assessment values.

What will now be described are those operations and functions that may be associated with selecting the process assessment menu item 156e from FIG. 9A menu display.

As described in connection with following figures is assessment data in the form of a "drill down" approach. The data stored in the system 10 of FIG. 1 may include different levels of detail. As a user views a first level of data, a second level of data in connection with a portion of the first level of data may also be displayed. This drill down approach allows a user to examine data in more detail where desired. The database included in the system 10 may store this data in a variety of different forms. The data models and descriptions included herein describe a flexible data arrangement to provide a user with the ability to navigate through data displaying detailed information and higher level information as well.

Referring now to FIG. 45, shown is an example of a screenshot 1300 that may displayed in connection with selecting the process assessment option 156e from the menu of FIG. 9A. The assessment history window 1300 may be used to display the amount paid or received for the selected member within a state fund by assessment. There may be more than one row per assessment. This may happen for example when assessment is reversed or an assessment is adjusted for any reason. The screenshot 1300 displays those assessments in connection with the assessments tab 1302 as included in screenshot 1300. Portions of the screenshot 1300, such as 1308, may be active in connection with refunds. Otherwise, such fields may be inactive. The comment tab 1304 may be selected causing screenshot 1310 of FIG. 46 to be displayed. The comments tab 1304 allows a user to view existing comments, or add new comments or notes, for example, in connection with an assessment. The screenshot 1310 of FIG. 46 may be used in displaying as well as entering new comments in the bottom portion of 1310.

The applied amount column 1302b indicates, for example, how a payment received from a member is to be applied. In other words, as described in more detail elsewhere herein, a single payment or check may be applied to multiple assessments. As applied to each assessment, a partial or total payment may be applied to the total amount due for a member. For example, there may be a first assessment amount in dispute by a member. Thus, a member may send a payment less the first amount in dispute as applied to a single assessment. This single payment may include the first amount and another amount owed in connection with another second assessment. Thus, the single payment may be allocated to the first and second assessments as just described. This is described in more detail in connection with FIGS. 48, 49, and 51.

The LOC (line of credit) balance 1308c and the member balance 1308d display the balances currently owed by, or owed to (refund) the member indicated in field 1308e. These fields, and others, are described in more detail elsewhere herein.

Figure 47:
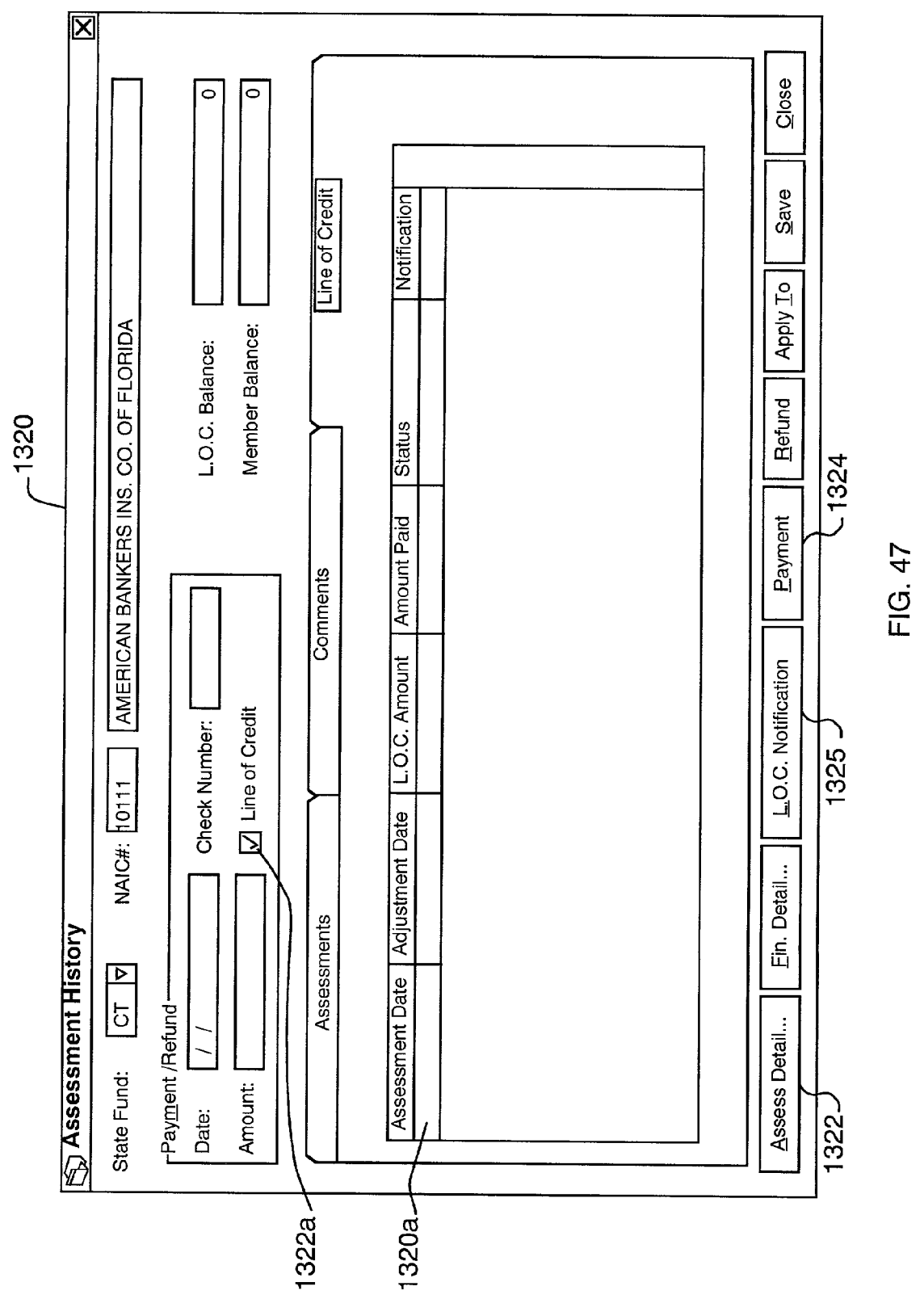

Referring now to FIG. 47, shown is an example of a screenshot 1320 that may be displayed in connection with selection of the (LOC) line of credit tab 1306 of screenshot 1300. Generally, it should be noted that the functionality associated with processing assessment 156e option are those functionalities and operations that may be performed in connection with managing an assessment including, for example, accepting payments and making refunds.

Payments may be entered, for example, by selecting button 1324 in connection with screenshot 1320. This may be used to record incoming payment such as the amount paid by a solvent member insurance company. When recording an LOC payment, the line of button 1322a must also be selected.

Generally, a member may be requested to take out a line of credit which may be used or drawn upon in connection with an assessment. The member has the option of issuing a check rather than obtaining a line of credit. However, if a line of credit is used, notification may be sent and recorded in the system 10, for example, by selecting LOC notification button 1325 causing a status to be indicated in field 1320a.

Referring now to FIG. 48, shown is an example of a screenshot 1340 in connection with selecting the assess detail button 1322 from screenshot 1300 of FIG. 45. The screenshot 1340 may be used in connection with displaying more detailed information about a particular assessment, for example, as highlighted in screen portion 1300a of screenshot 1300. It should be noted in this example indicated is a state fund of "Connecticut" and also "American Bankers Insurance Company of Florida" as the member for an assessment date of Dec. 28, 2000. Detailed information as to this particular assessment for this member is displayed in screenshot 1340 by insolvency, insurance account, and premium year.

The detailed information displayed is made in accordance with the status of the current highlighted row, for example, as may be indicated in screenshot 1300. If the currently highlighted row of 1300 represents an incoming payment of an assessment, then the data included in screenshot 1340 may represent payment activity data. If the currently highlighted row represents a refund, then the current tab 1340 may be the refund of activity tab.

It should be noted that in connection with a payment or refund, a particular payment or refund may be "allocated" across multiple assessments. In other words, a user may highlight multiple assessment rows to apply a particular payment or refund to. Using the payment or refund, a multiple assessment distribution window may appear or an individual assessment may be selected.

By selecting the paid button 1340a, the paid button acts as a toggle switch between a full pay and a no pay.

Selection of the partial/over button 1340b causes display of screenshot 1350 by FIG. 49. This may be used in connection with payments made which are an amount other than an exact amount owed for an assessment. In FIG. 48, a line of data associated with an insolvency, insurance account, and premium year is highlighted. An amount may be allocated to this insolvency, insurance account, and premium year by then selecting button 1340b causing display of screenshot 1350 of FIG. 49.

Selection of the button 1340c for gross assessment causes the display of screenshot 1360 in connection with FIG. 50 to be displayed. Using screenshot 1360, the user may view assessment transaction information for the line highlighted in screenshot 1340.

Referring now to FIG. 51, shown is an example of a screenshot 1380 that may be displayed in response to selecting the financial detail button 1322b from FIG. 45. This screenshot may display more detailed information, such as payments made for a particular member, in connection with the assessment line highlighted in portion 1300a of FIG. 45.

Referring to FIG. 52, shown is an example of a screenshot 1400 that may be displayed in connection with modifying information about a payment. Screenshot 1400 may be displayed, for example, by selecting button 1382a from screenshot of FIG. 51. A user may also delete a payment by selection of button 1382b. Operations such as these may cause a general ledger entry to be generated. As described elsewhere, this system may interact with other systems, such as an accounting system. Certain assessment operations, such as those in connection with refunds, payments, and the like, may cause general ledger entries to be generated and used by the accounting system. It should be noted, that as described elsewhere herein, functionality associated with each particular operation may be performed in accordance with user assigned roles and/or corresponding security levels. For example, not all users may have the ability to delete and/or modify a payment.

Figure 53:
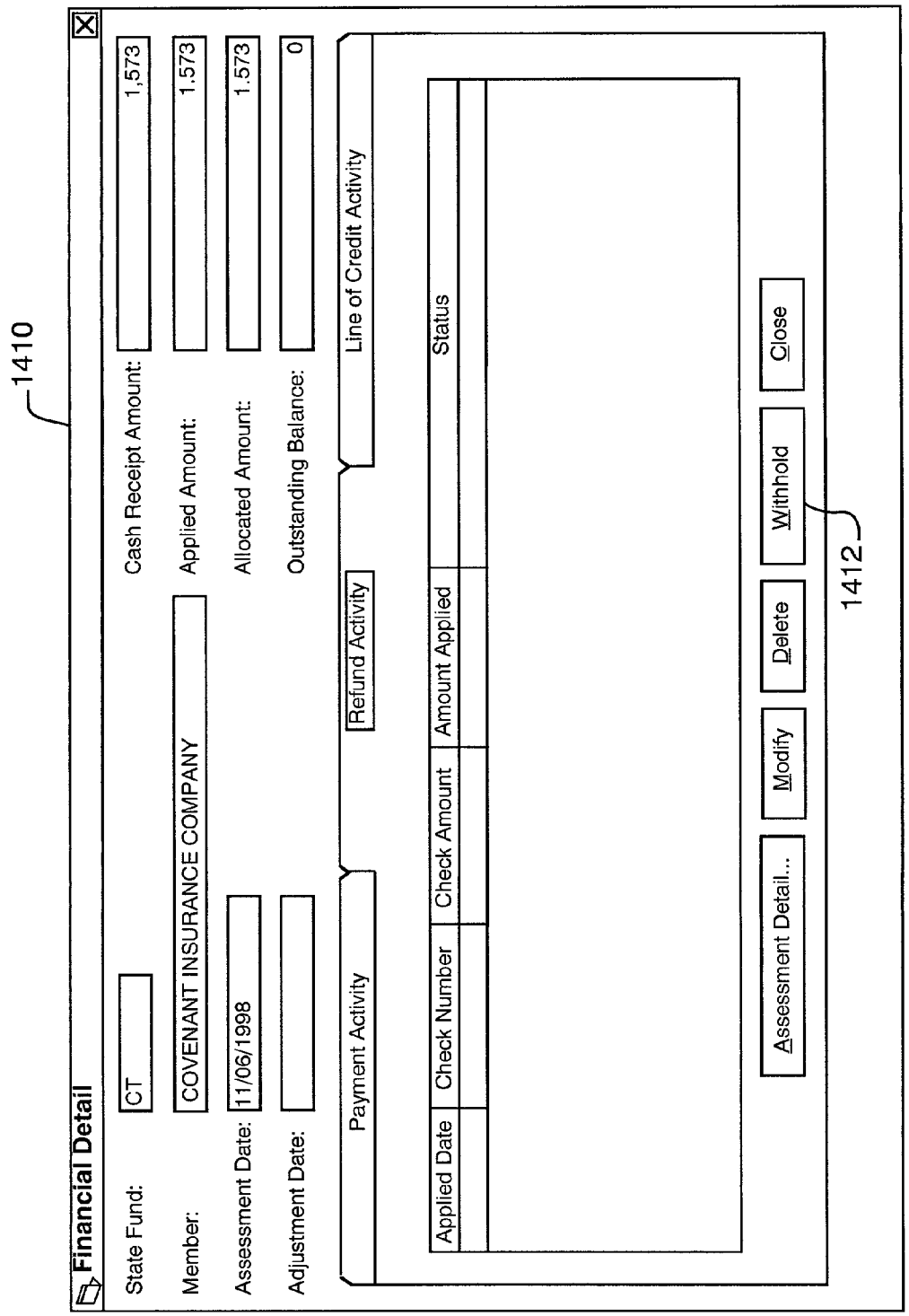

Referring now to FIG. 53, shown is an example of a screenshot 1410 that may be displayed in connection with financial detail about a member. The refund activity tab may be selected, as in screenshot 1410, to display associated refunds for the particular member by assessment. The withhold button 1412 may be used in connection with refunds. Refunds may be required to be withheld, for example, as may be specified in a state law. Use of the withhold button provides an option such that a user may withhold a refund resulting in remaining entries that would otherwise cause a check to be issued to a member.

Figure 54:
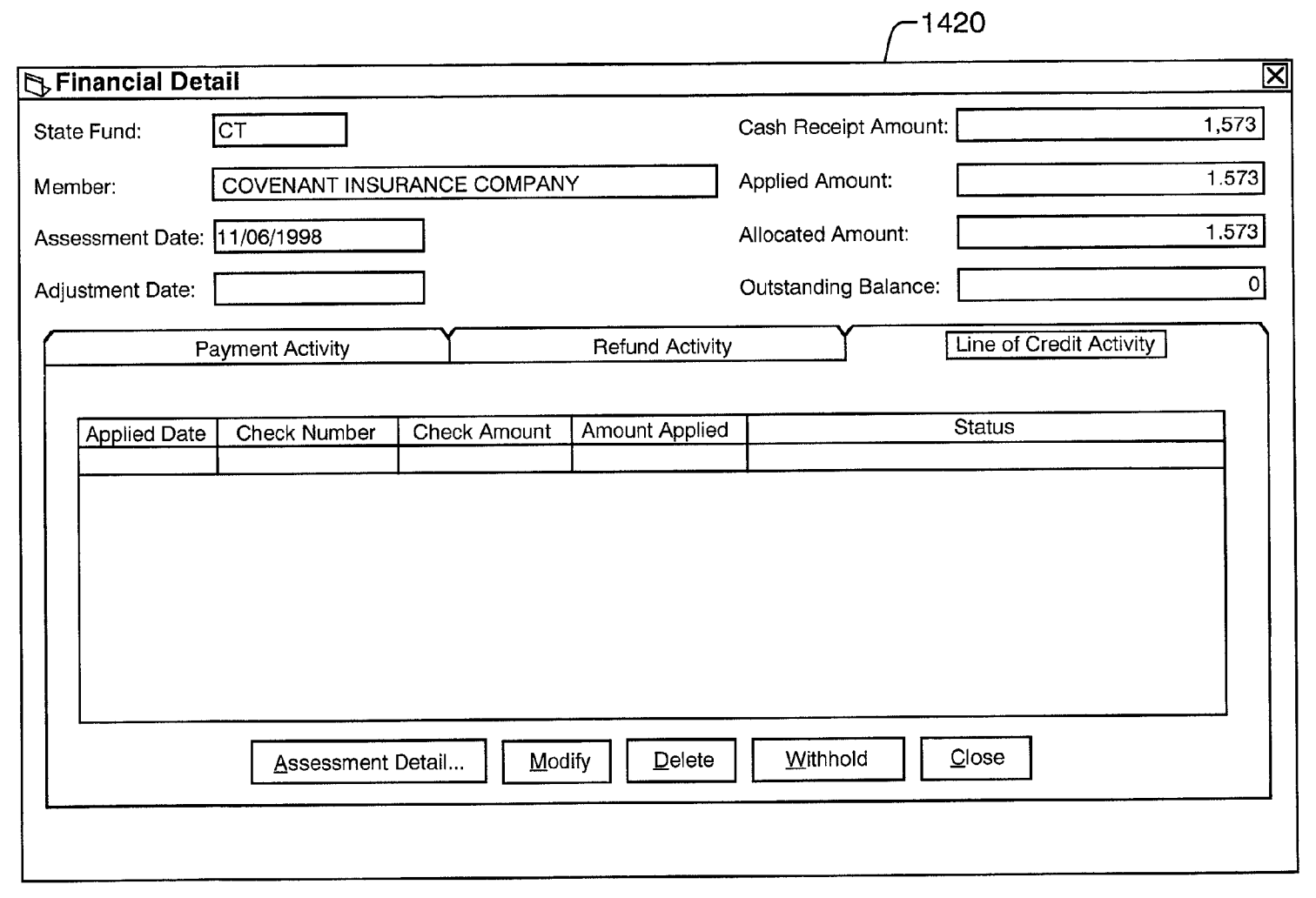

Referring now to FIG. 54, shown is an example of a screenshot 1420 that may be used to display detailed information of a line of credit for the member when the associated tab is activated/selected. As described elsewhere herein, the LOC activity may indicate a check has been received as payment instead of a member securing a line of credit at a financial institution that may be drawn upon.

Referring now to FIG. 55, shown is an example of a screenshot 1450 that may be displayed in connection with searching for refund checks. This screenshot 1450 may be displayed in response to selecting menu option 156f of FIG. 9A. This functionality may be used, for example, in locating refund checks to stop or void.

It should be noted that as described elsewhere herein, different rules may be defined and used in accordance with each particular state such as in connection with the member and state options of FIG. 10A. This menu option and level of granularity provides for unique state calculations to be performed that may vary in accordance with each state.

Figure 56:
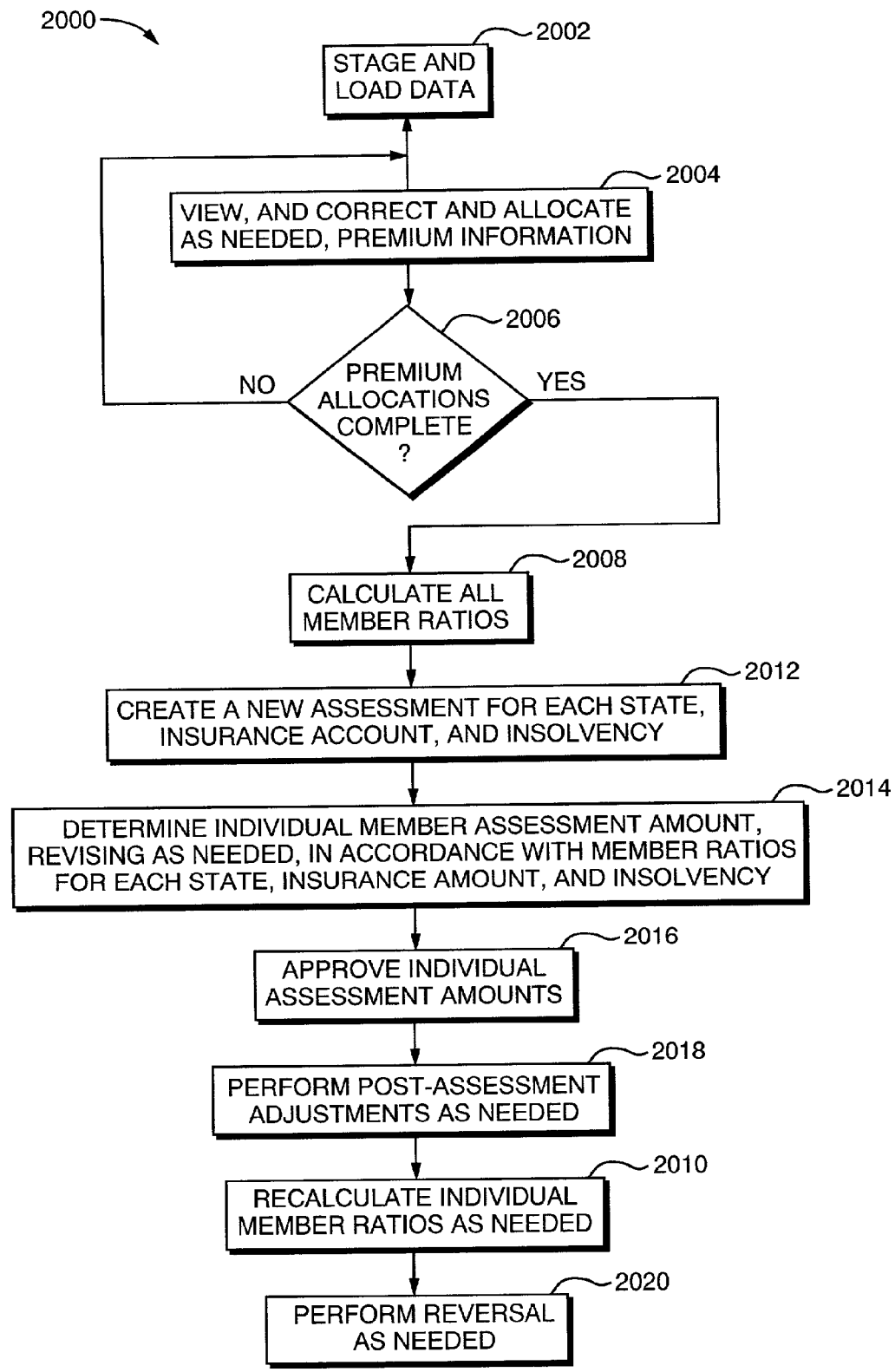
FIG. 56 is a flowchart of method steps of one embodiment for performing data operations in connection with an assessment.
Figure 57B:
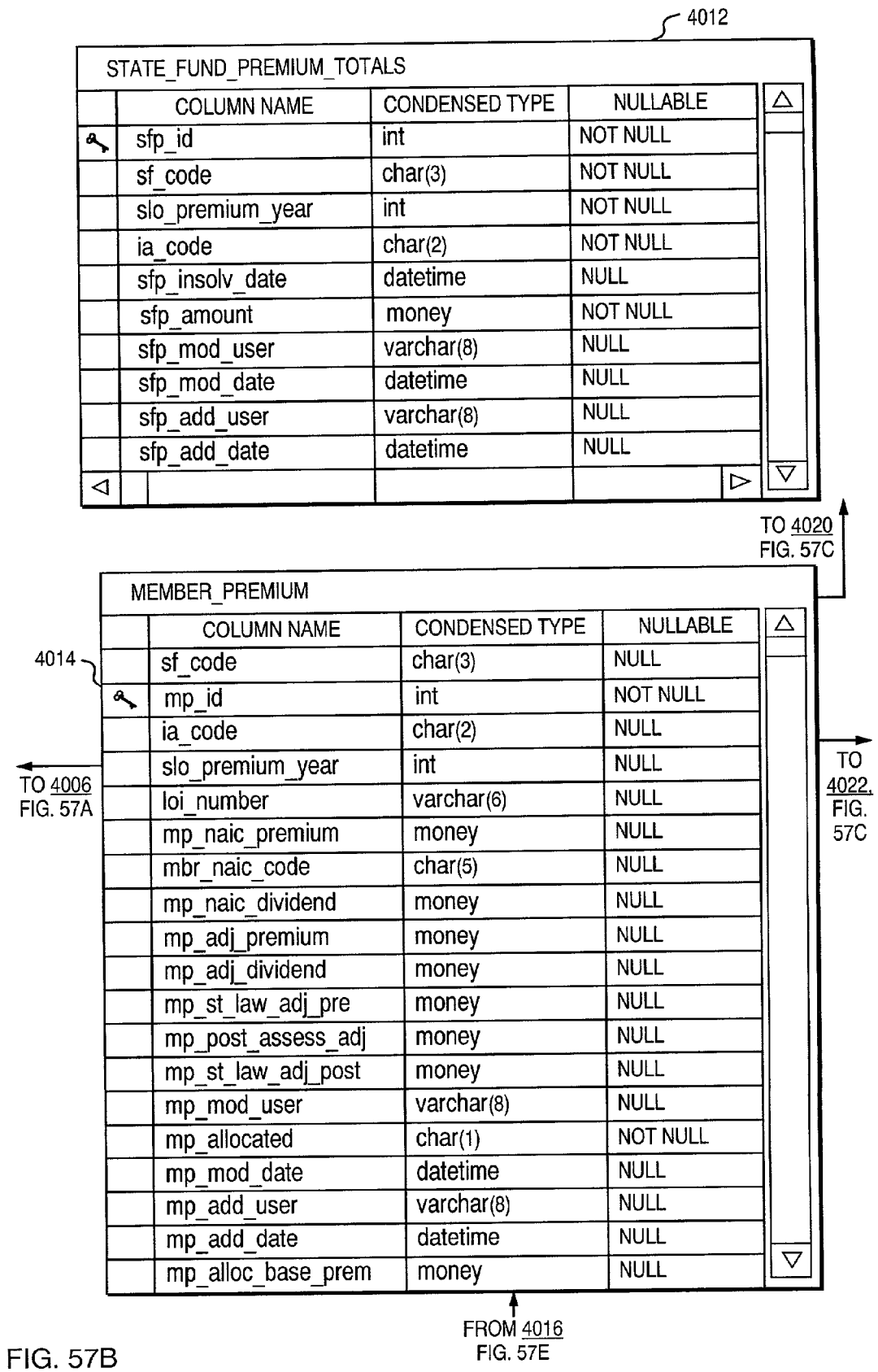
Figure 57E:
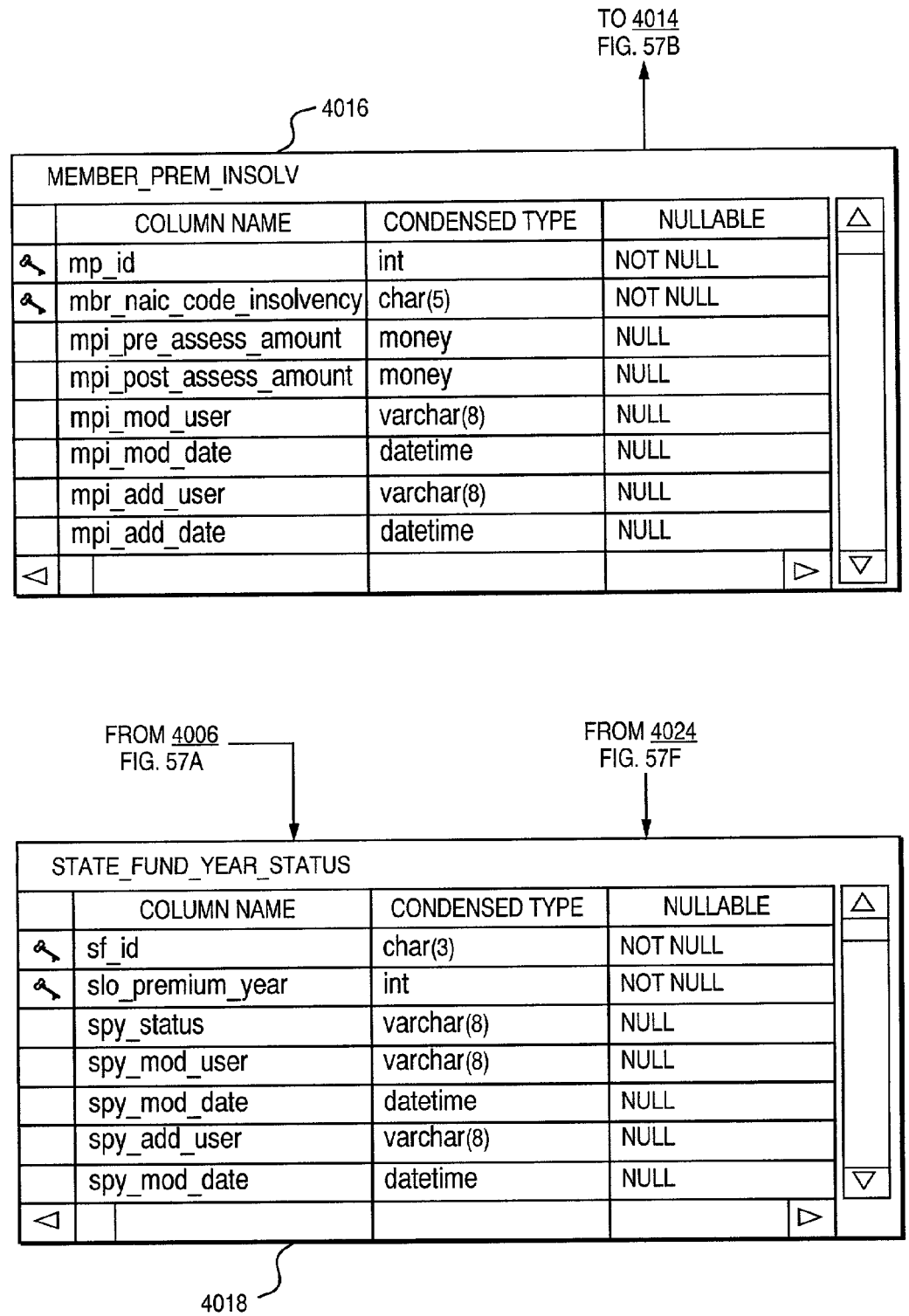
Figure 57F:
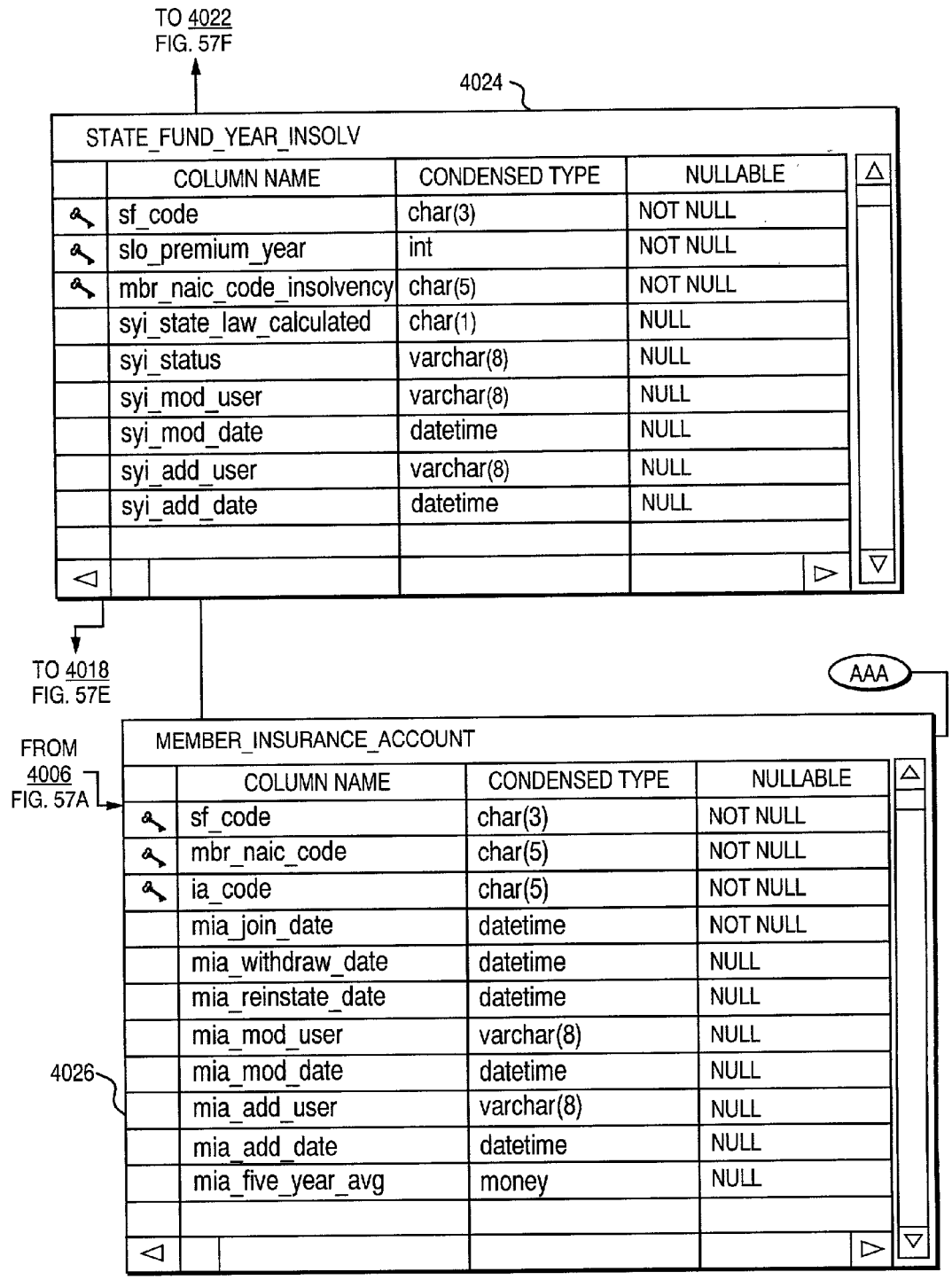
Figure 57G:
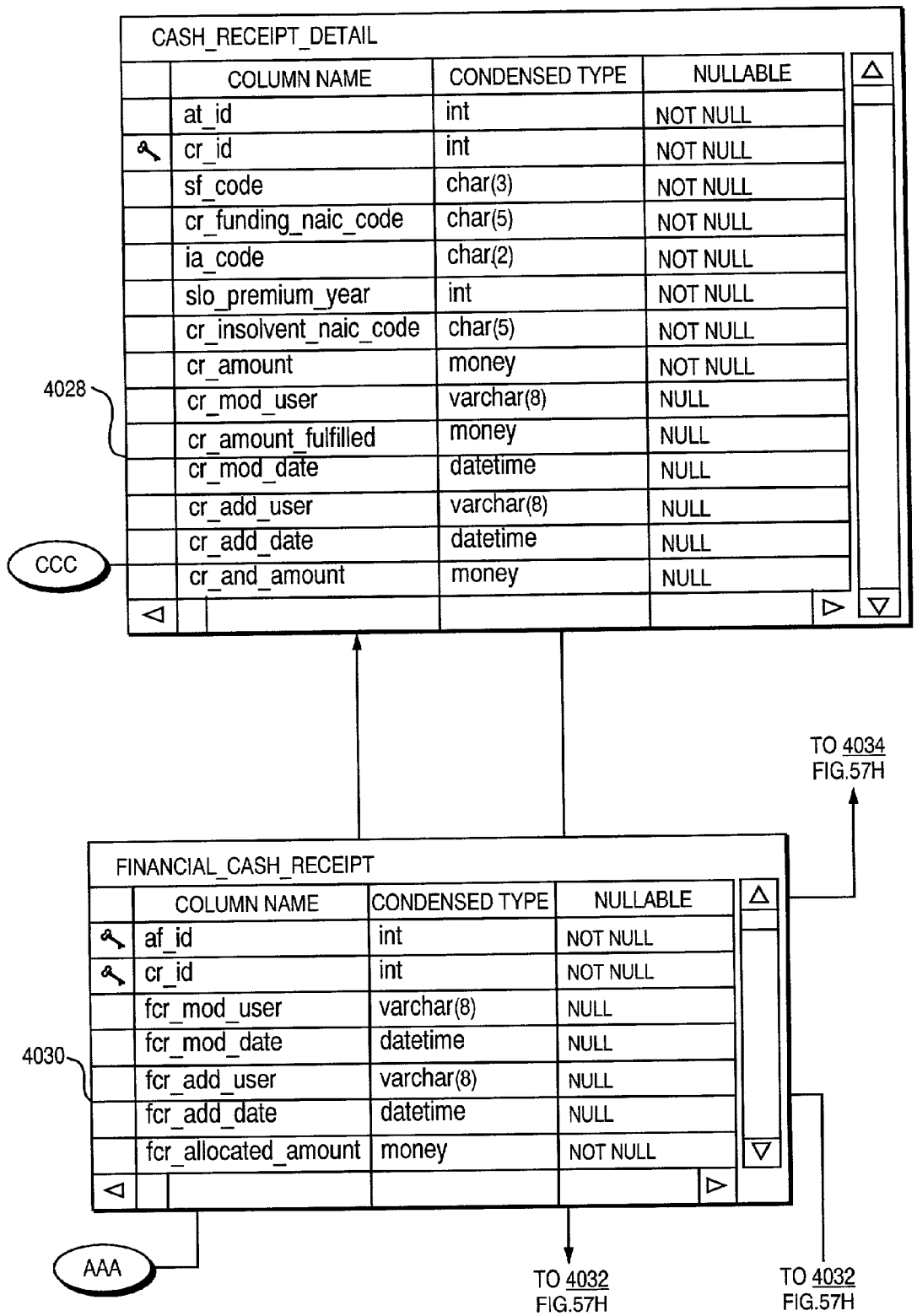
Figure 57H:
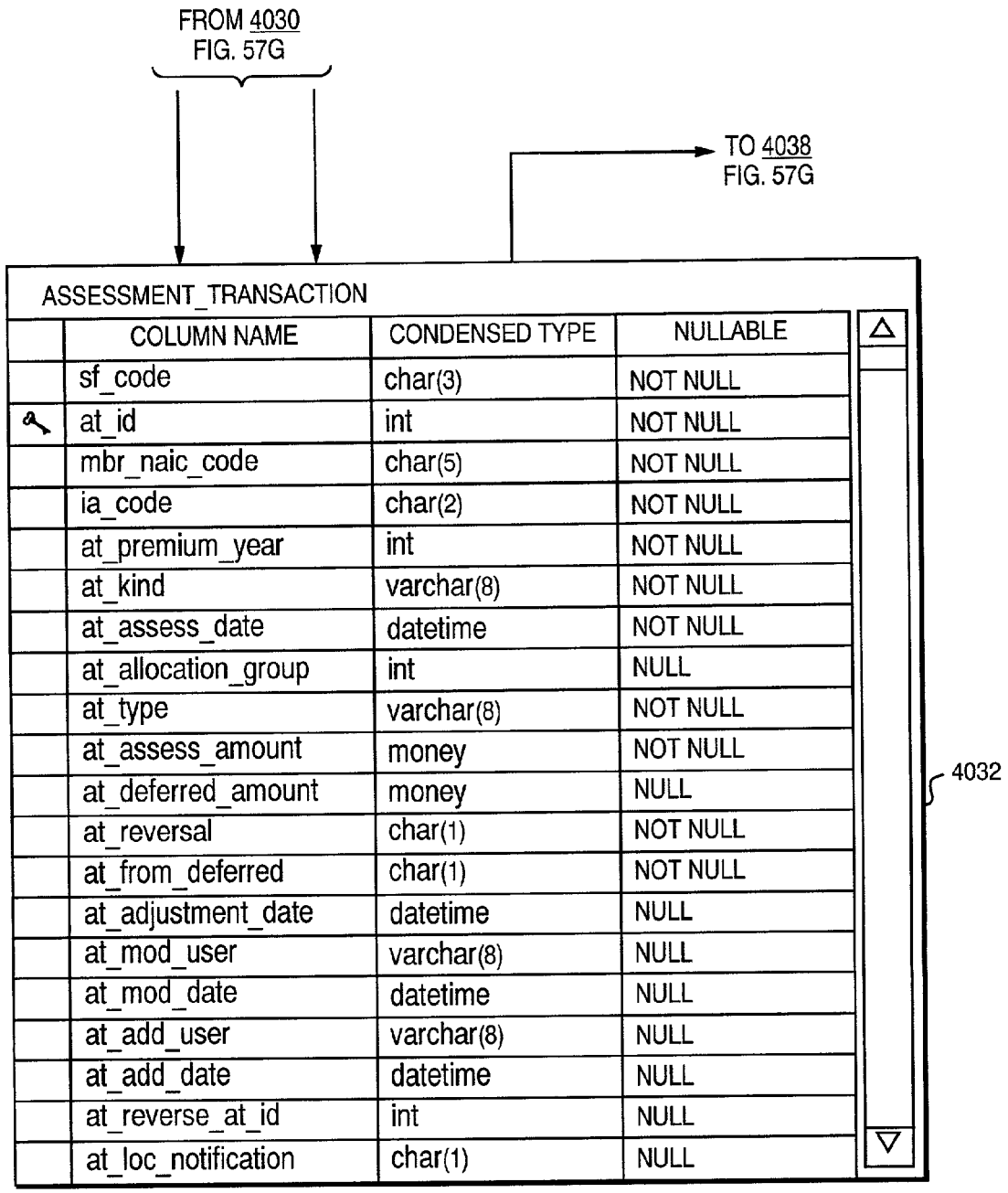
Figure 57I:
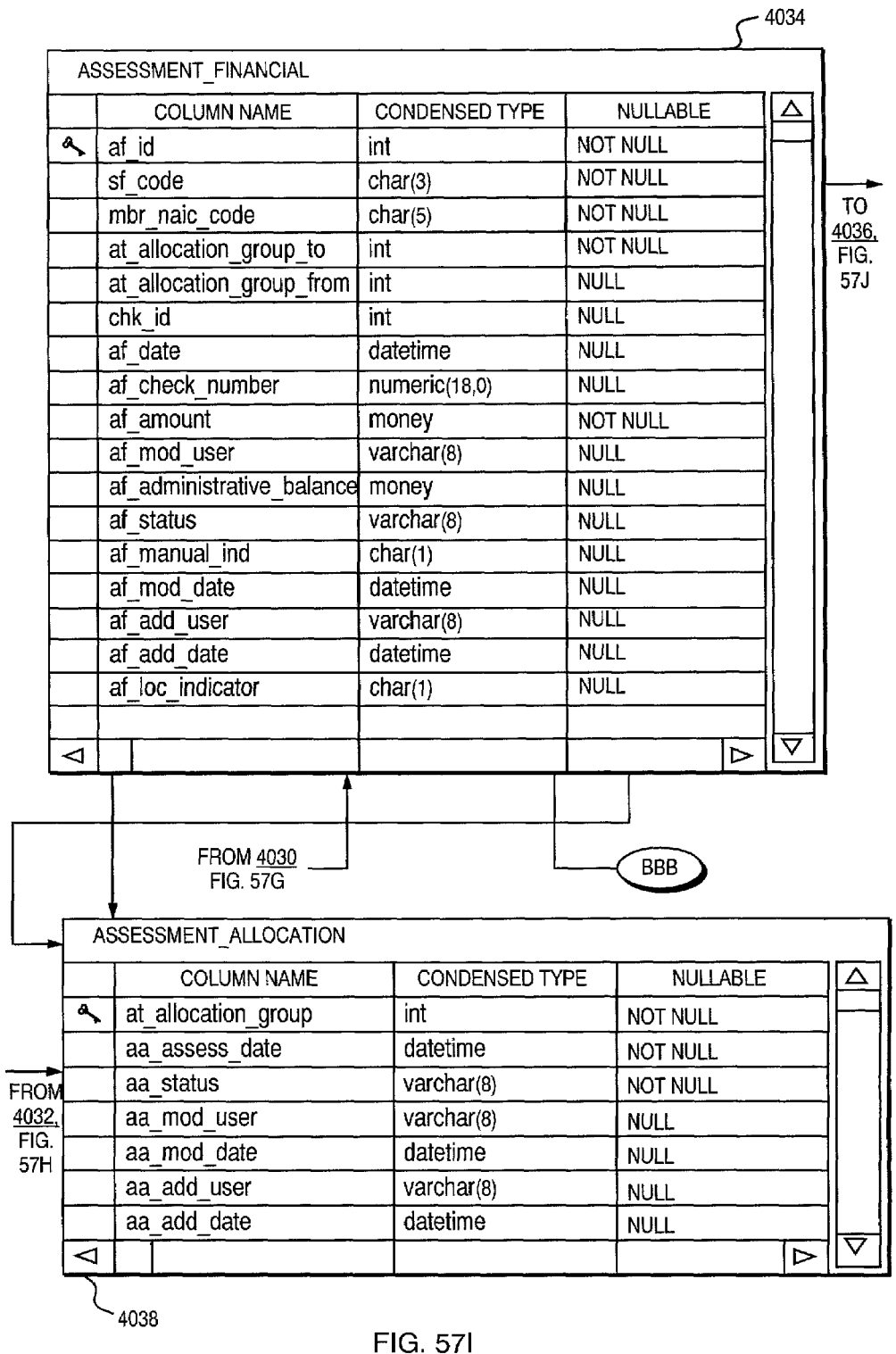
Figure 58A:
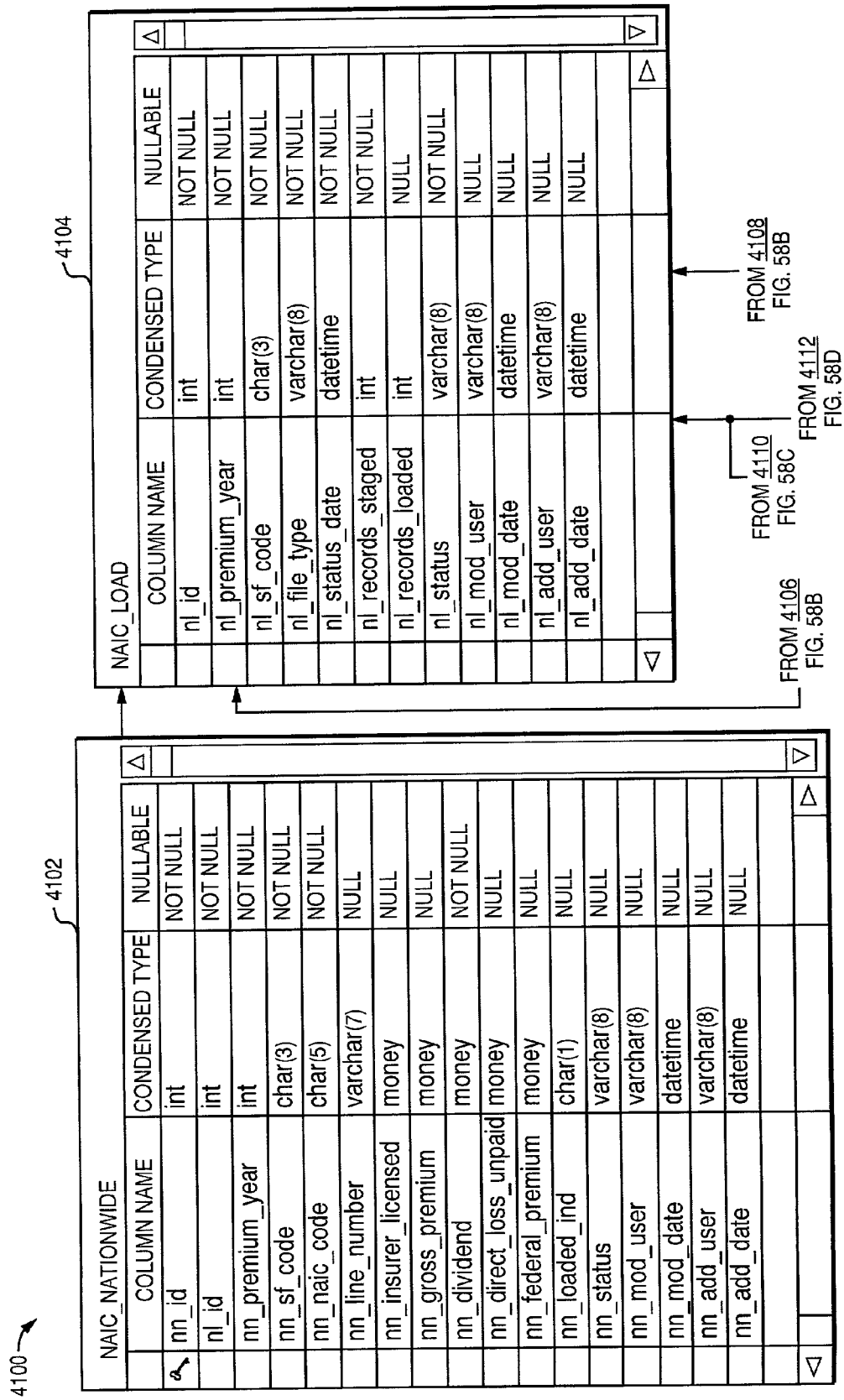
Figure 58B:
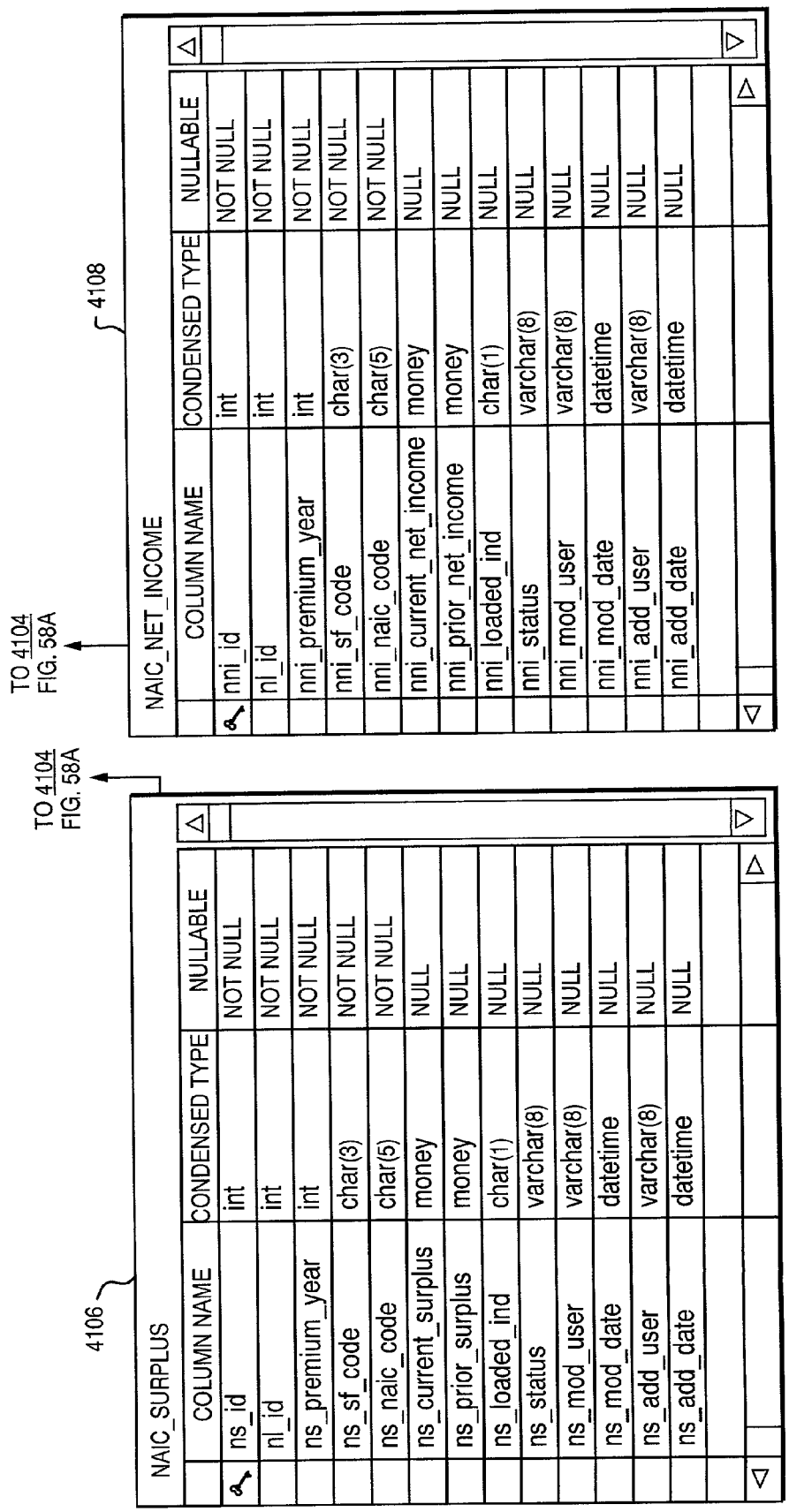

Referring now to FIG. 56, shown is a flowchart 2000 that includes steps of one embodiment that may be performed in connection with an assessment. It should be noted that each of these steps is described elsewhere herein in more detail. At step 2002, data associated with insurance premiums and the like may be loaded into the system. Step 2002 may include, for example, a two-phase process of staging and loading data. The staging may be a temporary area where data is examined and verified before it is actually loaded or integrated into the database.

Control proceeds to step 2004 where premium information included in the data loaded may be viewed, corrected and allocated as needed. In connection with processing of step 2004, premium information may include insurance premium information regarding amounts of insurance business for a member insurance company. For example, in connection with selling insurance policies for a particular line of insurance, different portions of a single line of premium information may be further refined or allocated, such as with an unassessable portion or a single line of data representing multiple amounts for different accounts. In this context, the further refinement of a total or aggregate amount may be included in a line of data that is loaded in connection with step 2002. One example may include a further refinement of an amount as to whether the amount is only partially or completely assessable as another example, an amount may be a single aggregate amount associated with multiple insurance accounts, such as auto and workers compensation.

Control proceeds to step 2006 where a determination is made as to whether the premium allocations are complete. If a determination is made in step 2006 that premium allocations are not complete, control proceeds again to step 2004 where premium information may again be adjusted as needed. At step 2006, when a determination is made that all of the premium allocations are complete, control proceeds to step 2008 where member ratios may be calculated. It should be noted that in this example, an embodiment may include a feature such that member ratios may not be calculated unless premium allocations are complete. Premium allocations may be required in certain instances as described elsewhere herein.

Control proceeds to step 2008 upon determining that the premium allocations where required are complete. At step 2008, member ratios are calculated. Member ratios are ratios for each individual solvent member based on the total aggregate of premiums written for a particular member as associated with a particular insurance account within a state. Member ratios represent a percentage of business that a particular member does within a state for a particular insurance account. The sum of all of the ratios, for example, for a particular insurance account within a particular state may add up to 100% as a result of step 2008 calculations.

Control proceeds to step 2012 where a new assessment is created for each state, insurance account and insolvency. In other words, data is received and input into the system at step 2012 in accordance with a granularity of definition for each state, insurance account and insolvency. This data is input at step 2012 where data is collected that may be used in connection with performing an assessment. In accordance with one aspect of the data representation, after the execution of step 2012, assessment data is available at the "state" level meaning that assessment information is available in accordance with state characteristics or parameters. Control proceeds to step 2014 where individual member assessment amounts are determined with revisions as needed. The individual assessment amounts are determined in accordance with member ratios for each state, insurance account, and insolvency. It is at step 2014, that the data created at step 2012 at the state level is now further propagated to the lower individual member levels of the database by determining the individual member assessment amounts of step 2014. As a result of step 2014 for example in one embodiment, data may be propagated to those data entities included in the database as related to individual member information. In contrast, at the completion of step 2012, the individual member information may not be updated or affected. However, individual state information in connection with a new assessment may be created. At step 2014 the information of step 2012 is now used in determining the individual member amount.

At step 2016, the individual assessment amounts calculated and determined at step 2014 are approved. For example, in connection with approving individual assessment amounts, individual requests are sent to each member, for example, in connection with the amount of assessment associated with each member. As another example, if rather than perform an assessment, a refund may be due to different members, processing of step 2016 may result in the checks actually being issued and sent out to each of the individual members. At step 2018, post-assessment adjustments may be performed as needed. Post-assessment data may include for example entering overriding or new data, correcting an amount of a particular line of insurance and the like. Post-assessment adjustments may include for example re-entering premium information that was wrongly used for a particular member in calculating that individual member's assessment. An individual member's premium may be adjusted as part of the post-assessment adjustment process and that individual's ratio recalculated and issuing a revised assessment amount.

Control proceeds to step 2010 when individual member ratios may be recalculated as needed. For example, in connection with processing step 2010, incorrect premium information may be used for a particular member. Thus, an individual member's premium may be adjusted and the ratio calculated again with respect to the whole. Note that as a result of execution of step 2010, a single individual member's ratio may be recalculated. However, all member ratios are not recalculated. In other words, a particular member's ratio includes a numerator portion over a total denominator portion where the denominator portion represents all of the assessable premium written, for example, in a particular state insurance account.

When performing step 2010 for a particular individual member, only the numerator or top portion is recalculated. As a result of execution of step 2010, the member ratios may no longer total 100% and may be slightly more or less as a particular member or member's numerator is adjusted, and the total aggregate amount is not accordingly adjusted. In step 2010, all individual member ratios are not recalculated as they are in connection with step 2008. All member ratios may not be recalculated for a single member as other premium information may be used in other calculations.

Control proceeds to step 2020 where reversals may be performed as needed. As described elsewhere herein, a reversal may be performed to "undo" or reverse out a previously entered assessment. This may be used, for example, in connection with reversing out a first assessment performed using a first premium year date in which the correct set of premium data was not previously available. At the point in time when the second, different set of premium data becomes available, the previous assessment may be reversed, and another assessment created using the correct set of premium data. A reversal operation is performed for all members and associated premiums. This may be contrasted to a post-assessment adjustment that may be performed for correct data associated with an individual member. In other words, a reversal is "backing out" or "undoing" an entire set of data associated with an assessment. Post assessment adjustments provide for adjusting a single member's information after an assessment has been approved. Reversals provide for correction or update of data as may be related to an entire assessment ratio, numerator and denominator portions of premium information.

Referring now to FIGS. 57A-57J, shown is an example of entities that may be included in a data model 4000 to represent data in connection with assessment functionality. It should be noted that the representation 4000 may replace the data model described in connection with FIGS. 28A-E. The assessment_financial_staging entity 4002 describes data fields that may be associated with allocating and approving assessment transactions.

The assessment_allocation_msf entity 4004 includes information about the LOC notification, such as, for example, whether a member has obtained an LOC.

The member_ratio entity 4006 includes information about a member ratio for a solvent member. This may include, for example, pre- and post assessment ratio information such as in connection with ratios determined using premium information "before" and "after" an assessment is approved.

The member_ratio_insolv entity 4008 tracks ratio information for the particular member as related to an associated insolvency. This provides for, for example, adjusting a particular member's assessment contribution for each insolvency.

The premium_base_year entity 4010 describes the assessment method to be used in determining the premium year on the gross assessment window as described elsewhere herein.

The state_fund_premium_totals entity 4012 includes information that may be used in connection with premium information associated with a particular state fund, for example, representing an aggregate amount of premiums for all members associated with particular state fund in a particular premium year and stored data used in report generation.

The member_premium entity 4014 includes information about premium information for a particular member, including, for example, state law premium information, NAIC premium information as input into the system for this member, and the like. It should be noted that various fields, such as the state law adjusted premium field, may be determined in connection with an automated feature such as selection of the "calculate state law" button described elsewhere herein.

The member_prem_insolv entity 4016 tracks premium information for a particular member as related to an associated insolvency.

The state_fund_year_status entity 4018 describes for a state fund and year, the status of premiums at a point in time as one of calculated, approved or unposted.

The state_fund_loi_per_year entity 4020 is similar to that as described in connection with element 656 of FIGS. 26M-26P.

The member state_fund entity 4022 describes information for each state fund associated with a particular member. For example, included in this entity may be information about when a particular member withdrew in this insurance account in the state, or when a particular member began doing business as associated with this particular state fund. This information may be used, for example, in performing five-year average calculations described elsewhere herein.

The state_fund_year_insolv entity 4024 is as described in connection with element 704 of FIGS. 26U-26Y.

The member_insurance_account entity 4026 is as described in connection with element 690 of FIGS. 26Q-26T.

The cash_receipt_detail entity 4028 includes detailed information in connection with monies applied to each insolvency, insurance account, and premium year. Data entity 4028 is similar to that as described in connection with element 686 of FIGS. 26Q-26T.

The financial_cash_receipt entity 4030 includes information in connection with a cash payment, such as date a payment was received, the check amount, and the like. Data entity 4030 is similar to that as described in connection with element 632 of FIGS. 26K-26L.

The assessment_transaction entity 4032 includes information that may be entered in connection with defining an assessment transaction, such as may be entered in the gross assessment screenshots.

The assessment_financial entity 4034 tracks refunds and payments.

The chk entity 4036 describes information associated with a check that may be issued, for example, in connection with a refund or other payment made to a party in connection with an insolvency.

The assessment_allocation entity 4038 describes information in connection with a status of an associated assessment, such as indicating whether an assessment is allocated.

It should be noted that relationships, such as data dependencies or references, between various entities are represented by lines connecting the various entities. For example, information about a member ratio 4006 is determined using premium information included in data entity 4014 as indicated by a line connecting these two entities.

Uses of the foregoing data entities of FIGS. 57A-57J as may be related to data operations and processing steps are described in more detail in following paragraphs.

Referring now to FIGS. 58A-58D, shown are data entities included in a data model 4100 representing NAIC tables. This data model 4100 describes entities that may be included in representing the NAIC data described elsewhere herein.

As also described elsewhere herein, different states may have different statutes and laws requiring adjustments to be made in connection with different state funds. For example, Connecticut state law may require that premiums be adjusted for a particular state fund if the total of the Connecticut premium is greater than one-half of the nationwide premium. In other words, a state law may override existing premiums in connection with a particular assessment for each member under certain conditions that may be set by different state statutes. The system described herein may include functionality providing for the different calculations that may vary with each particular state. This is described elsewhere herein in more detail as well.

Referring now to FIG. 59, shown is an example of a screen shot 2500 that may be used in connection with displaying premium summary information as may be obtained from selecting the premium information as described elsewhere herein in connection with FIG. 9A. Included as button 2502 on the bottom of screen shot 2500 is the calculation of state law button. By selecting button 2502, processing may be initiated to calculate state law amounts and accordingly adjust premiums and allocations associated with each particular member, if, for example, a state law overrides existing premium allocations and ratios for each member. In this example, "one button" automates the process of calculating state law amounts. For example, by selecting button 2502, the state law amounts if existing for a particular state may be calculated and adjustments accordingly made. Upon completion, a message may be displayed to the user indicating that state law adjustments have been successfully made.

Additionally, state law adjustments may be made by particular states for withdrawn members. One such technique that may be used in connection with determining the amount at which a particular member may be assessed is called the five-year average processing for withdrawn members. The particular method of how a five-year average may be determined may be set forth in a state statute similar to other types of limits as described in connection with each particular state and associated funds. Generally, the five-year average is one technique that may be used in connection with determining a member ratio for withdrawn members. For example, when a member no longer writes certain policies in a particular state and withdraws from a particular insurance account, that member may still be liable to pay an assessment if the insured member withdrew subsequent to an insolvency occurring. In other words, a member may withdraw and no longer write policies in a state for a particular insurance account after an insolvency has occurred. If that member was doing business in the state when an insolvency occurred, that member, even though they subsequently withdrew, may still be assessed a particular amount.

For example, insurance company A became insolvent in 1986. If insurance company B was in business in 1985 and subsequently withdrew and no longer wrote policies or premiums in 1987, insurance company B may still be assessed or liable for amounts associated with insurance company A's insolvency. Monies may still be paid out in connection with insurance company A's insolvency, for example, in 1988 when insurance company B is no longer doing business. However, because insurance company B was currently doing business when insurance company A became insolvent, insurance company B is still liable for those monies in connection with insurance company A's insolvency. The ratio calculated for a particular member for an assessment for year "n" is determined by the amount of premium written by a solvent member in year "n−1". However, in connection with the example just described with insurance company B, there may be no premium information available for insurance company B, for example, if an assessment is levied in the year 1999. State statute may dictate an alternate technique for determining the amount at which insurance company B may be assessed. This technique may be referred to as the five-year average technique and may be specified for example in a state statute or law. Generally, the technique such as the five-year average may vary by state law in determining the amount of an assessment which a particular member is required to contribute. The five-year average technique takes into account the amount of business or premiums that the particular withdrawn member wrote over an average of five years prior to when that particular member withdrew. Thus, in connection with insurance company B, if it withdrew in 1987, an average is taken of all of the amount of premiums written over the five years prior to insurance company B's withdrawal and that amount is an average that is used in determining the contribution of a particular member contributes in connection with an assessment performed for example in 1999. These automated calculations in connection with state law such as the five-year average technique are ones that are automatically performed in connection with selecting the calculate state law button 2502.

The five-year average insurance accounts to which the calculate state law button 2502 may apply may be displayed in the premium detail window, for example, upon selection of the premium detail button 2504 in FIG. 59.

Referring now to FIG. 60, shown is a screen shot 2600 that may be displayed upon selection of the premium detail button 2504. The premium detail screen shot 2600 includes two particular five-year average insurance accounts. The screen shot 2600 represents information that may displayed subsequent to selection of the state law button and affected calculations. Selection of the "calculate state law" button may cause a state law amount to appear in column 1152*e* as described previously in connection with FIG. 38. The particular details of each state statute or law used in determining the five year averages may be represented in routines or tailored procedures as described elsewhere herein. Selection of the "calculate state law" button for a particular state fund displayed causes the appropriate state-specific routines to be executed and accordingly performs additional calculations and amounts to be included in records, for example, for each member. Selecting the calculate state law button 2502 causes entries associated with each of the particular members to be recalculated.

By selecting the premium detail button 2504 in FIG. 59, the premium detail window 2600 may be displayed in connection with the member whose entry is highlighted in screen shot 2500. Referring now to 60, screen shot 2600 shows the results in connection with a particular member in the State of Rhode Island for which a five-year average calculation may be displayed. For example, in connection with the American Bankers Insurance Company of Florida shown in screen shot 2600, five-year averages are calculated in connection with insurance accounts 2606*a* and 2606*b* for "auto" and "other", respectively. In connection with each of these insurance accounts, a particular amount of adjusted premium has been associated with this particular member for determining member ratios in connection with assessments. The state law adjusted amount for this member is shown in column 2602 for each of these two lines of insurance accounts. The net premium associated with each of these particular lines of insurance accounts for this member is shown in connection with column 2604. In other words, in determining the amount or member ratio of this particular member, the amount of premium information that will be used is as displayed in connection with column 2604 for each of these accounts.

Referring now to FIG. 61, shown as the screen shot 2700 that may be displayed in connection with entering withdrawal information for a particular member as associated with a particular insurance account. Whenever a member withdraws, the five-year average may be calculated in connection with the particular withdraw date.

As shown in screen shot 2700, the withdraw date 2702 indicates the particular date in which a member insurance company withdraws from doing business with a particular line of insurance as indicated in field 2708a and 2708b. The reinstate date 2704 may show a date on which a particular insurance company again does business or reinstates business in a particular insurance account as may be associated with an account indicated in fields 2708a and 2708b. The five-year average amount in 2706 is that new amount which may be recalculated in connection with reentry of a withdrawal date 2702 or reinstate date 2704. It should be noted that in this particular embodiment, screen shot 2700 may be reached in connection with menu selections from the member search option 158a.

What will now be described are how different entities included in the representation 4000 may be used in connection with performing different data operations described elsewhere herein.

In connection with loading the NAIC data, data entity 4014 including member_premium information is updated. Member_ratio data entity 4006 may be populated as a result of calculating member ratios. Additionally, the premium data has an associated status change from "unposted" to "calculated" resulting in spy_status field of data entity 4018 being updated to indicate this premium status change. An instance of a data entity 4014 and 4006 may be created for each set of member information loaded.

Once premium data is loaded (as in step 2002) and before or after member ratios are calculated (as in step 2008), premium information may be "edited" or modified. As described herein, modification to premium information may be performed manually, such as by manual selection and adjustment of member information, or automatically, such as in connection with performing state law calculations. Additionally, once member premium information has been updated, member ratios may be calculated or recalculated (as in step 2008) using this updated premium information. This process may be repeated until there is an associated assessment allocation.

Additionally, once an assessment allocation is performed, premiums may be modified at the member level and member ratios may be recalculated (as in step 2010) in connection with post assessment adjustments.

In connection with manually updating one or more pieces of information, corresponding fields of data entity 4014 member_premium may be updated. Subsequently, member ratios may be recalculated causing updates to data entity 4006 member ratios.

In connection with automatically updating fields of the data entity 4014 member_premium, various other data entities may also be used. For example, in performing the automated state law calculation operation described elsewhere herein, a value in the field mia_five_year_avg in data entity 4026 member_insurance_account may be used to generate portions of data entities 4006 member_ratio and 4008 member_ratio_insolv. Additionally, syi_state_law_calculated field of data entity 4024 may be updated to indicate a status change in connection. In this embodiment, the syi_state_law_calculated field indicates whether a state law calculation has been performed.

In connection with step 2012 of FIG. 56 for creating an assessment, one or more instances of data entity 4032 assessment_transaction may be created. In this embodiment, a single instance of the assessment_transaction entity may be created for each entry made per insolvency as associated with gross assessment functionality described herein. As a result of allocating an assessment (as in step 2014), one or more assessment_transaction entities 4032 may be associated with a single instance of data entity 4038 assessment_allocation. Additionally, instances of data entity 4028 cash_receipt_detail are populated for each member as an assessment is allocated.

When an assessment has its status changed from "allocated" to "approved", status fields of data entities may be updated to indicate this status change. For example, the aa_status of data entity 4038 may be updated to indicate that assessment data has an associated allocated status (step 2016). Additionally, a similar indicator or status field associated with premium data may also be updated, for example, as included in data entity 4018 spy_status field.

It should be noted that an embodiment may use these status fields in connection with performing validations to determine if other processing operations may be performed. For example, the status field associated with premium information may be used to determine whether pre-assessment fields may be updated. If the status field indicates that an assessment has been "approved", then pre-assessment fields cannot be updated. Rather, post-assessment adjustments may be used.

In connection with an approved assessment, payments and refunds may be made. Data entity 4034 assessment financial tracks refunds and payments to each member. An instance of this entity 4034 may be created for each member. Similarly, data entity 4036 chk may be populated in connection with issued outgoing checks to a member, for example, as in connection with a refund.

Data entity 4030 financial_cash_receipt may be used to associate or link one or more cash_receipt_detail entities 4028 to one or more assessment_financial entities 4034. This association may be used, for example, to apportion a single payment among more than one assessment amount per insolvency using, the field fcr_allocated_amount of data entity 4030. Similarly, multiple payments may be associated with an applied to a single amount.

In connection with LOC processing, a status field aam_loc_ notification is included in data entity 4004 to indicate whether a line of credit has been obtained by a member.

An embodiment may also include other data entities for use in holding data or intermediate calculations in connection with other operations, for example, such as data entity 4002.

Other operations may be performed at different points in time. The foregoing is just one example of how a user may select and use the functionality described herein.

The foregoing system and data organization provides many advantages and facilitates an embodiment including any one or more of a variety of different automated functionalities. Using the foregoing, refunds may be determined based on historical activity of payments. The foregoing data organization and database may be used to store information for multiple years in connection with assessment payments made by each member. Using a LIFO technique, each member may accordingly be forwarded refunds when due in accordance with the most recent assessment transactions for the insolvency and insurance account combination. For example, if member A made payments in 1996 of 50$, 1997 of 100$, and refunds are paid out in the year 2000, company A may receive 75$ based on the 100$ 1997 payment. If another refund is issued, the next 25$ may count as the balance of the 100$ 1997 payment. In other words, the amount of payments are used in determining the amount of refunds paid out to member companies in a given year.

The foregoing system includes a flexible data arrangement that provides for "drilling down" technique for accessing assessment data. As described elsewhere herein, data may be displayed from the more general to target specific detailed data in accordance with higher level data selections. The more detailed information is available for searching, viewing and other data operations after data has been propagated in the database to those data fields associated with detailed, member-level information, such as in connection with changing status of an assessment from recommended to allocated. At this point, data may be obtained and organized at different levels throughout the entire application.

In connection with assessments, an embodiment may include the ability to record cash transactions that are different from those billed out in connection with an assessment. For example, if an amount of $1050 is due, and a member pays $1500, the allocate functionality described herein may be used to allocate a portion of the $1500 toward the $1050 due and apply the remaining amount, for example, to another assessment, to other monies due, and the like. In other words, the foregoing system has the ability to reconcile and track differences in payments and assessments due rather than rely on functionality, for example, that may be included solely in an accounting system with which this system interacts. Similarly, this system has the ability to apply multiple payments made by a member to a single assessment amount due. All payments may be tracked, for example, in connection with the assessment module. An embodiment may also include functionality for further correcting and deleting payment information as well as viewing and sorting payment data.

The assessment data in an embodiment may be associated with a plurality of different statuses in which each status corresponds to a different state of the assessment data and may have different associated operations that may be performed on the data in any given state. This hierarchy of statuses and associated particular data operations provides for improved data integrity by only allowing certain data operations to be performed when data is at a certain processing point. For example, when an assessment has an "approved" status, adjustments may be made only as post-assessment adjustments per member or reversed out for all members. Further, in a previous system, it may be common practice to delete and remove data and detailed information in connection with an assessment once the assessment has been approved. This may imply that certain functionality, such as the ability to view payment history of previous assessments and pay out refunds in accordance with past payments, for example, may not be included. However, in a system having a flexible data organization as described herein, detailed information about previous assessments may be maintained and used.

The foregoing system may also include warning levels, for example, in connection with capacity limits for assessments for each member. For example, based on state statute, only 2% of the net direct premium may be assessed for each account. The system may track the amount assessed for each member in connection with this maximum value.

When a premium year has data updated, for example, in connection with a post-assessment adjustment, an embodiment may track uses and references to this updated premium data and automatically update other calculations based on this updated premium data. Messages may be issued to users with various roles and responsibilities in connection with a single data update that affects other calculations. In other systems, for example, which may track information only within a single assessment, cross assessment dependencies may not be tracked as described herein.

The foregoing system may include functionality for offsetting transactions using an applied to/credited from method. For example, if a member owes 100$ and is due a refund check of 50$, the system described herein may apply the 50$ refund to the 100$ assessment owed by the member causing generation of a first general ledger entry that may be used in an associated accounting system. When the member makes a subsequent 50$ payment, a second general ledger entry may be also used in the associated accounting system. However, prior to this, the system described herein may internally track monies in connection with assessments.

In accordance with the different data operations and assessment statuses, the foregoing system provides the ability to run hypothetical or "what if" assessments. In other words, before reaching approval status, the assessment data is organized in phases or stages allowing a user to enter hypothetical assessment data to determine the outcome and effect on a member-per-member basis without actually performing the assessment. The data may be "backed out" prior to the approval step, for example.

An embodiment may include a variety of different data operations such that data may be viewed at its different stages in time. An embodiment may include functionality tracking data in its different phases and details regarding modifications made thereto. Further an embodiment may also allow a user to view any or all of the same. For example, an embodiment may track adjustments made to member premium information including the beginning data entry of the NAIC raw data, corrections made to this raw data, and associated state law calculations.

The foregoing describes functionality, such as in connection with five year average premium calculations, that may be performed automatically in connection with state-specific rules that may also be defined.

The reversal functionality associated with assessment data may be performed using automated techniques. In one embodiment as described herein, by reversing at the higher gross assessment level, new entries may be made or drilled down to the member level. For example, by allocating and then approving a reversal, all cash records and the like may be generated for each member automatically.

Additional functionality may be included in accordance with state statutes. For example, in connection with repaying a borrowing assessment, interest may be apportioned and general ledger transactions automatically generated in connection with the same. The interest rate as well as the occurrence of a "borrowing" may vary by state statute.

The foregoing arrangement provides for implementing functionality in an embodiment that may include a mix of manual and automated operations. There may be instances in which, even though an operation is automated, it may be desirable to also allow for manual operations. For example, it may be desirable to allow for generation and recordation of manually cut checks in the CAPS system 402 even though functionality may be automated, such as through interaction with the accounting system 404. The CAPS system 402 may include functionality for tracking automatically and manually generated checks in the system 402. Other embodiments, for example, may include only functionality for those checks automatically generated.

The foregoing system provides for segregation of particular data operations, statuses and functionality. The LOC assessment transactions may be segregated from other assessment transactions. In other words, those assessments associated with an LOC may be tracked separately from other remaining assessments. This may be desired since the LOC may not be used or commonly drawn upon. Thus, it may prove beneficial in this type of environment based on the likelihood of usage to segregate information associated with the LOC transactions.

Data may be "phased in" or integrated into the database and system in phases. An embodiment, for example, may include the different statuses associated with assessment data. Additionally, the raw NAIC data first input into the system may also be phased-in, for example, in two phases as described herein. In a first phase, the data may be placed in a temporary holding or staging area. At this point, data may advantageously be viewed, modified, and the like, prior to integration into the database. Thus, data integrity may also be enhanced using this type of phase-in functionality in an embodiment.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for performing an assessment comprising:
   determining with a triggering system in a computer device when an assessment of at least one insolvency fund associated with a plurality of insurers is needed based on one or more triggers;
   performing with an assessment processing system in the computer device the assessment of the at least one insolvency fund based on one or more factors when the determining determines the assessment is needed;
   allocating with the assessment processing system in the computer device a member assessment amount to each of the plurality of insurers based on the performed assessment; and
   providing with a communication system in the computer device notification of the allocated member assessment amount to each of the plurality of insurers.

2. The method as set forth in claim 1 wherein the one or more triggers comprise an insolvency of at least one of the plurality of insurers, a size of an insolvency of at least one of the plurality of insurers above an insolvency amount threshold, a current total amount in the at least one insolvency fund below a threshold amount, and an expiration of a first set period of time.

3. The method as set forth in claim 2 wherein the insolvency amount threshold comprises an amount needed to play existing claims.

4. The method as set forth in claim 1 wherein the allocating with the assessment processing system in the computer device the member assessment amount further comprising:
   determining with the assessment processing system a member ratio for the allocating the member assessment amount to each of the plurality of insurers; and
   applying with the assessment processing system each of the determined member ratios to a gross assessment amount obtained from the performed assessment to obtain the member assessment amount for each of the plurality of insurers.

5. The method as set forth in claim 1 wherein the one or more factors comprise at least one of one or more state rules and one or more state statutes relating to an insurance insolvency.

6. The method as set forth in claim 1 further comprising:
   receiving with the communication system in the computer device approval of the allocated member assessment amounts from each of the plurality of insurers; and
   finalizing with the assessment processing system in the computer device the allocated member assessment amounts based on the received approval.

7. The method as set forth in claim 1 further comprising:
   receiving with the communication system in the computer device at least one of new data and adjusted data relating to at least one of the performing the assessment and the allocating the assessment; and
   adjusting with the assessment processing system in the computer device the allocating the member assessment amount for at least one of the plurality of insurers based on the at least one of new data and adjusted data.

8. The method as set forth in claim 7 wherein the adjusting further comprises:
   recalculating with the assessment processing system in the computer device at least one new member ratio for allocating to at least one of the plurality of insurers; and
   applying with the assessment processing system in the computer device the at least one new determined member ratio to a gross assessment amount obtained from the performed assessment to obtain the member assessment amount for at least one of the plurality of insurers.

9. The method as set forth in claim 1 further comprises:
   receiving with the communication system in the computer device a reversal notification from at least one of the plurality of insurers; and
   reinstating with the assessment processing system in the computer device the prior member assessment amount to each of the plurality of insurers in response to the received reversal notification.

10. A computer readable medium having stored thereon instructions for performing an assessment comprising machine executable code which when executed by at least one processor, causes the processor to perform steps comprising:
    determining when an assessment of at least one insolvency fund associated with a plurality of insurers is needed based on one or more triggers;
    performing the assessment of the at least one insolvency fund based on one or more factors when the determining determines the assessment is needed;
    allocating a member assessment amount to each of the plurality of insurers based on the performed assessment; and
    providing notification of the allocated member assessment amount to each of the plurality of insurers.

11. The medium as set forth in claim 10 wherein the one or more triggers comprise an insolvency of at least one of the plurality of insurers, a size of an insolvency of at least one of the plurality of insurers above an insolvency amount threshold, a current total amount in the at least one insolvency fund below a threshold amount, and an expiration of a first set period of time.

12. The medium as set forth in claim 11 wherein the insolvency amount threshold comprises an amount needed to play existing claims.

13. The medium as set forth in claim 10 wherein the allocating the member assessment amount further comprising:

determining a member ratio for the allocating the member assessment amount to each of the plurality of insurers; and applying each of the determined member ratios to a gross assessment amount obtained from the performed assessment to obtain the member assessment amount for each of the plurality of insurers.

14. The medium as set forth in claim 10 wherein the one or more factors comprise at least one of one or more state rules and one or more state statutes relating to an insurance insolvency.

15. The medium as set forth in claim 10 further comprising:
receiving approval of the allocated member assessment amounts from each of the plurality of insurers; and
finalizing the allocated member assessment amounts based on the received approval.

16. The medium as set forth in claim 10 further comprising:
receiving at least one of new data and adjusted data relating to at least one of the performing the assessment and the allocating the assessment; and
adjusting the allocating the member assessment amount for at least one of the plurality of insurers based on the at least one of new data and adjusted data.

17. The medium as set forth in claim 16 wherein the adjusting further comprises:
recalculating at least one new member ratio for allocating to at least one of the plurality of insurers; and
applying the at least one new determined member ratio to a gross assessment amount obtained from the performed assessment to obtain the member assessment amount for at least one of the plurality of insurers.

18. The medium as set forth in claim 10 further comprising:
receiving a reversal notification from at least one of the plurality of insurers; and
reinstating the prior member assessment amount to each of the plurality of insurers in response to the received reversal notification.

19. A system comprising:
a triggering system that determines when an assessment of at least one insolvency fund associated with a plurality of insurers is needed based on one or more triggers;
an assessment processing system that performs the assessment of the at least one insolvency fund based on one or more factors when the determining determines the assessment is needed and allocates a member assessment amount to each of the plurality of insurers based on the performed assessment; and
a communication system that provides notification of the allocated member assessment amount to each of the plurality of insurers.

20. The system as set forth in claim 19 wherein the one or more triggers comprise an insolvency of at least one of the plurality of insurers, a size of an insolvency of at least one of the plurality of insurers above an insolvency amount threshold, a current total amount in the at least one insolvency fund below a threshold amount, and an expiration of a first set period of time.

21. The system as set forth in claim 20 wherein the insolvency amount threshold comprises an amount needed to play existing claims.

22. The system as set forth in claim 19 wherein the assessment processing determines a member ratio for the allocating the member assessment amount to each of the plurality of insurers and applies each of the determined member ratios to a gross assessment amount obtained from the performed assessment to obtain the member assessment amount for each of the plurality of insurers.

23. The system as set forth in claim 19 wherein the one or more factors comprise at least one of one or more state rules and one or more state statutes relating to an insurance insolvency.

24. The system as set forth in claim 19 wherein the communication system receives approval of the allocated member assessment amounts from each of the plurality of insurers and the assessment processing system finalizes the allocated member assessment amounts based on the received approval.

25. The system as set forth in claim 19 wherein the communication system receives at least one of new data and adjusted data relating to at least one of the performing the assessment and the allocating the assessment and the assessment processing system adjusts the allocating of the member assessment amount for at least one of the plurality of insurers based on the at least one of new data and adjusted data.

26. The system as set forth in claim 19 wherein the assessment processing system recalculates at least one new member ratio for allocating to at least one of the plurality of insurers and applies the at least one new determined member ratio to a gross assessment amount obtained from the performed assessment to obtain the member assessment amount for at least one of the plurality of insurers.

27. The system as set forth in claim 19 wherein the communication system receives a reversal notification from at least one of the plurality of insurers and the assessment processing system reinstates the prior member assessment amount to each of the plurality of insurers in response to the received reversal notification.

* * * * *